United States Patent
Roman et al.

(10) Patent No.: US 9,116,596 B2
(45) Date of Patent: Aug. 25, 2015

(54) SHARING IMAGES AND COMMENTS ACROSS DIFFERENT DEVICES

(71) Applicant: Apple Inc., Cupertino, CA (US)

(72) Inventors: Peter W. Roman, Los Altos, CA (US); Joshua B. Dickens, Menlo Park, CA (US); Richard R. Dellinger, San Jose, CA (US)

(73) Assignee: APPLE INC., Cupertino, CA (US)

( * ) Notice: Subject to any disclaimer, the term of this patent is extended or adjusted under 35 U.S.C. 154(b) by 212 days.

(21) Appl. No.: 13/631,943

(22) Filed: Sep. 29, 2012

(65) Prior Publication Data
US 2013/0332855 A1    Dec. 12, 2013

Related U.S. Application Data

(60) Provisional application No. 61/657,806, filed on Jun. 10, 2012, provisional application No. 61/657,883, filed on Jun. 10, 2012, provisional application No. 61/699,815, filed on Sep. 11, 2012.

(51) Int. Cl.
*G06F 3/0481* (2013.01)
*G06F 3/0488* (2013.01)
*G06F 3/0484* (2013.01)
*H04L 12/58* (2006.01)

(52) U.S. Cl.
CPC ............ *G06F 3/0481* (2013.01); *G06F 3/0488* (2013.01); *G06F 3/04842* (2013.01); *H04L 51/32* (2013.01)

(58) Field of Classification Search
CPC ......... G06F 3/00; G06F 3/048; G06F 3/0481; G06F 9/44543; G06F 3/0482; G06F 3/04817; G06F 15/16; G06F 3/01; G06F 3/041; G06Q 50/01; G06Q 10/10

USPC ......... 715/751, 753, 764, 765, 810, 835, 838; 705/319; 709/204

See application file for complete search history.

(56) References Cited

U.S. PATENT DOCUMENTS

| | | | |
|---|---|---|---|
| 7,756,945 B1 * | 7/2010 | Andreessen et al. .......... | 709/217 |
| 7,823,057 B1 | 10/2010 | Schultz et al. | |
| 7,840,650 B2 | 11/2010 | Levin | |
| 7,890,858 B1 | 2/2011 | Graham et al. | |
| 8,402,357 B1 | 3/2013 | Norwood et al. | |

(Continued)

FOREIGN PATENT DOCUMENTS

WO    WO 2013/188078    12/2013

OTHER PUBLICATIONS

International Search Report and Written Opinion for PCT/US2013/042541, Jun. 16, 2014 (mailing date), Apple Inc.

(Continued)

Primary Examiner — Xiomar L Bautista
(74) Attorney, Agent, or Firm — Adeli LLP

(57) ABSTRACT

Some embodiments provide tools that allow a user to share content on one device with multiple other users using different devices. To facilitate the sharing operations, the content sharing tools allow the user to (1) create a shared stream that represents a set of shared content and (2) invite one or more recipients to subscribe to the shared stream. When a recipient subscribes to the shared stream, the set of content is streamed across one or more of his or her devices. The content sharing tools of some embodiments can be used to exchange comments regarding the stream's content.

22 Claims, 74 Drawing Sheets

(56) References Cited

U.S. PATENT DOCUMENTS

| | | | |
|---|---|---|---|
| 8,438,495 B1 | 5/2013 | Gilra et al. | |
| 2002/0070982 A1 | 6/2002 | Hill et al. | |
| 2005/0018926 A1 | 1/2005 | Momose et al. | |
| 2005/0034079 A1 | 2/2005 | Gunasekar et al. | |
| 2005/0055455 A1 | 3/2005 | Asher | |
| 2005/0091595 A1 | 4/2005 | Shappell et al. | |
| 2006/0103891 A1 | 5/2006 | Atkins | |
| 2006/0136419 A1 | 6/2006 | Brydon et al. | |
| 2006/0173940 A1 | 8/2006 | Guntupalli et al. | |
| 2006/0268120 A1 | 11/2006 | Funakura et al. | |
| 2007/0067349 A1 | 3/2007 | Jhaveri et al. | |
| 2007/0067392 A1 | 3/2007 | Torres et al. | |
| 2007/0245243 A1* | 10/2007 | Lanza et al. | 715/723 |
| 2007/0283046 A1 | 12/2007 | Dietrich et al. | |
| 2008/0114844 A1 | 5/2008 | Sanchez et al. | |
| 2008/0186385 A1* | 8/2008 | O | 348/207.99 |
| 2008/0288499 A1 | 11/2008 | Choi et al. | |
| 2009/0100096 A1 | 4/2009 | Erlichson et al. | |
| 2009/0100361 A1 | 4/2009 | Abello et al. | |
| 2009/0138828 A1* | 5/2009 | Schultz et al. | 715/853 |
| 2009/0177502 A1 | 7/2009 | Doinoff et al. | |
| 2009/0228322 A1 | 9/2009 | van Os et al. | |
| 2010/0017491 A1 | 1/2010 | Johns et al. | |
| 2010/0063961 A1* | 3/2010 | Guiheneuf et al. | 707/622 |
| 2010/0153882 A1 | 6/2010 | Nakagawa et al. | |
| 2010/0166390 A1 | 7/2010 | Fukuya et al. | |
| 2010/0262924 A1* | 10/2010 | Kalu | 715/753 |
| 2010/0318921 A1* | 12/2010 | Trachtenberg et al. | 715/751 |
| 2011/0106899 A1* | 5/2011 | Madnani | 709/206 |
| 2011/0208831 A1 | 8/2011 | Ho et al. | |
| 2011/0258556 A1* | 10/2011 | Kiciman et al. | 715/751 |
| 2011/0280497 A1 | 11/2011 | Berger et al. | |
| 2011/0288946 A1 | 11/2011 | Baiya et al. | |
| 2011/0289139 A1* | 11/2011 | McIntosh et al. | 709/203 |
| 2012/0079023 A1 | 3/2012 | Tejada-Gamero et al. | |
| 2012/0084362 A1* | 4/2012 | McBrearty | 709/204 |
| 2012/0144416 A1 | 6/2012 | Wetzer et al. | |
| 2012/0151383 A1* | 6/2012 | Kazan et al. | 715/753 |
| 2012/0221520 A1 | 8/2012 | Garrett et al. | |
| 2012/0271882 A1* | 10/2012 | Sachdeva et al. | 709/204 |
| 2012/0284638 A1 | 11/2012 | Cutler et al. | |
| 2012/0314849 A1 | 12/2012 | LeBlanc et al. | |
| 2012/0324002 A1 | 12/2012 | Chen | |
| 2013/0044050 A1* | 2/2013 | Ylivainio | 345/156 |
| 2013/0066962 A1 | 3/2013 | Scherzinger et al. | |
| 2013/0066964 A1 | 3/2013 | Odio et al. | |
| 2013/0124508 A1 | 5/2013 | Paris et al. | |
| 2013/0167038 A1 | 6/2013 | Hirata | |
| 2013/0298083 A1* | 11/2013 | Bertoldo et al. | 715/835 |
| 2013/0328932 A1* | 12/2013 | Kim et al. | 345/636 |
| 2013/0332512 A1 | 12/2013 | Roman et al. | |
| 2013/0332526 A1 | 12/2013 | Hurley et al. | |
| 2013/0332840 A1 | 12/2013 | Roth et al. | |
| 2013/0332841 A1 | 12/2013 | Gallet et al. | |
| 2013/0332854 A1 | 12/2013 | Roman et al. | |
| 2013/0332856 A1 | 12/2013 | Sanders et al. | |
| 2014/0086458 A1* | 3/2014 | Rogers | 382/118 |
| 2014/0214950 A1* | 7/2014 | Mallet et al. | 709/204 |

OTHER PUBLICATIONS

Author Unknown, "Instagram Tips: Comments," Instagram, Archived Dec. 15, 2011, Web. May 1, 2014, 5 pages, available at http:blog.instagram.com/post/13978983262/comments.

Rahimi, David, "How to Disable a System App on Android 4.0 and up," phonebuff, Archived Mar. 30, 2012, Web, May 5, 2014, 2 pages, available at http://www.phonebuff.com/2012/03/disable-system-app-android-4-0/.

Portions of prosecution history of U.S. Appl. No. 13/631,940, Aug. 19, 2014, Apple Inc.

Portions of prosecution history of U.S. Appl. No. 13/631,953, Oct. 7, 2014, Apple Inc.

Portions of prosecution history of U.S. Appl. No. 13/631,955, Oct. 3, 2014, Apple Inc.

Myers, Andy, "Find what you're looking for: A clutterbug's guide to staying organized in Windows 7," Feb. 13, 2010, pp. 1-6, Microsoft, available at http://windows.microsoft.com/en-us/windows7/help/find-what-you-are-looking-for-staying-organized-in-windows-7.

Portions of prosecution history of U.S. Appl. No. 13/631,945, Feb. 24, 2015, Roman, Peter W., et al.

Portions of prosecution history of U.S. Appl. No. 13/631,948, Jan. 21, 2015, Hurley, Timothy S., et al.

Updated portions of prosecution history of U.S. Appl. No. 13/631,940, Feb. 17, 2015, Roman, Peter W., et al.

Updated portions of prosecution history of U.S. Appl. No. 13/631,953, Jan. 30, 2015, Sanders, Christopher John, et al.

Updated portions of prosecution history of U.S. Appl. No. 13/631,955, Jan. 19, 2015, Gallet, Bernard, et al.

Portions of prosecution history of U.S. Appl. No. 13/631,954, Mar. 11, 2015, Roth, Rachel A., et al.

Fonville, Maarten, "Confidential peer-to-peer file-sharing using social-network sites," 13th Twente Student Conference on IT, Jun. 21, 2010, 10 pages, University of Twente, Faculty of Electrical Engineering, Mathematics and Science.

Updated portions of prosecution history of U.S. Appl. No. 13/631,940, Apr. 9, 2015, Roman, Peter W., et al.

Updated portions of prosecution history of U.S. Appl. No. 13/631,955, Apr. 15, 2015, Gallet, Bernard, et al.

Updated portions of prosecution history of U.S. Appl. No. 13/631,954, Mar. 23, 2015, Roth, Rachel A., et al.

* cited by examiner

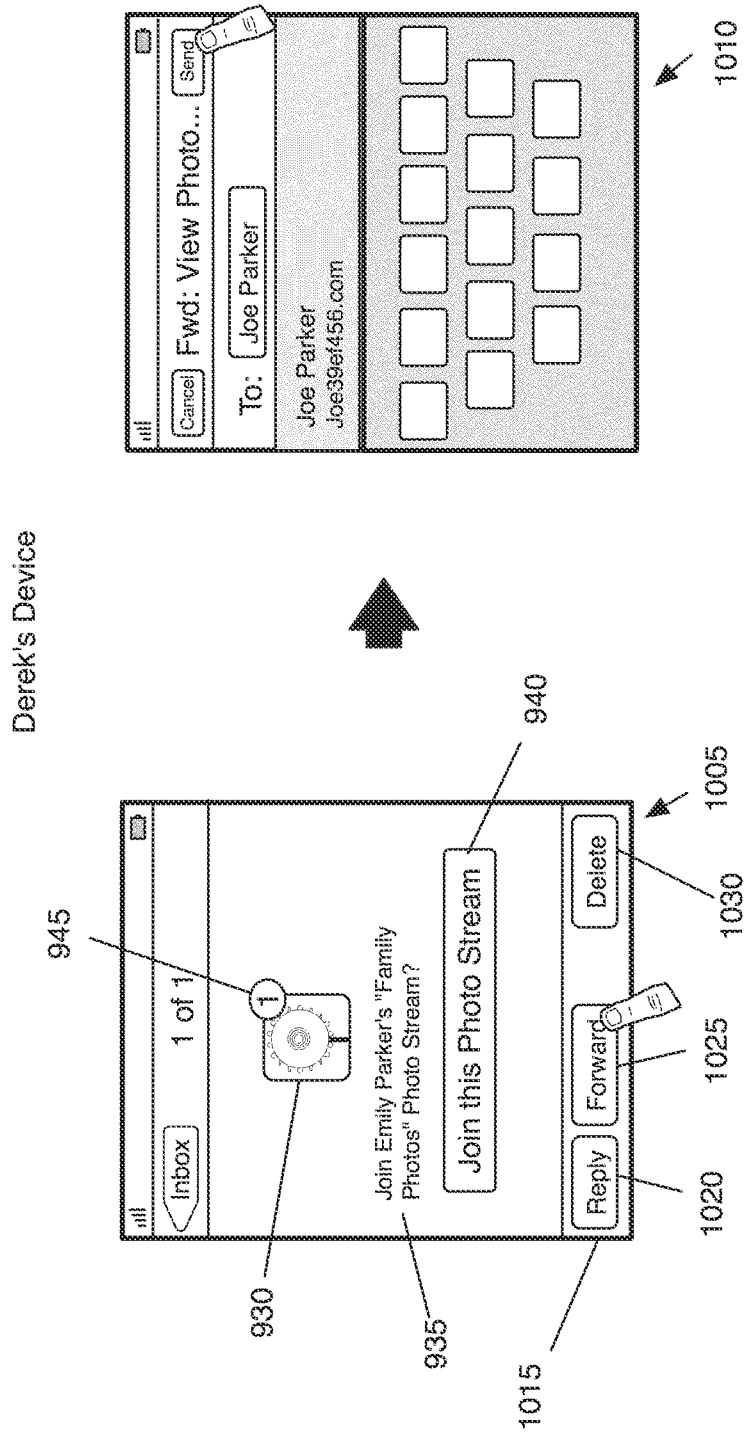

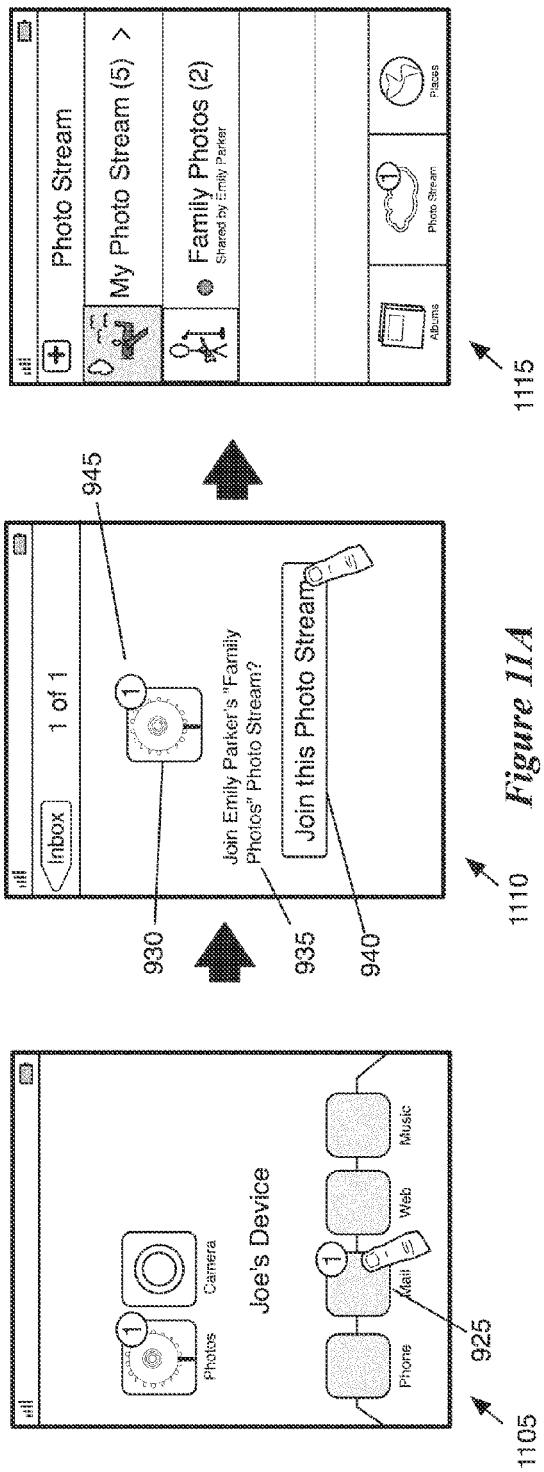
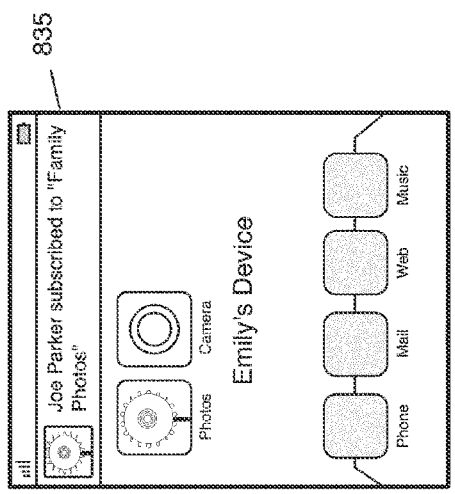
*Figure 11A*
*Figure 11B*

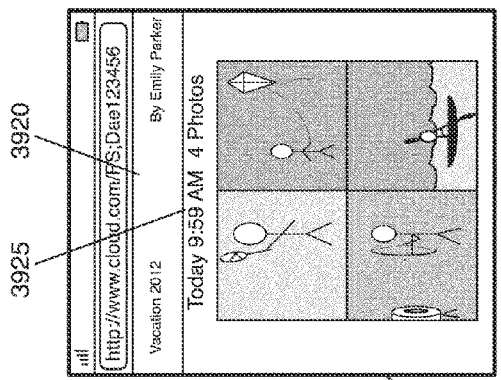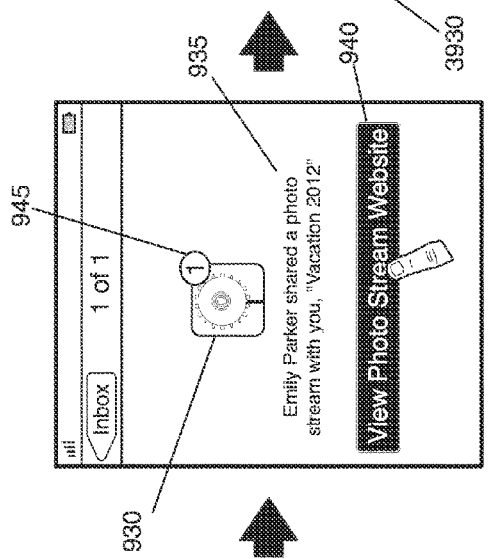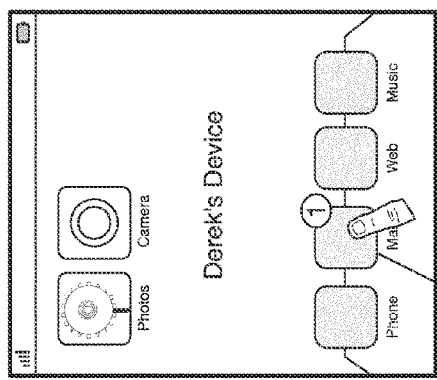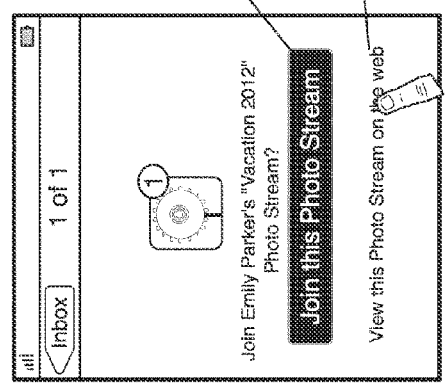
Figure 39A
Figure 39B

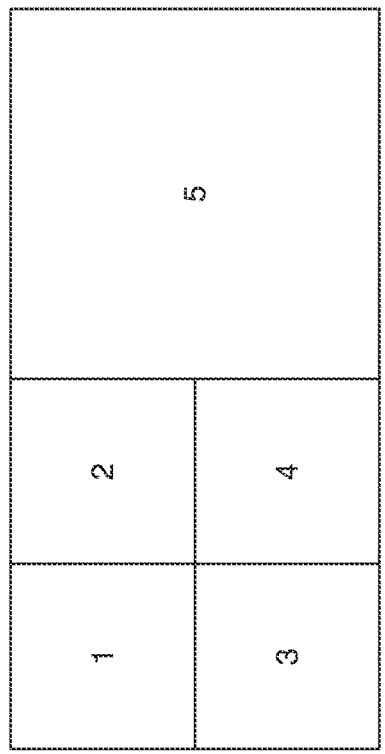
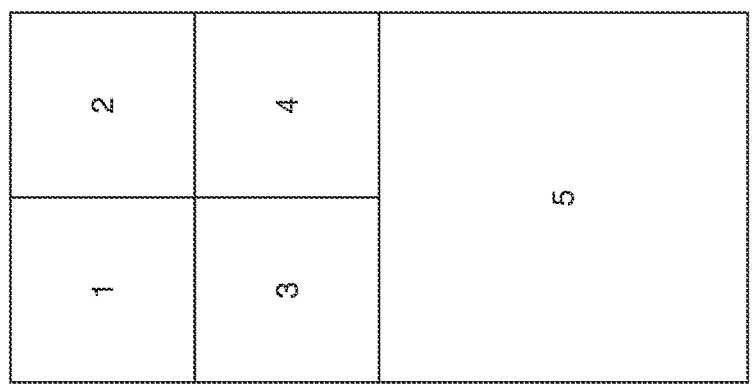
Figure 44

SHARING IMAGES AND COMMENTS ACROSS DIFFERENT DEVICES

CLAIM OF BENEFIT TO PRIOR APPLICATIONS

This application claims the benefit of U.S. Provisional Application 61/657,806, filed Jun. 10, 2012, U.S. Provisional Application 61/657,883, filed Jun. 10, 2012, and U.S. Provisional Application 61/699,815, filed Sep. 11, 2012. U.S. Provisional Applications 61/657,806, 61/657,883, and 61/699,815 are incorporated herein by reference.

BACKGROUND

Today, many different websites exists for sharing images. Typically, a person uses a web browser to navigate to a website. The person then logs on to the website and starts posting photos. In some cases, the person can also leave comments regarding those photos. The photos and comments may be viewed by everyone or by a group of people (e.g., friends, family, colleagues) that is associated with the person.

There are a number of shortcomings with such image and comment sharing operations described above. As a first example, the person may take a photo with a smart phone having a camera. To share that photo, the person then has to navigate to the website and log onto the website before he or she can even start uploading the photo. This can entail opening a web browser and inputting the website's URL address into web browser. If a desktop or laptop computer is being used, the person may also have to plug in the smart phone to the computer and then import the photo into the computer. Accordingly, there can be many different steps that must be performed just to share that one photo.

As another example, the website might not provide any easy options to select certain people that can or cannot view a group of photos. For example, when a person shares photos, they can be seen by either everyone or all people (e.g., friends, family, colleagues) that are associated with that person. Similarly, any comments that are left regarding the photos can be viewed by either everyone or the associated people. As such, there may be no easy way to specify a personal or mini social network that excludes one group of people (e.g., friends) while including another group of people (e.g., family).

BRIEF SUMMARY

Some embodiments described herein provide tools that allow a person to share content (e.g., images, video clips) on one device with multiple other people using different devices. Examples of such devices include a desktop computer, laptop, tablet, smart phone, digital media receiver, smart television ("TV"), etc. The content may also be shared across the person's own devices. To facilitate the sharing operations, the content sharing tools allow the person to (1) create a shared stream that represents a set of shared content, and (2) invite one or more recipients (e.g., friends, family) to subscribe to the shared stream. When a recipient subscribes to the shared stream, the set of shared content is streamed across to one or more of the recipient's devices.

In conjunction with the content sharing features, the content sharing tools (hereinafter image sharing tools) allow different participants to share comments regarding the stream's content. In some embodiments, the comments are pushed in real time to all devices (e.g., across different platforms) of the different participants associated with the shared stream. By pushing content and comments to a specified group of people, the content sharing tools create a social network (e.g., a mini social network, a personal social network). In this network, a participant can take a photo with his or her smart phone, add it to a shared stream album, and receive, at a moment's notice, comments from only those other participants that are associated with the shared stream album.

The image sharing tools of some embodiments provide a variety of different tools to modify a shared photo stream album. The user can use these tools to add or delete image from the shared photo stream album. When an image is added to the shared photo stream album, the image is distributed across the user's own devices and the devices of other participants that have subscribed to the shared photo stream album. Conversely, when an image is deleted from the user's device, the image may be deleted from the user's own devices and the participants' devices.

In some embodiments, the image sharing tools allow a user to manage a shared photo stream album. Example of such management features include resending a photo stream invitation, inviting additional subscribers, removing existing subscribers, and deleting the shared photo stream album. The image sharing tools of some embodiments only allow an owner (i.e., the person that created the shared photo stream album) to perform one or more of these management operations. However, the image sharing tools may allow the owner to specify access privileges. That is, the owner can specify whether a subscriber can add images to or remove images from the shared photo stream album, add or remove subscribers, make comments, etc. In some embodiments, the image sharing tools provide a control that when selected unsubscribes a subscriber from a shared photo stream album.

The image sharing tools of some embodiments allow content and comments to be shared across different platforms (e.g., from different vendors). That is, a person using one type of computing device (e.g., a tablet, smart phone) can share images and comments with a different person using another type of computing device (e.g., personal computer, laptop). In some embodiments, the image sharing tools are integrated into an operating system ("OS"). Alternatively, the image sharing tools may be provided as part of an image application (e.g., a photo viewing application, an image organizing and editing application).

In the cross-platform system, each client may communicate with a control server. In some embodiments, the control server facilitates the sharing by managing control data associated with different shared photo streams. Examples of such control data include user data (e.g., a list of devices associated with a user) and photo stream data (e.g., a list of photo stream associated with the user, a list of individuals that can access a particular photo stream).

When a new shared stream album is created, the control server of some embodiments sends file location data to the owner's device. The owner's device then uploads images in the shared photo stream album to a storage server. This storage server may be a third-party storage server. The control sever may also send a message to each recipient that has been invited to participate in the shared stream album. When a recipient accepts the invitation, the images may be downloaded from the storage sever to one or more of the recipient's devices.

In some embodiments, the image sharing tools allow images in a shared photo stream album to be published as a webpage to a website. In publishing the images, the layout of the webpage is selected based on the number of images and the orientation of the images. When different batches of images are added at different time, one particular layout is selected for each batch. The images in a batch may be presented in a particular order (e.g., starting with the oldest image and ending with the newest image, or vice versa). Also, the different batches may be presented in a particular order (e.g., starting with the oldest batch and ending with the newest batch, or vice versa). In some embodiments, the webpage is generated by a web-publishing server. Alternatively, a client device may generate the web page and upload it to the web-publishing server.

Several more detailed embodiments of the invention are provided below. Many of these examples refer to controls (e.g., selectable items) that are part of the image sharing tools. The image sharing tools in some embodiments are part of a standalone application that executes on top of the operating system of a device, while in other embodiments they are part of the operating system. Also, in many of the examples below (such as those illustrated in FIGS. 1-6, 8-13, 15-18, 21-35, 38-41, and 49-51) the device on which the application executes has a touch screen through which a user can interact with the image editing application. However, one of ordinary skill in the art will realize that cursor controllers or other input devices can be used to interact with the controls and applications shown in these examples for other embodiments that execute on devices with cursors and cursor controllers or other input mechanisms (e.g., voice control, remote control).

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features as described here are set forth in the appended claims. However, for purposes of explanation, several embodiments are set forth in the following figures.

FIG. 10 provides an illustrative example of a first recipient forwarding the photo stream to a second recipient.

FIG. 11A provides an illustrative example of the second recipient accepting the photo stream invitation.

FIG. 11B provides an illustrative example of a notification that is pushed onto the owner's device upon the second recipient accepting the invitation.

FIG. 39A provides an illustrative example accessing the webpage with the subscriber's device.

FIG. 39B provides an example message that is received at a recipient's device.

FIG. 44 provides an illustrative example of a webpage layout for a photo stream that includes five or six images.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments described herein provide tools that allow a person to share images on one device with multiple other people using different devices. Examples of such devices include a desktop computer, laptop, tablet, smart phone, digital media receiver, smart television ("TV"), etc. The images may also be shared across the person's own devices. To facilitate the sharing operations, these tools allow the person to (1) create a photo stream that represents a set of shared images and (2) invite one or more recipients to subscribe to the photo stream. When a recipient subscribes to the photo stream, the set of images is streamed across to one or more of the recipient's devices.

In conjunction with the image sharing features, the image sharing tools allow different participants to share comments regarding the photo stream's images. In some embodiments, the comments are pushed in real time to all devices (e.g., across different platforms) of the different participants associated with the shared stream. By pushing content and comments to a specified group of people, the content sharing tools create a social network (e.g., a mini social network, a personal social network). In this network, a participant can take a photo with his or her smart phone, add it to a shared photo stream, and receive, at a moment's notice, comments from only those other participants that are associated with the shared photo stream.

Figure 1:
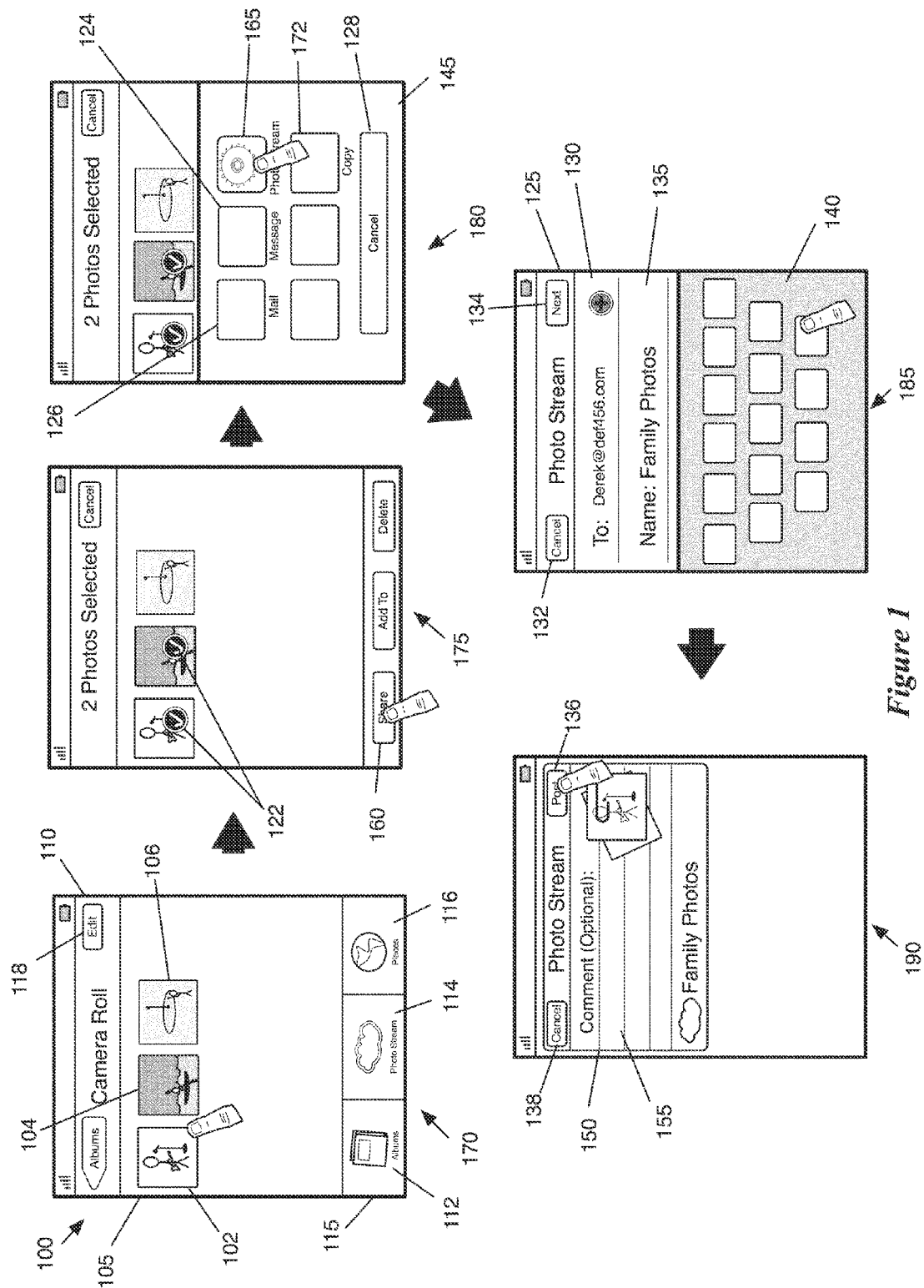
FIG. 1 illustrates an example graphical user interface ("GUI") of an application for sharing images.

In some embodiments, the image sharing tools are integrated into an operating system ("OS"). Alternatively, the image sharing tools may be provided as part of an image application (e.g., a photo viewing application, an image organizing and editing application). For some embodiments, FIG. 1 illustrates a graphical user interface ("GUI") 100 of an application with such image and comment sharing features. Specifically, this figure illustrates in five operational stages 170-190 how a user can use the GUI 100 to create a shared photo stream.

In several examples described below, a first user creates a photo stream and sends an invitation to a second different user to subscribe to the photo stream. To simplify the description, the first user may be referred to as an owner, and the second user may be referred to as a recipient or subscriber depending on whether the second user has subscribed to the photo stream.

As shown in FIG. 1, the GUI 100 includes (1) an image display area 105, (2) a photo stream options display area 125 (hereinafter an options sheet), and (3) a photo stream comment display area 150 (hereinafter a comment sheet). The image display area 105 is an area within the GUI 100 through which the user can view images. The image display area 105 displays thumbnail representations of images. Thumbnails are reduced-size representations of full-size images. At any time, the user can select any one of the thumbnail images to display the corresponding image at a higher resolution. This higher resolution image is typically not the full size image (which is often of a higher resolution than resolution of the display device). In some embodiments, the thumbnail image represents only a portion of an image. That is, the thumbnails in the image display area 105 are all squares, irrespective of the aspect ratio of the full-size images. In order to determine the portion of a rectangular image to use for a thumbnail, the application of some embodiments identifies the smaller dimension of the image and uses the center portion of the image in the longer dimension.

As shown in the first stage 170, the image display area 105 displays images from a collection, namely a camera roll. This is indicated by a top bar 110 that displays "Camera Roll" as the heading for the image display area 105. The camera roll collection includes one or more images taken with the device (e.g., a smart phone, tablet) on which the image application executes. Accordingly, the thumbnail images 102, 104, and 106 represent those images taken with the device.

In the example illustrated in the FIG. 1, the GUI 100 includes a bottom bar 115 that displays several selectable controls 112, 114, and 116. Specifically, the user can view images in another collection (e.g., album) by selecting the "Albums" tab 112. When selected, the application of some embodiments lists different collections, such as the camera roll collection. Different from the "Albums" tab, the user can select the "Photo Stream" tab 114 to display a list of different photo streams. The "Places" tab 116 can be selected to display a map showing mapped locations of geotagged images (e.g., images associated with Global Positioning System (GPS) metadata). In some embodiments, the application includes a separate "Camera Roll" tab for displaying images in the camera roll collection. The application may also include a "Photos" tab for displaying all images (e.g., a library of images) taken with the device and/or imported into the device.

The photo stream options sheet 125 is used to specify different options for a shared photo stream. This sheet 125 includes a subscriber field 130 and a name field 135. The subscriber field 130 is an area in the sheet that the user can input one or more recipients for the photo stream. That is, the owner can input contact information into this field to invite the recipients to join the photo stream.

In the example illustrated in FIG. 1, the contact information that can be inputted in the subscriber field 130 is an email address or a name associated with an email address. However, other types of contact information (e.g., a phone number) may be provided to invite a recipient to join the shared photo stream. In some embodiments, the application includes an auto-complete feature. For instance, one or more suggested names from a contacts directory or an address book may be displayed as the owner inputs text into the field 130. The owner can then select a suggested name to automatically fill in the field 130.

The name field 135 allows the user to specify a name or title for the photo stream. For example, the owner can use this field to input a name or title that summarizes the photo stream's images. The name specified with the name field 135 may be displayed in a number of different places. The name may appear in the photo stream invitation (e.g., email message). The name may also appear as the heading for the shared photo stream.

The comment sheet 150 can be used to add a comment. The comment sheet 150 includes a comment field 155 for inputting the comment. In some embodiments, the comment is associated with a first image in the photo stream (e.g., the first selected image 102 in the image display area 105). This comment may be displayed with the first image (e.g., as a caption over a lower portion of the first image) on each device of participants associated with the photo stream. As shown in FIG. 1, the comment field is an optional field because the owner does not have to input a comment in order to create the photo stream.

Having described the elements of the GUI 100, the operations of creating a photo stream will now be described by reference to the state of the GUI during the five stages 170-190 that are illustrated in FIG. 1. In the first stage 170, the image display area 105 displays thumbnail representations 102-106 of images from the camera roll collection. As mentioned above, the camera roll collection includes one or more images taken with the device (e.g., a smart phone or tablet equipped with a camera).

The second stage 175 illustrates the GUI 100 after the user has selected several images for the shared photo stream. Specifically, the user has selected (e.g., by performing a gesture such as tapping the user's finger on) the first thumbnail image 102 representing a first image for the photo stream, and a second thumbnail image 104 representing a second image. To choose images, the user might have first selected an edit button 118 (e.g., an image selection button, an action button) prior to selecting the thumbnail images 102 and 104. Otherwise, the image display area 105 may display a full-screen representation of the selected image.

When the application is in an image selection state, the selection of a thumbnail image causes it to display a marking near or at least partially over the selected thumbnail image. This marking provides the user with a visual indication of the selection of the thumbnail image. In the example illustrated in FIG. 1, the marking is a check mark 122 that is displayed over each of the selected thumbnail images 102 and 104. However, the application may display a different marking to provide the same visual indication.

To share the selected images, the user selects (e.g., by performing a gesture such as tapping the user's finger on) a share button 160. The selection of the share button 160 causes a pop-up menu 145 to appear, as shown in the third stage 180. The pop-up menu 145 may appear by sliding up from the bottom of the screen and disappear by sliding down towards the bottom of the screen.

As shown in the third stage 180, the pop-up menu 145 includes several selectable items. The selectable items are arranged as a 2×2 grid of buttons. Each button is associated with an icon and a description. The selectable items include a photo stream button 165, a message button 124, a mail button 126, and a copy button 172. The photo stream button 165 is for creating a new photo stream or adding the selected images to an existing photo stream, the message button 124 is for creating a text message (e.g., SMS, iMessage) with the selected images, the mail button 126 is for generating an email with the selected images, and the copy button 172 is for copying the selected images. The pop-up menu 145 also includes a cancel button 128 for canceling and returning to the previous view. In some embodiments, the pop-up menu 145 includes a print button (not shown) for printing the selected images.

In the example illustrated in the third stage 180, the selectable items are icon based. In some embodiments, the application presents each item with text and an icon, only with the text and without the icon, or only with the icon and without the text. The application of some embodiments presents different selectable items based on the number of images that are selected from the image display area. For instance, if only one image is selected, the pop-up menu 145 may include an option to use the selected image as a desktop wallpaper.

In the third stage 180, the user selects the photo stream button 165. The fourth stage 185 illustrates the GUI 100 after the user has selected the photo stream button 165. As shown, the selection resulted in the display of the photo stream options sheet 125 for creating a new photo stream. When a photo stream has been previously created, the application provides an option to add the selected images to an existing photo stream or create a new photo stream, in some embodiments. Here, the photo stream option sheet 125 is overlaid by the top bar 110 that includes a heading. The heading reads "Photo Stream". In some embodiments, the heading reminds the user that he or she is creating a new photo stream by specifically stating "New Photo Stream".

As shown in the fourth stage 185, the user has typed in an email address into the subscriber field 130 using an on-screen or virtual keyboard 140. The user has also typed in a name for the photo stream in the name field 135. Once the fields 130 and 135 are populated, the user can select a next button 134 that is shown on the top bar 110. Optionally, the user can select a cancel button 132 to return to a previous view (e.g., the view illustrated in the second stage 175). In some embodiments, the next button 134 is disabled when there are one or more blank fields. For example, the next button 134 may be disabled when the subscriber field and/or the name field are blank. The application of some embodiments modifies the appearance of the button 134 (e.g., changes its color) to indicate that it is selectable or disabled.

The fifth stage 190 illustrates the application after the selection of the next button 134. The selection results in the display of the comment sheet 150. In some embodiments, the application presents the comment sheet 150 with animation. For example, the application may present it by flipping over the photo stream options sheet 125, similar to a two-sided card being flipped over.

As shown in the fifth stage 190, the comment sheet 150 includes a heading that states that it is associated with the photo stream. The name of the photo stream is also shown on the comment sheet. Specifically, the name of the photo stream is displayed below the comment field 155 with an icon (e.g., a photo stream icon). The comment field 155 remains empty, as the user has not inputted any comment for an image (e.g., the first image) in the photo stream. In some embodiments, the comment sheet 150 displays one or more thumbnail images of images in the photo stream. In the example illustrated in the fifth stage 190, thumbnail images of the selected images are shown as being attached (e.g., paper clipped) to the comment sheet 150. However, different embodiments may differently present previews of the photo stream's images. For example, the application may present the images as a grid of thumbnails on one or more rows.

In the fifth stage 190, the user selects a post button 136 to create the new photo stream. Optionally the user can select a cancel button 138 to return to a previous display area, namely the options sheet 125 that is illustrated in the fourth stage 185. In some embodiments, the selection of the cancel button 138 causes the application to return to the image display area 105 that is illustrated in the second stage 175.

When the post button is selected, the application of some embodiments generates a message regarding the new photo stream and sends the notification to a control or push server. Based on the message, the control server may respond with file location data (e.g., with one or more Uniform Resource Locators ("URLs")) to send the images to a storage server (e.g., a third-party storage server). The application may also generate images to send to the storage server. For example, the application may generate one or more lower resolution images from a stored image (e.g., raw image) and send those images to the storage server.

In some embodiments, the control server identifies each device associated with the recipient (e.g., based on the recipient's email address) and sends one or more messages or notifications regarding the photo stream invitation. Once the recipient accepts the invitation, the images are downloaded from the storage server onto each associated device. To more quickly display the images, the images may be downloaded to a recipient's device prior to the recipient accepting the invitation, and may be deleted from the device if the recipient rejects the invitation.

Figure 2:
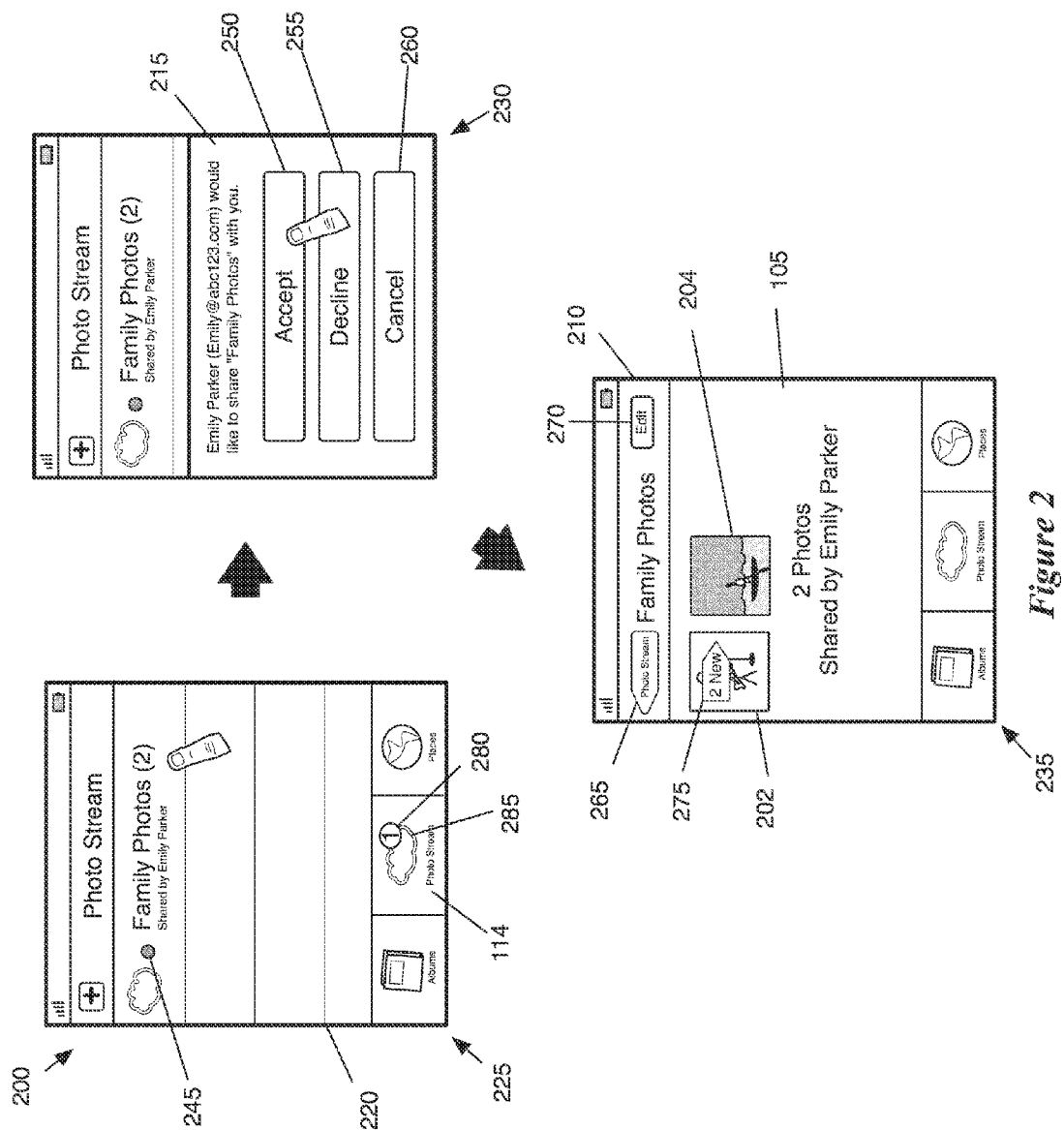
FIG. 2 provides an illustrative example of a recipient becoming a subscriber by accepting a photo stream invitation.

FIG. 2 provides an illustrative example of a recipient becoming a subscriber by accepting the photo stream invitation. Specifically, this figure illustrates in three operational stages 225-235 how the recipient can accept the photo stream invitation to display the shared images on the recipient's device. In this example, the recipient's device is executing the same image application as the owner's device. As such, the GUI 200 is the same one described above by reference to FIG. 1.

In the first stage 225, the application is displaying a photo stream display area 220 (hereinafter a photo stream menu). To display the menu 220, the recipient might have first selected (e.g., by performing a gesture such as tapping the recipient's finger on) the "Photo Stream" tab 114. As shown, the menu 220 displays the photo stream created by the owner. The photo stream is listed with (1) an icon associated with the image sharing tools, (2) the name of the photo stream, and (3) a number that identifies the number of images in the photo stream. In addition, the menu 220 identifies the owner as it states that the photo stream is shared by "Emily Parker". In the illustrated example, the name of the owner is listed using a smaller font than the name of the photo stream.

In some embodiments, the image sharing tools provide one or more visual indications that there is a new photo stream invitation and/or an update to an existing photo stream. This is shown in the photo stream menu 220 as the new photo stream is listed with a marking 245. Here, the marking 245 is a colored dot (e.g., blue dot) but other types of markings (e.g., textual markings) can be used to convey the same message. For instance, the "Photo Stream" tab 114 shows an icon 285 that is badged with a number 280. This number indicates that there is one new photo stream invitation. In some embodiments, the application removes the badge 280 from the icon upon displaying the photo stream menu. On the other hand, the marking 245 may be shown on the menu until the recipient either accepts or declines the photo stream invitation.

As will be described in detail below, the image sharing tools of some embodiments provide different visual indications at multiple different levels to notify a user of a new photo stream invitation and/or an update to an existing photo stream. For example, the image sharing tools may badge the application's icon at the operating system ("OS") desktop level, mark different photo streams with a marking at the application menu level, and/or flag images (e.g., as new images) at the photo stream image level. In conjunction with, or instead of one or more of these visual indications, the image sharing tools of some embodiments alerts the user by causing the recipient's device to play a sound and/or vibrate.

In the first stage 225, the recipient selects (e.g., by performing a gesture such as tapping the recipient's finger on) the photo stream from the photo stream menu 220. The selection causes the application to display a pop-up menu 215, as illustrated in the second stage 230. In some embodiments, the pop-up menu 215 is superimposed over a portion of the photo stream menu 220 by sliding up from the bottom of the screen. The pop-up menu 215 includes a heading. The heading states that the owner would like to share the photo stream with the recipient. The owner is identified by the owner's name and email address, and the photo stream is identified by its associated name. The pop-up menu 215 includes (1) an accept button 250 for accepting the photo stream invitation, (2) a decline button 255 for declining the invitation, and (3) a cancel button 260 for closing the pop-up menu without accepting or declining the invitation (e.g., keeping the invitation pending and deciding at a later time).

As shown in the second stage 230, the recipient selects the accept button 250 from the pop-up menu 215. This results in the display of an image display area 105, as illustrated in the third stage 235. The image display area 105 is the same as the one described above by reference to FIG. 1. The image display area 105 displays thumbnail representations 202 and 204 of the images in the photo stream. The user can select any one of the thumbnail representations 202 or 204 to display a full screen representation of the corresponding image.

In the example illustrated in FIG. 2, the image display area 105 is overlaid by the top bar 210, which includes the name of photo stream. The top bar 210 also includes a back button 265 for returning to the photo stream menu 220 and an edit button 270 for selecting images in the photo stream. In the example illustrated in the third stage 235, the image display area also displays text below the two thumbnails 202 and 204. The text states the name of the owner and the number of images shared by the owner.

In some embodiments, the application displays a marking that identifies the number of new image that are in the photo stream. This is shown in the third stage 235 as a flag 275 is displayed over the thumbnail 202 of the first new image. The flag is marked with text that states that there are two new images in the photo stream. The application of some embodiments displays such a marking for each new batch of images. For example, when the owner adds a new batch of images to the photo stream, the application may display a similar flag on a first thumbnail image that corresponds to the first image in the new batch.

The image application of some embodiments displays images in a batch in a particular order (e.g., starting with the oldest image and ending with the newest image, or vice versa). The application of some embodiments displays different batches in a particular order (e.g., starting with the oldest batch to the newest batch, or vice versa). By displaying different batches in chronological or reverse chronological order, the images may not necessarily be ordered in a display area (e.g., the image display 105). For example, this can occur when there are multiple batches and when an image in a first batch is newer (e.g., has a timestamp that is later) than another image in one of the subsequent batches. Many different examples of batching or grouping images will be described below.

Figure 3:
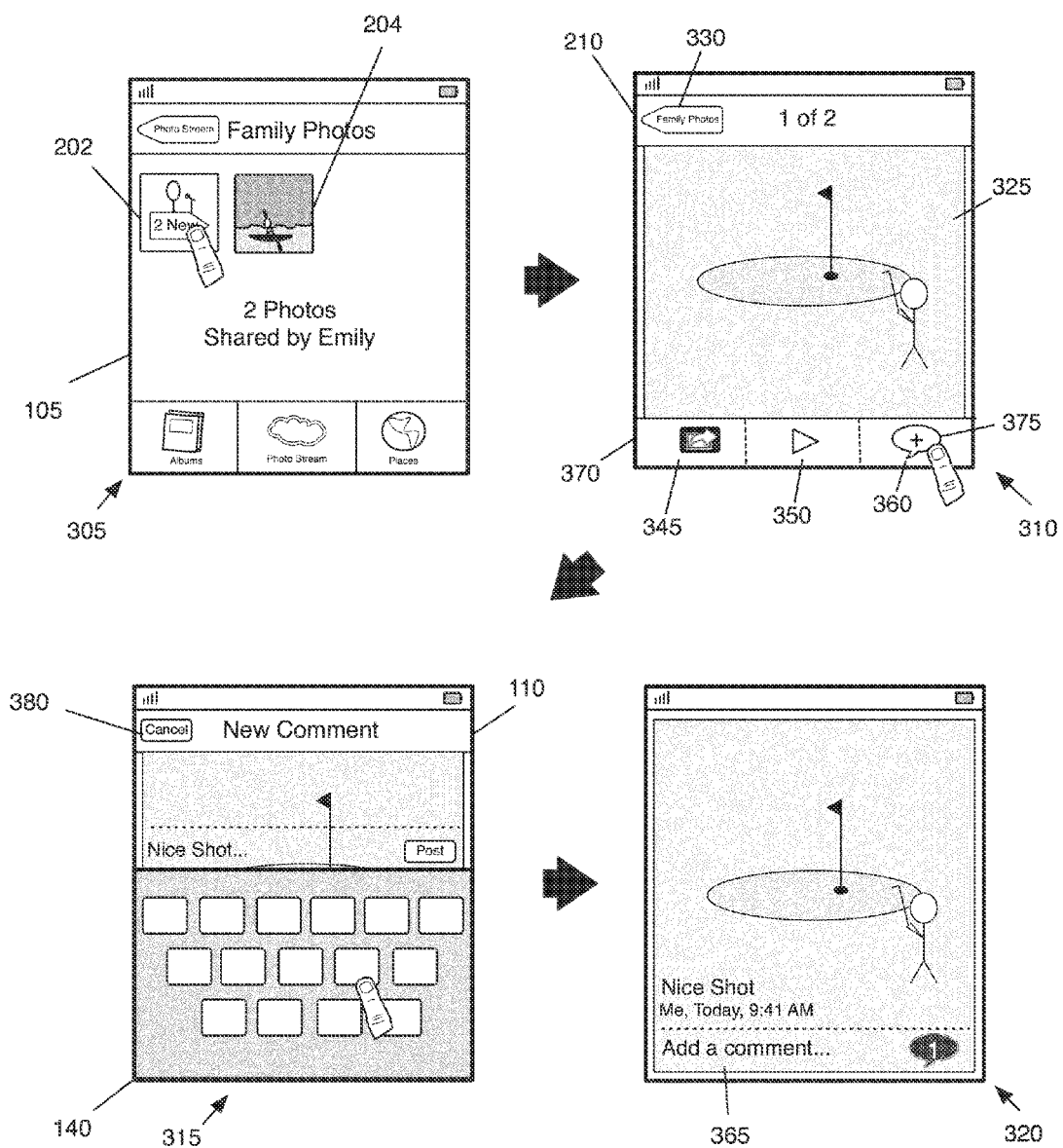
FIG. 3 provides an illustrative example of sharing a comment regarding an image in the photo stream.

In the example described above, the recipient's device is in an invited state through the first two stages 225 and 230. In this state, the photo stream's images may not be pushed to the recipient's device or any other devices associated with the recipient. However, the images may be pushed to all of the recipient's devices upon the recipient accepting the invitation. In some embodiments, a notification is sent to one or more of the owner's devices upon the recipient accepting the invitation. This notification may state that the recipient has subscribed to the photo stream As mentioned above, the image sharing tools create a social network by allowing users to share not only images but also comments regarding those images. FIG. 3 provides an illustrative example of sharing a comment regarding an image in the photo stream. Four operational stages 305-320 of the application are illustrated in this figure. These stages are continuations of the stages that are illustrated in FIG. 2.

In the first stage 305, the image display area 105 displays thumbnail representations 202 and 204 of the images associated with the photo stream. The subscriber selects the first thumbnail image 202. The selection causes the image display area 105 to display a full screen representation 325 of the corresponding image. The full screen representation is overlaid by the top and bottom bars 210 and 370. The top bar 210 includes a back button 330 to return to the thumbnail view. The top bar 210 also states that the displayed image 325 is a first of two images in the photo stream.

Different from the top bar 210, the bottom bar 370 includes (1) a share button 345 for sharing the selected image, (2) a play button 350 for playing a slide show of the images in the photo stream, and (3) a comment button 360 for leaving a comment regarding the displayed image. The bottom bar may also include a stream button (not shown) for streaming the images in the photo stream to one or more other devices (e.g., a desktop computer, a laptop). In the example illustrated in FIG. 3, each item in the bottom bar 370 is displayed with a corresponding icon. For example, the comment button 360 is displayed with a chat bubble icon 375. The chat bubble icon 375 includes a plus sign (i.e., "+") that provides a visual indication that a comment can be added for the displayed image 325.

As shown in the second stage 310, the user selects the comment button 360. The selection causes the virtual or on-screen overlay keyboard 140 to appear, as illustrated in the third stage 315. The selection also causes the top bar 110 to display a heading that states "New Comment". Here, the user types in a comment regarding the image 325. Alternatively, the user can select the cancel button 380 to return to the full screen representation.

The fourth stage 320 illustrates the image application after inputting the comment. As shown, the comment is displayed over the image 325. The comment is also associated with comment metadata. The metadata is displayed below the comment, and identifies the person who left the comment and the time and date that the comment was left. In the example illustrated in the fourth stage 320, the person who left the comment is identified as "Me". This is because the subscriber left the comment with the subscriber's device. The comment is also displayed with an add comment field 365 that can be selected to add another comment.

In some embodiments, the comments are shared in real time across multiple different devices (e.g., across different platforms of different vendors). For instance, when a new comment has been received, the application of some embodiments generates a message regarding the new comment and sends the message to the control server. The message may include the comment and a key that uniquely identifies the image that is associated with the comment. Based on the message, the control server may store the comment, identify participants associated with the photo stream, and send a message regarding an update to a photo stream to each device associated with the identified participants. In some embodiments, the participant's device then downloads the comment and displays it with the associated image.

Many more photo stream examples are described below. Section I describes another more detailed example of creating a new photo stream. This section also describes another example of accepting a photo stream invitation. Section II then describes adding and removing images from a photo stream. Section III describes several examples of managing a photo stream (e.g., resending an invitation, adding or removing a subscriber, unsubscribing, etc.). Section IV then describes additional examples of exchanging comments. Section V describes publishing a photo stream to a public website. These previous sections are then followed by examples of the image sharing tools that are implemented on different devices and/or platforms. Specially, Section VI describes example of the image sharing tools that operate on a tablet. The tablet examples are followed by Section VII that describes an example digital media receiver. Section VIII then describes how the image sharing tools of some embodiments are integrated in an operating system (e.g., of a personal computer ("PC")). Section IX then describes several more examples of the image sharing tools that are integrated into one or more image editing and organizing application. Section X then describes an example system architecture used to facilitate the image and comment sharing operations. Section XI then describes example processes that are performed on the server-side. Section XII then describes a software architecture of content sharing tools of some embodiments. Finally, Section XIII then describes several example electronic systems that implement some embodiments described herein.

I. Example Operations

As mentioned above, the image sharing tools allow an owner to create a shared photo stream album that includes images, and invite any number of recipients to join the shared photo stream album and view those images. When a recipient accepts the invitation, the images are downloaded onto one or more of the recipient's devices. Several more example operations of creating a photo stream album and sharing the photo stream album will now be described by reference to FIGS. 1-14.

A. Creating the Photo Stream

Figure 4:
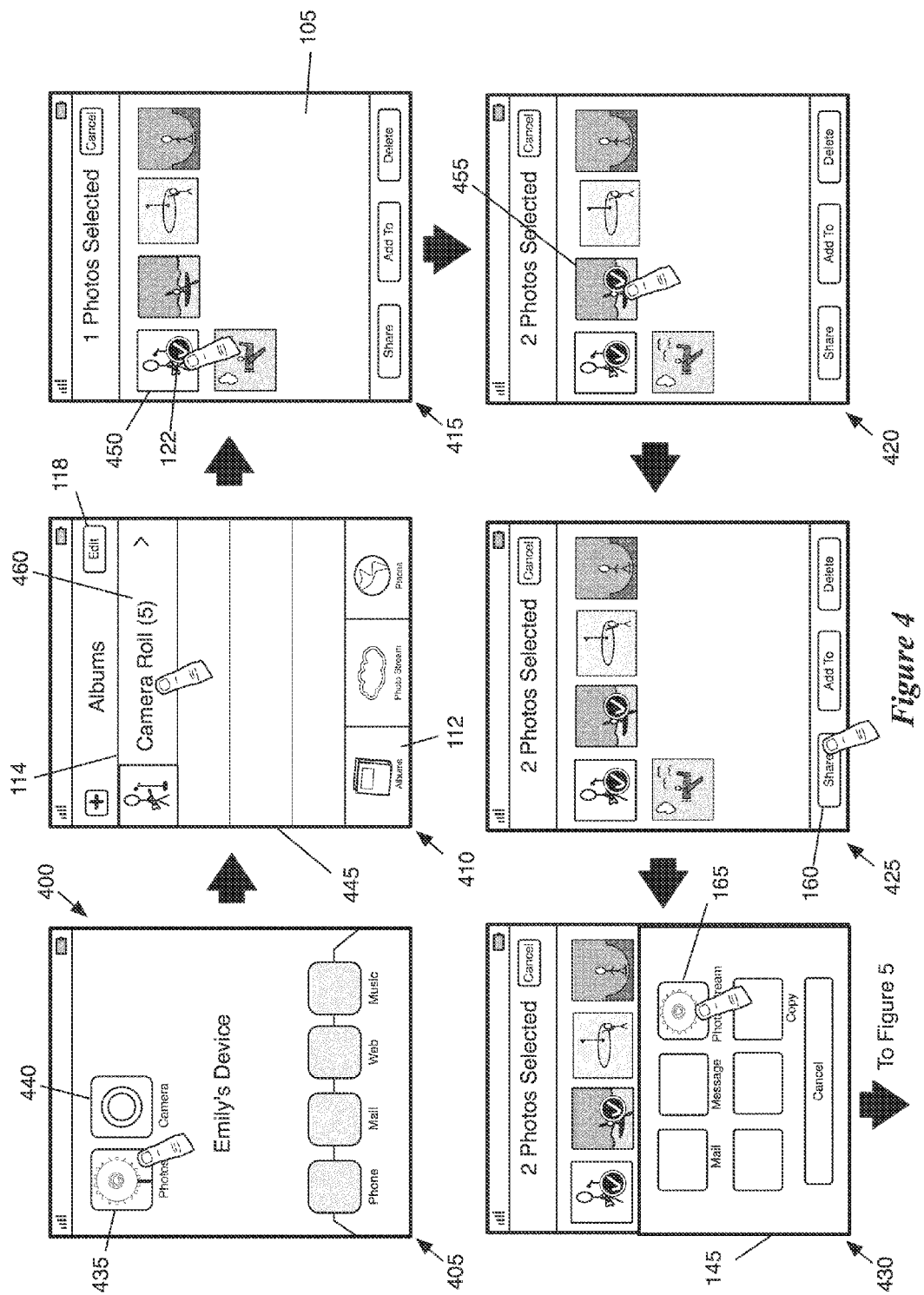
FIG. 4 provides an illustrative example of selecting several images for a photo stream.
Figure 5:
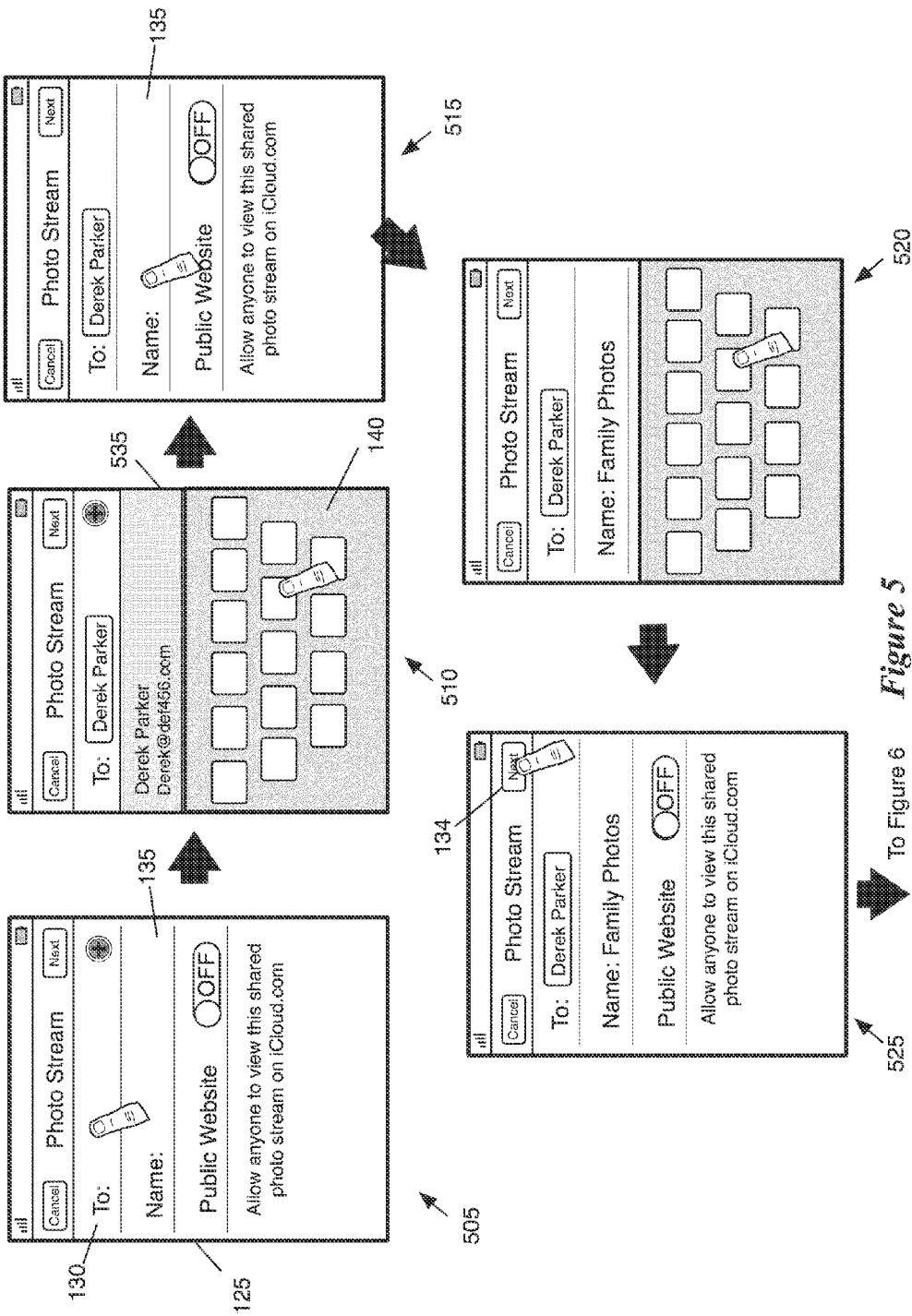
FIG. 5 provides an illustrative example of specifying a name and subscriber for a photo stream.
Figure 6:
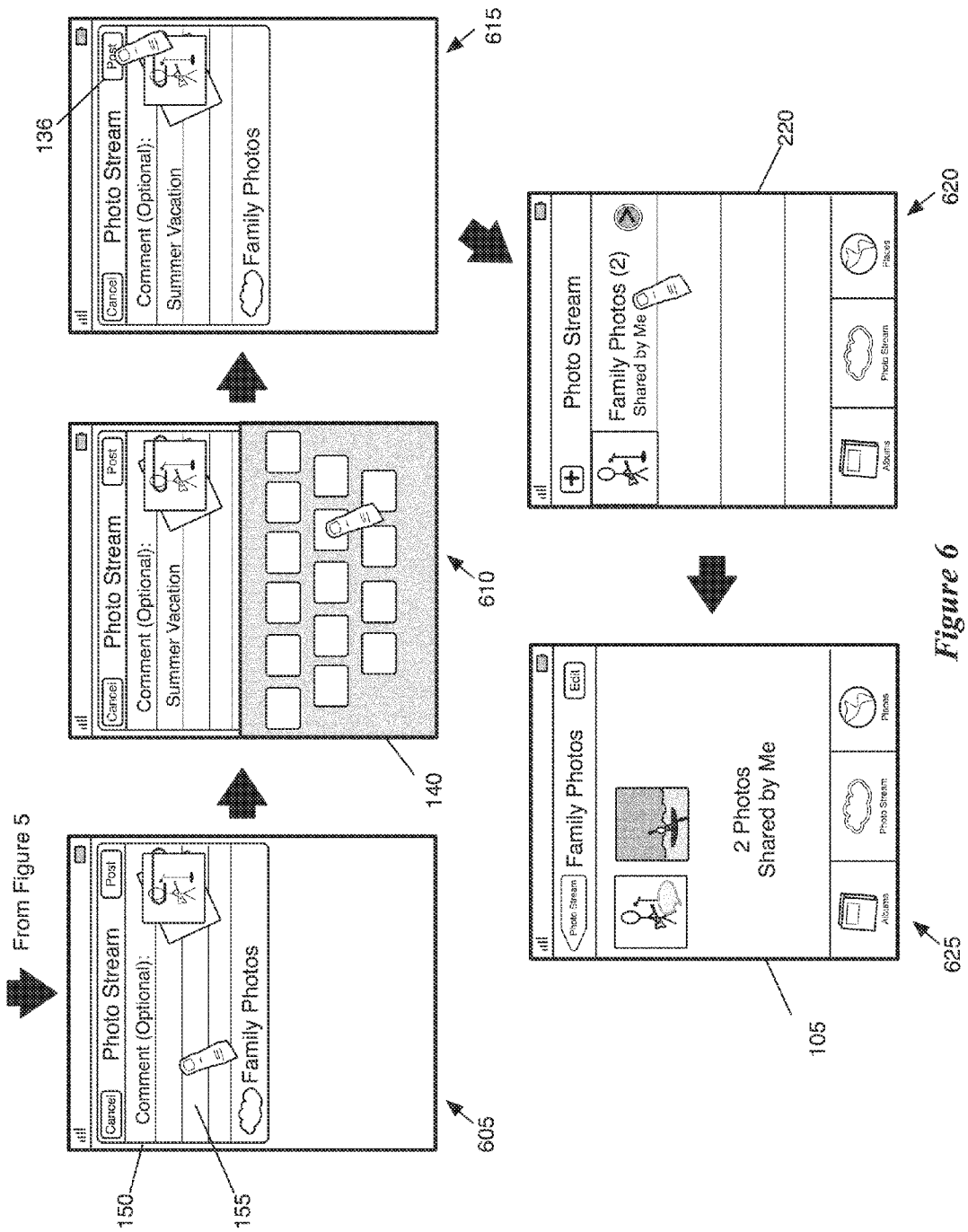
FIG. 6 provides an illustrative example of inputting a comment for an image in the new photo stream.

An example of creating a photo stream has been described above. A more detailed example of creating a photo stream will now be described by reference to a sequence of operations that is illustrated in FIG. 4-6. FIG. 4 provides an illustrative example of selecting several images for a photo stream. Six operational stages 405-430 of the owner's device 400 are illustrated in this figure. The figure includes the image display area 105 that is described above by reference to FIG. 1.

The first stage 405 illustrates the device 400 displaying a graphical user interface ("GUI") of its operating system ("OS"). The GUI includes selectable icons for opening different applications. Several of the icons are displayed along a menu bar (e.g., a dock). The icons include ones for opening a phone application, email application, web browser, and music player. An image application icon 435 (e.g., Photos application icon) and a camera application icon 440 are overlaid on the OS's desktop or main display area. To open the image application, the owner selects (e.g., by tapping the owner's finger on) the image application icon 435.

The second stage 410 illustrates the device after the owner has selected the icon 435. As shown, the application displays a list 445 of different collections. The owner might have first selected the albums tab 112 to display this list. Here, the owner selects the camera roll collection 460 from the list. As shown in the third stage 415, the selection causes the image display area 105 displays thumbnail representations of images in the camera roll collection. Here, the camera roll collection includes the images taken with the device (e.g., a smart phone or tablet equipped with a camera).

The third and fourth stages 415 and 420 illustrate selections of several images for the new photo stream. Specifically, the owner selects (e.g., by performing a gesture such as tapping the owner's finger on) a first thumbnail image 450 to select a first image for the photo stream, and selects a second thumbnail image 455 to select a second image for the photo stream. The owner might have selected the edit button 118 prior to selecting the first thumbnail image 450. Otherwise, the image display area 105 may display a full screen representation of the selected image.

When the application is in an image selection state, the selection of a thumbnail image causes it to display a marking near or at least partially over the selected thumbnail image. This marking provides the user with a visual indication of the selection of the thumbnail image. In the example illustrated in FIG. 4, the marking is a check mark 122 that is displayed over each of the selected thumbnail images 450 and 455. However, the application may display a different marking to provide the same visual indication.

In the fifth stage 425, the owner selects (e.g., by tapping the owner's finger on) the share button 160. The selection causes the pop-up menu 145 to appear, as illustrated in the sixth stage 430. The menu 145 includes the photo stream button 165 for creating a new photo stream or adding the selected images to an existing photo stream. To create a new photo stream, the owner then selects the photo stream button.

FIG. 5 provides an illustrative example of specifying a name and subscriber for a photo stream. Five operational stages 505-525 of the image application are shown in this figure. The operations are continuations of the ones illustrated in FIG. 4. The first stage 505 illustrates the image application after the owner has selected the photo stream button 165 from the pop-up menu 145. The selection resulted in the display of the photo stream options sheet 125. The photo stream options sheet includes a subscriber field 130 for inputting one or more subscribers, and a name field for inputting a name for the photo stream. To input an email address of the subscriber, the owner then selects (e.g., by tapping the owner's finger on) the subscriber field 130.

The second stage 510 illustrates inputting a name of a subscriber into the subscriber field 130. In particular, the owner begins to input (e.g., type in) an email address in the subscriber field 130 using the on-screen or virtual keyboard 140. Based on the input, the application provides a list of suggested names 535 from the address book. Here, the auto-complete feature displays a name of a person. The name is shown with the associated email address. The owner then selects the name from the list 535 to automatically fill in the subscriber field 130.

In the third stage 515, the owner selects (e.g., by tapping the owner's finger on) the name field 135 for inputting a name (e.g., title) of the new photo stream. As shown in the fourth stage 520, the owner types in a name for the photo stream in the name field 135. In the fifth stage 525, the owner then selects the next button 134 to continue defining the photo stream.

FIG. 6 provides an illustrative example of inputting a comment for an image in the new photo stream. Five operational stages 605-625 of the image application are shown in this figure. These operations are continuations of the ones illustrated in FIG. 5. The first stage 605 illustrates the comment sheet 150 that is shown after the selection of the next button 134. The comment field 155 remains empty, as the owner has not inputted any comment for an image (e.g., the first image) in the photo stream. To input a comment, the owner selects the comment field 155.

As shown in the second stage 610, the selection of the comment field 155 causes an on-screen keyboard 140 to appear. The owner then types in a comment (e.g., "Summer Vacation") into the comment field 155. As mentioned above, the image sharing tools of some embodiments associate the comment to the first image in the photo stream. In some embodiments, the image sharing tools provide separate fields to input comment for different images. The image sharing tools of some embodiments automatically populates comment fields. For example, the comment fields may be populated using the image filenames. In auto-populating the comment fields, the image sharing tools may analyze the image files names to differentiate machine-generated names and user-specified names. Several example of such analysis will be described in detail below by reference to FIG. 58.

Returning to FIG. 6, the third stage illustrates the owner selecting (e.g., by tapping the user's finger on) the post button 136 to post or share the photo stream. The fourth stage 620 illustrates the image application displaying the photo stream menu 220. Here, the user selects the new photo stream (e.g., "Family Photos") from the menu 220. The selection causes thumbnail representation of the images in the new photo stream to be displayed in the image display area 105, as illustrated in the fifth stage 625.

When a new photo stream is defined, the application of some embodiments generates a message regarding the new photo stream and sends the notification to a control or push server. Based on the message, the control server may respond with file location data (e.g., with one or more URLs) to send the images to a storage server (e.g., a third-party storage server). The application may also generate images to send to the storage server. For example, the application may generate one or more lower resolution images from a stored image (e.g., raw image) and send those images to the storage server.

In some embodiments, the control server identifies each device associated with the recipient (e.g., based on the recipient's email address) and sends one or more messages or notifications regarding the photo stream invitation. Once the recipient accepts the invitation, the images are downloaded from the storage server onto each associated device. To more quickly display the images, the images may be downloaded to a recipient's device prior to the recipient accepting the invitation, and may be deleted from the device if the recipient rejects the invitation.

Figure 7:
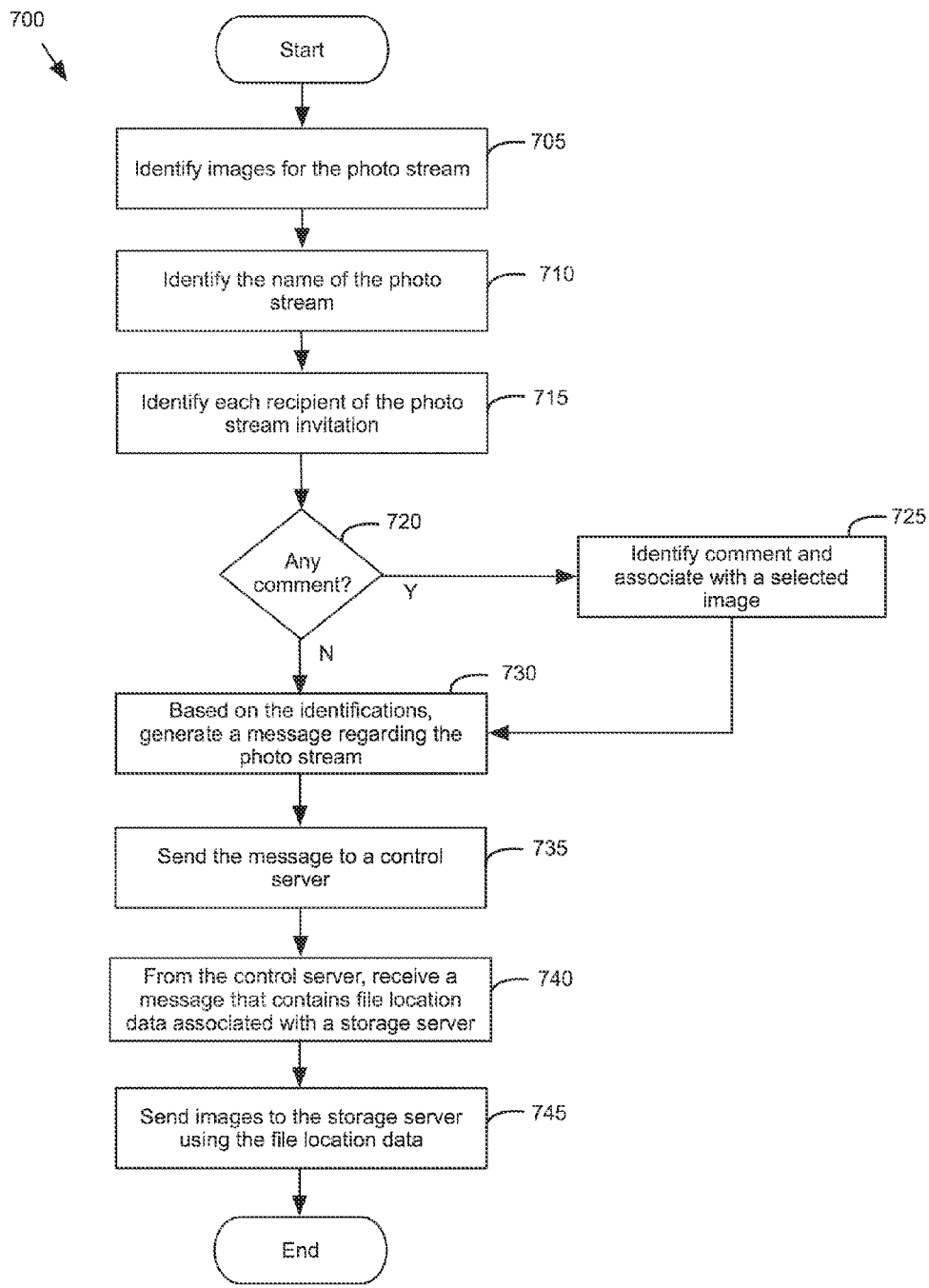
FIG. 7 conceptually illustrates a process that some embodiments use to create a new photo stream.
Figure 8:
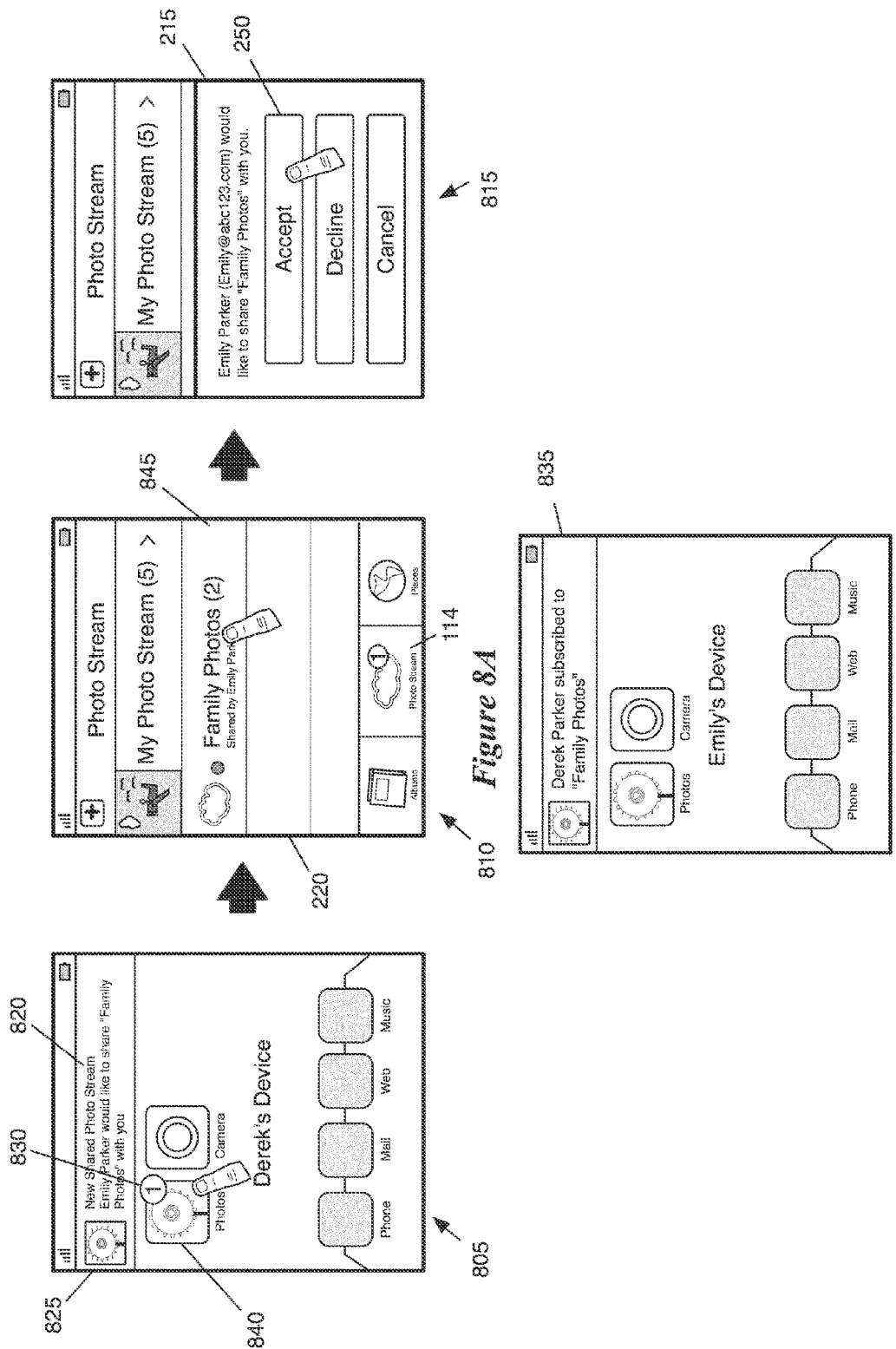
FIG. 8A provides an illustrative example of how a recipient is notified of the photo stream invitation.
FIG. 8B illustrates an example of the owner receiving notification of the acceptance of the invitation.

Having described several example GUI operations, a process for creating the new photo stream will now be described. FIG. 7 conceptually illustrates an example process 700 that some embodiments use to create a new photo stream. The process 700, in some embodiments, is performed by the image application.

The process 700 begins when it identifies (at 705) images for the photo stream. In the example described above, the owner selects the images through an image display area. After identifying the images, the process identifies (at 710) the name of the photo stream. Next, the process 700 identifies (at 715) each recipient of the photo stream invitation. Examples of specifying a name of the photo stream and a recipient of the photo stream invitation are described above by reference to FIG. 5.

The process 700 then determines (at 720) whether any comment has been left regarding an image (e.g., a first selected image) in the photo stream. If a comment was made, the process 700 identifies (at 725) the comment and associates it with the image. The process 700 then generates (at 730) a message regarding the new photo stream based on the identifications. After generating the message, the process sends (at 735) the message to a control server. In some embodiments, the control server facilitates the sharing of content by managing control data associated with a shared photo stream. Examples of such control data include user data (e.g., a list of devices associated with a user) and photo stream data (e.g., a list of photo stream associated with the user, a list of individuals that can access a particular photo stream, file location data).

A shown in FIG. 7, the process 700 receives (at 740) file location data from the control server. In some embodiments, the file location data comprises one or more URLs to upload images to a storage server (e.g., a third-party storage server). After receiving the file location data, the process 700 sends (at 745) the images to a storage server using the file location data. The process 700 then ends.

In some embodiments, the process 700 generates one or more copies of each original image (e.g., RAW image) prior to sending them to the storage server. That is, the process may take an image and generate different versions (e.g., at different resolutions) of that same image. Depending on the type of client (e.g., digital media receiver, tablet, smart TV, etc.), one of several different versions of the same image may be downloaded onto a client.

In some embodiments, the images are sent to the storage server when there is a particular type of network connection. For example, the images may not be sent to the storage server when the device is connected to the Internet through a cellular (e.g., a 3G, 4G) connection. That is, the device may send the image data to the storage server when there is a different type of connection such as a Wi-Fi connection. One reason for this is a smart phone or a tablet operates in a high-power state when transferring data using the cellular network. On the hand, the smart phone or tablet may operate in a low-power state when connected to the Internet through a wired connection or Wi-Fi connection. As such, power consumption (e.g., battery consumption) is minimized.

In some embodiments, the process 700 generates and sends an email message to each recipient. The email message may include a link that when selected causes cause the recipient to be added as a subscriber to the shared photo stream. Several examples of such an email will be described below by reference to FIG. 9.

Some embodiments perform variations on the process 700. The specific operations may not be performed in one continuous series of operations, and different specific operations may be performed in different embodiments. For instance, the process 700 might not identify any comment associated with an image. Also, the process 700 may generate multiple messages (e.g., one regarding a new shared photo stream album and another regarding a comment that was left for an image in the new shared photo stream) to send to the control server. Furthermore, the process 700 could be implemented using several sub-processes, or as part of a larger macro process.

B. Push Notifications

The previous examples illustrated creating a photo stream and sending a photo stream invitation. FIG. 8A provides an illustrative example of how a recipient is notified of the photo stream invitation. This figure is followed by FIG. 8B which illustrates an example of the owner receiving notification of the acceptance of the invitation. Three operational stages 805-815 are illustrated in FIG. 8A.

The first stage 805 illustrates the recipient receiving notification through his or her device (e.g., "Derek's Device"). This first stage 805 occurs after the owner (e.g., "Emily") has created the photo stream and sent the photo stream invitation. As shown, a banner 820 is displayed on the recipient's device. Specifically, the banner is superimposed along the top edge of the operating system's desktop. In some embodiments, the banner rotates into view as a simulated 3D effect. The banner may float on top of the display area for a predetermined period of time and then disappear (e.g., rotate out of view, fade away).

The banner 820 includes a message and an icon 825. The message states that there is a new shared photo stream. In addition, the message states that the photo stream's owner would like to share the photo stream with the recipient. The owner is identified by the owner's name (e.g., "Emily Parker"), while the photo stream is identified by its name (e.g., "Family Photos"). The icon 825 is the one associated with the image application.

In conjunction with the icon, or instead of it, the application of some embodiments displays a thumbnail representation of an image in the shared photo stream. For example, the banner 820 may include a thumbnail representation of the first image in the shared photo stream. The application of some embodiments alerts the recipient through one or more other means. For instance, the application may cause a device to vibrate or play a sound. When the device is in a locked mode, a pop-up window or dialog box with the message may appear in a lock screen.

In the first stage 805, the application displays a badge at the operating system ("OS") level to alert the recipient of an update to a photo stream. At this level, the application may display one or more other markings. One such type of notification is a badge that appears at least partially over the application's icon. This is shown in the first stage 805 as a badge 830 is displayed on the icon 840 of the image application. The badge 830 includes a number (e.g., "1"). In the example illustrated in the first stage 805, the number does not represent the number of new images in the photo stream. Instead, it indicates there is an update to a photo stream (e.g., there is a new photo stream invitation, a batch of images has been added to an existing photo stream, a new comment has been received regarding an image the existing photo stream, etc.).

The first stage 805 illustrates the selection of the application icon 840 (e.g., through a touch operation such as tapping the recipient's finger on the icon). As shown in the second stage 810, the selection causes the image application to be opened. The application displays the photo stream menu 220. The user might have first selected the photo stream tab 114 to display this menu. In the second stage 810, the menu 220 lists the new photo stream (i.e., "Family Photos") 845. Here, the recipient selects the photo stream 845 from the menu 220. The selection causes the application to display the pop-up menu 215, as shown in the third stage 815. The recipient then accepts the photo stream invitation by selecting the accept button 250 from the pop-up menu 215.

In the example illustrated in the second stage 810, the recipient selects the photo stream from the photo stream menu 220 to display the pop-up menu 215. In some embodiments, the selection of the banner 825 (shown in the first stage 805) opens the image application. In conjunction with launching the application, the selection of the banner 825 may cause the application to navigate to the photo stream menu 220 and/or displays an invitation sheet (e.g., the pop-up menu 215).

The previous example illustrated an example notification that is displayed on the recipient's device. When a subscriber accepts an invitation, the owner may also be notified of the acceptance of the invitation. FIG. 8B provides an illustrative example of a notification that is pushed onto the owner's device (e.g., through the image application).

As shown in FIG. 8B, a banner 835 is displayed on the owner's device. The banner 835 is superimposed along the top edge of the OS's desktop. The banner 835 includes a message that states that the recipient has subscribed to the photo stream. The subscriber is identified by the subscriber's name (e.g., "Derek Parker"), while the photo stream is identified by its name (e.g., "Family Photos"). The owner's device might have received the subscriber's name and/or the photo stream's name from a message from the control server. In this example, a badge is not displayed over the image application's icon. This is because the photo stream has not been updated. For instance, the subscriber has not added any comments regarding the images in the photo stream.

In some embodiments, the application alerts the recipient through one or more other means. For example, the application may cause a device to vibrate or play a sound to alert the user. When the device is in a locked mode, a pop-up window or dialog box with the message may appear in the lock screen.

As mentioned above, the application of some embodiments alerts the recipient through one or more other means. For instance, the application may cause a device to vibrate or play a sound. When the device is in a locked mode, a pop-up window or dialog box with the message may appear in a lock screen. In some embodiments, the notifications are fully customizable in that the user can disable them (e.g., from the application settings menu). For example, the user can turn on or off notification for certain updates (e.g., new comments, new photo streams, new images, etc.). The user can also specify whether to (1) display push notifications, (2) to display the notification as a banner or as an alert (e.g., the message in a bubble), (3) whether to view the notifications in the lock screen, (4) to play sound, and/or (5) badge the application's icon. These customization features are described below by reference to FIG. 28.

C. Email Notifications

In the example shown in FIG. 8A, the application displays a banner to notify the recipient of the photo stream invitation. In conjunction with the banner notification, or instead of it, an email message may be sent to the recipient upon creation of a new shared photo stream. In some embodiments, the image application generates the email message that contains a selectable link which when selected opens the image application. The selection of the link may also cause the application to navigate to the photo stream menu and/or may cause the recipient to be added as a subscriber to the photo stream. In some embodiments, the email message is always sent to each recipient that is invited to join the shared photo stream.

Figure 9:
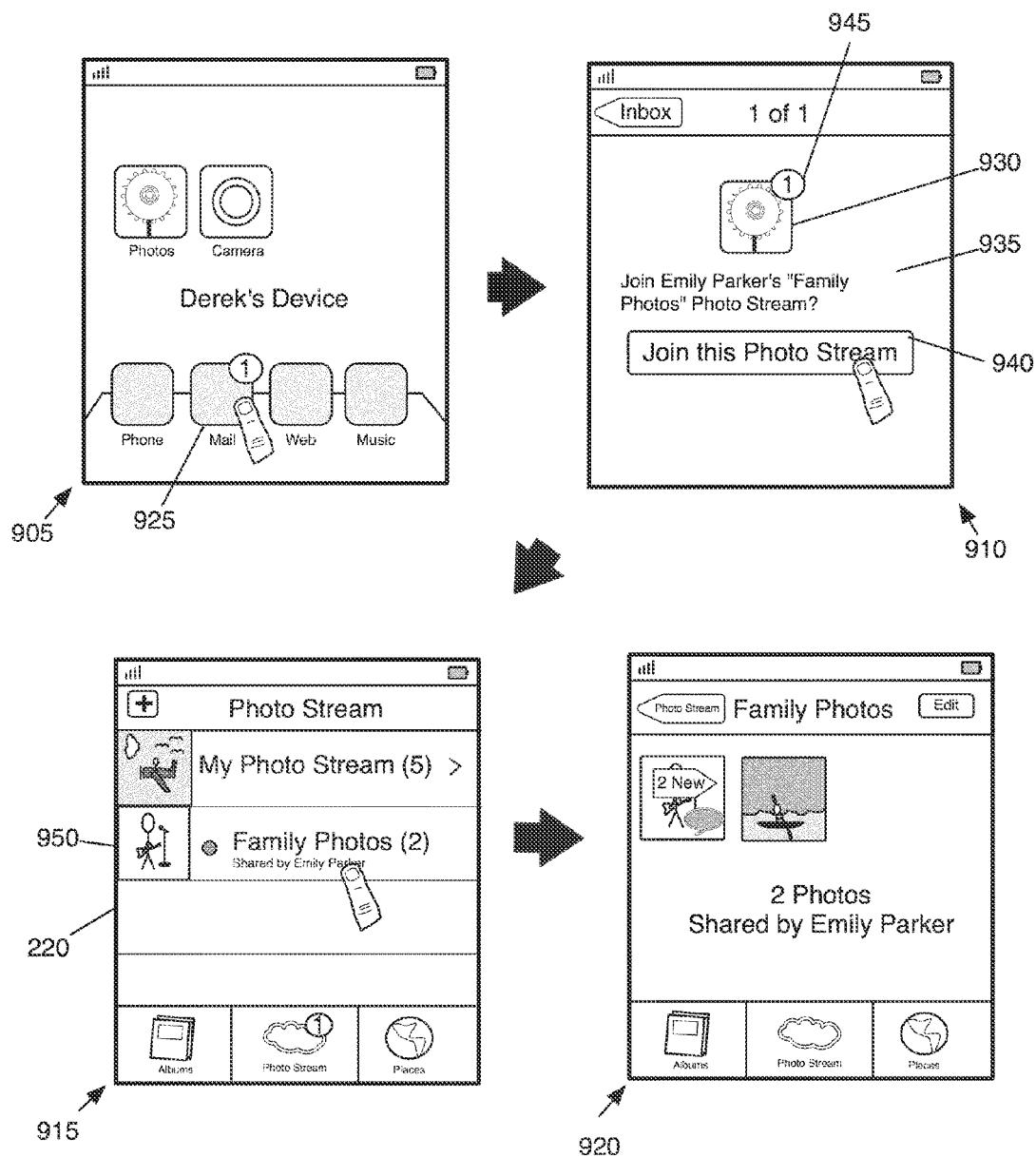
FIG. 9 provides an illustrative example of an email that is received at the recipient's device.

FIG. 9 provides an illustrative example of an email that is received at the recipient's device. Four operational stages 905-920 of the recipient's device are illustrated in this figure. The first stage 905 illustrates the selection of an icon 925 of an email application. In the second stage 910, the email application displays the email sent from the owner's device. The email includes (1) a message 935, (2) a link 940, and (3) a thumbnail image 930. The message 935 indicates that the owner shared a photo stream with the recipient. Specifically, it asks the recipient to join the owner's shared photo stream. The owner is identified by the owner's name and email address, and the photo stream is identified by its associated name.

The thumbnail image 930 shows the icon of the image application. The icon includes a marking or badge 945. The marking indicates that there is a new photo stream or an update to an existing photo stream. The link 940 is a selectable item for opening the image application. In some embodiments, the email includes a message that states that recipient has to create an account with a cloud service in order to join the shared photo stream. To download the photo stream album, the recipient may have to register his or her device with the cloud service.

In the second stage 910, the recipient selects (e.g., by tapping the recipient's finger on) the link 940. As shown in the third stage 915, the selection causes the image application to be opened. Specifically, the selection results in the display of the photo stream menu 220. The selection also causes the recipient to be added as a subscriber to the shared photo stream. Accordingly, the recipient does not have to select an accept button from an invitation sheet.

In the third stage 915, the subscriber selects the photo stream 950 from the photo stream menu 220. As shown in the fourth stage 920, the selection resulted in the display of the image display area 105. The image display area 105 shows thumbnail representations of the images in the shared photo stream. In some embodiments, a return email may be sent to the owner once the recipient accepts the invitation. This return email may state that the recipient joined or subscribed to the shared photo stream. The owner may also be notified of the acceptance through a notification (e.g., a banner) that is displayed on the owner's device. An example of such a notification is described above by reference to FIG. 8B.

The previous example illustrated accepting an invitation to a shared photo stream through an email message. The image-sharing tool of some embodiments allows a first recipient to forward the invitation to a second recipient. The second recipient can then subscribe to the shared photo stream by accepting the invitation. In some embodiments, the photo stream invitation is associated with a one-time token that can be used by only one individual. That is, the second recipient can take the place of the first recipient. However, the first and second recipients cannot both subscribe to the shared photo stream through the one photo stream invitation.

FIG. 10 provides an illustrative example of a first recipient forwarding the photo stream invitation to a second recipient. Two operational stages 1005 and 1010 of the first recipient's device are illustrated in this figure. In the first stage 1005, the email application has been opened to display the email. The email includes the message 935, the link 940, and the thumbnail image 930. The email application also displays a bottom bar 1015. This bar includes a reply button 1020 for replying to the email, a forward button 1025 for forwarding the email, and a delete button 1030 for deleting the email.

In the first stage, the first recipient selects the forward button 1025. As shown in the second stage 1010, the first recipient then forwards the email to a second recipient (e.g., to "Joe Parker").

FIG. 11A provides an illustrative example of the second recipient accepting the photo stream invitation. Three operational stages 1105-1115 of the second recipient's device are illustrated in this figure. The first stage 1105 illustrates the selection of an icon 925 of an email application. In the second stage 1110, the email application displays the email forwarded from the first recipient's device. The email includes the message 935, the link 940, and the thumbnail image 930.

In the second stage 1110, the second recipient selects (e.g., by tapping the second recipient's finger on) the link 940. As shown in the third stage 1115, the selection causes the image application to be opened. Specifically, the selection results in the display of the photo stream menu 220. The selection also causes the second recipient to be added as a subscriber to the shared photo stream. Accordingly, the second recipient does not have to select an accept button from an invitation sheet.

FIG. 11B provides an illustrative example of a notification that is pushed onto the owner's device upon the second recipient subscribing to the shared photo stream. As shown in, a banner 835 is displayed on the owner's device. The banner 835 is superimposed along the top edge of the OS's desktop. The banner 835 includes a message that states that the second recipient has subscribed to the photo stream. The subscriber is identified by the second recipient's name (e.g., "Joe Parker"), and the photo stream is identified by its name (e.g., "Family Photos").

In some embodiments, the banner may state that a person using a different email address has joined the shared photo stream. The banner may further state that the owner can remove the subscriber if the owner does not recognize the person or the email address. Alternatively, or conjunctively with the notification, a return email may be sent to the owner once the second recipient accepts the invitation. This return email may include the same message as the banner.

D. Selecting and Viewing Photo Stream

Figure 12:
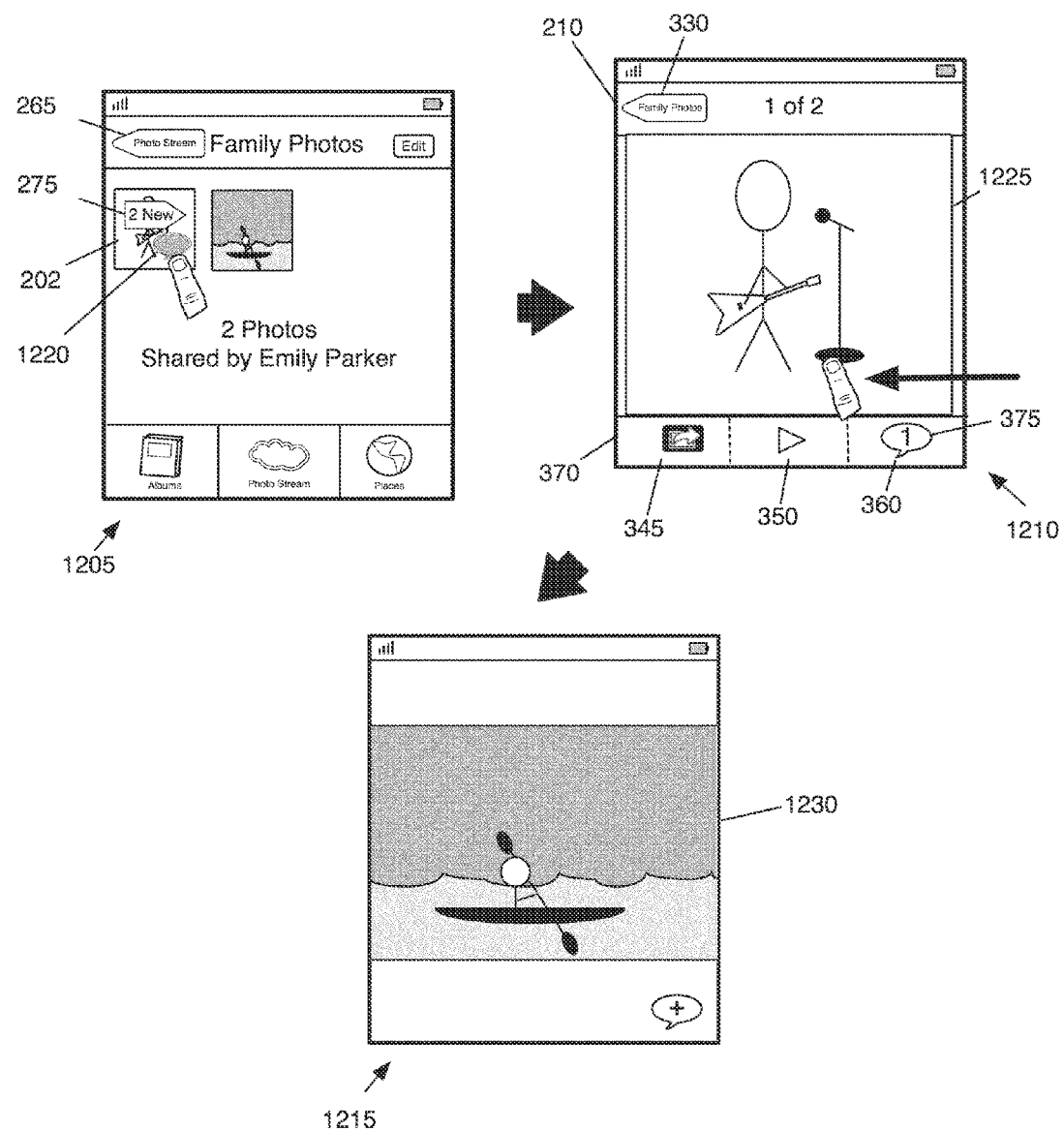
FIG. 12 provides an illustrative example of a subscriber selecting and viewing the photo stream after accepting the invitation.

In several examples described above, a recipient becomes a subscriber to a photo stream by accepting a photo stream invitation. FIG. 12 provides an illustrative example of how the images in the photo stream are presented to the subscriber. Three operational stages 1205-1215 of the subscriber's device are illustrated in this figure.

The first stage 1205 illustrates the image application displaying thumbnails representations of the image in the shared photo stream. As mentioned above, the application of some embodiments displays a marking that identifies the number of new image that are in the photo stream. This is shown in the first stage 1205 as a flag 275 is displayed over the thumbnail 202 of the first new image. The flag is marked with text that states that there are two new images in the photo stream. The application of some embodiments displays such a marking for each new batch of images. For example, when the owner adds a new batch of images to the photo stream, the application may display a similar flag on a first thumbnail image that corresponds to the first image in the new batch.

In some embodiments, the image application displays a visual indication that an image is associated with one or more comments. This visual indication may also indicate that there is at least one unread comment associated with the image. In the example illustrated in the first stage 1205, the first thumbnail 275 is displayed with a chat bubble 1220 that is colored (e.g., blue). The chat bubble 275 indicates that there is one or more comments associated with the corresponding image, and the color of the chat bubble indicates that there is at least one unread comment associated with the same image.

As shown in the first stage 1205, the subscriber selects the thumbnail 202. The second stage 1210 illustrates that the selection resulted in the display of a full-screen representation 1225 of the corresponding image. The full-screen representation 1225 is overlaid by the top and bottom bars 210 and 370. The top bar 210 includes a back button 330 to return to the thumbnail view. The back button 330 is labeled with the name of the photo stream. The top bar 210 also states that the displayed image 325 is a first of two images in the photo stream.

Different from the top bar 210, the bottom bar 370 includes (1) a share button 345 to share the selected image, (2) a play button 350 to play a slide show of the images in the photo stream, and (3) a comment button 360 to display the comment associated with the displayed image or leave another comment. In the example illustrated in FIG. 12, the comment button 360 is displayed with a chat bubble icon 375. The chat bubble icon includes a number that identifies the number of comments associated with the displayed image.

In the second stage 1210, the user selects (e.g., swipes across) the screen to display the next image. As shown in the third stage 1215, the selection causes the application to display the next image 1230. The selection also causes the top and bottom bars to disappear. However, the chat bubble icon 375 remains at the same location. As the displayed image is not associated with any comments, the number in the chat bubble has been replaced by a "+" sign. The sign provides a visual indication that a comment can be added for the displayed image 1230. At any time, the subscriber can add a new comment by selecting the chat bubble.

In the example described above, the top and bottom bars 210 and 370 disappear upon displaying the next image 1230. Alternatively, the application may remove these bars after a set period of time. For instance, in the second stage 1210, the top and bottom bars 210 and 370 may automatically disappear once a predefined period (e.g., a few seconds) has been reached.

E. Declining an Invitation

Figure 13:
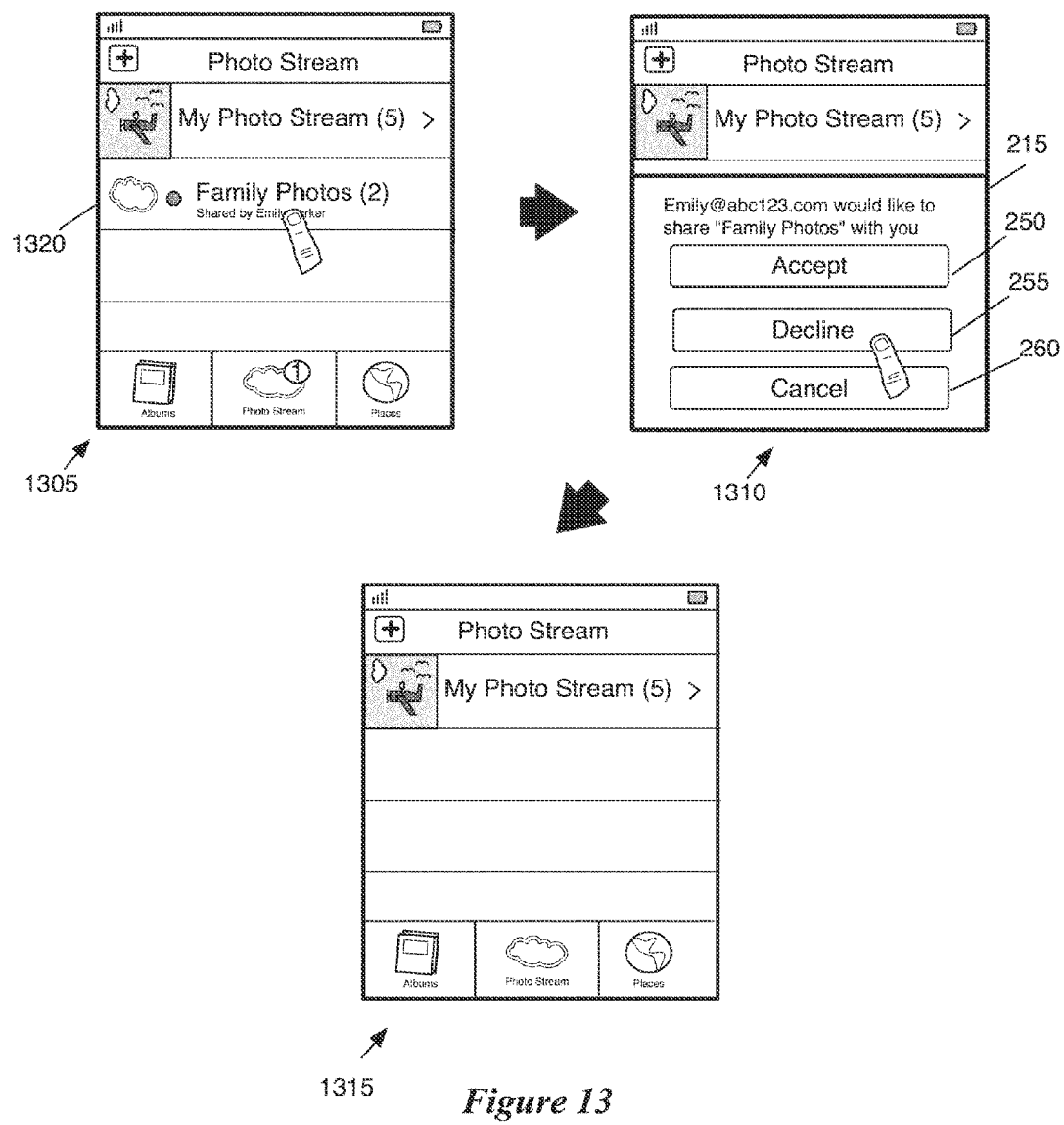
FIG. 13 provides an illustrative example of a recipient declining a photo stream invitation.

In several examples described above, a recipient becomes a subscriber to a photo stream by accepting a photo stream invitation. FIG. 13 provides an illustrative example of a recipient declining the photo stream invitation. Three operational stages 1305-1315 of the recipient's device are illustrated in this figure.

The first stage 1305 illustrates the image application displaying the photo stream menu 220. The menu 220 includes the photo stream 1320 created by the owner. The recipient selects the photo stream 1320 from the photo stream menu 220. The selection causes the application to display a pop-up menu 215 in the second stage 1310. Included in the pop-up menu 220 is a decline button 255, which when selected, declines the invitation. As shown at this stage 1310, the recipient selects the decline button 255 to decline the invitation. The third stage 1315 illustrates the photo stream menu 220 after the recipient has declined the photo stream invitation. As shown, the selection of the decline button 255 results in the removal of the photo stream 1320 from the photo stream menu 220.

F. Example Process

Figure 14:
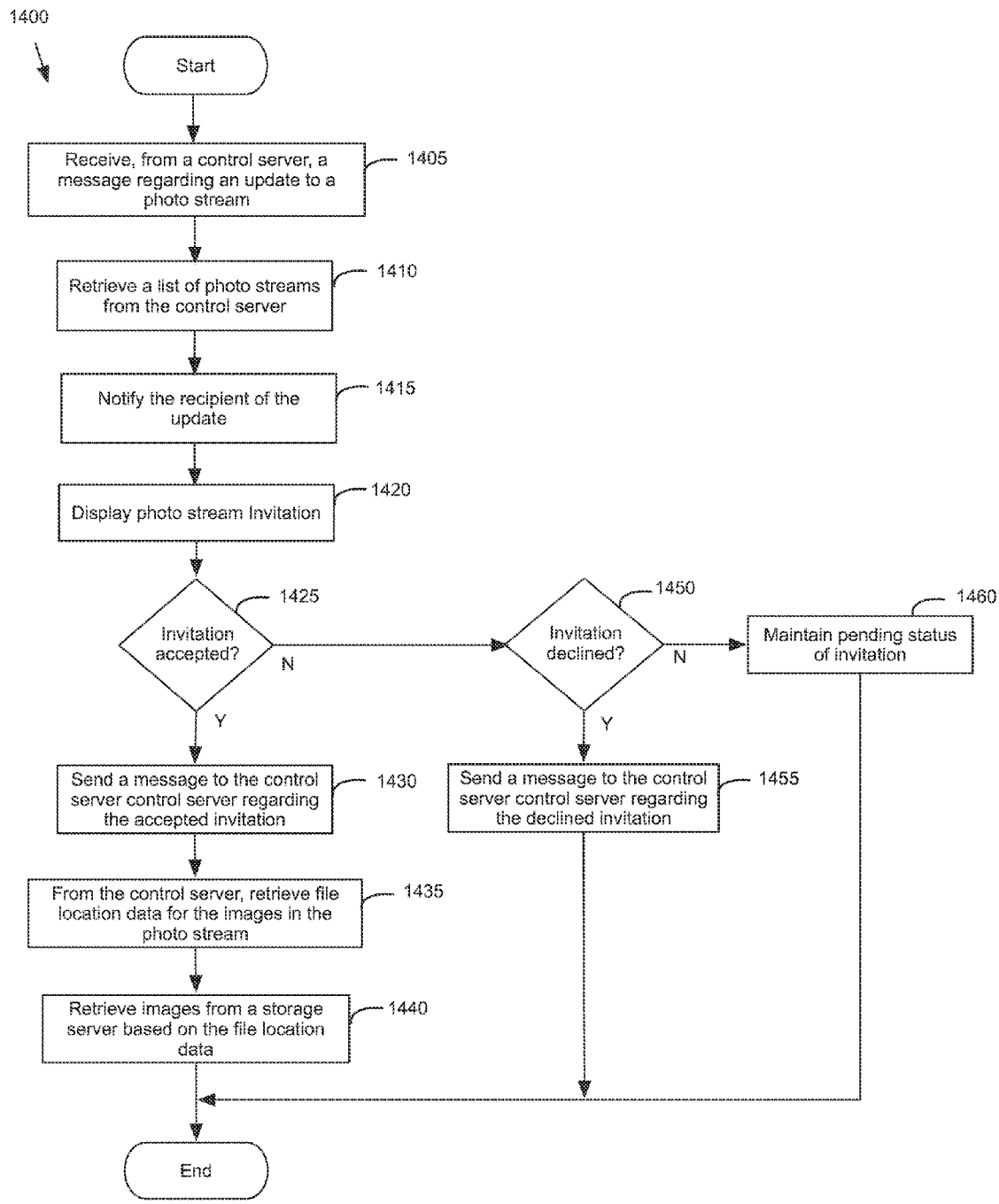
FIG. 14 conceptually illustrates a process that some embodiments use to accept or decline a photo stream invitation.

Having described accepting and declining a photo stream invitation, an example process will now be descried. FIG. 14 conceptually illustrates a process 1400 that some embodiments use to accept or decline a photo stream invitation. The process 1400, in some embodiments, is performed by the image application.

The process 1400 begins when it receives (at 1405), from a control server, a message regarding an update to a photo stream. After receiving the message, the process 1400 retrieves (at 1410) a list of photo streams from the control server. Based on the list, the process 1400 then notifies (at 1415) the recipient of the update. Several examples of different notifications or markings has been described above, including a banner notification and a badged icon at the OS level, a marking (e.g., a blue dot) at the application's album level, etc. As mentioned above, the recipient's device may also play a sound or vibrate upon receiving the message.

At 1420, the process 1400 displays the photo stream invitation. Many different examples of such a photo stream invitation are described above. For instance, the invitation may be a part of a pop-up window with buttons for accepting and/or declining the invitation. Different from the pop-up window, the invitation may be an email message with one or more selectable links for accepting and/or declining the invitation. In some embodiments, the photo stream invitation is displayed upon the recipient selecting a notification (e.g., a banner). Alternatively, the invitation may be displayed upon the recipient selecting the photo stream from a photo stream menu.

As shown in FIG. 14, the process 1400 awaits (at 1425) input from the recipient. If the invitation has been accepted, the process 1400 sends (at 1430) a message to the control server regarding the accepted invitation. In some embodiments, the control server receives the message and adds the recipient as a subscriber in access list. In some embodiments, this access list lists each subscriber that is authorized to view the images in the photo stream and make comments regarding those images. The list may also specify whether the subscriber can add images to the photo stream, remove images, add subscribers to the photo stream, and/or remove subscribers from the photo stream.

After notifying the control server of the accepted invitation, the process 1400 retrieves (at 1435), from the control server, file location data (e.g., with one or more Uniform Resource Locators ("URLs")) for the images in the photo stream. Then, the process retrieves (at 1440) the images from a storage server (e.g., a third-party storage server) using the location data. The process 1400 then ends.

At 1450, the process 1400 determines whether the recipient declined the invitation. If the recipient declined the invitation, the process sends (at 1455) a message to the control server regarding the declined invitation. The process 1400 may also delete the photo stream from the list of photo stream (e.g., that is represented in the photo stream menu). Based on the message, the control server of some embodiments removes the recipient from a list that lists different individuals that are invited to join the photo stream.

If the recipient has not declined or accepted the invitation (e.g., by selecting a cancel button or closing the email message), the process maintains (at 1460) the pending status of the invitation. As the invitation is pending, the process 1400 may not remove the photo stream from the photo stream menu and/or the marking (e.g., the colored dot) that is displayed with the name of the photo stream in that photo stream menu.

Some embodiments perform variations on the process 1400. The specific operations may not be performed in one continuous series of operations, and different specific operations may be performed in different embodiments. Furthermore, the process 1400 could be implemented using several sub-processes, or as part of a larger macro process.

II. Adding and Deleting Images

The image application of some embodiments provides tools to add or delete images from a shared photo stream. When a participant of the photo stream adds images, the images may be published to all of the participant's devices as well as the devices of other participants. Similarly, when the participant deletes images, the images may be deleted from all of the participant's devices and the devices of the other participants. Several examples of adding and deleting images will now be described by reference to FIGS. 15-20.

A. Adding an Image to a Photo Stream

Figure 15:
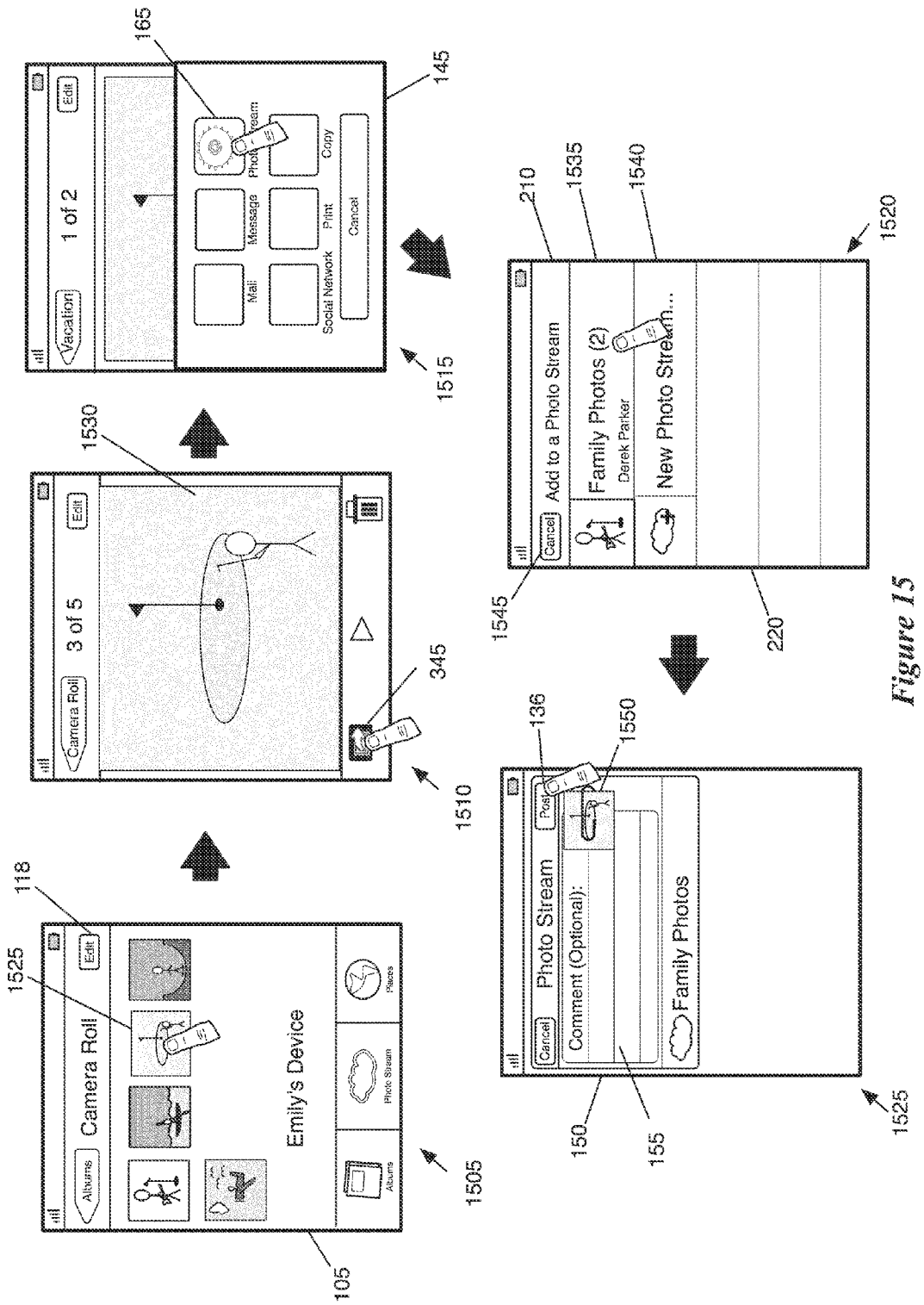
FIG. 15 provides an illustrative example of adding an image to an existing photo stream.

FIG. 15 provides an illustrative example of adding an image to an existing photo stream. Five operational stages 1505-1525 of the owner's device are illustrated in this figure. In the first stage 1505, the image display area 105 of the application displays thumbnail representations of images from the camera roll collection. Here, the owner selects (e.g., by performing a gesture such as tapping the owner's finger on) the third thumbnail image 1525.

The second stage 1510 illustrates the image display area 105 after the owner has selected the thumbnail image 1525. The selection results in the image display area 105 displaying a full screen representation 1530 of the selected image. To share the image, the owner then selects the share button 345. As shown in the third stage 1515, the selection causes the pop-up menu 145 to appear. In some embodiments, the pop-up menu 145 appears with animation by sliding up from the bottom of the screen. The owner then selects the photo stream button 165 from the pop-up menu 145.

As shown in the fourth stage 1520, the selection of the photo stream button 165 causes the application to display the photo stream menu 220. The photo stream menu 220 lists the existing photo stream 1535. The menu 220 also lists an option 1540 to create a new photo stream. The top bar 210 is superimposed on the photo stream menu 220. The top bar 210 includes a cancel button 1545 to return to the previous view (e.g., the full screen view illustrated in the second stage 1510). The top bar 210 also includes a heading that states "Add to a Photo Stream". Alternatively, the heading may indicate that a photo stream should be chosen. When there is no existing photo stream, the application of some embodiments displays the photo stream options sheet 125 that is described above by reference to FIG. 1. This allows the owner to skip the photo stream menu screen when creating a new photo stream.

In the fourth stage 1520, the owner selects (e.g., by tapping the owner's finger on) the photo stream 1535 from the menu 220. As shown in the fifth stage 1525, the selection of the photo stream 1535 results in the display of the comment sheet 150. The comment sheet 150 includes the field 155 for inputting a comment for the selected image. A thumbnail representation 1550 of the selected image is also shown on the comment sheet 150. To add the image to the photo stream, the owner then selects the post button 136.

In the example described above, the owner selects a single image 1525 from the image display area 105. Alternatively, the owner can select multiple images from the image display area 105 (e.g., by selecting the edit button 118 in the thumbnail view). An example of selecting multiple images has been described above by reference to FIG. 1.

Figure 16:
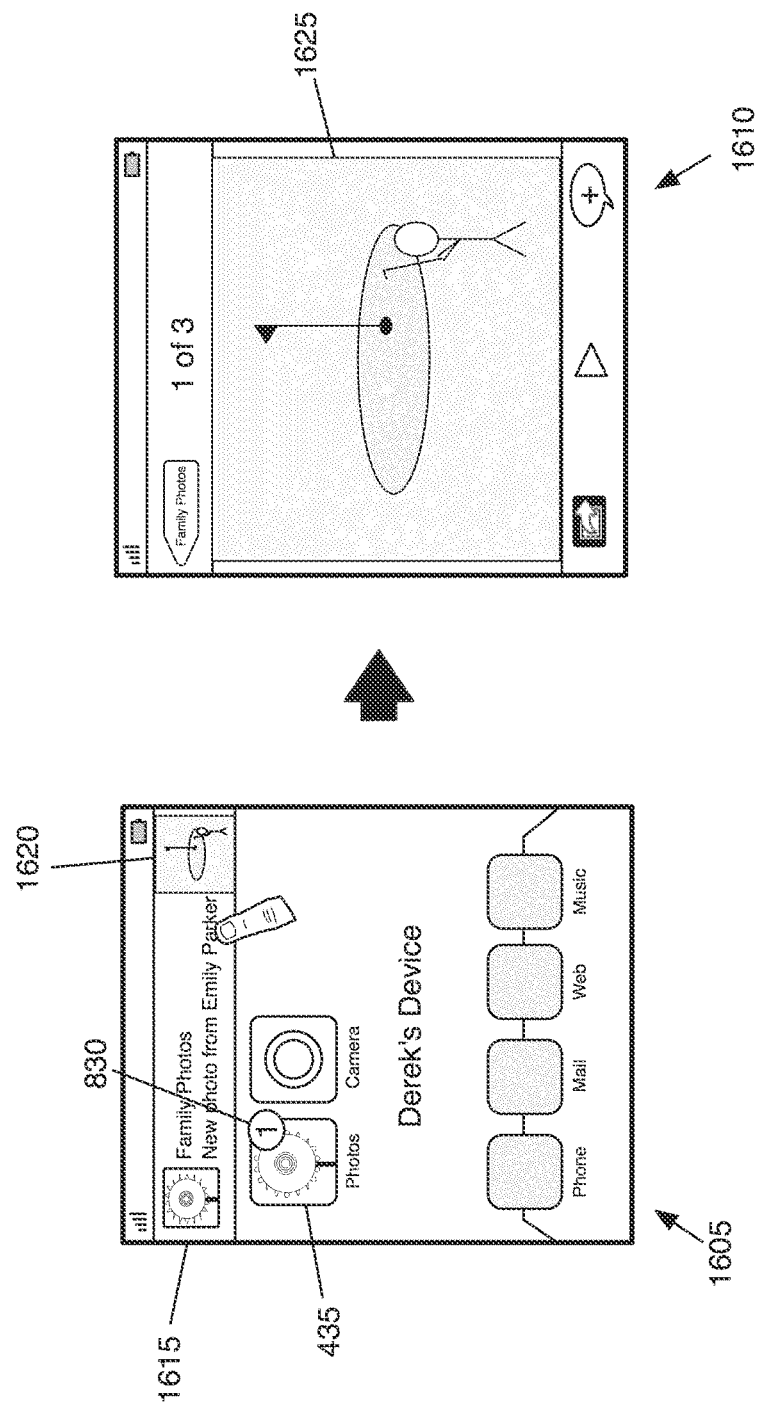
FIG. 16 provides an illustrative example of several notifications that are received at the subscriber's device.

When images are added to the photo stream, the subscriber may be notified of the additions. FIG. 16 provides an illustrative example of different markings (e.g., a banner notification, a badged icon) that are displayed on the subscriber's device. Two operational stages 1605 and 1610 of the subscriber's device are illustrated in FIG. 16.

The first stage 1605 illustrates the different markings that are shown on the subscriber's device. This first stage 1605 occurs after the owner has added the image to the photo stream (e.g., as illustrated in FIG. 15). Upon the owner adding the image, a banner 1615 is displayed on the subscriber's device. In this example, the banner 1615 is superimposed along the top edge of the operating system's desktop. In some embodiments, the banner 1615 rotates into view in a simulated 3D effect. The banner 1615 may float on top of the main display area for a predetermined period of time and then disappear (e.g., rotate out of view or fade away).

The banner 1615 includes a heading and a message. The heading identifies the photo stream, and the message states there is a new image from the owner. In some embodiments, the message states that the owner has added one new image to the photo stream. As shown, the photo stream is identified by its associated name, and the owner is identified by the owner's name.

In the example illustrated in the first stage 1605, the banner 1615 includes a thumbnail representation 1620 of the new image added to the photo stream. In some embodiments, the application displays a thumbnail representation of one image (e.g., the first image 1625 in the new batch) regardless of the number of images added to the photo stream. Alternatively, the application of some embodiments displays multiple thumbnail images of the images added to the photo stream. In some embodiments, the thumbnail representation 1620 is only displayed upon the recipient accepting the invitation to the photo stream. Otherwise, the banner 1615 displays the icon of the image application in some embodiments.

As shown in the first stage 1605, the subscriber is also notified through the icon 435 of the image application that there is an update in the photo stream. Specifically, the icon 435 is displayed with a marking or badge 830. Here, the badge 830 at least partially overlaps the icon 435. The badge includes a number that indicates that a photo stream has been updated. Hence, the number on the badge 830 does not represent the number of new images in the photo stream but represents the number of photo streams that are updated or new.

B. Deleting an Image from a Photo Stream

Figure 17:
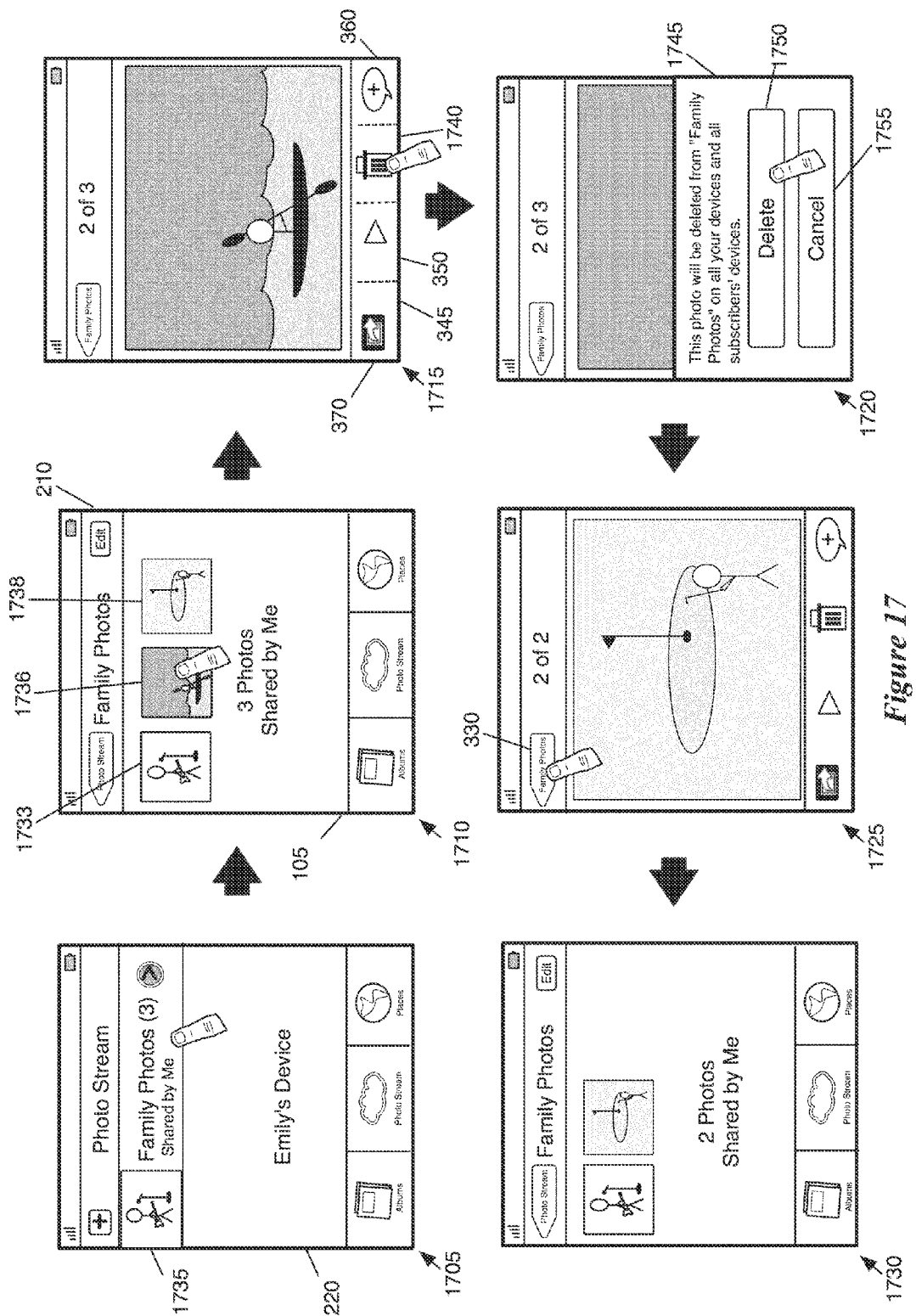
FIG. 17 provides an illustrative example of deleting an image from a photo stream.

In the example described above, the owner adds a new image to a shared photo stream. FIG. 17 provides an illustrative example of deleting an image from the photo stream. Six operational stages 1705-1730 of the owner's device are illustrated in this figure. In the first stage 1705, the application displays the photo stream menu 220. The photo stream menu 220 lists the photo stream 1735. To modify the photo stream, the owner selects (e.g., by performing a gesture such as tapping the owner's finger on) the photo stream 1735.

As shown in the second stage 1710, the selection of the photo stream 1735 results in the application displaying the image display area 105. The image display area 105 displays thumbnail representations of images 1733, 1736, and 1738 in the photo stream. This is indicated by the top bar 210, which displays the name of the selected photo stream. The owner then selects the second thumbnail image 1736 to display a full screen representation of the same image.

The third stage 1715 illustrates the image display area 105 after the owner has selected the thumbnail image 1736. The selection results in the image display area displaying a full screen representation of the selected image. The selection also causes the application to display several contextual menu items. These menu items are displayed on the bottom bar 370. In the example illustrated in the third stage 1715, the bottom bar 370 includes the share button 345 for sharing the displayed image, the play button 350 for playing a slide show of the images in the photo stream, the stream button 355 for streaming the images in the photo stream to one or more other devices (e.g., a desktop computer, a laptop), the delete button 1740 for deleting the image from the photo stream, and a comment button 360 to leave a comment regarding the displayed image. In some embodiments, the delete function is only available to the user that created the photo stream. As such, the subscriber may not be able to access this button 1740 on the subscriber's device when viewing the photo stream. In other words, the button 1740 may not be displayed at all on the bottom bar 370.

In the third stage 1715, the owner selects the delete button 1740. The selection of the delete button causes a pop-up menu 1745 to be displayed, as illustrated in the fourth stage 1720. The pop-up menu 1745 includes (1) a confirmation button 1750 to confirm deleting the selected image from the photo stream and (2) a cancel button 1755 to cancel the delete operation (i.e., the delete operation initiated by selecting the delete button 1740). As shown, the pop-up menu 1745 includes a warning message or a prompt stating that the image will be deleted from all of the owner's devices and the subscribers' devices.

In the fourth stage 1720, the owner selects the delete button 1750 from the pop-up menu 1745. The fifth stage 1725 illustrates the owner's device after deleting the selected image from the photo stream. As the second image 1736 has been deleted, the application displays a full screen representation of the next image 1738 in the photo stream. The owner then selects the back button 330 to return to the thumbnail view. As shown in the sixth stage 1730, the image display area 105 displays only two thumbnail images 1733 and 1738 because the second image 1736 has been deleted from the photo stream.

Figure 18:
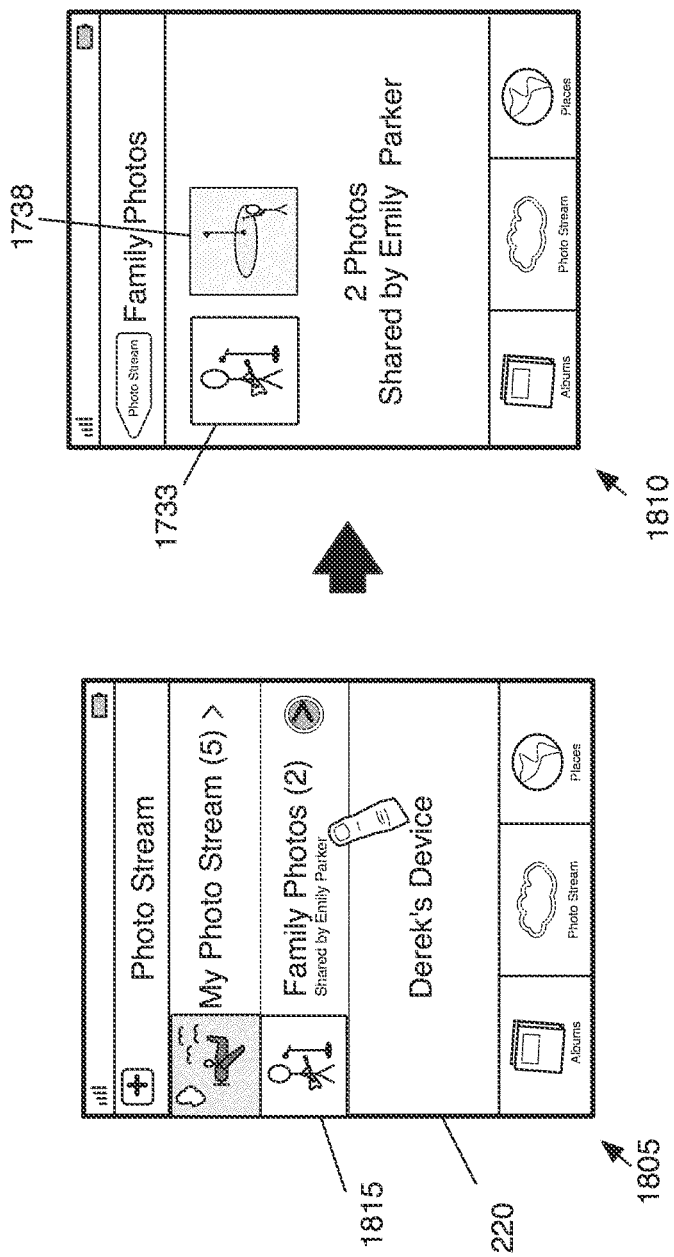
FIG. 18 provides an illustrative example of the photo stream on the subscriber's device after deleting the image.

In the previous example, the owner deletes an image from the owner's device. FIG. 18 provides an illustrative example of the photo stream on the subscriber's device after the owner deletes the image. Two operational stages 1805 and 1810 of the subscriber's device are illustrated in this figure.

As shown in the first stage 1805, the subscriber's device displays the photo stream menu 220. The subscriber might have selected the application's icon from the desktop and then navigated to the photo stream menu 220. When one or more images are deleted from the photo stream, the subscriber may not be notified of this update. For instance, a banner notification may not be shown on the subscriber's device and/or a badge may not be shown on the application's icon.

In the first stage 1805, the subscriber selects the photo stream 1815 from the photo stream menu 220. The selection causes the application to display thumbnail representations of the images in the photo stream. As the second image 1736 has been deleted (e.g., by the owner), the image display area only displays representations of the remaining two images 1733 and 1738.

C. Example Processes

Figure 19:
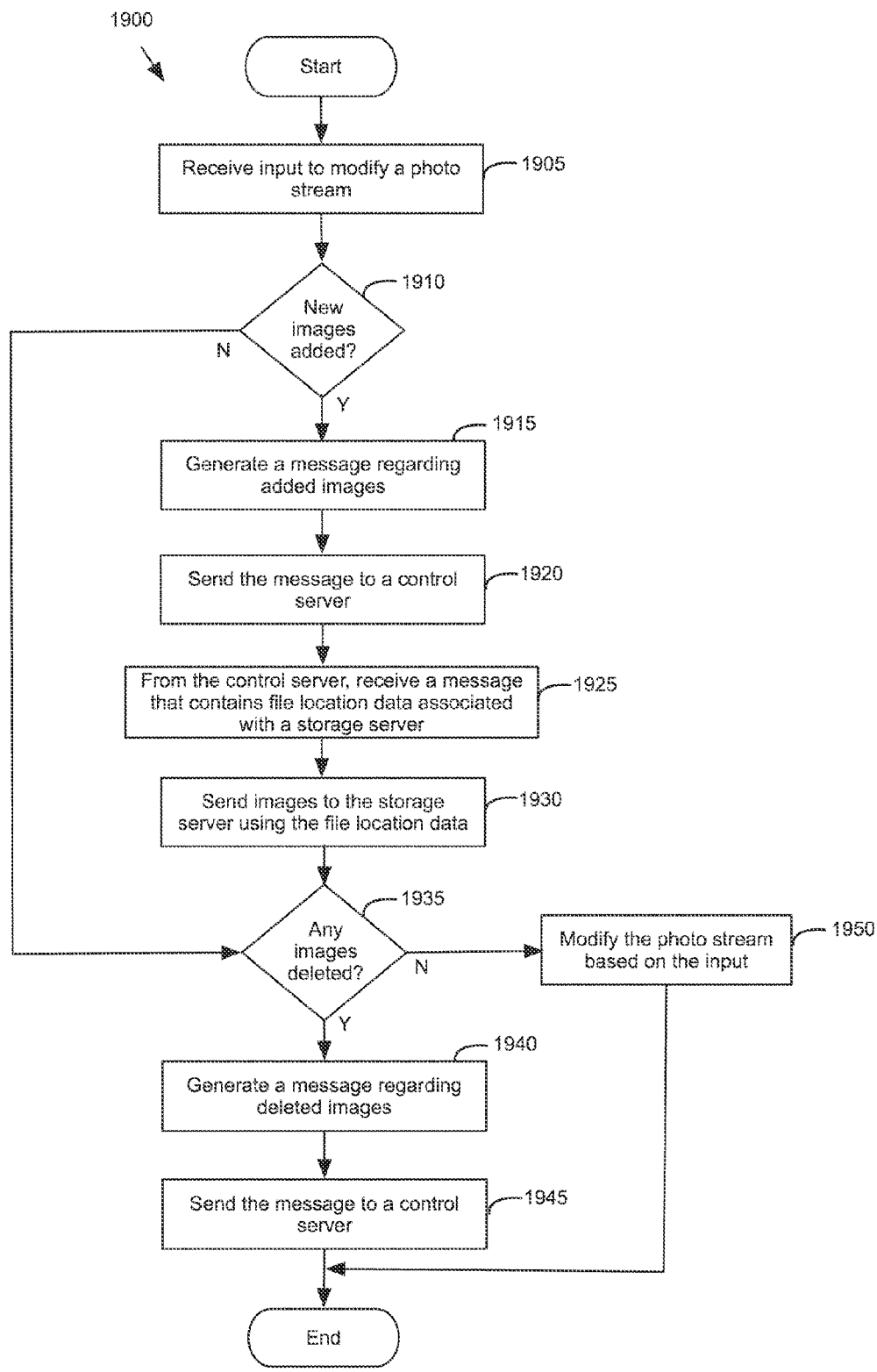
FIG. 19 conceptually illustrates a process that some embodiments perform to add or delete images from a photo stream.

Having described adding and deleting images from a shared photo stream, several example processes will now be described by reference to FIGS. 19 and 20. FIG. 19 conceptually illustrates a process 1900 that some embodiments use to add or delete images from a photo stream. The process 1900, in some embodiments, is performed by the image application (e.g., executing on the owner's device).

The process 1900 begins when it receives (at 1905) input to modify a photo stream. The process 1900 then determines (at 1910) whether a new batch of images has been added to the photo stream. If not, the process 1900 proceeds to 1935, which is described below. If so, the process 1900 generates (1915) a message regarding the new batch of images. After generating the message, the process 1900 sends (at 1920) the message to a control server. As mentioned above, the control server facilitates the sharing of content by managing control data associated with a shared photo stream. Examples of such control data include user data (e.g., a list of devices associated with a user) and photo stream data (e.g., a list of photo stream associated with the user, file location data). The control data may also include a subscriber list that lists individuals that can access a particular photo stream. The subscriber list may also specify whether a subscriber can add images to the photo stream, remove images, add subscribers to the photo stream, make comments, and/or remove subscribers from the photo stream.

As shown in FIG. 19, the process 1900 receives (at 1925) file location data from the control server. In some embodiments, the file location data includes one or more URLs to upload the images to a storage server (e.g., a third-party storage server). Once the file location data is received, the process 1900 sends (at 1930) the images to the storage server using the file location data.

At 1935, the process 1900 determines whether any images have been deleted from the photo stream. If not, the process 1900 proceeds to 1950, which is described below. If so, the process 1900 generates (1940) a message regarding the deleted images. After generating the message, the process 1900 sends (at 1945) the message to a control server. Based on the message, the control server may disassociate the images from the photo stream. For instance, the control server may remove references to those images from a photo stream list that lists all images associated with the photo stream.

When the modification is another type of modification, the process 1900 modifies (1950) the photo stream based on the input. Examples of such modifications include adding a new subscriber, deleting a current subscriber, deleting the photo stream, changing the photo stream's name, etc. Similar to adding and deleting images, the application of some embodiments generates and sends a message to the control server based on the modification. The control server then makes changes to the shared photo stream. For instance, the control server may remove a subscriber from a subscriber list that lists all individuals that are able to access the photo stream. Several examples of such modifications are described below in detail in Section III.

Figure 20:
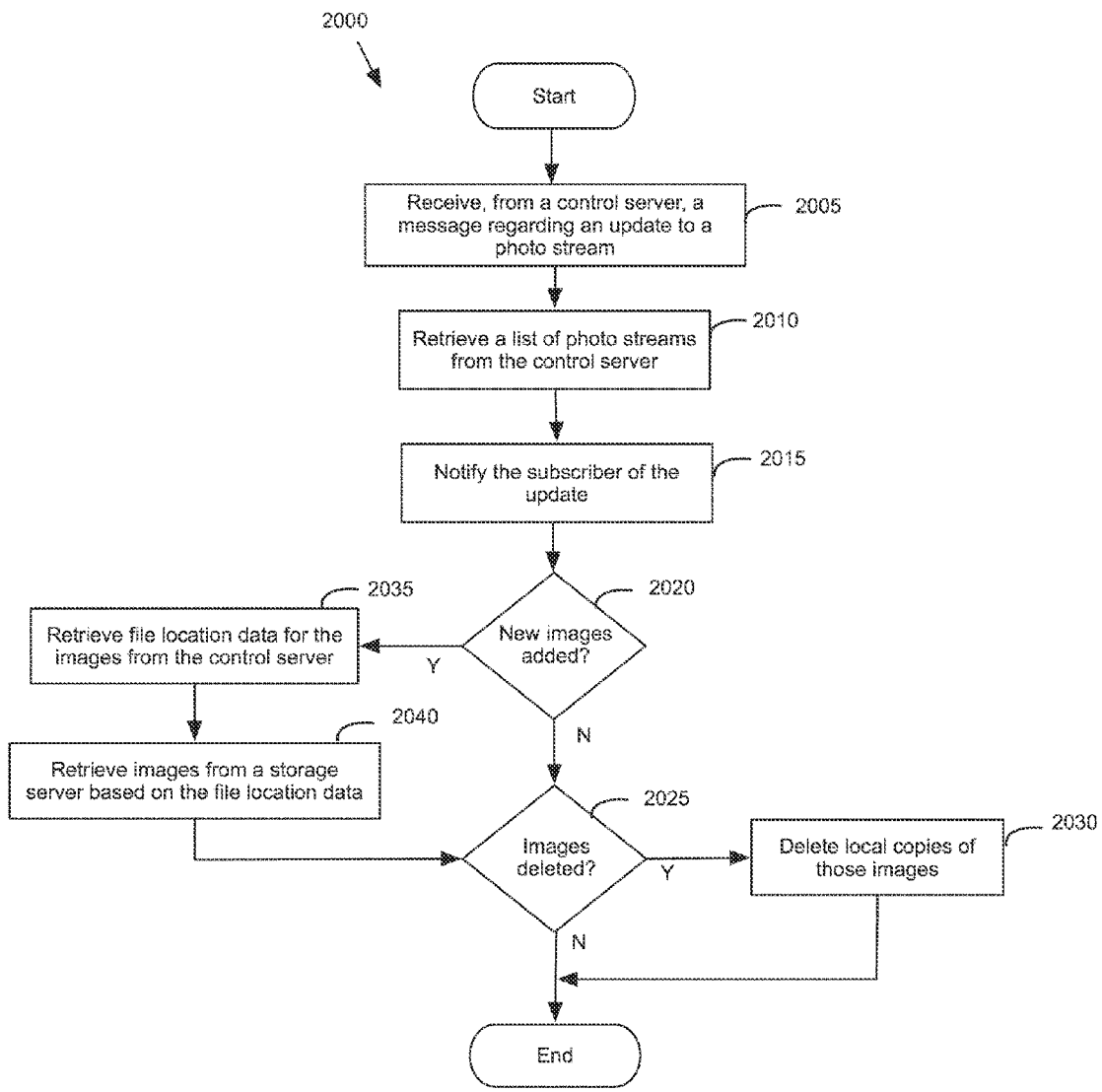
FIG. 20 conceptually illustrates a process that some embodiments perform when a participant adds images to or deletes images from a photo stream.

FIG. 20 conceptually illustrates a process 2000 that some embodiments perform when a participant adds images to or deletes images from a photo stream. The process 1900, in some embodiments, is performed by the image application (e.g., executing on the subscriber's device). The process 2000 begins when it receives (at 2005), from a control server, a message regarding an update to a photo stream.

After receiving the message, the process 2000 retrieves (at 2010) a list of photo streams from the control server. Based on the list, the process 2000 then notifies (at 2015) the subscriber of the update. In some embodiments, the process 2000 only notifies a participant of certain types of updates and ignores other updates. For instance, the process 2000 might display a notification if a new image has been added to the photo stream. On the other hand, if an image has been deleted, the process 2000 might not display any notifications. The application of some embodiment allows its user to specify what type of events (e.g., new comment, new image, new subscriber, etc.) triggers a notification.

As shown in FIG. 20, the process 2000 determines (at 2020) whether new images have been added to the photo stream. If not, the process 2000 proceeds to 2025, which is described below. If so, the process 2000 retrieves (at 2035) file location data from the control server. The process 2000 then retrieves (at 2040) the images from a storage server based on the file location data. At 2025, the process 2000 determines whether any images have been deleted from the photo stream. If so, the process 2000 deletes (at 2030) the local copies of the images from the photo stream. Otherwise, the process 2000 ends.

Some embodiments perform variations on the processes 1900 and 2000. The specific operations of each of these processes may not be performed in one continuous series of operations, and different specific operations may be performed in different embodiments. Furthermore, the processes 19 and 20 could be implemented using several sub-processes, or as part of a larger macro process.

III. Photo Stream Management

In the examples described above, a participant modifies a photo stream by adding and deleting images. The image application of some embodiments provides a variety of different tools that allow a participant to manage a photo stream. In some embodiment, the management entails (1) resending an invitation to a recipient who has not responded, (2) adding a new subscriber, (3) deleting a current subscriber, and/or (4)

deleting the photo stream. Several examples of these photo stream management features will now be described by reference to FIGS. 21-28.

A. Resending an Invitation

Figure 21:
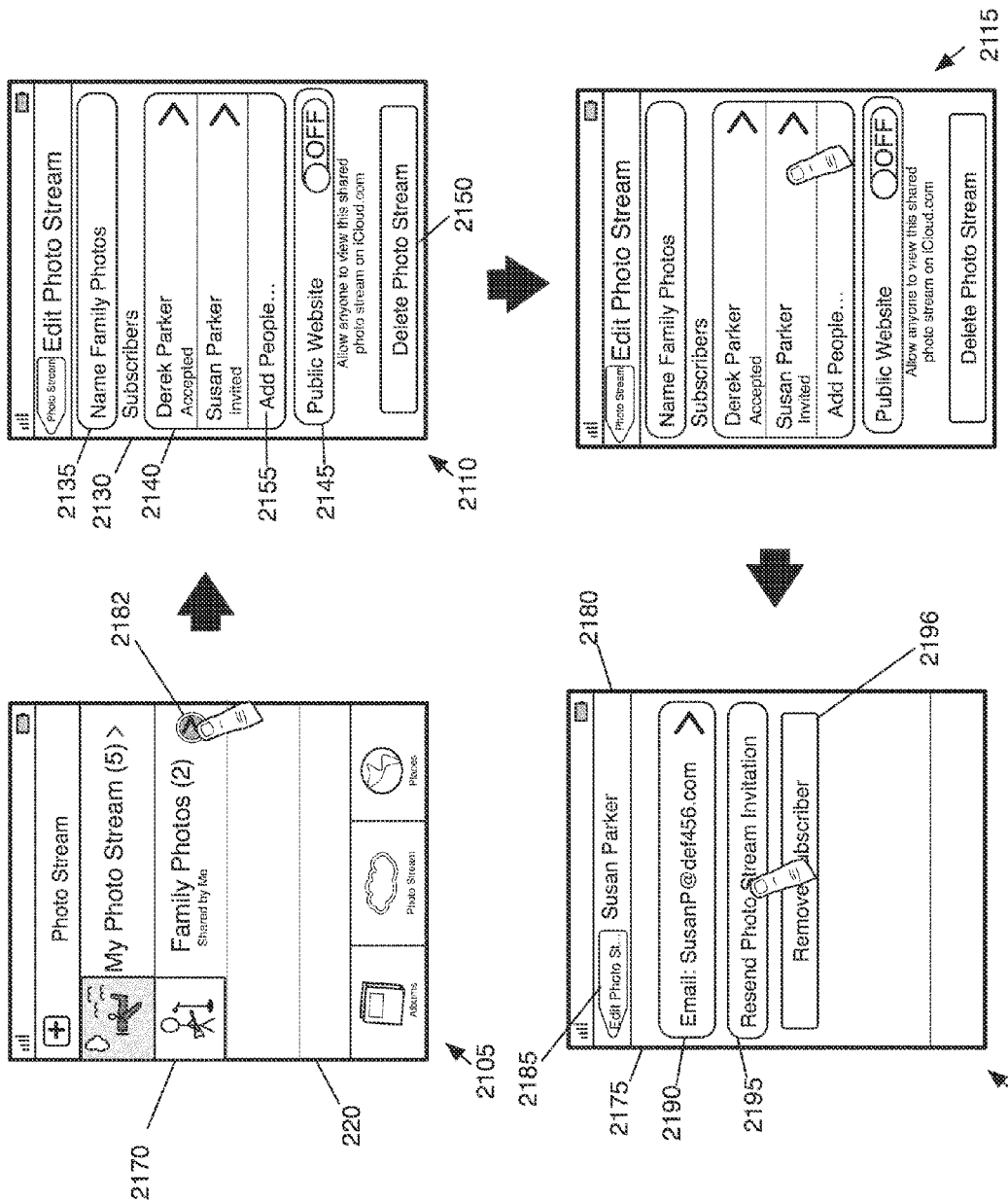
FIG. 21 provides an illustrative example of resending a photo stream invitation to a recipient that has not accepted or declined the invitation.

FIG. 21 provides an illustrative example of resending a photo stream invitation to a recipient who has not accepted or declined the invitation. Specifically, this figure illustrates in five operational stages 2105-2125 how an owner can use the image application to resend the invitation. This figure includes the photo stream menu 220 that lists one or more photo streams. The figure also includes an edit menu 2130.

The edit menu 2130 provides several different tools to modify a photo stream. As shown, the edit menu 2130 includes a name field 2135, a subscriber section 2140, a public website control 2145, and a delete button 2150. The name field 2135 is an area in the edit menu 2130 that displays the name of the photo stream. In some embodiments, the name field 2135 can be used to edit the name of the photo stream. For example, the owner can select the name field 2135 to display a virtual or onscreen keyboard. The owner can then use the virtual keyboard to modify the name of the photo stream. The delete button 2150 can be used to delete the selected photo stream.

The subscriber section 2140 displays a list of individual that have been invited to join the photo stream. Specifically, the section lists the name of each person along with a corresponding subscription status. In some embodiments, the different subscription statuses include pending (e.g., invited), declined, and accepted. The owner can select any person from the list to remove the person as a subscriber, or resend the invitation if the person has not accepted or declined the invitation. As shown in FIG. 21, the subscriber section includes an add people control 2155. The owner can select this control to invite other people to join the photo stream.

In some embodiment, the application provides tools to publish the photo stream's images to a website (e.g., a public website). That is, instead of pushing the images to each participant's device, the images can be displayed in a web browser by accessing the website. To facilitate web publication, the edit menu 2130 includes the public website control 2145. The owner can select or toggle this control 2145 to publish the shared photo stream to the website. For example, the owner can select the control 2145 to turn on or off the public website feature. When turned on, the application of some embodiments displays the URL associated with the photo stream's website. Several examples of publishing images to the website will be described in detail below by reference to FIGS. 38-48.

In conjunction with one or more of the menu items, or instead of them, the image sharing tools of some embodiments allows the owner to control user access to the photo stream. For example, the owner can control read and write access by specifying one or more individuals that can add images to and/or remove image from the photo stream. The image sharing tools of some embodiments allows the owner to control commenting (e.g., which subscriber can or cannot leave comments, etc.).

Having described the edit menu 2130, the operations of resending a photos stream invitation will now be described by reference to the state of the application's GUI during the five stages 2105-2125 that are illustrated in FIG. 21. In the first stage 2105, the owner's device is displaying the photo stream menu 220. The photo stream menu 220 includes a selectable item 2182 (e.g., a colored icon with a directional arrow) for the shared photo stream. This item 2182 can be selected to display the edit menu 2130 for the corresponding photo stream. Instead of the selectable item, the application of some embodiments includes an edit button 2160 for entering the photo stream editing mode.

In the first stage 2105, the owner selects the selectable item 2182 associated with the "Family Photos" photo stream. As shown in the second stage 2110, the selection of the selectable item 2182 causes the application to display the edit menu 2130. The edit menu 2130 displays the name of the selected photo stream in the name field 2135. The subscriber section 2140 includes a list of people that have been invited to the photo stream. The list includes "Derek Parker" and "Susan Parker". The subscriber section also displays the subscription status below the name of each individual. Specifically, the statuses indicate that Derek Parker has accepted the invitation, while Susan Parker's invitation status is pending (e.g., invited).

In the third stage 2115, the owner selects (e.g., by tapping the owner's finger on) the recipient "Susan Parker" from the subscriber section 2140. The selection causes the application to display the subscriber menu 2175, as illustrated in the fourth stage 2120. The subscriber menu 2175 is overlaid by the top bar 2180. The top bar 2180 includes a back button 2185 to return to the previous view. The top bar 2180 also includes a heading that states the name of the subscriber.

The subscriber menu 2175 includes (1) an email field 2190, (2) a resend invitation button 2195, and (3) a remove subscriber button 2196. The email field 2190 displays the email address of the recipient. The owner can also use this field to modify the email address of the recipient. The resend invitation button 2195 can be used to resend the invitation to the recipient. The remove subscriber button 2196 can be used to remove the recipient or subscriber from the photo stream.

As shown in the fourth stage 2120, the owner selects the resend invitation button 2195 to resend the photo stream invitation. When the invitation is resent, the recipient's device may display one more notifications of the invitation. For example, the recipient's device may re-display a banner stating that the owner shared a photo stream with the recipient. Alternatively, or conjunctively with the banner, an email message may be sent to the recipient's device regarding the photo stream invitation. As mentioned above, the email may include a link that when selected adds the recipient as a subscriber to the photo stream.

B. Adding a Subscriber

Figure 22:
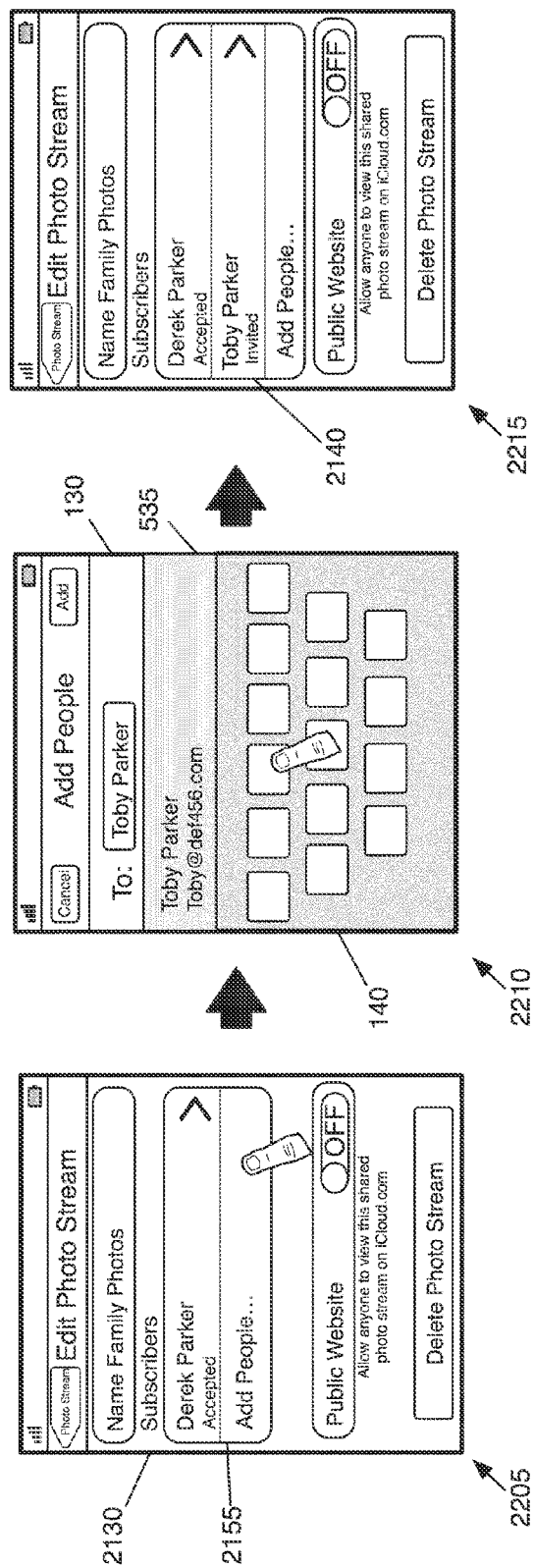
FIG. 22 provides an illustrative example of adding a subscriber for the photo stream.

In the example described above, an owner uses the image application to resend an invitation to a recipient. The image application of some embodiments allows the owner to add additional subscribers. FIG. 22 provides an illustrative example of sending an invitation to another recipient to join the shared photo stream. Three operational stages 2205-2215 of the owner's device are illustrated in this figure.

In the first stage 2205, the application displays the photo stream edit menu 2130. The menu includes the add people button 2155. To add a subscriber, the owner selects (e.g., by tapping the owner's finger on) the add people button 2155. The selection causes a virtual or on-screen overlay keyboard 140 to be displayed, as illustrated in the second stage 2210. The owner then begins to input an email address of the subscriber. Based on the input, the application displays, in a suggestion field 535, a contact from the owner's contacts list or address book. The name of the contact is shown with the contact's associated email address. The owner can selects the name from the list 535 to automatically fill in the subscriber field 130.

The third stage 2215 illustrates the photo stream edit menu 2130 after the owner has specified another recipient to join the photo stream. The name of the recipient is listed in the subscriber section 2140. Specifically, the name is listed with the pending status (e.g., invited status), as the person has not yet accepted the photo stream invitation.

C. Removing a Subscriber

Figure 23:
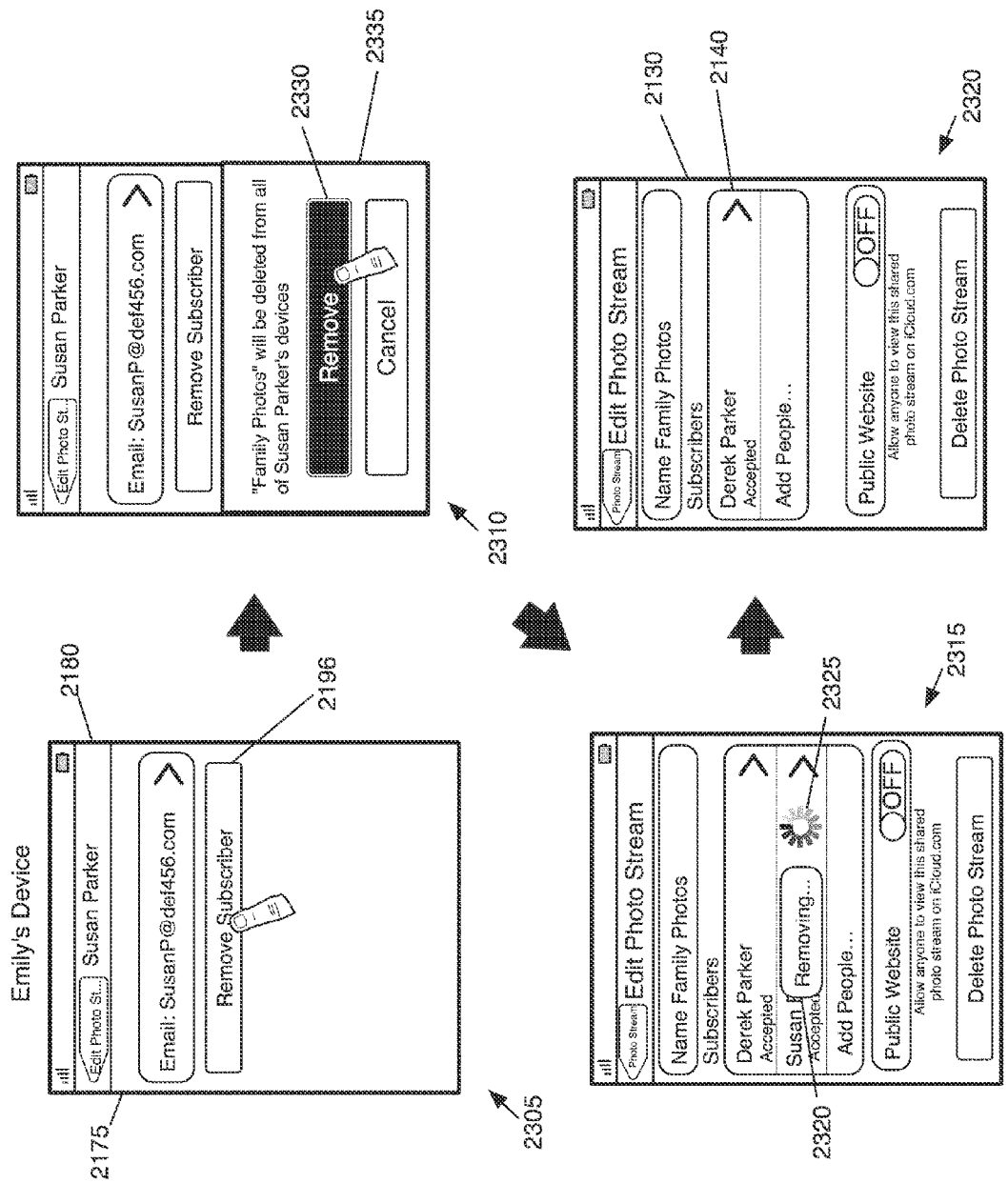
FIG. 23 provides an illustrative example of removing a subscriber.

In the example described above, the owner uses the image application to invite a person to join the shared photo stream. The image application of some embodiments allows the owner to remove subscribers from the photo stream. This includes the recipients that have not yet responded to the photo stream invitation. FIG. 23 provides an illustrative example of removing a subscriber. Four operational stages 2305-2320 of the owner's device are illustrated in this figure.

In the first stage 2305, the application displays the subscriber menu 2175. As shown, the top bar 2180 includes the heading that states the name of the person that subscribed to the photo stream. The menu 2175 also includes the remove subscriber button 2196 for removing the subscriber. As the person has subscribed to the photo stream, the resend invitation button is not shown in the subscriber menu 2175. To remove the subscriber, the owner selects the remove subscriber button 2196.

The second stage 2310 illustrates the application after the owner has selected the remove subscriber button 2196. Here, the application displays a pop-up window 2335 (e.g., an action sheet). The pop-up window states that the photo stream and its images will be removed from all of the subscriber's devices. Here, the owner selects a confirmation button 2330 to confirm removing the subscriber.

In the third stage 2315, the application is awaiting confirmation of the removal from a server (e.g., the control server) that maintains the list of individuals (e.g., an access list) associated with the photo stream. The menu is overlaid by a prompt 2320 that indicates that the individual is being removed. The application also displays a spinner 2325 while awaiting confirmation of the removal. However, the application may display one or more other graphical symbols (e.g., an hourglass) or text to convey the same meaning.

The fourth stage 2320 illustrates the photo stream edit menu 2130 after the subscriber has been removed from the photo stream. As shown, the name of the subscriber is no longer listed in the subscriber section 2140.

D. Deleting a Photo Stream

Figure 24:
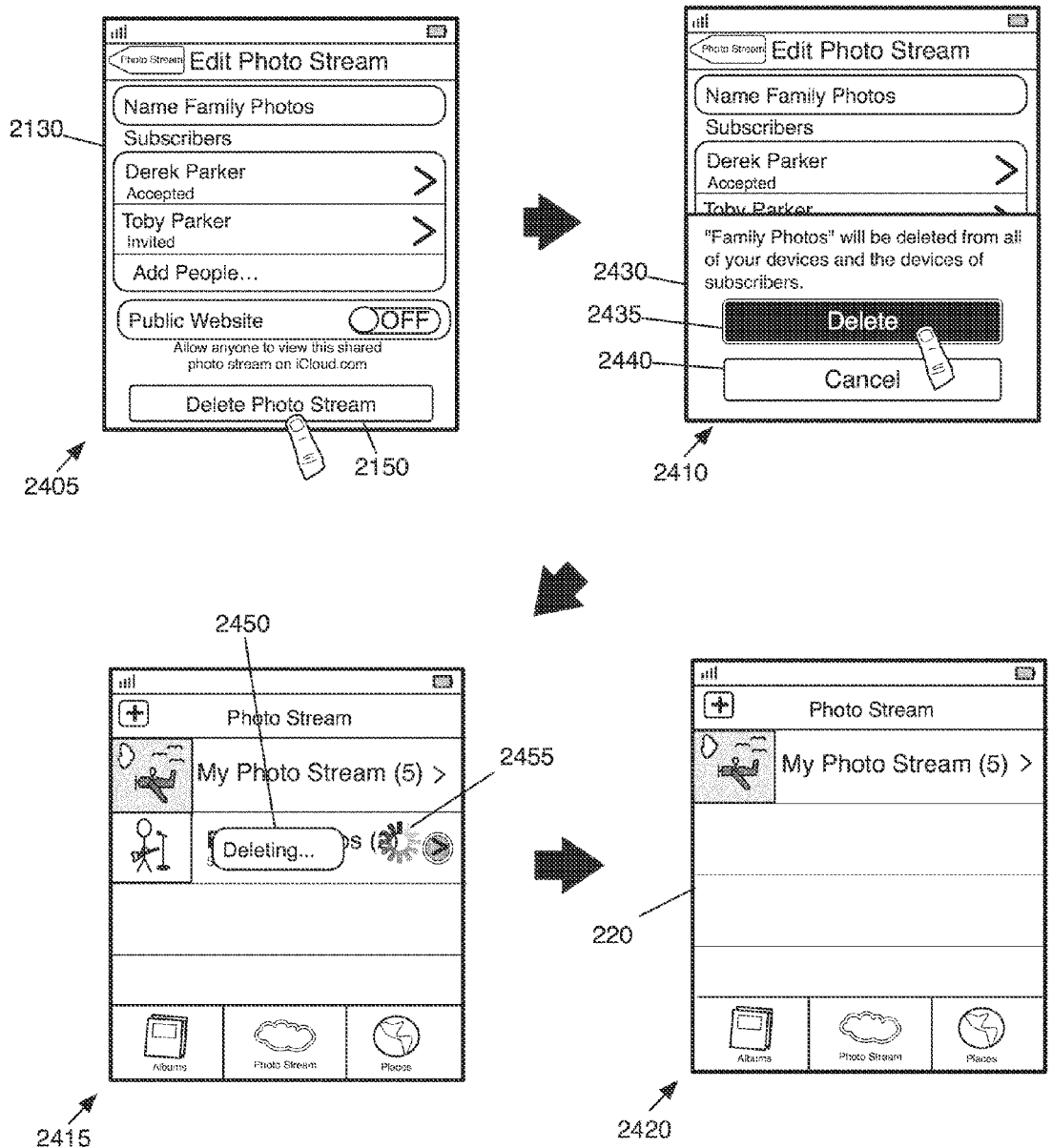
FIG. 24 provides an illustrative example of deleting a photo stream.

In some embodiments, the image application allows an owner to delete a photo stream. FIG. 24 provides an illustrative example of deleting a photo stream. Four operational stages 2405-2420 of the owner's device are illustrated in this figure.

In the first stage 2405, the application displays the photo stream edit menu 2130. The menu includes the delete button 2150 for deleting a photo stream. The owner has previously selected the photo stream from the photo stream menu (not shown). To delete the photo stream, the owner selects the delete button 2150.

As shown in the second stage 2410, the selection of the delete button 2150 results in the display of the pop-up window 2430. The pop-up window 2430 includes a confirmation button 2435 to delete the photo stream and a cancel button 2440 to cancel the delete operation. The pop-up window 2430 also includes a message stating that the photo stream will be deleted from all the owner's devices and the subscribers' devices. The photo stream is identified by its name in the message. Here, the owner selects (e.g., by performing a gesture such as tapping the owner's finger on) the confirmation button 2435 to confirm deletion of the photo stream.

The third stage 2415 illustrates the owner's device after the owner has selected the confirmation button 2435. The application displays a prompt 2450 stating that the photo stream is being deleted. The photo stream is also displayed with a spring wheel or spinner 2455 indicating that it is awaiting confirmation of the delete operation. In some embodiments, the confirmation is sent from the control server to the owner's device. The fourth stage 2420 illustrates the photo stream menu 220 after the photo stream has been deleted. As the "Family Photos" photo stream has been deleted, it is not listed in the photo stream menu 220.

E. Unsubscribing

In several of the examples described above, the owner is allowed to modify a photo stream by resending an invitation to a recipient, adding a subscriber, removing a subscriber, and deleting the photo stream. In contrast to the owner, the application of some embodiments prevents subscribers from performing one or more of these operations. However, the application of some embodiments allows the subscriber to unsubscribe from the photo stream.

Figure 25:
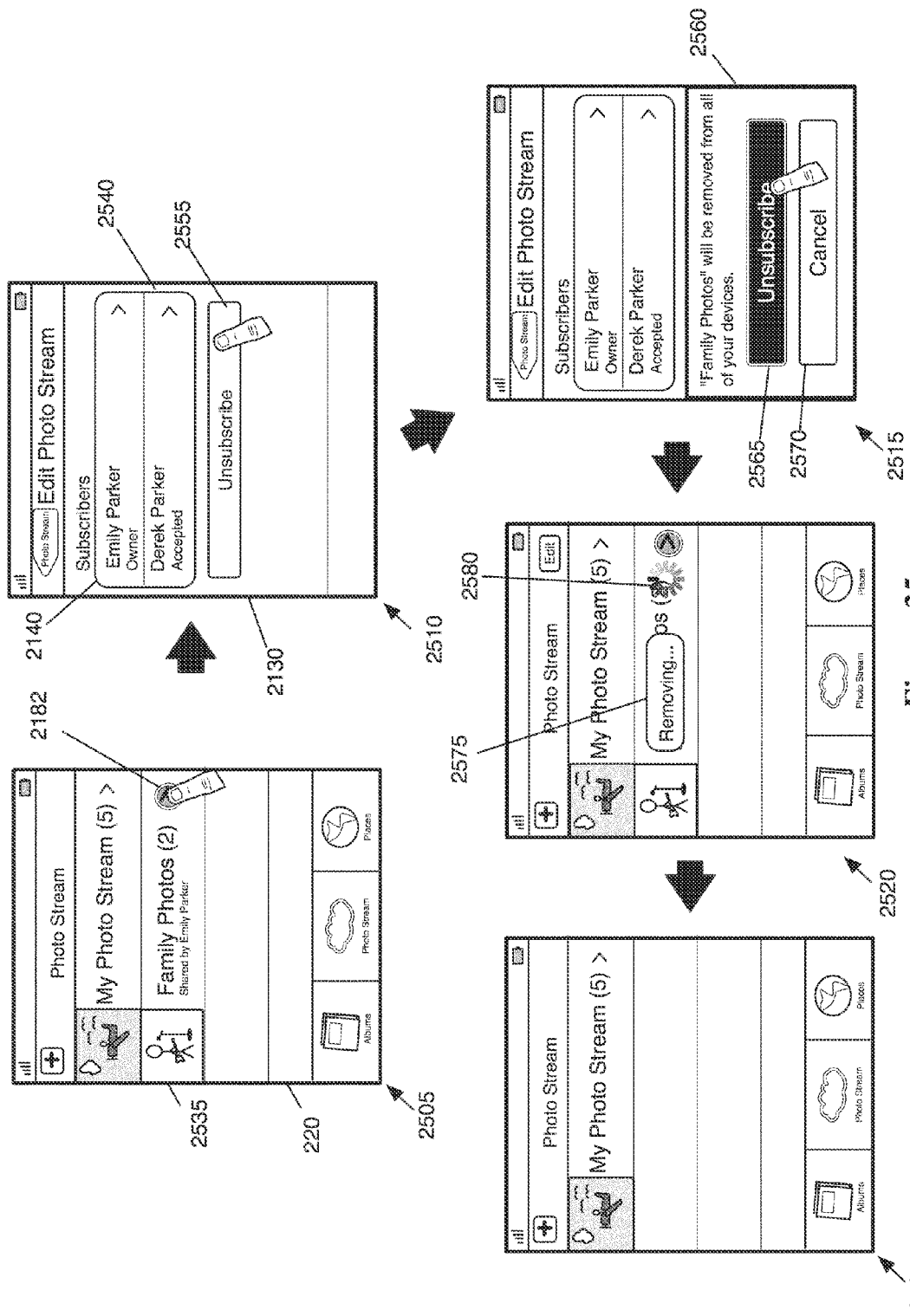
FIG. 25 provides an illustrative example of unsubscribing from a photo stream by a subscriber.

FIG. 25 provides an illustrative example of unsubscribing from a photo stream. Five operational stages 2505-2525 of the subscriber's device are illustrated in this figure. In the first stage 2505, the image application displays the photo stream menu 220. The photo stream menu 220 lists the "Family Photos" photo stream 2535. To display the edit menu 2130, the subscriber selects the selectable item 2182.

As shown in the second stage 2510, the selection results in the display of the edit menu 2530. Different from the edit menu described above, this menu includes only the subscriber section and a unsubscribe button 2555. That is, it does not include menu items to remove or add a subscriber, resend an invitation, rename a photo stream, etc. This is because the subscriber is not the owner of the photo stream. In this example, the subscriber can unsubscribe from the photo stream but has limited control over managing the photo stream. As mentioned above, the image sharing tools may allow an owner of the photo stream to specify access privileges. For example, the owner can specify whether the subscriber can add images to the photo stream, remove images, add subscribers to the photo stream, and/or remove subscribers from the photo stream.

In some embodiments, the name of the subscriber 2540 can be selected from the subscriber section 2140. The selection results in the display of the subscriber menu (not shown). The subscriber menu may include an email field that displays the email address of the subscriber. In some embodiments, the application allows the subscriber to modify or update the email using this field. One example of such a subscriber menu has been described above by reference to FIG. 21.

In the second stage 2515, the subscriber selects (e.g., by performing a gesture such as tapping the subscriber's finger on) the unsubscribe button 2555. As shown in the third stage 2515, the selection results in the display of a pop-up window 2560. The pop-up window 2560 includes a confirmation button 2565 to confirm unsubscribing from the photo stream and a cancel button 2570 to cancel the unsubscribe operation. The pop-up window 2560 also includes a message stating that the photo stream will be deleted from all of the subscribers' devices.

As shown in the third stage 2515, the owner selects (e.g., by performing a gesture such as tapping the owner's finger on) the confirmation button 2565 to confirm unsubscribing from the photo stream. When the input is received, the application of some embodiments generates a message having information (e.g., a user ID such as an email address) to unsubscribe the subscriber. The message is then sent to the control server. After receiving the message, the control server may remove the user ID from an access list associated with the photo stream. As mentioned above, the access list contains a list of authorized individuals that are able to access the photo stream.

The fourth stage 2520 illustrates the subscriber's device after the subscriber has selected the confirmation button 2560. The application displays a prompt 2575 indicating that the photo stream is being removed. The photo stream is also displayed with a spring wheel or spinner 2580 indicating that it is awaiting confirmation of the unsubscribe operation. The fifth stage 2525 illustrates the photo stream menu 220 after the unsubscribe operation. As the subscriber has been unsubscribed from the photo stream, the "Family Photos" photo stream is removed from the photo stream menu 220.

F. Parental Control

Figure 26:
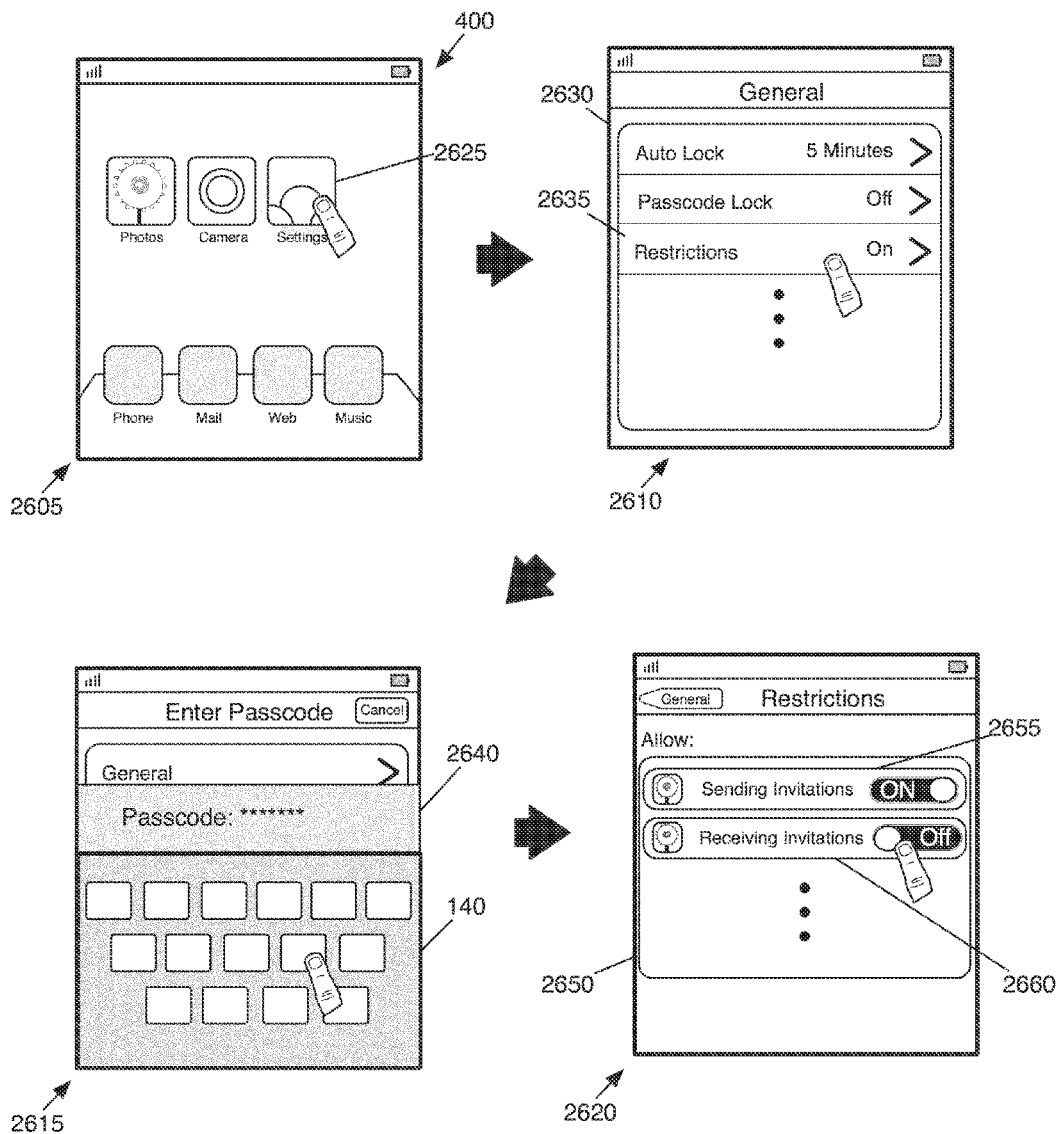
FIG. 26 provides an illustrative example of preventing the user of a device from receiving a photo stream invitation.

The image application of some embodiments provides tools to set restrictions or parental controls for one or more of its features. In some embodiments, the restrictions include preventing a user of a device from sending and receiving photo stream invitations. FIG. 26 provides an illustrative example of preventing the user from receiving photo stream invitations. Four operational stages 2605-2620 of the user's device are illustrated in this figure.

The first stage 2605 illustrates the device 400 displaying a desktop graphical user interface of its operating system. The operating system's desktop includes several selectable icons of different applications (e.g., image application, camera application). The desktop also displays an icon 2625 for the settings menu. To open the settings menu, the user selects the icon 2625 from the desktop.

The second stage 2610 illustrates the settings menu 2630 after the user has selected the icon 2625. As shown, the settings menu 2630 displays "General" in the heading, under which different general settings relating to the operating system and/or the device are displayed. The user might have navigated to this section from a main settings menu (not shown). The general section includes a selectable item 2635 for setting restrictions or parental controls. To set restrictions, the user selects the item 2635 from the general section of the settings menu 2630.

The third stage 2615 illustrates the user's device after the selection of the selectable item 2635. The selection causes a passcode field 2640 and the virtual or on-screen keyboard 140 to appear. The passcode field 2640 is for restricting unwanted users (e.g., children) from making changes to device or application settings. The user then uses the keyboard 140 to type the passcode into the passcode field 2640.

Once the correct passcode is entered, the settings menu 2630 displays the restriction section 2650 as illustrated in the fourth stage 2620. The restriction section 2650 includes a list of restriction controls for different applications. To simply the discussion, only two restriction controls related to the image application area shown in the fourth stage 2620. Specially, the restriction section 2650 includes a send invitation control 2655 (e.g., toggle switch) to turn on or off the send invitation feature. The restriction section 2650 also includes a receive invitation control 2660 to turn on or off the receive invitation feature. Each of these controls 2655 and 2660 is displayed with an icon that indicates that the control is associated with the image application. As shown in the fourth stage 2620, the user selects the receive invitation control 2660 to prevent any user of the device from receiving photo stream invitations.

In the previous example, the user places restrictions on receiving photo stream invitations. Alternatively or conjunctively, the image sharing tools allow the user to freeze or lock a cloud service account in its current state. By locking the account, the user cannot create a new photo stream (e.g., with the user's device associated with the account) or become a subscriber to another photo stream. In some embodiments, the master account lock is provided in the restriction section 2650. For example, instead of the controls 2655 and 2660, the restriction section 2650 may include a "Don't Allow Changes" option for locking the account its current state or an "Allow Changes" option for unlocking the account.

Figure 27:
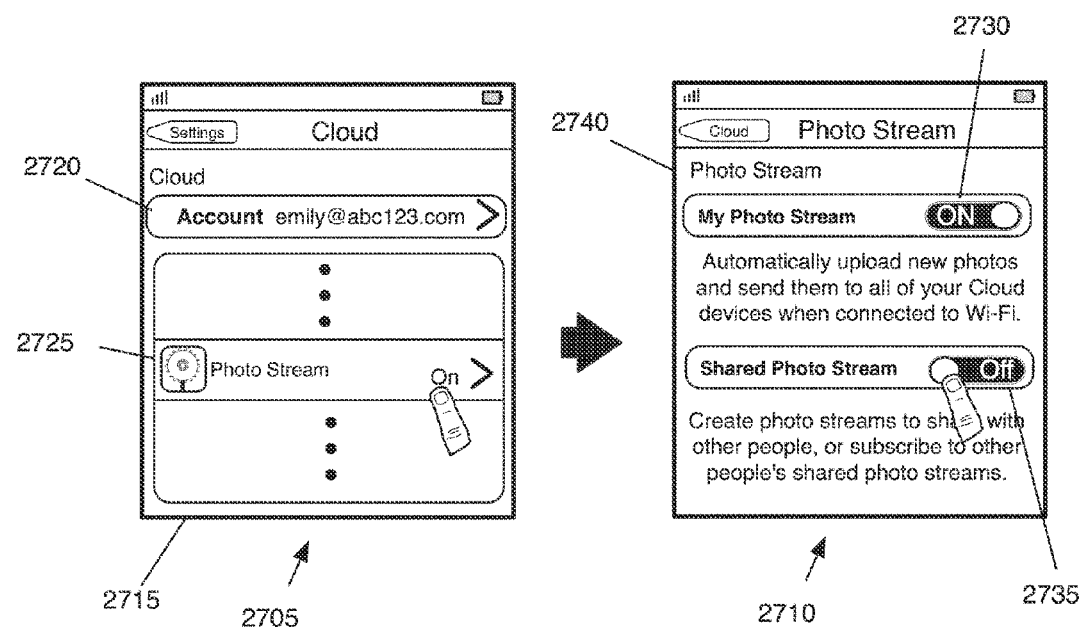
FIG. 27 provides an illustrative example of turning off the shared photo stream features.

In conjunction with the restriction controls or instead of it, the image application of some embodiments provides tools to specify whether a particular device can be used to create a shared photo stream and to subscribe to different shared photo stream. FIG. 27 provides an illustrative example of turning off such shared photo stream features. Two operational stages 2705 and 2710 of the user's device are illustrated in this figure.

In the first stage 2705, the device is displaying a settings menu 2715 for managing cloud services associated with an account. Examples of such cloud services include cloud storage service, synchronizing data across user devices, etc. The settings menu 2715 includes an account tab 2720 that can be selected to view account information (e.g., account payment information, available storage space). The settings menu 2715 also includes a photo stream menu item 2725 for displaying a photo stream settings menu 2740. The photo stream menu item 2725 is displayed with text that indicates that the personal photo stream and/or the shared photo stream is currently turned on.

The first stage 2715 illustrates the user selecting the photo stream menu item 2725. As shown in the second stage 2710, the selection causes the image application to display the photo stream menu 2740. This menu includes a first control 2730 (e.g., a toggle switch) for turning on or off the personal photo stream feature (e.g., device to device syncing). The first control 2730 is displayed with text that indicates that, when the control is turn on, the new images (e.g., captured or imported images) will automatically be uploaded and sent to one or more other devices associated with the cloud service account.

In addition, the menu 2740 includes a second control 2735 (e.g., a toggle switch) for turning on or off the shared photo stream feature. The second control is displayed with text that indicates that, when the control has been turned on, the device can be used to create new photo streams to share with other people, or subscribe to other people's photo stream. In the example illustrated in the second stage 2710, the user selects the second control 2735 to turn off the shared photo stream feature.

G. Managing Notifications

The image application of some embodiments provides different tools to manage notifications. These tools can be used to specify whether a banner is displayed, an alert is shown, and/or a sound is played (e.g., when a new comment has been received for a photo stream, when there is a new photo stream invitation, etc.). The application of some embodiments allows the user to granularly manage notification by implementing a whitelist feature. The whitelist feature allows the user to specify whether photo stream notifications are presented for everyone or presented for only those entities that are listed in the user's contact list.

Figure 28:
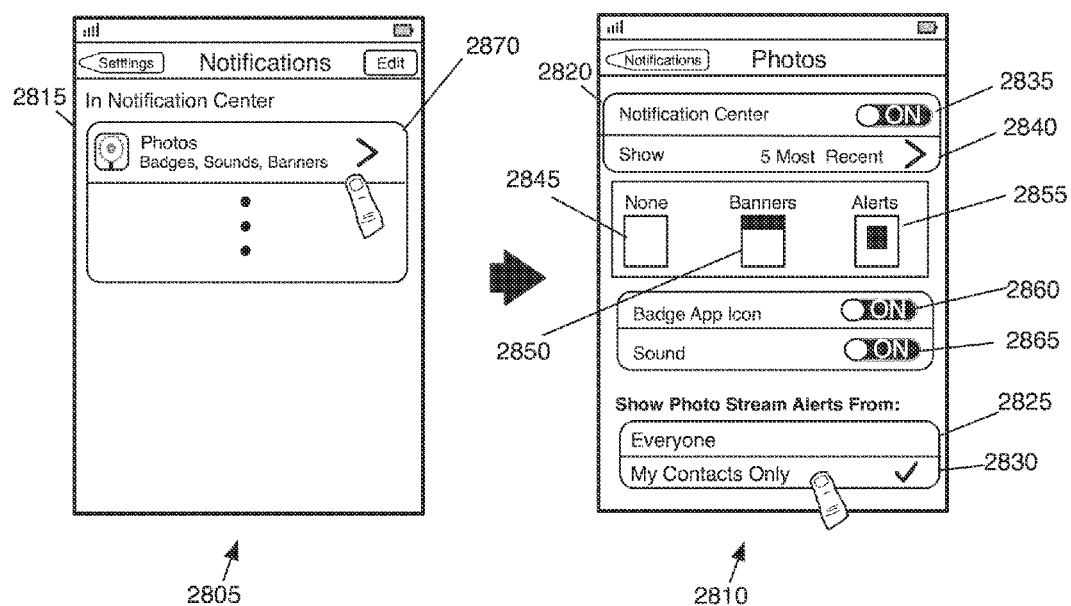
FIG. 28 provides an illustrative example of blocking photo stream alerts.

FIG. 28 provides an illustrative example of turning on the whitelist feature. Two operational stages 2805 and 2805 of the user's device are illustrated in this figure. In the first stage 2805, the device is displaying a notification section 2815. The user might have navigated to this section from the main settings menu. In this section, the user can select an application to manage different notifications (e.g., banner, sound, badge, etc.). As shown, the image application is listed in the list of applications 2870.

In the first stage 2805, the user selects the image application from the list 2870. The second stage 2810 illustrates the device after the selection of the image application from the notification section 2815. The selection results in the display of the image application's notification menu 2820. The menu includes multiple controls 2825-2865 for managing notifications. This menu 2820 includes a control 2835 to turn on or off a notification center and a control 2840 to specify the number of notifications to show in the notification center. In some embodiments, the notification center is a display area that lists different notifications.

As shown in the second stage 2810, the menu 2820 includes selectable items 2845-2855 for turning on or off banner notification and alerts. The menu 2820 also includes a control 2860 to turn on or off badging icons (e.g., with a number), and a control 2865 to turn on or off playing sound. Lastly, the menu 2820 includes selectable items 2825 and 2830 for switching between receiving alerts from everyone or from only those in the user's contacts. In the second stage 2810, the user selects the selectable item 2830 to display alerts for only those in the user's contact list.

IV. Commenting

In some embodiments, the image application provides tools to share comments regarding images in the photo stream. Several examples of sharing comments will now be described by reference to FIGS. 29-37.

A. Exchanging Comments

Figure 29:
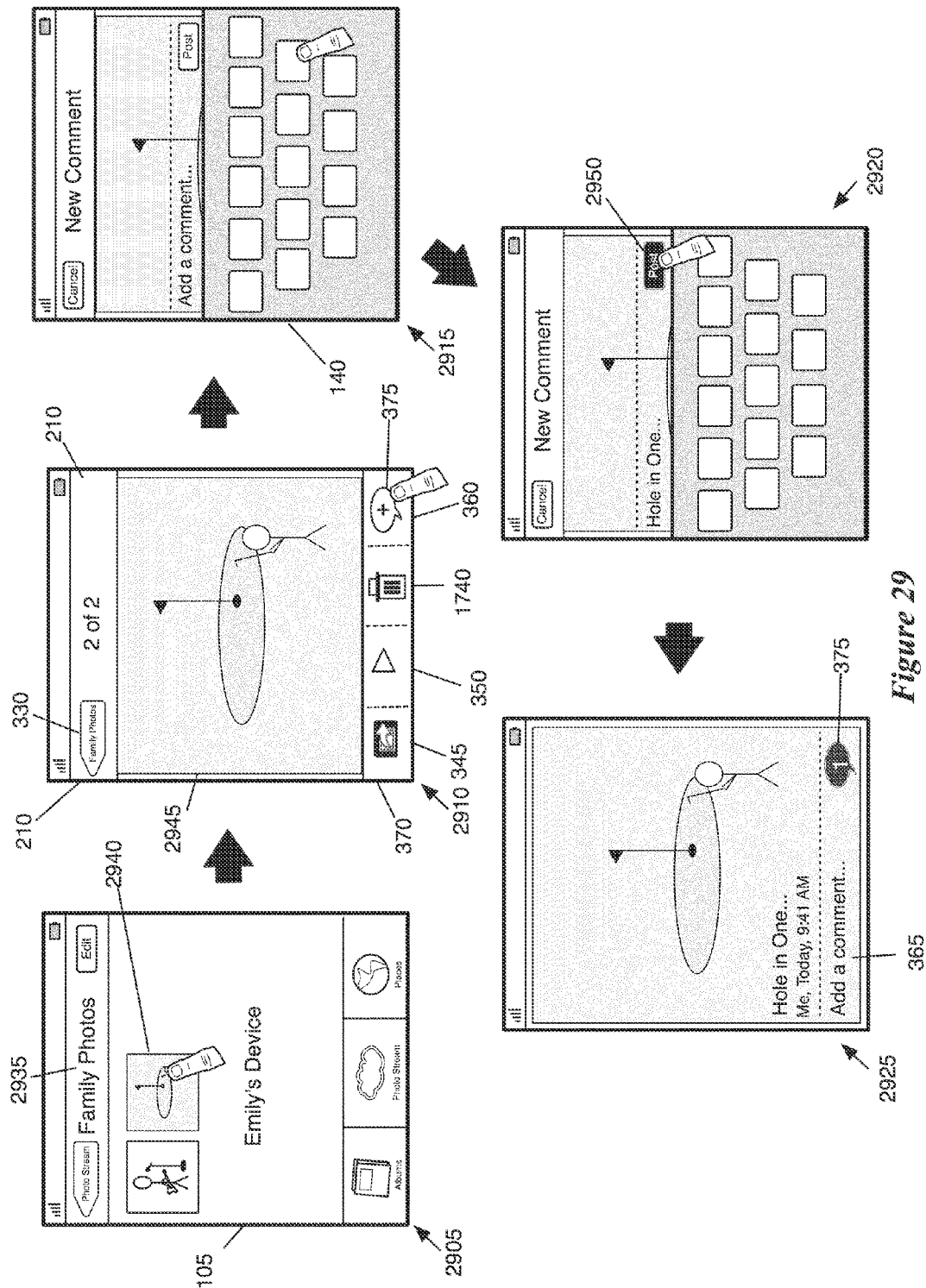
FIG. 29 provides an illustrative example of adding a comment regarding an image in a photo stream.

FIG. 29 provides an illustrative example of leaving a comment regarding an image in a shared photo stream. Six operational stages 2905-2930 of the owner's device are illustrated in this figure. The first stage 2905 illustrates the image display area 105, which includes thumbnail representations of images. As indicated by the heading 2935, the thumbnails represent images associated with the photo stream (e.g., "Family Photos"). The owner might have first selected the name of the photo stream from the photo stream menu (not shown) to display these thumbnail images. To leave a comment for an image, the owner selects the corresponding thumbnail image 2940 from the image display area 105.

As shown in the second stage 2910, the selection causes the image display area 105 to display a full screen representation 2945 of the corresponding image. The selection also causes the top and bottom bars 210 and 370 to be modified. The top bar 210 includes a back button 330 to return to the thumbnail view. The top bar 210 also includes a heading that states that the displayed image 2945 is the second of two images in the photo stream. The top bar 210 may also include an edit button that when selected provides different editing tools to edit the displayed image. In some embodiments, the editing entails enhancing the image, removing red eye from the image, and/or cropping the image.

Different from the top bar 210, the bottom bar 370 includes (1) a share button 345 for sharing the selected image, (2) a play button 350 for playing a slide show of the images in the photo stream, (3) a delete button 1740 for deleting the image from the photo stream, and (4) a comment button 360 for leaving comments regarding the displayed image. The bottom bar may also include a stream button (not shown) for streaming the images in the photo stream to one or more other devices (e.g., a desktop computer, a laptop). In the example illustrated in the second stage 2910, each item in the bottom bar 370 is displayed with a corresponding icon. For example, the comment button 360 is displayed with a chat bubble icon 375. The chat bubble icon 375 includes a plus sign (i.e., "+") that provides a visual indication that a comment can be added for the displayed image 325.

As shown in the second stage 2910, the owner selects the comment button 360. The selection causes a virtual or onscreen overlay keyboard 140 to appear, as illustrated in the third stage 2915. The owner then types in a comment regarding the image 2945 in a comment field 155. The post button 2950 may also change its appearance when the owner types in a character in the comment field. Here, the owner types in a comment into the comment field and selects the post button 2950. In some embodiments, the application provides a selectable item for deleting a comment. For example, the application may display a delete button next to a comment. The delete operation can only be performed by the person that left the comment, in some embodiments.

The fifth stage 2925 illustrates the image display area 105 after posting the comment. As shown, the comment is displayed over the image 2945. The comment is also associated with metadata. The metadata is displayed below the comment, and identifies the person that left the comment and the time the comment was left. As shown in the fifth stage 2925, the person who left the comment is identified as "Me". This is because the owner left the comment with his or her device. The comment is also displayed with an add comment field 365 that can be selected to add additional comments.

In the example illustrated in the fifth stage 2925, the top and bottom bars 210 and 370 disappear upon selection of the post button 2950. However, the chat bubble icon 375 remains in the same position. As shown, the "+" sign has been replaced with the number "1", and the color of the chat bubble icon has been changed from a first color (e.g., white) to a second different color (e.g., blue). The number identifies the number of comments associated with the image. The color of the icon indicates that the image application is in a comment displaying mode. Here, the owner can select the chat bubble icon to (1) hide the comment, (2) hide the add comment field 365, and (1) return the chat bubble icon to its first color (e.g., white). In some embodiments, the number remains visible on the chat bubble icon (e.g., by changing color).

Figure 30:
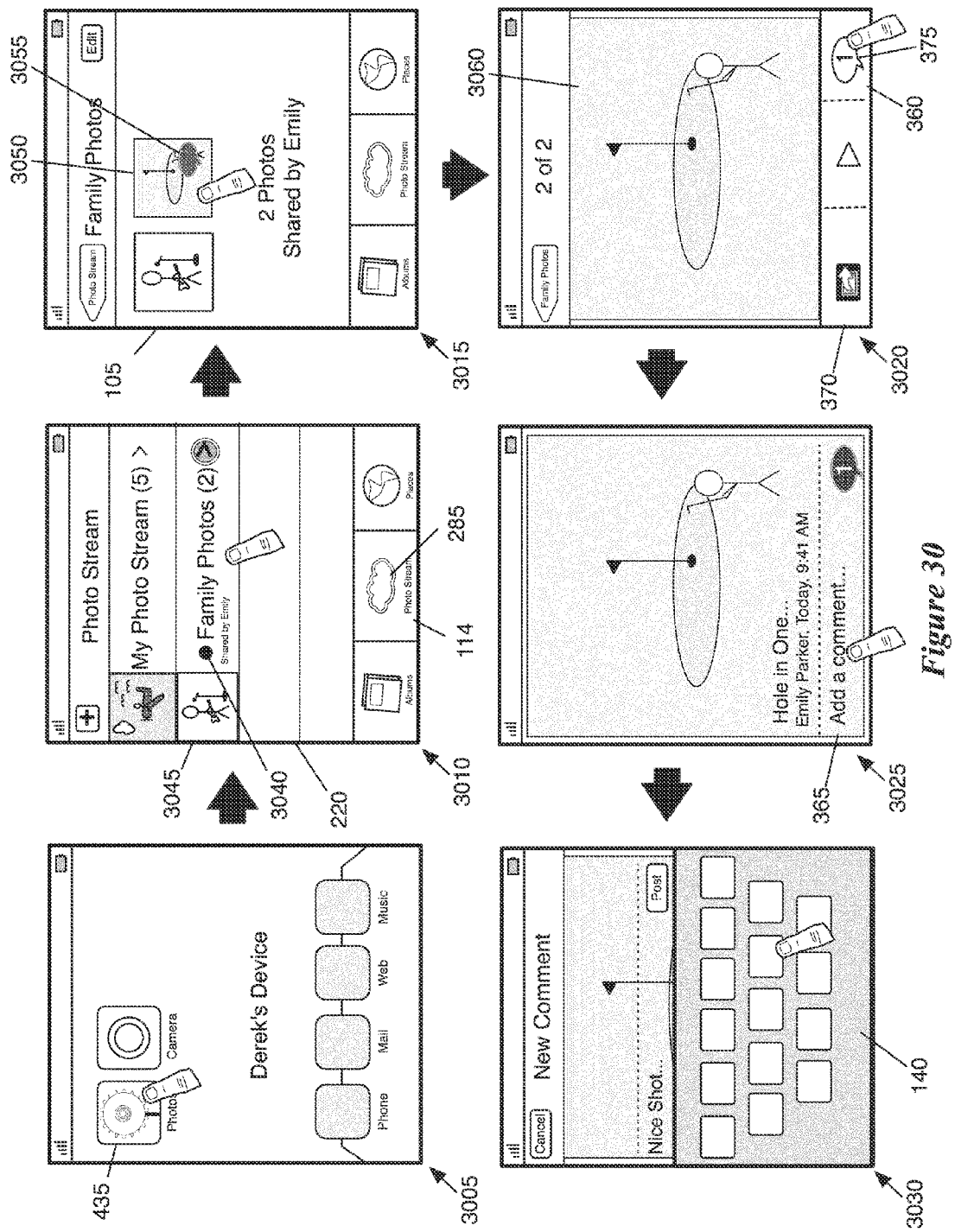
FIG. 30 provides an illustrative example of how the comment appears on a subscriber's device.

Upon posting, the comment is pushed to all devices of participants associated with the photo stream. FIG. 30 provides an illustrative example of how the comment appears on a subscriber's device. Six operational stages 3005-3030 of the subscriber's device are illustrated in this figure. In the first stage 3005, the subscriber's device displays the desktop of its operating system. The desktop includes the icon 435 for opening the image application. In this example, the icon 435 does not display any marking indicating that there are one or more updates to the photo stream. For instance, the icon 435 is not overlaid by a badge with a number indicating that a photo stream has been updated. As will be described in detail by reference to FIG. 31, the application of some embodiments displays a marking on the icon 435 when the subscriber has participated in the conversation (i.e., previously left a comment regarding the same image).

As shown in the first stage 3005, the subscriber selects the icon 435 to open the image application. The second stage 3010 illustrates the application's photo stream menu 220. The subscriber might have previously selected the photo stream tab 114 to display this menu. Different from the desktop icon 435, the name of the photo stream is listed with a marking 3040. The marking 3040 provides a visual indication to the subscriber that there is one or more updates to the photo stream. In the example illustrated in the second stage 3010, the marking 3040 is a blue dot. However, different types of markings can be used to convey the same meaning. For instance, the icon 285 of the "Photo Stream" tab 114 can be badged with a number 280 that indicates that there is an update to a photo stream.

In the second stage 3010, the subscriber selects the photo stream 3045 from the menu 220. The selection causes the application to display the image display area 105, as illustrated in the third stage 3015. The image display area 105 includes thumbnail representations and of images in the photo stream 3045. The application of some embodiments provides a visual indication that an image is associated with one or more comments. This is shown in the third stage 3015 because the second thumbnail image 3050 is displayed on the image display area 105 with a marking 3055. In the example illustrated in the third stage 3015, the marking 3055 is a chat bubble that is displayed at least partially over the image 3050. The chat bubble is also colored (e.g., blue). The color provides a visual indication to the subscriber that there is an unread comment associated with the corresponding image.

As shown in the third stage 3015, the subscriber selects the thumbnail image 3050. The selection causes the image display area 105 to display a full screen representation 3060 of the corresponding image. The selection also causes the comment button 360 to appear along the bottom bar 370. The comment button 360 contains a chat bubble icon 375. The chat bubble icon 375 is colored white and includes a number "1". The number represents the number of comments associated with the image. To display the comment, the subscriber selects the comment button 360.

The fifth stage 3025 illustrates the image display area 105 after the selection of the comment button 360. As shown, the comment is displayed over the image 3060. The comment is also associated with metadata. The metadata is displayed below the comment, and identifies the person who left the comment and the time when the comment was left. In the example illustrated in the fifth stage 3025, the person who left the comment is identified as "Emily Parker".

In the fifth stage 3025, the subscriber selects the comment field 365 to add another comment. The sixth stage 3030 illustrates the subscriber leaving another comment. Specifically, the comment is inputted into the comment field using the on-screen keyboard 140.

In the example described above, the subscriber is notified of the update to the photo stream after opening the image application and navigating to the photo stream menu 220. The application of some embodiments provides one or more different types of notifications to alert a participant that a new comment has been posted. In some embodiments, the owner is always notified of any new comments that have been posted. A subscriber may be notified when the subscriber has participated in the conversation. That is, the subscriber has left a comment regarding an image and another comment was left regarding that same image by another participant. In some embodiment, if a participant (e.g., subscriber, owner) shared an image, that participant is always notified of any new comments that have been posted regarding the same image.

Figure 31:
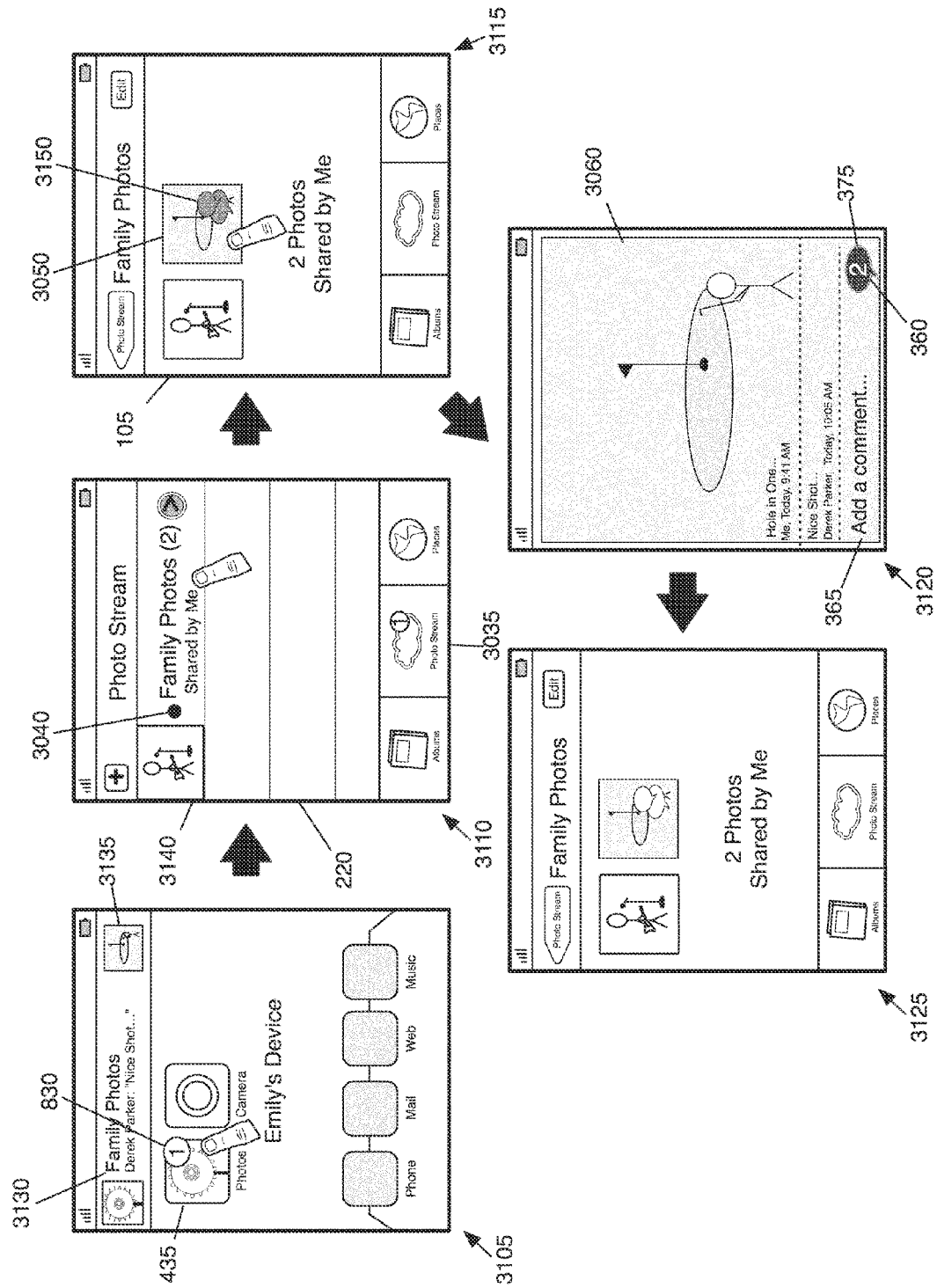
FIG. 31 provides an illustrative example of how the comment appears on the user's device.

FIG. 31 provides an illustrative example of how the image application notifies an owner of a new comment and presents the new comment on the owner's device. Five operational stages 3105-3125 of the owner's device are illustrated in this figure. In the first stage 3105, the owner's device displays the desktop of its operating system. The desktop includes the icon 435 for opening the image application. As the device is associated with the owner, the image application displays a banner 3130 indicating that a new comment has been left for an image. Specifically, the banner 3130 is superimposed along the top edge of the operating system's desktop. In some embodiments, the banner 3130 rotates into view by simulating a 3D effect. The banner 3130 may float on top of the main display area for a predetermined period of time and then disappear (e.g., rotate out of view, fade away).

As shown in the first stage 3105, the banner 3130 includes the comment and the name of the subscriber that left the comment. The banner 3130 also includes a thumbnail representation 3135 of the image associated with the comment. In some embodiments, the banner 3130 is a selectable item that when selected opens the image application. The image application may also open to display a full screen representation of the image with the comment.

In conjunction with the banner or instead of it, the image application may provide a different type of marking. One such type of marking is a badge that is displayed at least partially over the icon of the image application. This is shown in the first stage 3105 as the icon 435 is displayed with a badge 830 that is marked with a number "1". In this example, the number represents the number of photo streams that have one or more updates, and does not represent the number of new comments. However, the application of some embodiments may display such a marking to identify the number of new comments that have been received for a photo stream.

In the first stage 3105, the owner selects the icon 435 to open the image application. The second stage 3110 illustrates the application's photo stream menu 220 after the application is opened. The owner might have previously selected the photo stream tab 3035 to display this menu 220. The name of the photo stream 3140 is listed with a marking 3040. The marking 3040 provides a visual indication to the subscriber that there is one or more updates to the photo stream 3140.

In the second stage 3110, the owner selects the photo stream 3140 from the menu 220. The selection causes the application to display the image display area 105, as illustrated in the third stage 3115. The image display area 105 includes thumbnail representations of images in the photo stream. As mentioned above, the application of some embodiments provides a visual indication that an image is associated with one or more comments. This is shown in the third stage 3115 because the second thumbnail image 3050 is displayed on the image display area with a marking 3150.

In the example illustrated in the third stage 3115, the marking 3150 is a double chat bubble or speech bubble icon. Different from a single chat bubble, the double chat bubble indicates that the owner has participated in the conversation. That is, the owner has previously left a comment regarding the image and a new comment has been received. The double chat bubble is displayed at least partially over the thumbnail image 3050. The double chat bubble is also colored (e.g., blue). The color provides a visual indication to the owner that there is an unread comment associated with the corresponding image. In some embodiments, the application does not differentiate whether a person participated in a conversation. For example, the application may display a same marking (e.g., the single chat bubble and not the double chat bubble) regardless of whether the person participated in the conversation.

As shown in the third stage 3115, the owner selects the thumbnail image 3050. The selection causes the image display area 105 to display a full screen representation 3060 of the corresponding image as illustrated in the fourth stage 3120. As shown, the new comment is displayed over the image 3060. The new comment is also associated with metadata that identifies the person who left the comment and the time when the comment was left. The comments are sequentially displayed in the image display area 105. Specifically, the new comment is shown below the previous comment. The add comment field 365 is displayed below the previous comment.

The fifth stage 3125 illustrates the image display area 105 after navigating out of the full screen view (e.g., by selecting a back button). The thumbnail view is identical to the one shown in the third stage 3115. However, the double chat bubbles 3150 have been modified to indicate that there are no unread comments. Specifically, the color of the double chat bubble 3150 has been modified from one color (e.g., blue) to another color (e.g., white). One of ordinary skill in the art would understand that modifying the color is just one of many different ways in which the application can provide such visual indication. For instance, the double chat bubble 3150 can be removed from the thumbnail image 3050 to provide the same indication (e.g., no unread comments).

In the example described above, the different marking are displayed over images with comments. In some embodiments, the application follows a set of rules to display the different markings. For example, a first marking (e.g., a comment or chat bubble) that is colored a first color (e.g., blue) indicates that the image is associated with an unread comment and the participant has not left a comment for the same image. A first marking (e.g., a comment bubble) that is colored a second different color (e.g., white) indicates that all comments have been read and the participant did not leave any comments for the same image.

A second different marking (e.g., a double comment or chat bubble) that is colored the first color (e.g., blue) indicates the image associated with an unread comment and the participant has previously left a comment for that image. The second different marking (a double comment bubble) that is colored the second different color (e.g., white) indicates that all comments have been read and the participant previously left a comment for that same image.

B. Marking Images

Figure 32:
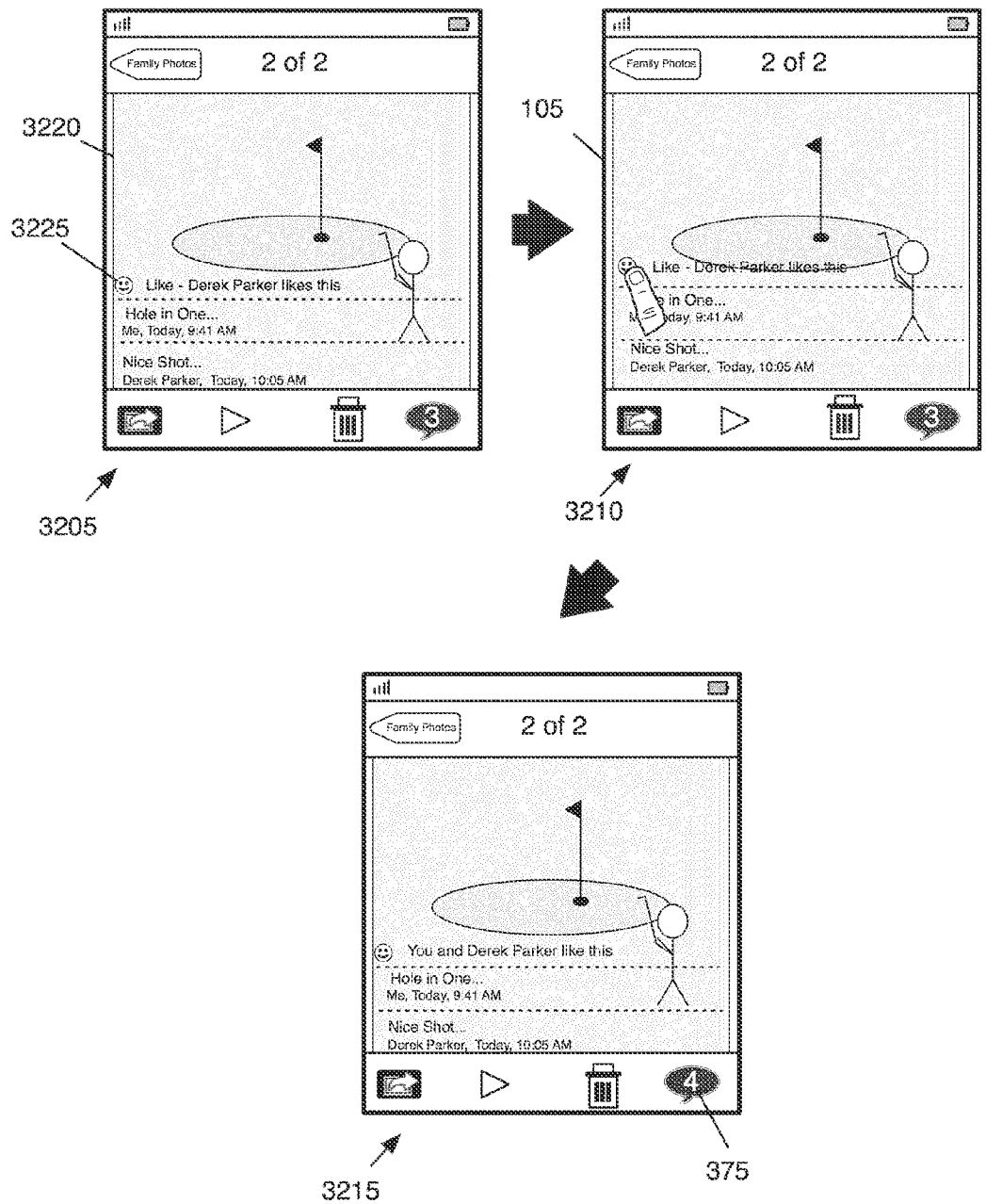
FIG. 32 provides an illustrative example of marking an image.

In the examples described above, the owner and the subscriber exchange comments regarding an image. The image application of some embodiments allows a participant to mark an image. In some such embodiments, the marking provides a visual indication that the participant approves or likes the image. FIG. 32 provides an illustrative example of marking an image. Three operational stages 3205-3215 of the user's device are illustrated in this figure.

The first stage 3205 illustrates the image application displaying a full screen representation of an image 3220. The image 3220 is associated with several comments and a mark 3225. The mark 3225 includes an image or symbol. Here, the mark 3225 is a smiley face or happy face that provides an indication that one or more individuals listed adjacent to it approves or likes the displayed image 3220. However, any number of different symbols (e.g., heart symbol) and/or images (e.g., flags, icons) can be used to provide the same indication. In the example illustrated in the first stage 3205, the name of a subscriber is displayed next to the smiley face symbol 3225.

The second stage 3210 illustrates the owner selecting the marking 3225 to indicate that he or she likes the marking. Specifically, the user selects the marking 3225 from the image display area 105. The third stage 3215 illustrates the image display area 105 after the selection of the symbol 3225. As shown, the selection results in the owner being added to the list of individuals adjacent to the symbol 3225. Specifically, the owner's identification has been added next to the subscriber's name. In this example, the owner is identified as "Me".

In some embodiments, the application counts the association of the approval mark as one comment. That is, the number of likes is counted towards the number of comments. This is shown in the second and third stage 3210 and 3210 because the number of comments in the comment bubble 3235 is incremented by one (i.e., changes from three comments to four comments). The application of some embodiments allows a participant to remove the approval mark. For instance, the owner can reselect the marking 3225 to unlike the displayed image.

C. Displaying Comments

Figure 33:
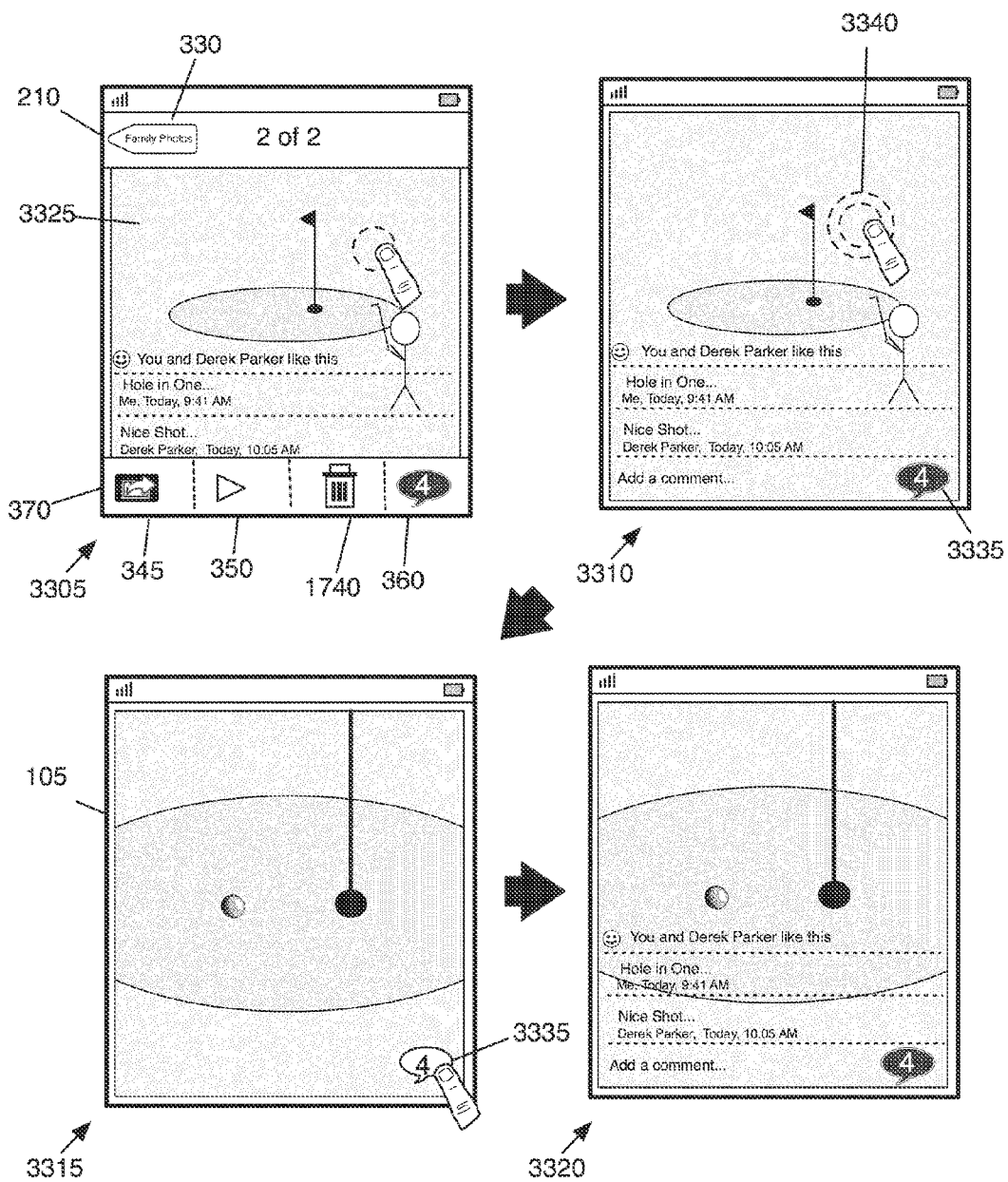
FIG. 33 provides an illustrative example of how the image application of some embodiments displays an image with comments.

The previous two examples illustrated adding comments or markings to images. Several examples of displaying and scrolling comments will be described by reference to FIGS. 33-35. FIG. 33 provides an illustrative example of how the image application of some embodiments displays an image with comments. Four operational stages 3305-3320 of the owner's device are illustrated in this figure.

The first stage 3305 illustrates the image application displaying a full screen representation of an image 3325 with comments. The full screen representation is overlaid by the top bar 210 and the bottom bar 370. The top bar 210 includes the back button 330 and a heading. The heading indicates that the displayed image is the second of two images. Different from the top bar 210, the bottom bar 370 includes (1) a share button 345 for sharing the displayed image, (2) a play button 350 for playing a slide show of the images in the photo stream, (3) a delete button 1740 for deleting the displayed image, and (4) a comment button 360 for leaving a comment regarding the displayed image. The bottom bar may also include a stream button (not shown) for streaming the images in the photo stream to one or more other devices (e.g., a desktop computer, a laptop).

In the first stage 3305, the owner selects the full screen representation of the second image in the photo stream. As illustrated in the second stage 3310, the selection causes the top and bottom bars to disappear (e.g., fade away). However, the comments remain overlaid on the full screen representation. In addition, the icon 3335 of the comments button 360 (e.g., the comment bubble) is displayed in the same location over the full screen representation. As shown in the second stage 3310, the owner then selects a location 3340 on the full screen representation 3325 to zoom in on the image.

The third stage 3315 illustrates the image display area 105 after the selection of the location 3340 on the full screen representation. The selection results in the application zooming in on the displayed image towards the selected location. As shown, the icon 3335 of the comment button 360 (e.g., the comment bubble) remains in the same location with respect to the device's screen. However, the comments are not displayed in this zoomed view. To display the comments, the owner selects the icon 3335.

The fourth stage 3320 illustrates the image display area 105 after the selection of the icon 3335. The selection results in the application displaying the comments in the zoomed view. Alternative, the selection may result in the application displaying the full screen representation with the comment. For instance, the selection may cause the application to zoom out of the displayed image. The selection may also cause the comments to reappear over the full screen representation 3325. Accordingly, upon selection of the icon 3335, the application of some embodiments displays the full screen view that is illustrated in the second stage 3310.

Figure 34:
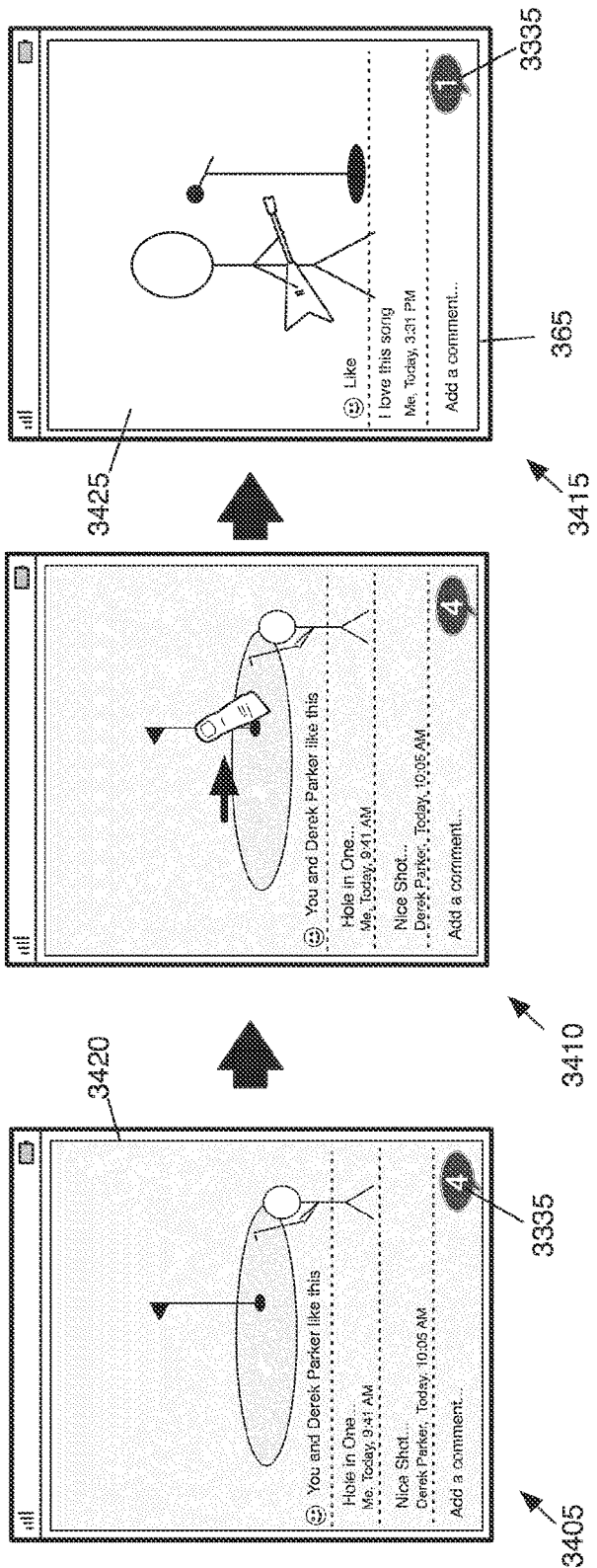
FIG. 34 provides an illustrative example of scrolling through different images with comments.

The previous example illustrated zooming in on an image with comments. In some embodiments, the comment toggle is persistent across other images. For example, when the comment mode has been activated, the application allows its user to scroll through images with comments. FIG. 34 provides an illustrative example of scrolling through different images with comments. Three operational stages 3405-3415 of the owner's device are illustrated in this figure.

The first stage 3405 illustrates the image application displaying the full screen representation 3420 of the image associated with several comments. The comments and the comment icon 3335 appear over the full screen representation 3420. The comment icon 3335 has been activated (e.g., changed from a first color to a second different color) to indicate that comments are being displayed. The top and bottom bars are not shown in this full screen view.

In the second stage 3410, the user selects (e.g., swipes across) the screen to display the next image. This causes the application to display the next image 3425. As shown in the third stage 3415, the next image 3425 is also displayed with its associated comment. When the next image is not associated with any comments, the application of some embodiments only displays the add comment field 365 and the icon 3335 (e.g., with the plus sign instead of a number).

Figure 35:
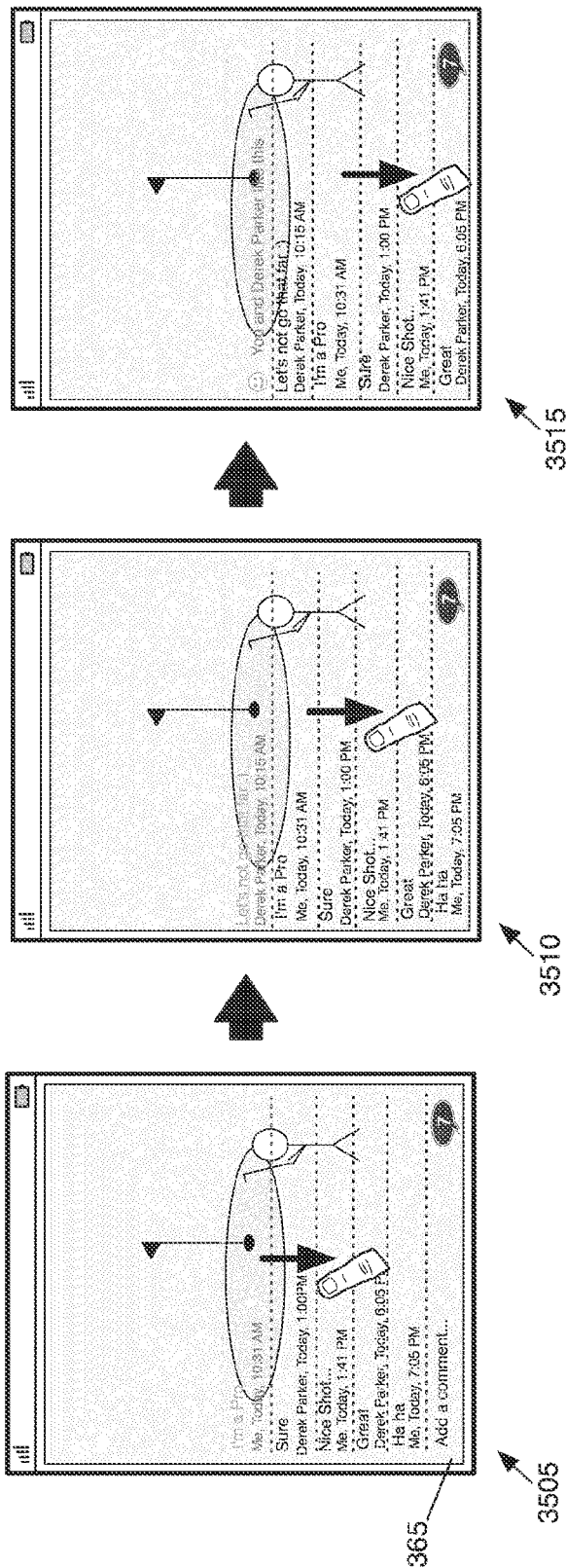
FIG. 35 provides an illustrative example of scrolling through the comments associated with one image.

The previous example illustrated scrolling through different images with comments. FIG. 35 provides an illustrative example of scrolling through the comments associated with one image. Three operational stages 3505-3515 of the owner's device are illustrated in this figure. The first stage 3505 illustrates the image application displaying the full screen representation of the image with the comment. Specifically, there are six comments associated with the displayed image and five of those are shown in the image display area. The comments are also in a sorted order, starting with the oldest comment at or near the top and the newest one at the bottom. In some embodiments, the application displays the comments in opposite order, starting with the newest comment at the top and the oldest one at the bottom. The application of some embodiments presents the comment with shading. For example, the application may display the top of the comment list being white down to the bottom becoming grayer and grayer.

As shown in the first stage 3505, there is limited amount of space to display different comments. Here, the image display area displays four comments and the add a comment field 365. In the second stage 3510, the user then scroll through the comments associated with the image by using a touch gesture (e.g., moving or dragging the user's finger up or down the device's screen). The gesture causes the application to display one older comment while removing the add comment field 365. In the third stage 3510, the user inputs the same gesture to display another comment. As shown, the input causes another comment comes into view while a newer comment scrolls out of the view. The input also causes a marking tool (e.g., the smiley face, the like icon) also comes into view.

D. Example Processes

Figure 36:
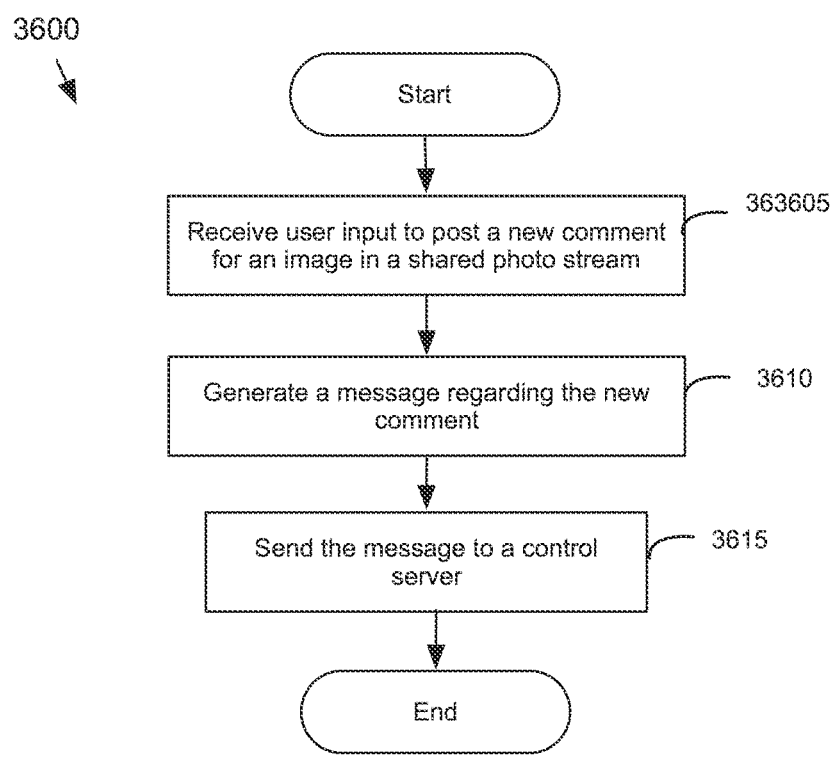
FIG. 36 conceptually illustrates a process that some embodiments use to post a comment.

Several example processes for exchanging comments will now be described by reference to FIGS. 36 and 37. FIG. 36 conceptually illustrates a process 3600 that some embodiments use to post a new comment. The process 3600, in some embodiments, is performed by the image application. The process 3600 begins when it receives (at 3605) a user input to post a new comment for an image in a shared photo stream. As mentioned above, the user might have first inputted a comment into a comment field and then selected a post button.

After receiving the input, the process 3600 generates (at 3610) a message regarding the new comment. The message may include the new comment. The message may also include one or more identifying information, such as (1) a user identification ("ID") that identifies a participant that left the new comment, (2) a photo stream ID that identifies the photos stream, (3) an image ID that identifies the image with the new comment, (4) comment ID that identifies the new comment, and (5) a timestamp that identifies the time and date the new comment was left.

The process 3600 then sends (at 3615) the message to a control server. In some embodiments, the control server receives the message and stores the comment. Based on the message, the control server may also identify entities (e.g., owner, subscribers) associated with the photo stream. The control server may then send a message regarding an update to a photo stream to each device associated with the identified entities.

Figure 37:
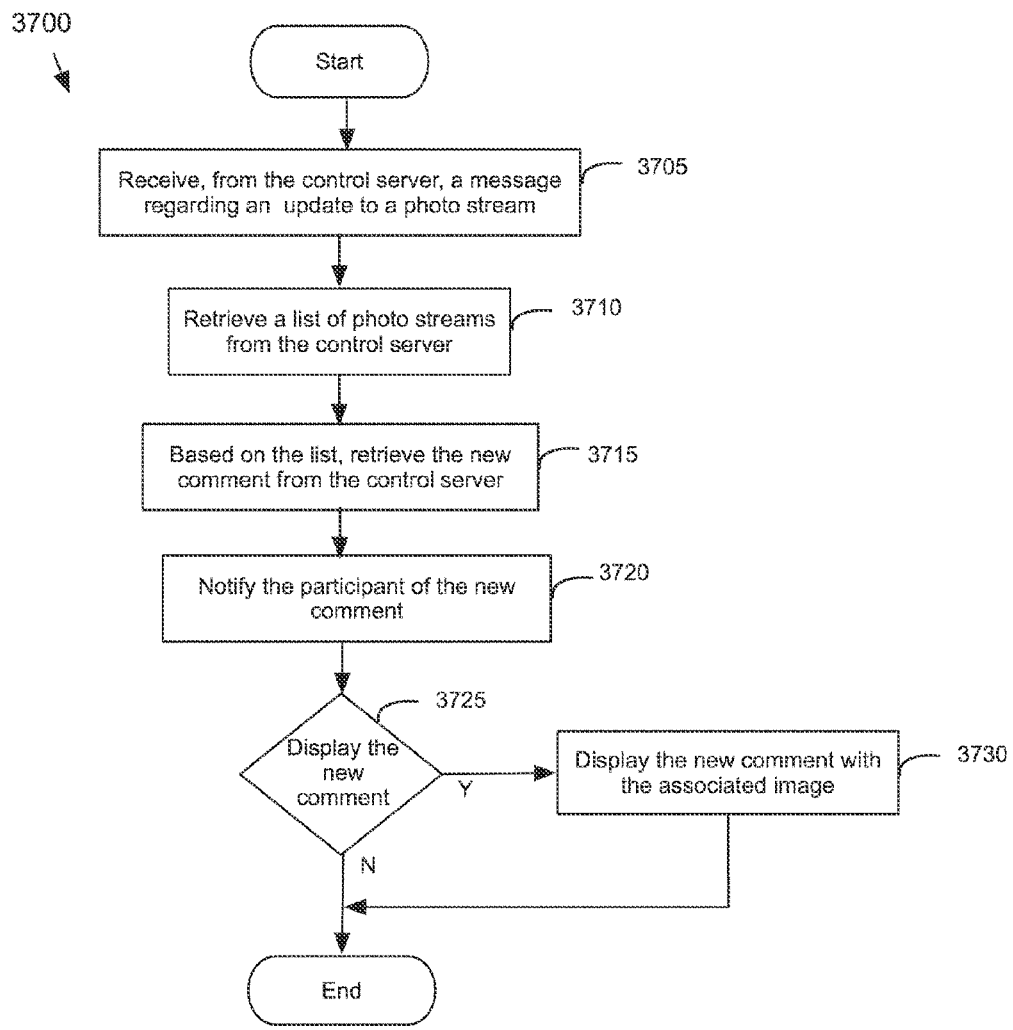
FIG. 37 conceptually illustrates a process that some embodiments use to provide one or more notifications regarding a new comment.

FIG. 37 conceptually illustrates a process 3700 that some embodiments use to display the new comment. The process, in some embodiments, is performed by the image application. The process begins when it receives (at 3705), from a control server, a message regarding an update to the shared photo stream. After receiving the notification, the process 3700 retrieves (at 3710) a list of photo streams from the control server. Based on the list, the process 3700 retrieves (at 3715) the new comment from the control server.

At 3720, the process 3700 notifies a participant (e.g., the device's user) of the new comment. As mentioned above, the application of some embodiments always notifies the owner when a new comment has been posted regarding an image in the shared photo stream. A subscriber may be notified when the subscriber has participated in the conversation. That is, the subscriber has left a comment regarding an image and another comment was left regarding that same image by another participant. In some embodiment, if a participant (e.g., subscriber, owner) shared an image, that participant is always notified of any new comments that have been posted regarding the same image.

In notifying the participant, the process 3700 may display one or more marking and/or cause the participant's device to play a sound or vibrate. For instance, a visual indication of the association of the comment may be shown with a banner and a badge over an icon. The visual indication may be presented at a thumbnail view (e.g., with a chat bubble near or at least partially over the thumbnail representation) and/or at a full-screen view (e.g., with a similar chat bubble near or at least partially over the thumbnail representation).

As shown in FIG. 37, the process 3700 determines (at 3725) whether there is an input to display the new comment. Many different examples of such an input are described above. For instance, the participant might select (e.g., tap the participant's finger on) a banner notification. Alternatively, the participant might select a comment tool (e.g., the chat bubble icon) to display the new comment. If there is an input to display the new comment, the process 3700 displays (at 3730) the new comment with the associated image. Otherwise, the process 3700 ends.

Some embodiments perform variations on the processes 3600 and 3700. The specific operations of each of these processes may not be performed in one continuous series of operations, and different specific operations may be performed in different embodiments. Furthermore, the processes 3600 and 3700 could be implemented using several sub-processes, or as part of a larger macro process.

V. Public Website

The image application of some embodiments allows a participant to publish the photo stream to a website. In some embodiments, the website is a public website that can be accessed by any browser with the correct uniform resource locator (URL) address. Several example of publishing a photo stream to a website will now be described by reference to FIGS. 38-48.

A. Publishing a Photo Stream to a Website

Figure 38:
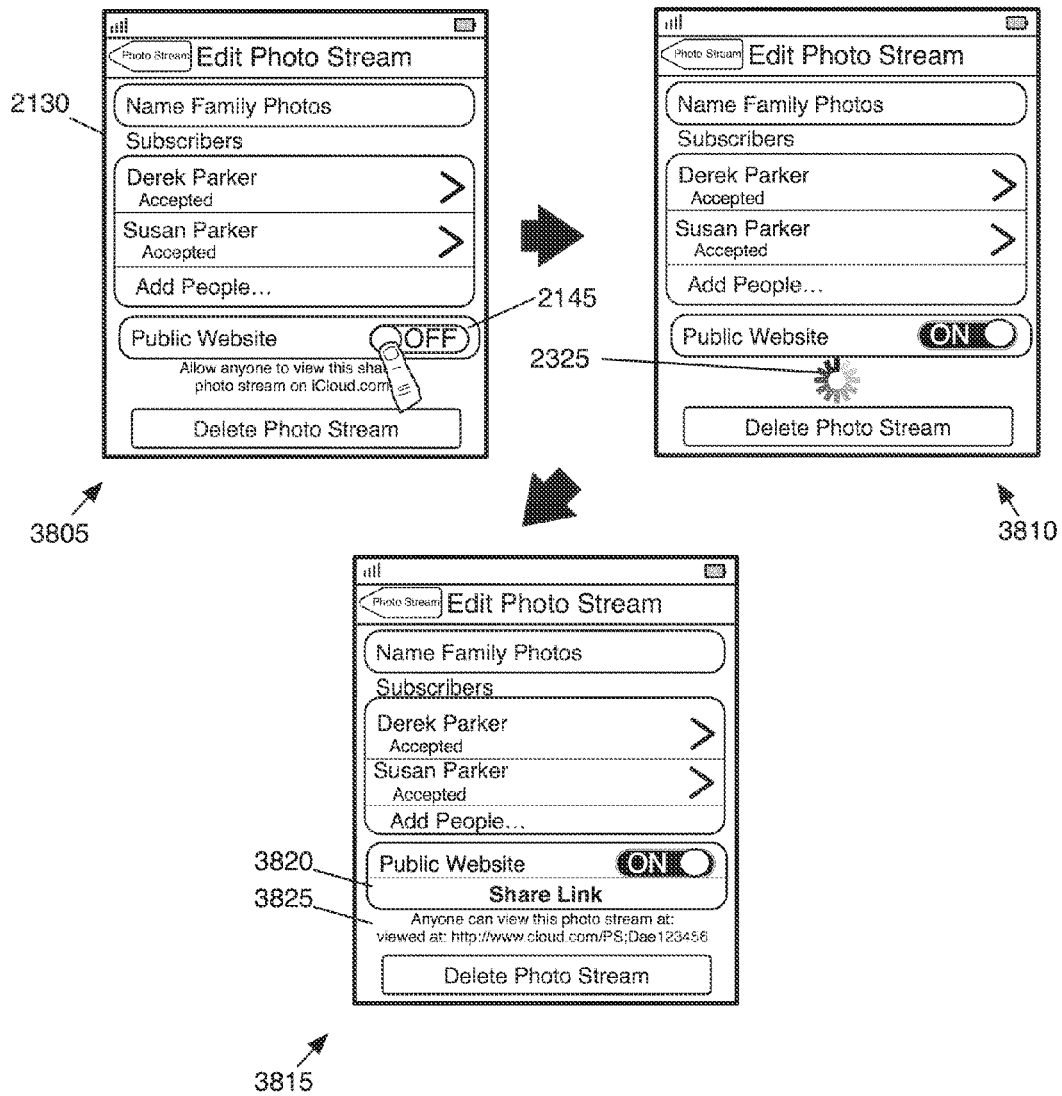
FIG. 38 provides an illustrative example of publishing a photo stream to a website.

FIG. 38 provides an illustrative example of publishing a shared photo stream to a website. Specifically, in three operational stages 3805-3815, this figure illustrates how an owner can publish the photo stream using the image application. This figure includes the edit photo stream menu 2130 that has been described above by reference to FIG. 21.

The first stage 3805 illustrates the owner's device displaying the edit menu 2130. To display the edit menu 2130, the owner might have first selected a selectable item (e.g., a colored icon with a directional arrow) that is displayed with the name of the photo stream in the photo stream menu. As shown, the edit menu 2130 includes the public website control 2145. The owner can select the control 2145 to turn on or off the public website feature. In the example illustrated in the first stage 3805, the public website feature is turned off or disabled. To publish the photo stream, the owner selects (e.g., by performing a gesture such as tapping the owner's finger on) the control 2145.

The second stage 3810 illustrates the image application after the selection of the control 2145. The selection causes the application to send data to one or more servers to publish the photo stream to the website. For example, the application may generate one or more lower resolution images from a stored image (e.g., raw image) and send those images to a server. The application may exchange messages with a control server regarding publication. In the example illustrated in the second stage 3810, the edit menu 2130 is overlaid by a spinner or spinning wheel 2325 (e.g., below the control in the edit menu). The spinner 2325 provides a visual indication that the application is awaiting confirmation of the publication.

The third stage 3815 illustrates the image application after the publication of the images associated with the photo stream. The publication of the photo stream results in the display of a share link control 3820. In this example, the share link control 3820 is displayed below the public website control 2145. The share link control 3820 can be selected to generate a message (e.g., an email) that contains a link to the URL to access the website. In some embodiments, the message can be sent to anyone, including those that are not subscribed to the photo stream. The selection of the share link button may cause the application to display different options (e.g., buttons with icons). Each of these options may allow the user to share the link differently, e.g., through an email message, text message, social network post, social network message, etc. As shown, the URL is also displayed on the edit menu 2130. Here, the edit menu 2130 is overlaid by a message 3825 stating that the photo stream can also be viewed at the URL (e.g., http) address.

FIG. 39A provides an illustrative example accessing the webpage with the subscriber's device. Three operational stages 3905-3915 of the subscriber's device are illustrated in this figure. The first stage 3905 illustrates the selection of an icon 925 of the email application. In the second stage 3910, the email application displays the email sent from the owner's device. The email includes a message 935, a link 940, and a thumbnail image 930. The message 935 states that the owner shared a photo stream with the recipient. The thumbnail image 930 shows the icon of the image application. The icon is shown with a marking or badge 945 indicating that there is a new photo stream or an update to an existing photo stream. The link 940 is a selectable item for the webpage that contains the images from the photo stream.

As shown in the second stage 3910, the subscriber selects the link 940. The selection causes a web browser to be opened, as illustrated in the third stage 3915. The browser 3930 displays the webpage that includes the images from the photo stream. The webpage is overlaid by a top bar 3920. The top bar 3920 states the title of the photo stream and the name of the owner. In addition to the top bar, the group of images includes its own heading 3925. Specifically, the heading 3925 includes (1) the date and time the group of images was added to the photo stream, and (2) the number of photos in the group.

In the example illustrated in the third stage 3915, the images are displayed in a grid format. Specifically, the images are displayed in a two by two grid with two images on each grid row. The images are displayed side by side with minimal or no spacing between them in either the horizontal or vertical direction. In some embodiments, the image layout is selected based on the number of images in a batch and the orientation of the images in the batch. Several examples of selecting a layout for the images will be described by reference to FIGS. 42-47.

FIG. 39B provides an example of an alternate email message that is received at the subscriber's device. This figure is identical to stage two 3910 of the previous figure. However, the link to the public website is a secondary link 3935. The primary link 3940 being a link to join the photo stream, which is similar to the one described above by reference to FIG. 9.

Figure 40:
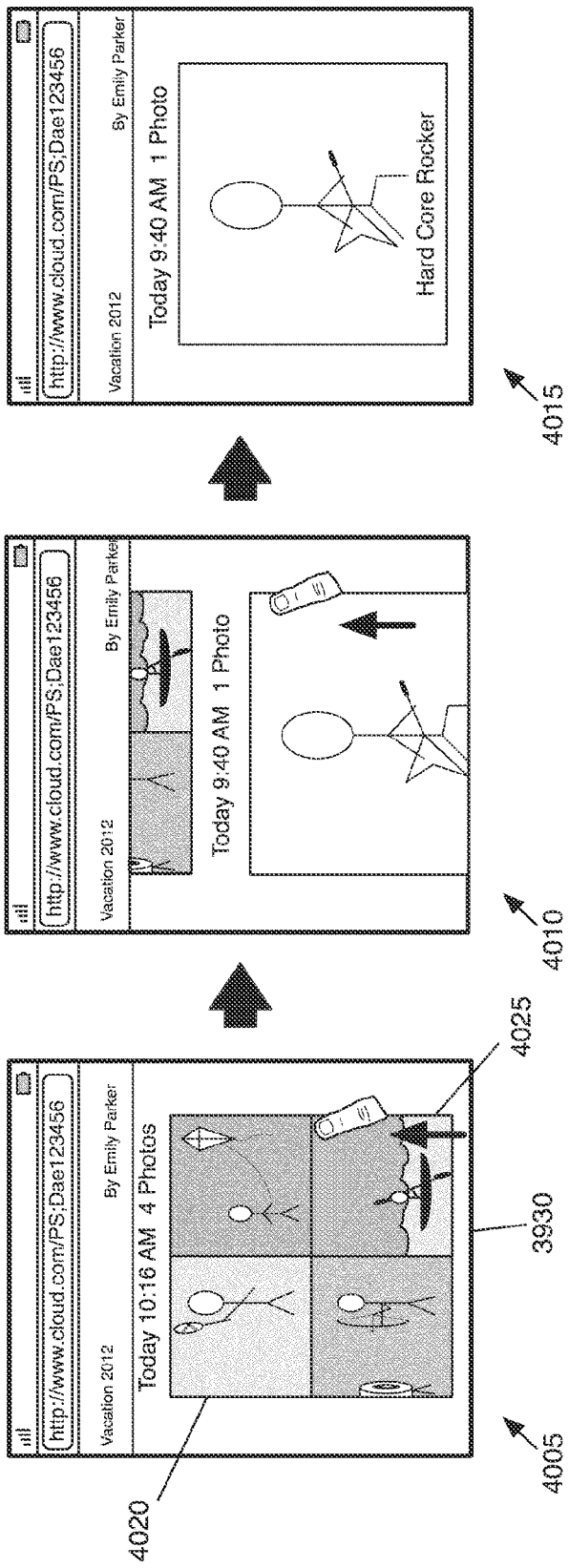
FIG. 40 provides an illustrative example of how the webpage is updated when a new image is added to the photo stream.

The previous example illustrated publishing images in the photo stream to a website. In some embodiments, the webpage containing the published images is updated each time a participant adds additional images to a shared photo stream. FIG. 40 provides an illustrative example of how the webpage is updated when a new image is added to the photo stream. Three operational stages 4005-4015 of the subscriber's device are illustrated in this figure.

In the first stage 4005, the browser 3930 displays the webpage that includes the images from the photo stream. In this example, the webpage displays the batches in reverse chorological order, starting with the newest batch at the top and the previous batch below. The images in each batch are displayed in chronological order, starting from the oldest to the newest. Specifically, the images are sequentially displayed starting with top left image 4020 of the first row, which represents the oldest image, to the bottom right image 4025 of the second row, which represents the newest image.

As shown in the second stage 4010, the user uses a touch gesture to scroll down the webpage to display a second batch of images. The third stage 4015 illustrates the webpage displaying a second batch of images that were added at a different time than the first batch. Here, the batch includes only one image. The heading 4020 indicates that the older batch contains one image and the time when the image was added, which is before the first batch of images.

Figure 41:
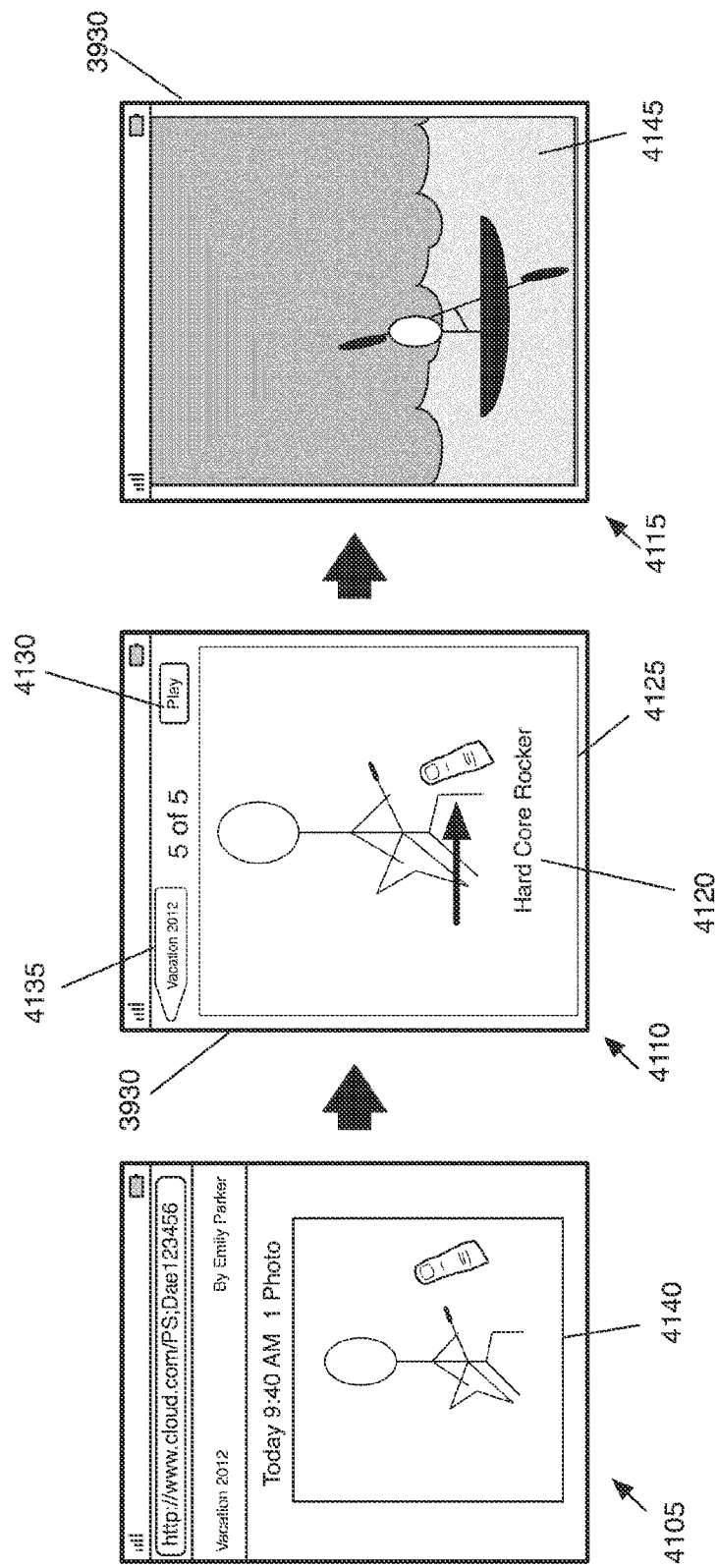
FIG. 41 provides an example of scrolling through images in the photo stream.

FIG. 41 provides an example of scrolling through images in the photo stream. In the first stage 4105, the subscriber selects an image 4140 from the webpage. As shown in the second stage 4110, the selection causes the web browser to display a full-screen representation 4125 of the selected image. The full-screen representation may be displayed with one or more comments. In some embodiments, the full-screen representation 4125 is displayed only with the first associated comment 4120. As shown, the comment 4120 appears as a caption that is displayed over the lower portion of the full-screen representation 4125.

In the example illustrated in the second stage 4110, the full-screen representation 4125 is displayed with a back button 4135 for returning to the previous view (i.e., the view illustrated in the first stage 4105) and a slide show button 4130 for playing a slide show of the published images. In some embodiments, the full-screen representation 4125 is displayed with navigation buttons (not shown) that can be used to display a next or previous image.

In the second stage 4110, the subscriber selects (e.g., swipes across the device's screen to display a previous image. The third stage 4115 illustrates the web browser 3930 after the selection. As shown, the browser displays a previous image 4145 in the photo stream. In this example, the displayed image 4145 is the last image (e.g., the newest image) in another batch (e.g., the newest batch). In some embodiments, the selection to display a previous image may result in the browser displaying a full-screen representation of the first image (e.g., the oldest image) in the batch.

B. Webpage Layouts

In some embodiments, a web publishing server publishes images in a photo stream as one or more webpages to a website. The web publishing server of some embodiments selects a webpage layout based on the number of images in different batches and the orientation of those images. The webpage layout may display images in a particular order (e.g., starting with the oldest image and ending with the newest image, or vice versa). The webpage layout may display different batches in a particular order (e.g., starting with the oldest batch to the newest batch, or vice versa). Several example webpage layouts will now be described by reference to FIGS. 42-45. In these examples, the boxes represent horizontal or landscape images. Each box is numbered, and the number represents the sequence of images, starting from the oldest image to the newest image.

Figure 42:
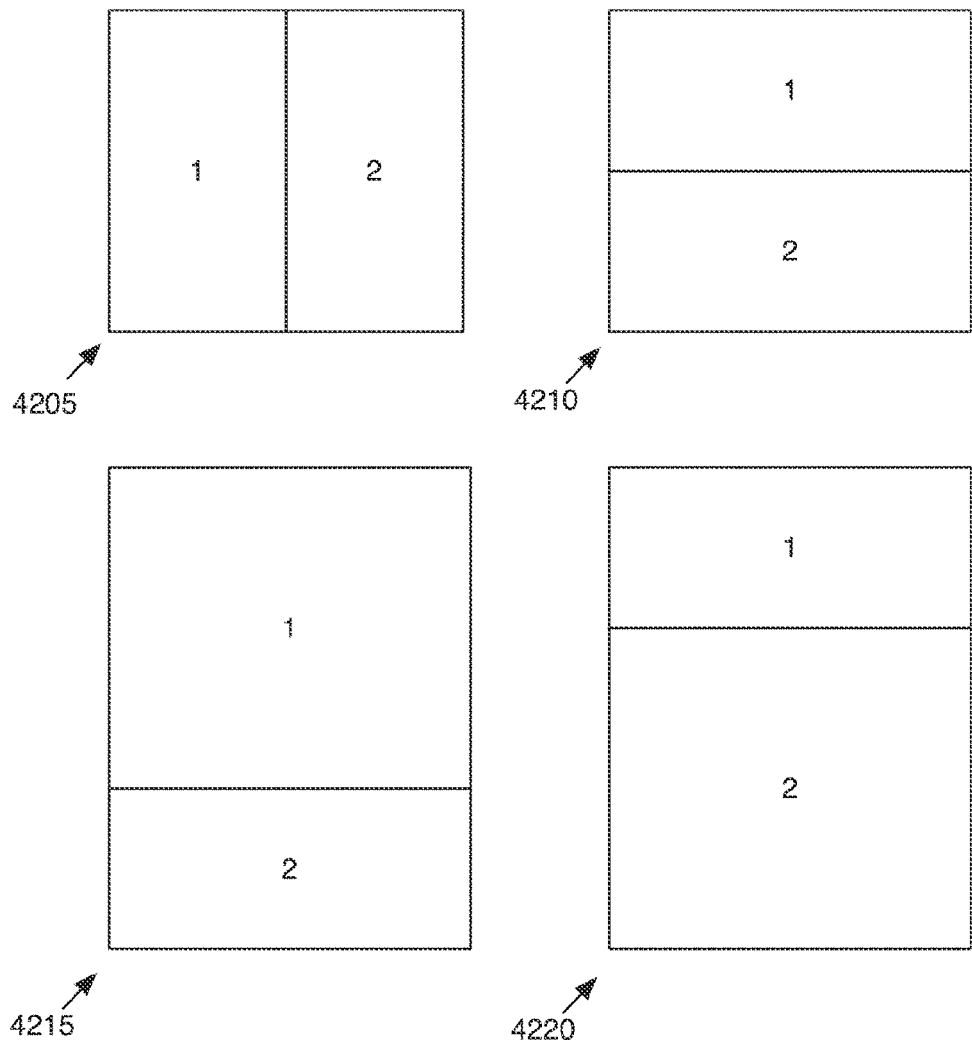
FIG. 42 provides an illustrative example of a webpage layout for a photo stream that includes two images.

FIG. 42 provides an illustrative example of webpage layouts for a batch that includes two images. Four different example layouts 4205-4220 are shown in this figure. The layout 4205 represents a layout for a batch that contains two portrait images, while layout 4210 represents one with two landscape images. When the batch includes a portrait image and a landscape image, the portrait image may occupy one square grid cell, while the width of the landscape image is matched with the width of the square grid cell. The layout 4215 represents a layout where the first image is a portrait image while the second image is a landscape image. Conversely, the layout 4220 represents a layout where the first image is a landscape image while the second image is a portrait image.

Figure 43:
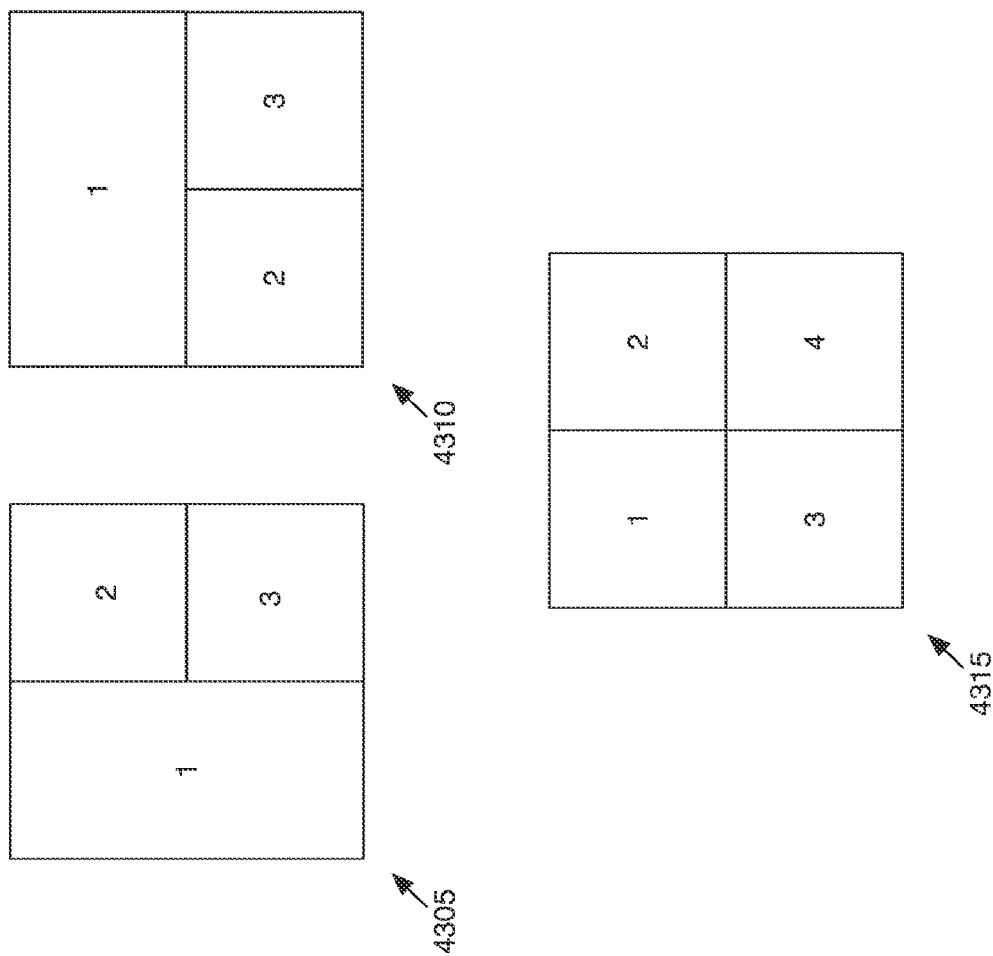
FIG. 43 provides an illustrative example of a webpage layout for a photo stream that includes three or four images.

FIG. 43 provides an illustrative example of a webpage layout for a batch that includes three or four images. Specifically, the layout 4305 represents a batch with three images, where the first image is a portrait image, while the layout 4310 represents one where the first image is a landscape image. In these two layouts 4305 and 4310, the remaining two images in batch are displayed as square images. Irrespective of the orientation of the images, the layout 4315 shows that all images are displayed as square images when there are four images in a batch.

FIG. 44 provides an illustrative example of a webpage layout for a batch that includes five images. In particular, the layout 4405 is for a five-image batch shows that the first four images are arranged in a two-by-two block and the fifth image is placed below the block. The fifth image is also four times the size of each of the first four images. In contrast, the five-image layout 4410 (e.g., the landscape layout) shows that first four images are arranged in a two-by-two block and the fifth image (i.e., the largest one) is placed thereafter (e.g., to the right). In some embodiments, the landscape layout used to display images on certain platforms (e.g., smart TV, digital media receivers). For example, an image application that operates on a digital media receiver may select this layout to display images in a batch.

Figure 45:
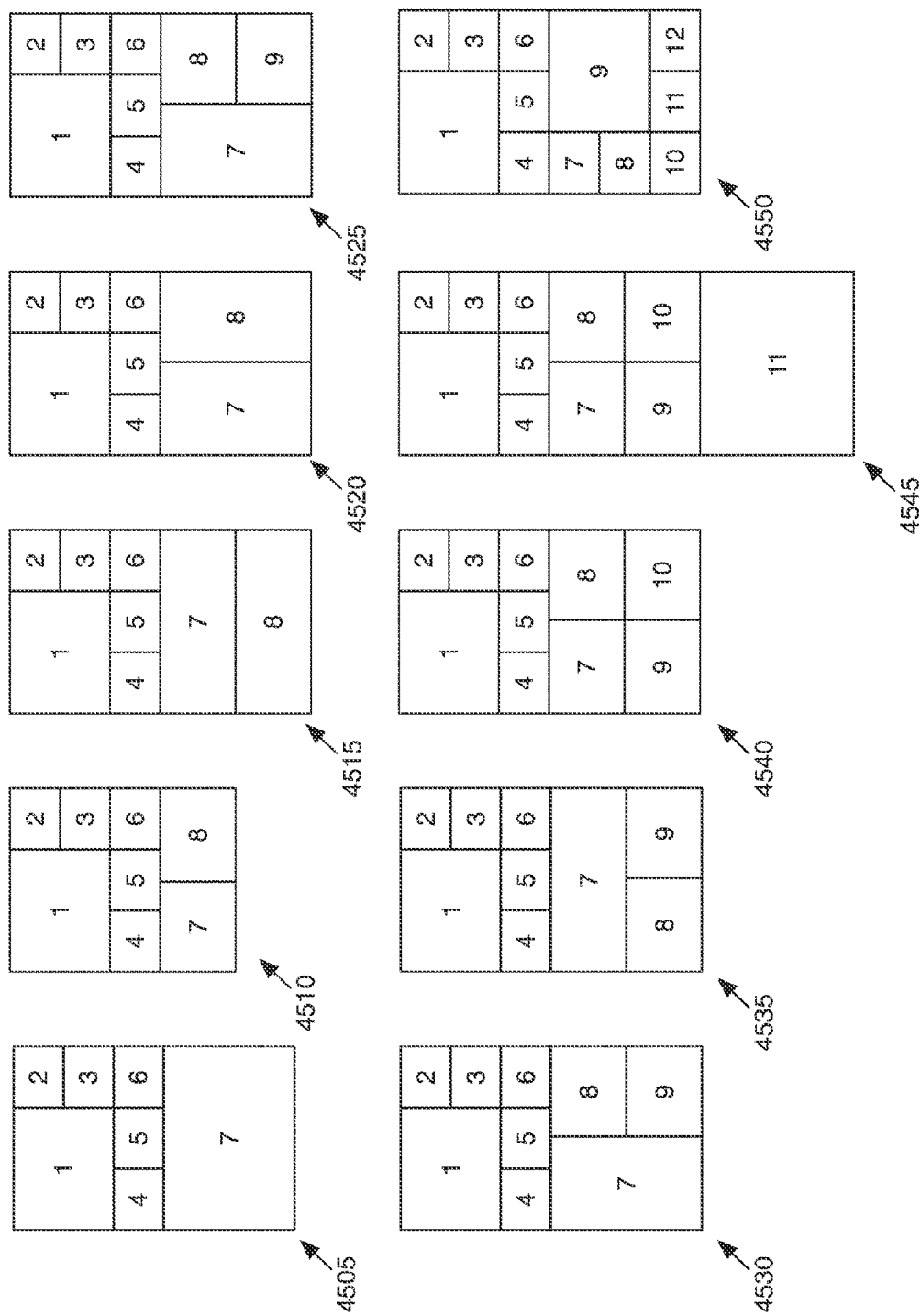
FIG. 45 illustrates webpage layouts for a photo stream that includes more than six images.

FIG. 45 illustrates webpage layouts for a batch that includes more than six images. Specifically, the seven-image layout 4505 is the same as the six-image layouts, except a seventh image is arranged below the first six images. There are also three different layouts 4510-4520 for photo streams containing eight images. Specifically, the layout 4510 is for a batch where the seventh and eighth images are a mix of landscape and portrait images, the layout 4515 is for a batch where the seventh and eighth images are landscape images, and the layout 4520 is for a batch where the seventh and eighth images are portrait images. This figure also illustrates examples of nine-image layouts 4525-4535, a ten-image layout 4540, an eleven-image layout 4545, and a twelve-image layout 4550. Several of these layouts 4525-4550 follow a pattern by adding one or more of the layouts described above. Similar to the twelve-image layout 4550, a layout may be added to another layout by inverting or flipping the order in relation to the different image sizes. This figure illustrates example portrait layouts. However, the groups of images can be arranged side-by-side for different landscape layouts for certain platforms (e.g., smart TV, digital media receivers).

C. Image Framing

In many of the examples described above, the images are displayed in square cells or blocks, regardless of whether they are landscape or portrait images. To account for the mismatch in the aspect ratio, the web publishing system of some embodiments performs a framing operation that fits the image's smaller dimension (i.e., width or height) on a square cell and displays the portion of the image that is within the grid cell. The framing operation may also entail centering or top aligning the image on the grid cell.

Figure 46:
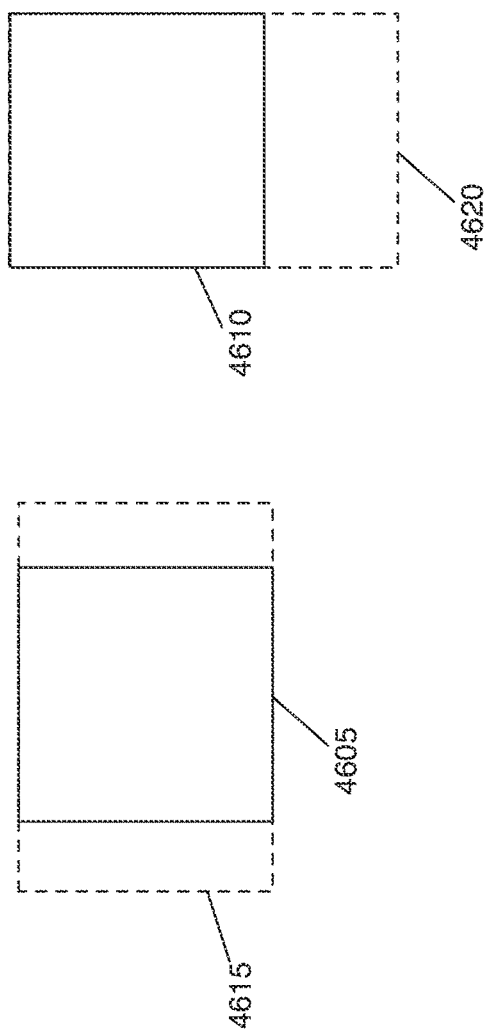
FIG. 46 provides several examples of how images are framed in a webpage layout.

FIG. 46 provides several examples of how images are framed in a webpage layout. The figure includes two square cells 4605 and 4610. The landscape image 4615 is placed on the cell 4605. As shown, the height of the landscape image 4615 is matched with the height of the cell 4605. The landscape image 4615 is then centered on the grid cell 4605. The portion of the landscape image 4615 within the square cell 4605 is the displayed portion of the landscape image.

The portrait image 4620 is placed on the cell 4610. As shown, the width of the portrait image 4620 is matched with the width of the cell 4610. Different from the landscape image 4615, the portrait image 4620 is not centered on the grid cell 4610. Instead, the portrait image 4620 is top aligned on the cell.

Figure 47:
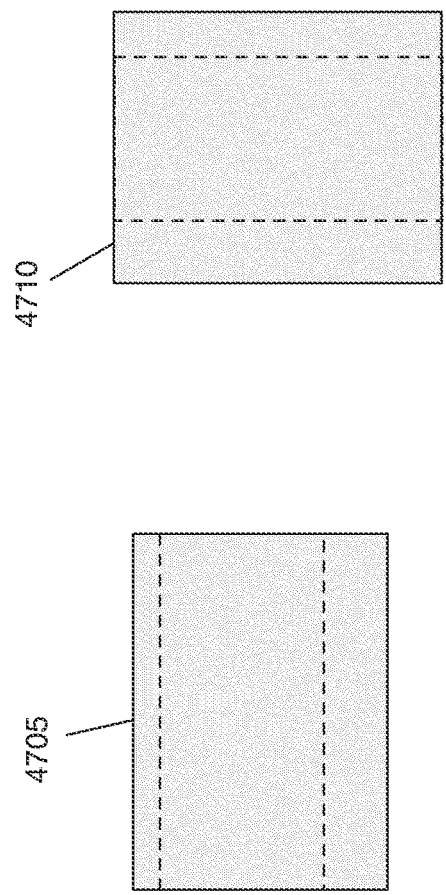
FIG. 47 provides an illustrative example of how portrait and landscape images are presented in a batch layout.

In conjunction with the framing operation, or instead of it, an image may be cropped or different portions (e.g., the outer parts) of the image may be removed from the layout. FIG. 47 provides an illustrative example of how portrait and landscape images 4705 are presented in a batch layout (e.g., two-image layout, three-image layout, etc.). As shown, the layout crops the top portion of the landscape image 4705 after shifting the image up a particular amount (e.g., 10% of the image). That is, the top portion of the image and the lower portion of the image are not shown in the batch layout. In this example, the lower portion of the image is cutoff more than the top portion. Different from the landscape image, the center portion of the portrait image 4710 is cropped. Specifically, the portrait image 4710 is cropped such that the left and right outer portions are not shown in the batch layout.

D. Example Process for Publishing a Photo Stream to a Website

Figure 48:
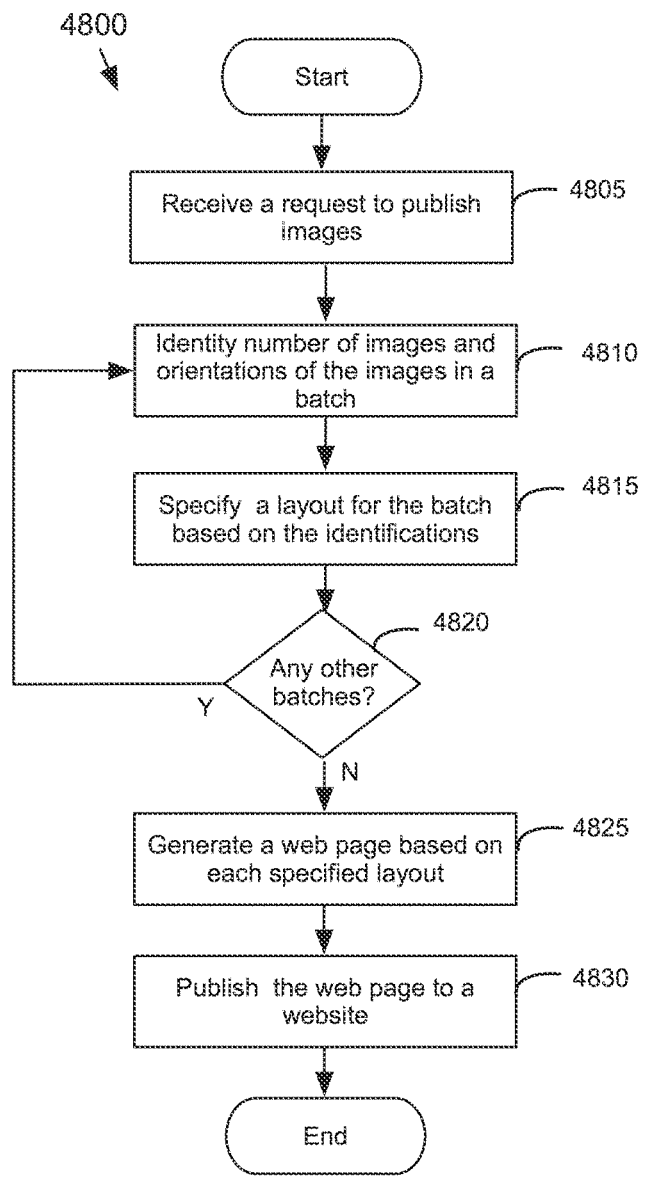
FIG. 48 conceptually illustrates a process that some embodiments use to publish images in a photo stream to a website.

Having described several example batch layouts, an example process for publishing a photo stream will now be described. FIG. 48 conceptually illustrates a process 4800 that some embodiments use to publish images in a photo stream to a website. The process 4800, in some embodiments, is performed at the server-side by a server computer (e.g., by the web publishing server). Alternatively, a client device may generate the web page and upload it to the web publishing server.

The process 4800 begins when it receives (at 4805) a request to publish images. For instance, the process 4800 might receive a request to turn on the website from a client device. The process 4800 then identifies (at 4810) the number of images and the orientations of the images in a batch. Based on the identifications, the process 4800 specifies (at 4815) a layout for the batch.

At 4820, the process 4800 determines whether there are any other batches. If so, the process 4800 returns to 4810, which is described above. Otherwise, the process 4800 generates (at 4825) a webpage based each specified layout. When the batch has been previously published, the process 4800 might use a previously selected layout to generate the webpage. The process 4800 then publishes (at 4830) the webpage to a website (e.g., to a web servers).

Some embodiments perform variations on the process 4800. The specific operations may not be performed in one continuous series of operations, and different specific operations may be performed in different embodiments. For instance, the process 4800 might receive images from a client device in order to publish those images. In some embodiments, the process 4800 returns a Uniform Resource Locator ("URL") address for accessing the webpage to the client device. Furthermore, the process 4800 could be implemented using several sub-processes, or as part of a larger macro process.

In some embodiments, the batch layout operations described above may be performed at a client device to display the images. For instance, an image application that operates on a digital media receiver, smart TV, or a personal computer may perform the batch layout operation to generate a batch view of the images in the photo stream. Several examples presenting images on different clients are described below VI. Tablet Example In the examples described above, the image sharing tools are implemented as part of an image application. The image application executes on both the owner and subscriber's device to facilitate image sharing and commenting operations. In some embodiments, the image sharing tools are implemented across different devices (e.g., smart phone, tablet, laptop, desktop, digital media receiver, etc.) and/or different operating systems (e.g., Windows®, iOS, MAC OS X, etc.). These implementations allow the different platforms to inter-operate in order to share images and comments. An example implementation of the image sharing tools on a tablet device will now be described by reference to FIGS. 49-51.

Figure 49:
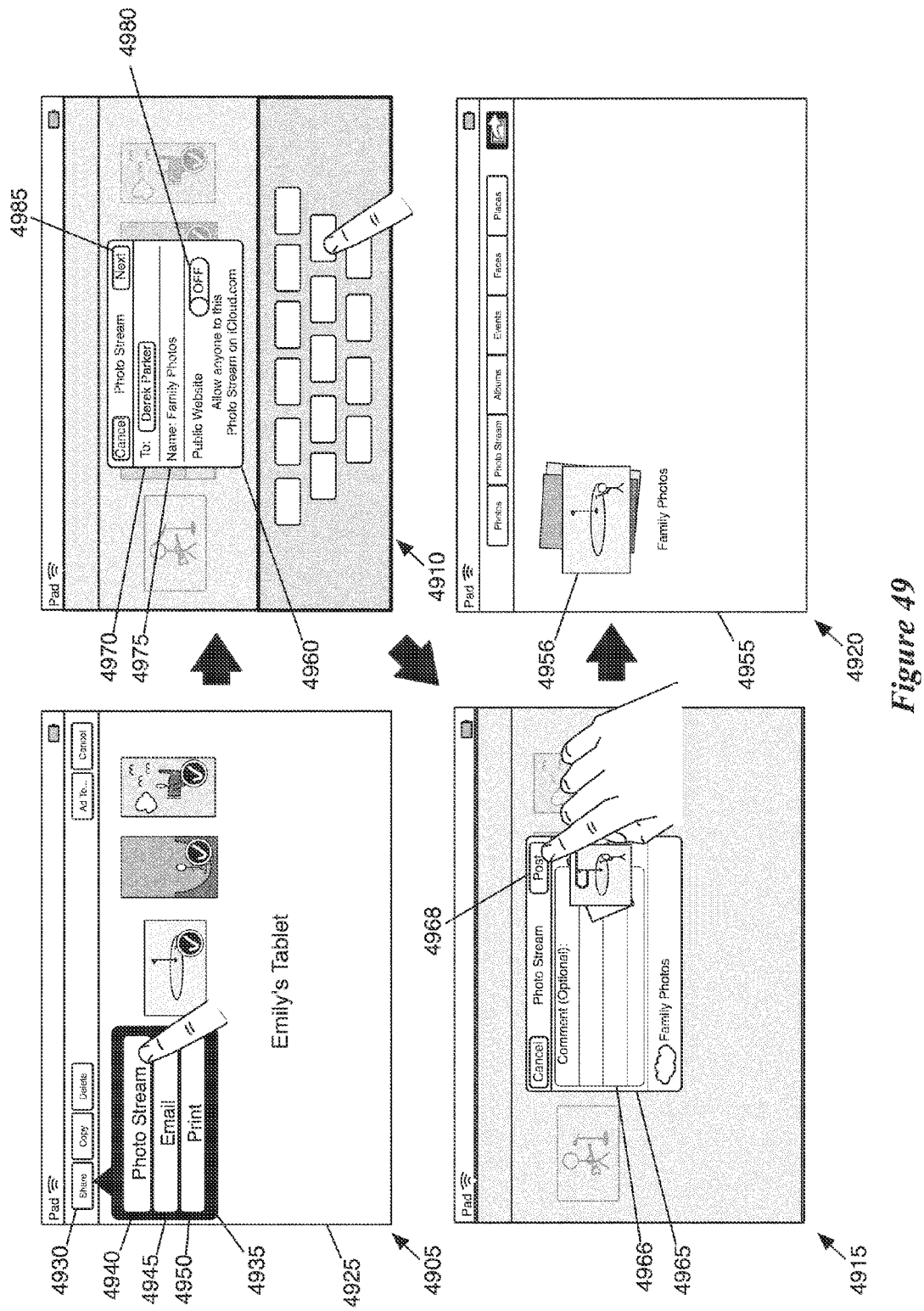
FIG. 49 provides an illustrative example of the image sharing tools on a tablet.

FIG. 49 provides an illustrative example of the image sharing tools on a tablet. The image sharing tools are provided as part of the image application described above. However, the tablet's user interface is different from the smart phone's user interface because the tablet has a larger screen than the smart phone. Four operational stages 4905-4920 of the owner's tablet are illustrated in this figure. This figure includes an image display area 4925, a photo stream menu 4955, a photo stream options sheet 4960, and a comment sheet 4965. These user interface items correspond to those items that are described above for the smart phone by reference to FIGS. 1 and 2.

In the first stage 4905, the image application displays images from a collection (e.g., an image library). Specifically, the application displays thumbnail representations of the images. Each thumbnail image is not displayed as a square image but is displayed in its corresponding aspect ratio (e.g., as a portrait image, a landscape image). Three images have been selected using the image display area 4925. To share the selected images, the user has also selected the share button 4930. The selection of the share button 4930 results in the display of a pop-up menu 4935. Here, the pop-up menu 4935 appears below the share button 4930 and overlays a portion of the upper-left hand corner of the image display area 4925. The pop-up menu 4935 includes (1) a photo stream button 4940 to create a new photo stream or add images to an existing photo stream, (2) an email button 4945 to email the selected images, and (3) a print button 4950 to print the selected images.

To create a new photo stream, the user selects (e.g., by tapping the user's finger on) the photo stream button 4940. The second stage 4910 illustrates the owner's tablet after the selection of the photo stream button 4940. The selection results in the display of the photo stream options sheet 4960. In the tablet version, the photo stream options sheet 4960 covers only a portion of the image display area 4925. Here, the options sheet 4960 is presented similar to a fill-in card with a field 4970 to input one or more subscribers for the photo stream, a field 4975 to input a name of the photo stream. The option sheet also includes a control 4980 to turn on or turn off the public website version of the photo stream.

In the second stage 4910, the owner has specified a subscriber and a name for the photo stream. The third stage 4915 illustrates the image application after the owner has selected a next button 4985. The selection caused the application to display the comment sheet 4965. Similar to the options sheet 4960, the comment sheet 4965 is presented similar to a fill-in card and covers only a center portion of the image. In some embodiments, the image application displays an animation when switching or transitioning from one display area to another display area. For example, the application may display the photo stream options sheet 4960 being flipped over to the comment sheet 4965, similar to a two-sided card being flipped over.

The comment sheet includes a comment filed 4966 and a post button 4968. The user can use the comment field 4966 to input a comment regarding an image (e.g., the first image) in the photo stream. The post button 4968 can be selected to publish the photo stream. Here, the user does not input any comment into the comment field 4966 and selects the post button 4968.

The fourth stage 4920 illustrates the photo stream menu 4955 after the selection of the post button 4968. As shown, the new photo stream 4956 is listed with its name. In addition, the new photo stream 4956 includes previews of one or more images in the photo stream. Here, the thumbnail representations of images in the photo stream are sequentially stacked on top of each other starting with the first image on top and the third image at the bottom. One of ordinary skill in the art would understand that the image preview could be presented differently. For example, the thumbnail images can be presented in a grid format instead of being stacked on top of each other.

Figure 50:
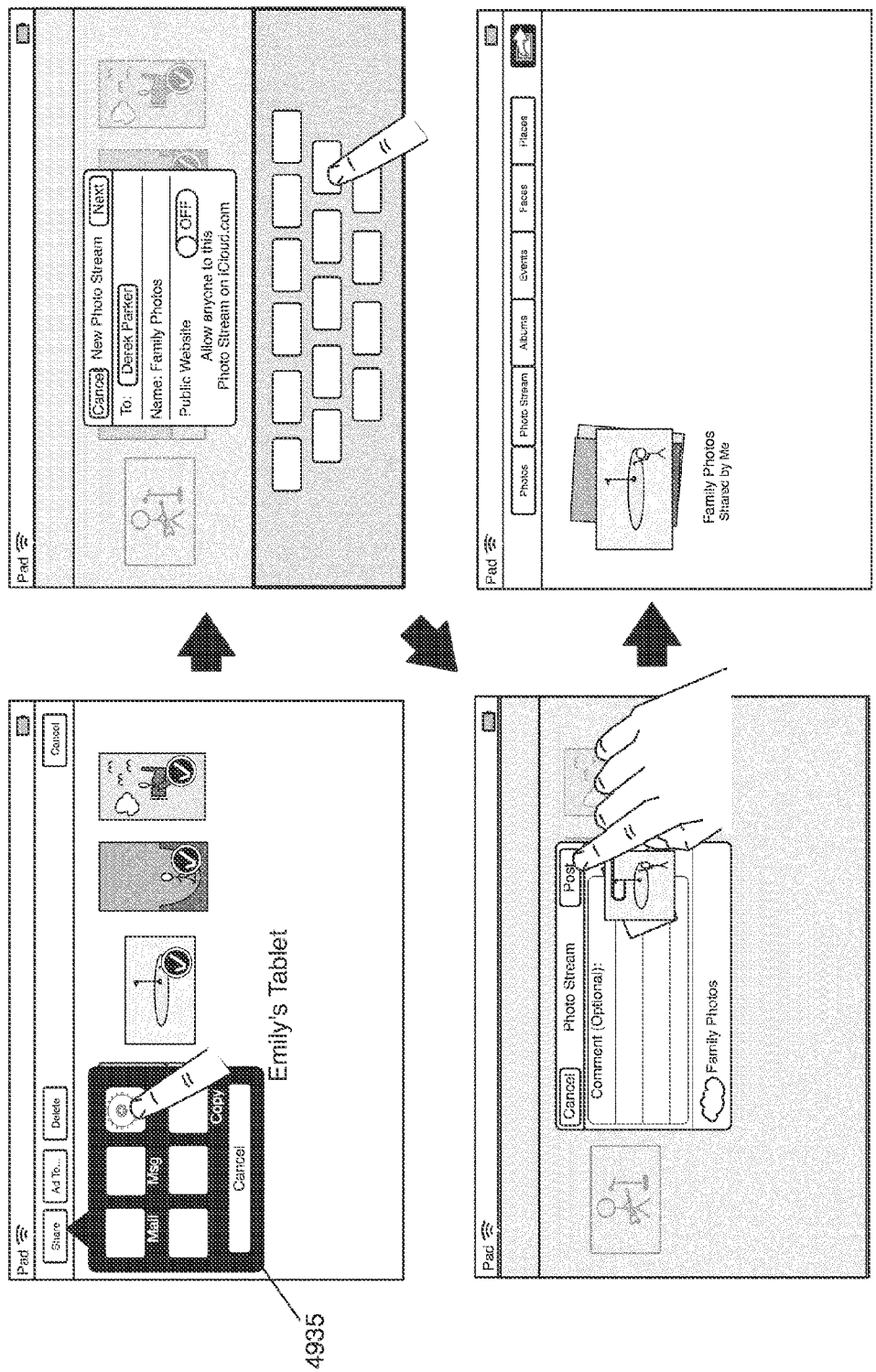
FIG. 50 provides another example of the image sharing tools on a tablet.

FIG. 50 illustrates another example of the image sharing tools on a tablet. This figure is identical to the previous figure; however, the pop-up menu 4935 includes a grid of icons, instead of the text-based buttons. A similar grid of icons has been described above by reference to FIG. 1.

Figure 51:
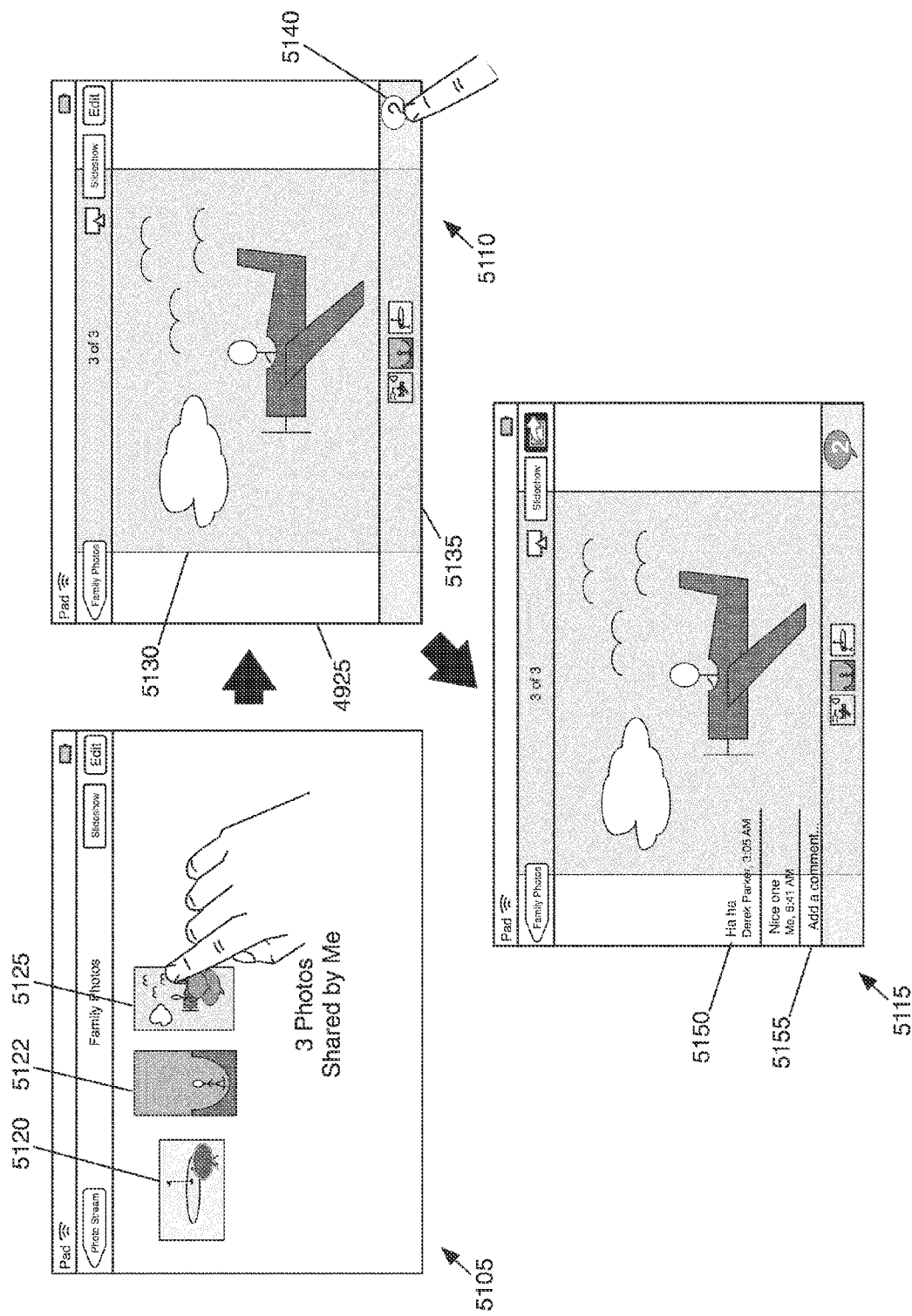
FIG. 51 provides an illustrative example of how comments are presented on the tablet.

The previous example illustrated creating a new photo stream using a tablet. FIG. 51 provides an illustrative example of how comments are presented on the tablet. Three operational stages 5105-5115 of the owner's tablet are illustrated in this figure.

The first stage 5105 illustrates the image application displaying thumbnail representations of images in the photo stream. The thumbnail images 5120-5125 are also marked with markings. These markings indicate that there are comments associated with the corresponding images. In the example illustrated in the first stage 5105, the thumbnail image 5120 is marked with a single chat bubble and the thumbnail image 5125 is marked with a double chat bubble. The single chat bubble indicates that the owner has not participated in the conversation (e.g., left a comment regarding the image). The double chat bubble indicates that the owner has previously left a comment regarding the corresponding image. The color of these markings (e.g., blue markings) indicates that there are new or unread comments.

In the first stage 5105, the owner selects (e.g., by tapping the owner's finger on) the thumbnail representation 5125 of the image. The selection causes the image application to generate a display of a full screen representation 5130 of the image. The image display area 4925 is overlaid by a semi-transparent bottom bar 5135. The thumbnail representations of images in the photo stream are sequentially displayed along the bottom bar 5135. The owner can select any one of these images to display the corresponding full screen representation in the image display area 4925.

As shown in the second stage 5110, the selection of the thumbnail image 5125 results in the display of a comment bubble 5140. The comment bubble 5140 includes a number (e.g., "2") that represents the number of comments associated with the image. The comment bubble 5140 is also colored (e.g., colored white) to indicate that the comment mode has not been activated.

In the second stage 5110, the owner selects the comment bubble 5140 to activate the comment mode. Selection of the comment bubble 5140 causes it to change colors (e.g., turn blue), which in turn provides the owner with a visual indication that the comment mode has been activated. The selection of the comment bubble also results in the display of the comments 5150 associated with the image.

As shown in the third stage 5115, the comments 5150 are displayed sequentially with the oldest one on top and the newest one at the bottom. The comments 5150 are also associated with metadata. The metadata is displayed below each comment, and identifies the person who left the comment and the time when the comment was left. The comments 5150 are also displayed with an add comment field 5155 that can be selected to add additional comments. In some embodiments, the application displays a marking (e.g., a like button, smiley face icon) that can be selected to specify that the participant likes the displayed image. Several examples of such a marking have been described above by reference to FIG. 32.

VII. Digital Media Receiver

In some embodiments, the image sharing tools are provided as part of an image application that executes on a digital media receiver (e.g., high-definition ("HD") media streaming device) or smart television ("TV"). Several examples of such an image application that executes on a digital media receiver will now be described by reference to FIGS. 52-55. In these examples, the digital media receiver is controlled by a remote control. The remote control may include a set of navigation buttons (e.g., up, down, left, right buttons) and a selection button. The remote control may also include other controls such as a menu button to return to a preview view (e.g., previous menu).

Figure 52:
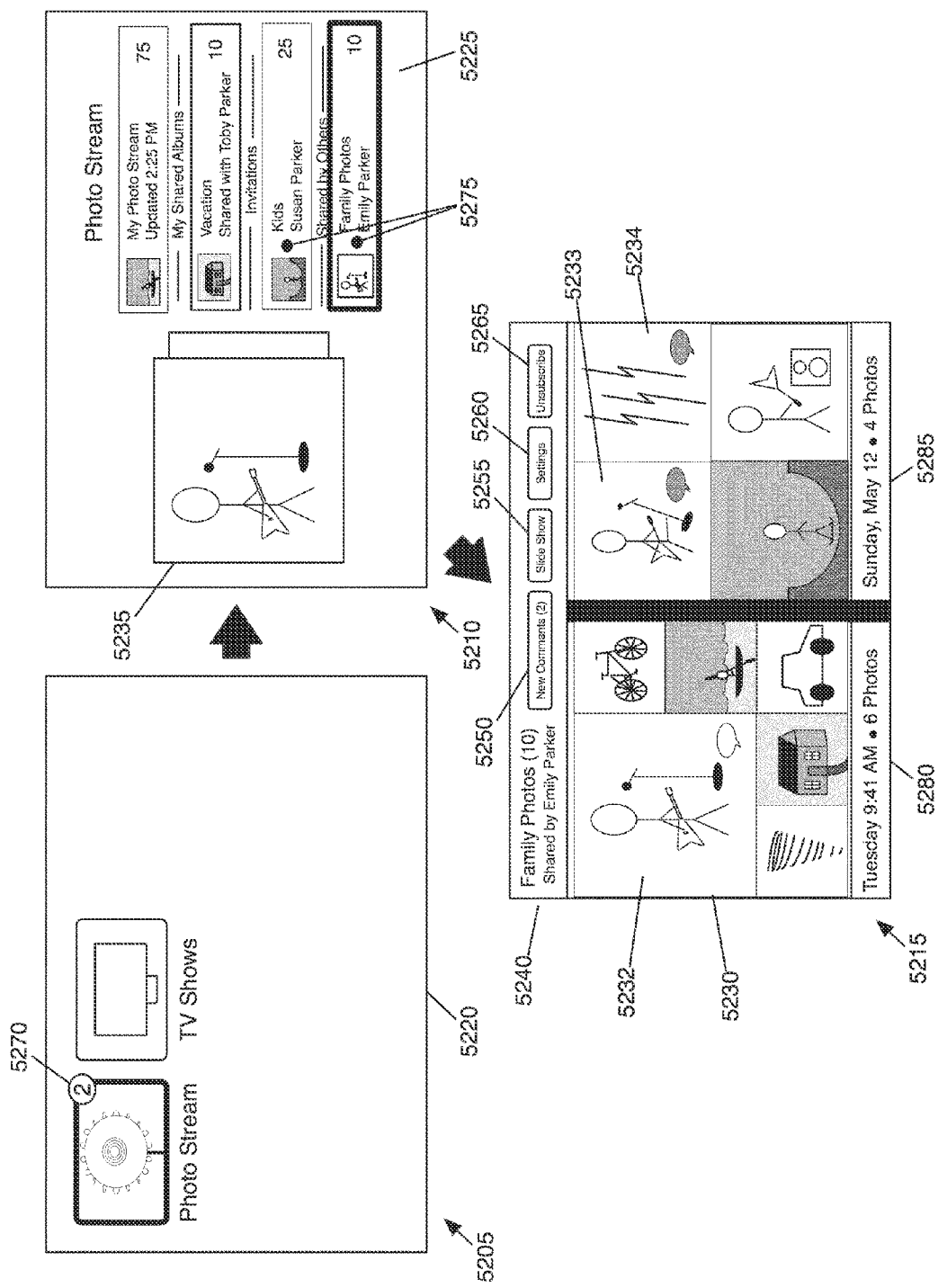
FIG. 52 provides an illustrative example of opening a shared photo stream with a digital media receiver.

FIG. 52 provides an illustrative example of opening a shared photo stream with a digital media receiver. Specifically, this figure illustrates in three operational stages 5205-5215 how the image application presents the photo stream on a wide screen television ("TV"). As shown, the figure includes an operating system desktop 5220 (hereinafter a grid view), a photo stream menu 5225 (hereinafter an album list), and an image display area 5230 (hereinafter a batch view).

The grid view 5220 displays different application icons in a grid formation. The user can select any one of the icons to open a corresponding application. To simplify the discussion, the grid view 5220 includes only two icons, namely a photo stream icon for opening the image application and a TV show icon for opening a TV show streaming application. However, the grid view 5220 can include other icons for other applications (e.g., movie streaming application, music streaming application, etc.). The grid view may also include a settings icon for opening a settings menu.

Similar to the photo stream menu 220 described above, the album list 5225 displays a list of photo streams. Here, each photo stream is listed with its name, a thumbnail representation of an image (e.g., a first image) in the photo stream, and a number that identifies the number of images in the photo stream). The photo stream menu includes a preview display area 5235 that displays one or more images from a photo stream selected from the list.

In the example illustrated in FIG. 52, the photo stream list 5225 is organized into four different sections. Here, the top section lists a personal photo stream that represents a group of images shared only across the user's devices. The remaining sections include (1) a shared albums section (e.g., "my shared albums") listing the name of each photo stream shared by the user, (2) an invitation section listing the name of each pending invitation for a photo stream from another user, and (3) a shared by others section listing the name of each photo stream shared by another user. One of ordinary skill in the art would understand that this is just one example organization scheme and that the application may organize the different types of photo streams differently in different embodiments. For example, the four sections can be organized into two sections with the personal photo stream in one section and the remaining photo streams in another section.

In some embodiments, the image application lists different shared photo streams in chronological or reverse chronological order by publication dates of the shared photo streams (e.g., the time and date the shared photo stream was created). Alternatively, the image application of some embodiments uses a different ordering to list the photo streams. For instance, the application may group all shared photo stream invitations at top or upper section of the photos stream menu list and sort them alphabetically. The application may also alphabetically sort all remaining photo streams and group them underneath the invitations. The alphabetical sorting is useful in that it allows the application's user to quickly find a shared photo stream when there are several different shared photo streams. For example, when there are many shared photo streams that were published at different dates, this sorting allows the user quickly search for a particular shared photo stream by its name. In some embodiments, the application provides user interface items to change the sorting of the shared photo streams and/or search for a particular photo stream.

Returning to FIG. 52, the batch view 5230 displays one or more images in a selected photo stream. When the photo stream includes sets of images that were added at different time, the batch view 5230 presents the images in different groups or batches. Each group of images may be sequentially ordered (e.g., in chronological order starting with the oldest image on the top left corner to the newest image on the bottom right corner). In addition, all groups may be sequentially ordered (e.g., in reverse chronological order starting with the newest group and ending with the oldest group).

As shown, the batch view 5230 is overlaid by a top bar 5240 that includes a new comments button 5250, a slide show button 5255, a settings button 5260, and an unsubscribe button 5265. The new comments button 5250 can be selected to display only images with new comments. An example of displaying only images with new comments will be described below by reference to FIG. 54. The slide show button 5255 can be selected to play a slide show of the images in the photo stream. The slide show may start with a first selected (e.g., highlighted) image in the batch view 5230. In some embodiments, one or more music clips may be selected or streamed to accompany the slide show presentation.

The settings tool 5260 can be selected to modify different photo stream setting. In some embodiments, the settings are contextual so they relate directly to the displayed photo stream. For example, the settings for a personal photo stream may differ from the settings for a photo stream shared with others. The unsubscribe button 5265 can be used to unsubscribe from a photo stream. In some embodiments, the button 5265 may only appear in the top bar 5240 when a subscribed photo stream is selected from the album list 5225. The selection of this button 5265 may also display a prompt requiring confirmation of the unsubscribe operation. One reason for the displaying the prompt is that the images in the subscribed photo stream may be deleted from all devices associated with the subscriber.

Having described several user interface elements, the operations of opening a photo stream will be described by reference to three stages 5205-5215 that are illustrated in FIG. 52. The first stage 5205 illustrates the grid view 5220 of the device's operating system. The grid view 5220 includes the photo stream icon and the TV show icon. In some embodiments, the icon for the image application displays a marking when one or more photo streams have been updated. In the example illustrated in the first stage 5205, the marking is a badge 5270 that is displayed partially over the photo stream icon. The badge 5270 includes a number "2" that indicates the number of new invitations and/or the number of photo streams that have been updated. The badge 5270 is removed from the icon when the image application is opened (e.g., to the album list 5225).

In the first stage 5205, the photo stream icon is selected (e.g., with the device's remote). The user then selects the application (e.g., by selecting the select or enter button on the remote). The second stage 5210 illustrates the image application after the selection of the photo stream icon. The selection results in the display of the album list 5225. The album list 5225 lists different photo streams. Specifically, it lists the user's personal photo stream, a "Vacation" photo stream that is shared by the user, and a "Family Photos" photo stream that is shared by another user. The list 5225 also includes an invitation to a "Kids" photo stream. The user can select the "Kids" photo stream to accept or decline the invitation. The "Kids" photo stream is moved to the "Shared by Others" section when the invitation is accepted, and it is removed from the album list 5225 when the invitation is declined.

Similar to the marked icon, several of the photo streams listed in the album list 5225 are marked with a marking 5275. This inner marking represents a second level of marking, the first level being at the icon level. As shown, the "Kids" photo stream is marked because it is a new photo stream invitation, and the "Family Photos" photo stream is marked because it has been updated (e.g., includes new images and/or comments). Here, the marking 5275 is a colored circle or dot (e.g., blue circle). In some embodiments, the number of circles corresponds to the number shown on the photo stream icon's badge 5270. A marking may be removed from the list once the corresponding photo stream has been opened.

As shown in the second stage 5210, the album list 5225 has been navigated (e.g., by selecting the down button on the remote) to the "Family Photos" photo stream. The user then selects the "Family Photos" photo stream (e.g., by selecting the select or enter button on the remote). The selection results in the display of the batch view 5230, as illustrated in the third stage 5215.

The third stage 5215 illustrates the application displaying the batch view 5230. The batch view 5230 is overlaid by the top bar 5240 with the new comments button 5250, the slide show button 5255, the settings button 5260, and the unsubscribe button 5265. The top bar 5240 also includes the name of the photo stream, the name of the owner of the photo stream, and a number (e.g., in parentheses) that identifies the number of images in the photo stream.

As shown in the third stage 5215, two groups of images are displayed in the batch view 5230. The first group includes six images and the second group includes four images. The owner of the photo stream has added these groups of images to the photo stream at different times. Each group includes a bottom field (5280 or 5285) that states the date and time the corresponding group of images were added, and the number of images in the group. In some embodiments, the application uses relative dating to display the date and time information. For example, if the date is within the week, the application may display "Today", "Yesterday", "Monday", "Tuesday", etc. However, if the date is not within the week, the application may display the day and the month of the date. If the date is not within the year, the application may display the year in some embodiments.

In the example illustrated in the third stage 5215, several of the images are associated with comments. Specifically, three images are associated with comments. This is indicated by a marking that is displayed over each of the three corresponding thumbnail representations 5232-5234. Here, the marking is a comment bubble. The comment bubble is colored a first color (e.g., white) for the thumbnail image 5232 and a second different color (e.g., blue) for the thumbnail images 5233 and 5234. The first color provides a visual indication to the user that the first image in the first group is associated with viewed comments, and the first and second images in the second group is associated with one or more unread comments. The number of images associated with new comments is also indicated by the new comments button 5250 that includes a number (e.g., in parentheses).

Figure 53:
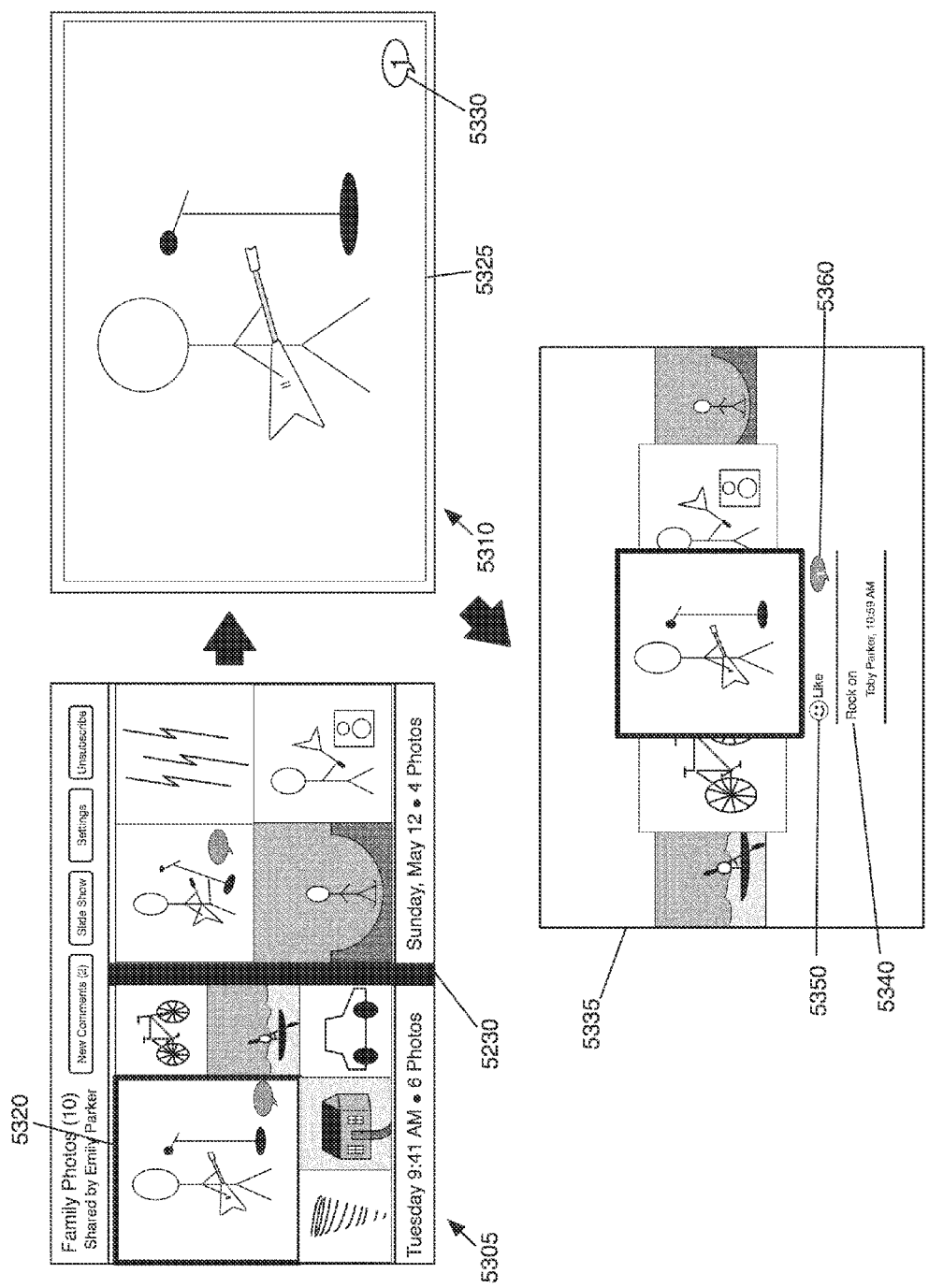
FIG. 53 provides an illustrative example of navigating images in the photo stream.

The previous example illustrated opening a photo stream using the digital media receiver. FIG. 53 provides an illustrative example of navigating images in the photo stream. Three operational stages 5105-5115 of the image application are shown in this figure.

The first stage 5305 illustrates the image application displaying the batch view 5230. The user has navigated to the first image 5320 (e.g., by using the remote's directional buttons). The user then selects the first image 5320 (e.g., by selecting the remote's select or enter button). The selection causes the display of the full screen representation 5325 of the selected image, as illustrated in the second stage 5310. Here, the full screen representation is displayed with a marking 5330. The marking 5330 is a comment bubble with a number. This number corresponds to the number of comments associated with the image.

The user can navigate through the images in the photo stream in this full screen view. In some embodiments, the full-screen view displays images (e.g., across batches) in chronological order starting with the oldest image and ending with the newest images. The batches may also be sorted in reverse chronological order, starting with the newest batch and ending with the oldest batch. Alliteratively, the batches may be sorted in chronological order, starting with the earliest batch and ending with the latest batch. In addition, the images may be ordered in reverse chronological order starting with the latest image and ending with the earliest image.

In the second stage 5310, the user makes another selection (e.g., by selecting the select button or down button on the remote). The selection causes the application to display a carousel view 5335, as illustrated in the third stage 5315. The carousel view 5335 displays several images of the photo stream across a screen. The images are displayed at different sizes that emulate a three-dimensional carousel of images. That is, the center image is the largest one while other images are progressively smaller. At any time, the user can change the center image by selecting a next or previous image (e.g., by selecting the next button on the remote).

In some embodiments, the carousel view 5335 displays each image in a group along the virtual carousel in chronological order (i.e., from the newest to the oldest). Similar to the full screen view, the carousel view shows all images (e.g., across batches) in chronological order, starting with the oldest image on the left to the newest image on the right. The batches may also be sorted in reverse chronological order, starting with the newest batch and ending with the oldest batch. This is illustrated in the first stage 5305 as the first image 5320 in the batch view 5230 is not the first image along the virtual carousel or in the list of images as it is the oldest image amongst the first group of images. Accordingly, five other images are in the list prior to the first image 5320. Only two of the five images are shown in the third stage 5315. Similarly, the list of images includes different groups of images in chronological order. This is also shown in the third stage 5315 as the last image (e.g., the image with the earliest timestamp) from the second group (e.g., the earlier batch) is displayed adjacent to the first image 5320 in the first group. In some embodiments, the batches are sorted in chronological order, starting with the earliest batch and ending with the latest batch. In addition, the images may be ordered in reverse chronological order starting with the latest image and ending with the earliest image.

As shown in the third stage 5315, the comment 5340 is displayed below the image 5320. The comment's metadata is also shown in the carousel view 5335. Specifically, the name of the person who left the comment and the time when the person left the comment are displayed below the comment 5340. A chat bubble 5360 with the number of comments is also shown above the comment 5340. In addition, an icon 5350 is displayed next to the chat bubble 5360. The user can select this icon 5350 to indicate that the user likes or approves of the image 5320. In some embodiments, the approval rating is counted similar to a comment in that the number of comments increases (e.g., in the chat bubble 5360).

In conjunction with the selectable icon, or instead of it, the application of some embodiments allows the user to add and/or delete comments. The comment may be selected for different actions or operations, such as replying to a comment, deleting the comment, etc. For example, a participant of the shared photo stream can navigate to the comment with the remote's navigational buttons and then press the select button. Upon selection of the comment, the application may display a list of different operations that can be performed.

Figure 54:
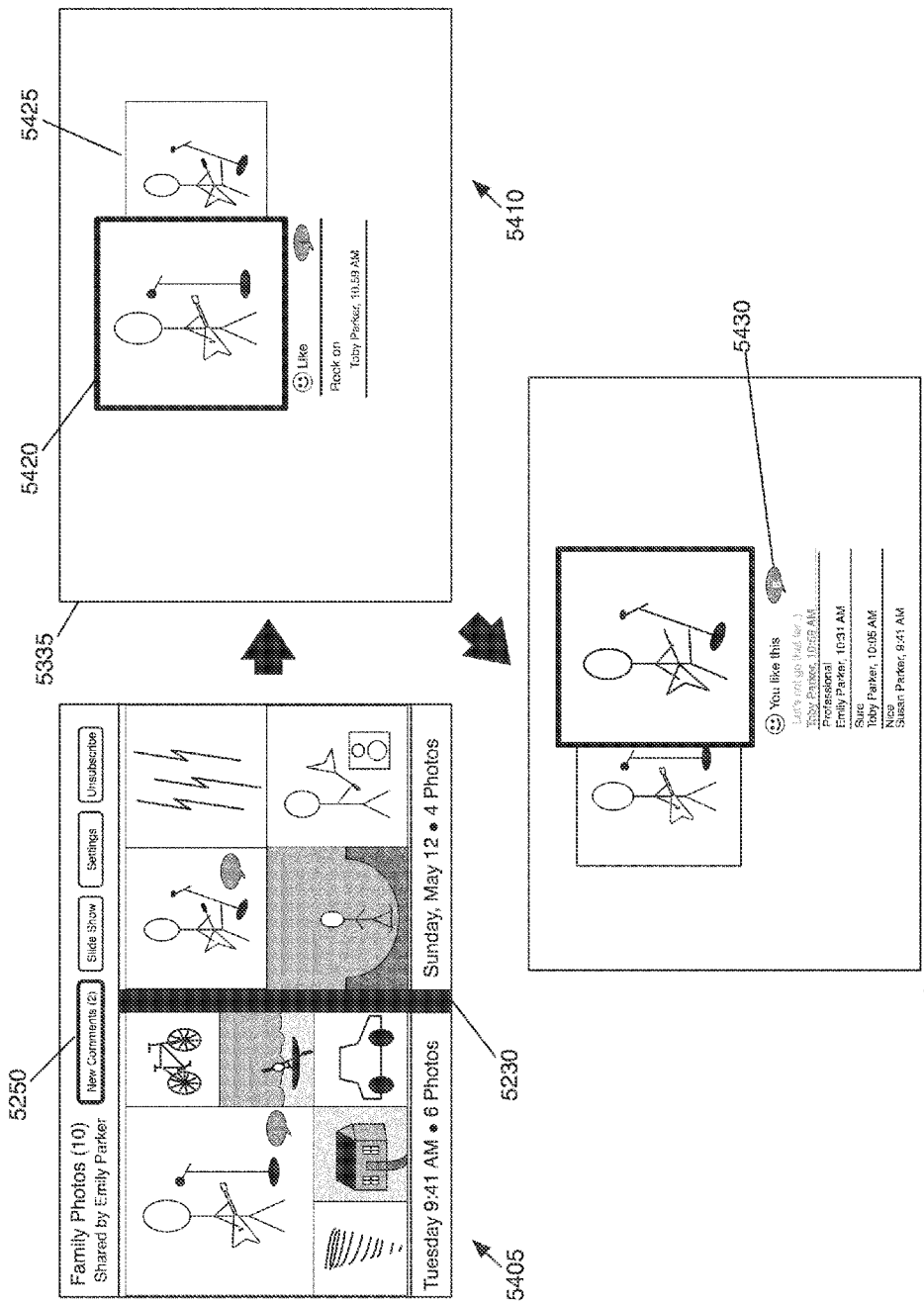
FIG. 54 provides an illustrative example of filtering a display to only display images with one or more new comments.

In some embodiments, the image application allows the user to view only images that are associated with one or more new comments. FIG. 54 provides an illustrative example of filtering a display to only display images with one or more new comments. Three operational stages 5405-5415 of the application are shown in this figure.

The first stage 5405 illustrates the image application displaying the batch view 5230. The user has navigated to the new comments button 5250 (e.g., by using the remote's directional arrows). The new comments button 5250 is labeled with a number two indicating that two images are associated with unread comments. The user then selects the button 5250 (e.g., by selecting the remote's select or enter button).

The second stage 5410 illustrates the image application's user interface after the selection of the new comments button 5250. The selection causes the application to display the carousel view 5335. Different from the carousel view described above, the carousel view 5335 in this figure includes only images 5420 and 5425 associated with unread comments. Here, the image 5420 is the center image. The one comment that is associated with the image is displayed below the image 5420. To view the next image with one or more unread comments, the user then navigates to the next image 5425 (e.g., by selecting the remote's next button).

Third stage 5415 illustrates the carousel view 5335 after navigating to the image 5425. As shown, the image 5425 is associated with five comments and one approval rating. The number of comments and/or approval ratings is indicated by the number that is shown on the comment bubble 5430. In this example, only four single-lined comments are shown below the image 5425. The other remaining comment is not shown. Different embodiments may display more or less lines of comments.

In some embodiments, the carousel view 5335 presents comments associated with an image by automatically scrolling through them. The application of some embodiments automatically scrolls through unread comments starting from the newest to the oldest unread comment and then stops. The comments can also be scrolled with the remote's navigational buttons, in some embodiments. For example, the user can scroll up the comments by selecting the up (e.g., top) button and scroll down by selecting the down (e.g., bottom) button.

Figure 55:
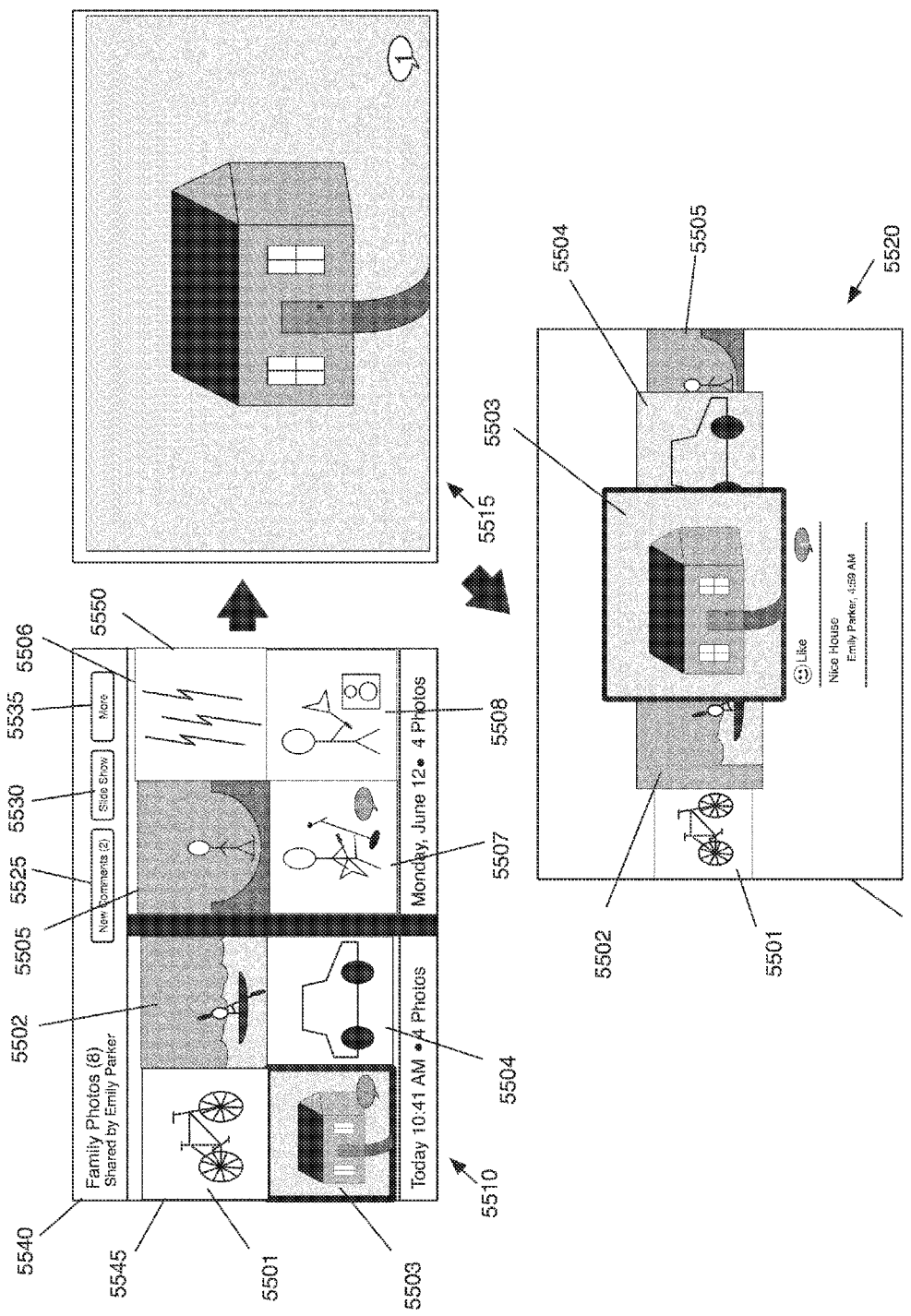
FIG. 55 illustrates an example of another image application for a digital media receiver or smart TV.

Several examples of the image application of some embodiments are described above. FIG. 55 illustrates an example of another image application for a digital media receiver or smart TV. The image application is an alternate embodiment that implements the image sharing tools. Different from the examples described above, this application includes three controls along a top bar 5540: a new comments button 5525, a slide show button 5530, and a more button 5535. The new comments 5525 button is the same as the one described above by reference to FIG. 54.

In the example illustrated in FIG. 55, the selection of the slide show button 5530 causes the application to display several selectable items relating to the slide show presentation. Specifically, the application provides a selectable item (e.g., a play button) for starting a slide show using the images in the shared photo stream. The selection of the slide show button 5530 also causes the application to display a set of slide show configuration tools for configuring the slide show presentation (e.g., to add a music track to the presentation, to specify how the images are presented, etc.). When the more button 5535 is selected, the application of some embodiments provides different management commands. For example, the application may provide a selectable item for unsubscribing from the displayed photo stream. The application may also provide a selectable item for using the images in the shared photo stream as a screen saver. Several other management commands are described above by reference to FIG. 21.

Three operational stages 5510, 5515, and 5520 of the image application are illustrated in FIG. 55. These stages are similar to the ones shown in FIG. 52. Specifically, the images are grouped into two different batches 5545 and 5550. In some embodiments, each batch is a publishing of a group of one or more images to a shared photo stream. The primary sort order is reverse chronological order by batch, and the secondary sort order is chronological by image. That is, the batch 5545 on the left-hand side is the newest batch, and the batch 5550 on the right-hand side is the older batch. The images (5501-5504 or 5505-5508) in each batch are sorted starting with the oldest image on the top left and the newest image on the bottom right.

Different from several examples described above, the application of some embodiments linearizes the photo stream's images by taking the batch order and flattening into a straight set. This is shown in the third stage 5520 because the first four images 5501-5504 in the carousel view 5555 represent the first four images from the first batch 5545. The fifth image in the carousel view 5555 is the first image from second batch 5550. The user can view the remaining three images 5506-5508 in their batch order by using the remote control to scroll though the carousel view. Although this linearization does not sort the images in a proper chronological order, it allows the user to view the images in an order that was shown in the batch view. Instead of flattening the images into a straight set, the application may present the images in a number of different ways. For instance, the application may display the images from different batches in chronological order starting with the oldest image to the newest image without regard to the batch sorting. In some embodiments, the application provides selectable items to switch from one type of sorting (e.g., the sorting illustrated in the third stage 5520) to another type of sorting (e.g., chronological or reverse chronological sorting).

VIII. Personal Computer

The image sharing tools of some embodiments are integrated into a main graphical user interface or shell of an operating system ("OS"). That is, the image sharing tools are not part of an image application but are part of the main graphical user interface ("GUI"). Several example of such image sharing tools will now be described by reference to FIGS. 56-61. In these examples, the operating system is a Windows operating system that is extended to support image-sharing operations. However, other types of operating systems (e.g., Linux, Mac OS X) can be extended to support the same or similar features.

A. Control Panel

Figure 56:
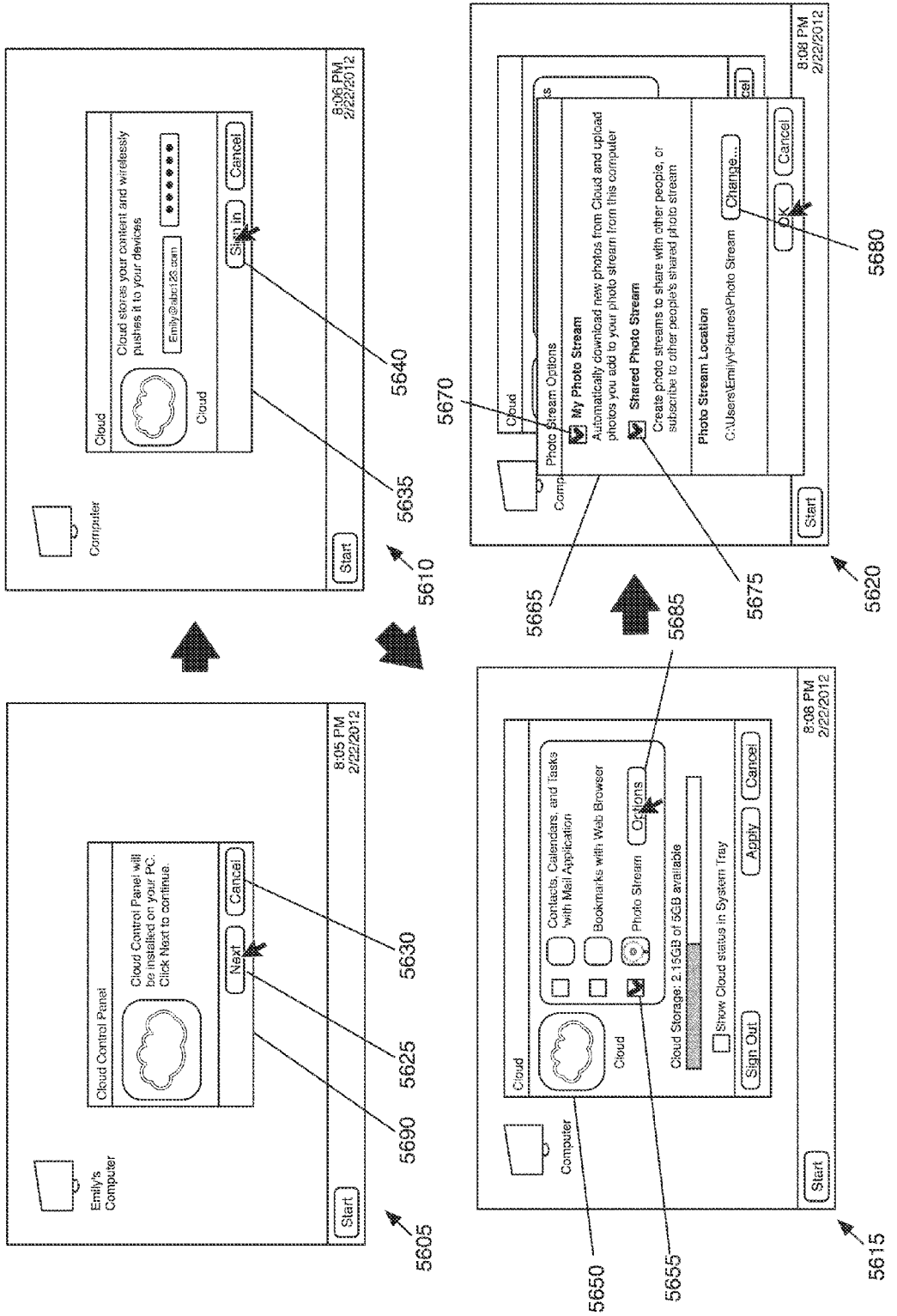
FIG. 56 provides an illustrative example of installing and configuring the image sharing tools.

In some embodiments, the image sharing tools are integrated into an OS upon executing an installer program. FIG. 56 provides an illustrative example of installing and configuring the image sharing tools. Four operational stages 5605-5620 of the owner's personal computer (PC) are illustrated in this figure.

The first stage 5605 illustrates the OS's desktop. The owner has selected the installation program (e.g., executable file) to display an installation window 5690. The owner might have first downloaded the installation program using a web browser (not shown) or obtained it from a storage device (e.g., hard disk, flash driver, etc.). As shown, the installation window 5690 includes a heading indicating that it is installing a control panel item for configuring the image sharing tools. In addition to the heading, the installation window includes a message that the control panel item will be installed on the PC. The control panel is a part of the OS's GUI that allows users to configure different software and hardware settings. In the first stage 5605, the user selects (e.g., with a cursor click operation) a next button 5625. Alternatively, the user can select a cancel button 5630 to cancel the installation of the image sharing tools.

The second stage 5610 illustrates the OS's desktop after installing the control panel item. Specifically, the control panel item has been opened to display a login window 5635. The owner has typed in a username (e.g., an email address) and password into a username field and a password field, respectively. The user might have first created an account with a cloud service provider in order to register the username and password. The user then selects a sign-in button 5640 to sign in with the cloud service provider. As will be described in detail below, the cloud service provider of some embodiments facilitates the image sharing operations between different user devices.

The selection of the sign-in button 5640 results in the display of a cloud service control panel window 5650 (herein after a settings menu), as illustrated in the third stage 5615. The settings menu 5650 includes several selectable items (e.g., check boxes) for synchronizing bookmarks across user devices. The settings menu 5650 may also include selectable items for syncing calendars and other data.

In the example illustrated in the third stage 5615, the settings menu 5650 includes a selectable item 5655 for selecting a photo stream and a button 5685 for setting photo stream options. The user can select (e.g., through a cursor click operation) this item to turn on or off the image streaming features. When selected, the owner's PC may be registered with the cloud service provider to share images with other devices associated with the owner and/or different users. In addition, the selection of this item 5655 may cause the image sharing tools to be integrated in the OS's shell.

In the third stage 5615, the owner selects the button 5685. As shown in the fourth stage 5620, the selection results in the display of a photo stream options window 5665. This window list a first selectable item 5670 for turning on or off the owner's personal photo stream, and a second selectable item 5675 for turning on or off shared photo streams. That is, the window 5665 includes separate controls for activating a personal photo stream that is shared across only the user's device, and for activating a shared photo stream that is shared with other users. The window 5665 also includes a control 5680 to specify the location of the photo stream folder (e.g., that contain folders for the personal and shared photo streams). The window 5664 may also include one or more controls for blocking or allowing notifications (e.g., photo stream invitations, comment notifications, new image notifications) from people that are not in the user's address book or contact list. In some embodiments, the window 5665 include other options to turn on or off sending or receiving photos stream invitations, showing notifications in a notification area (e.g., a system tray on a taskbar), receiving invitations from only those in the owner's contact list, etc.

B. Creating a New Photo Stream

Figure 57:
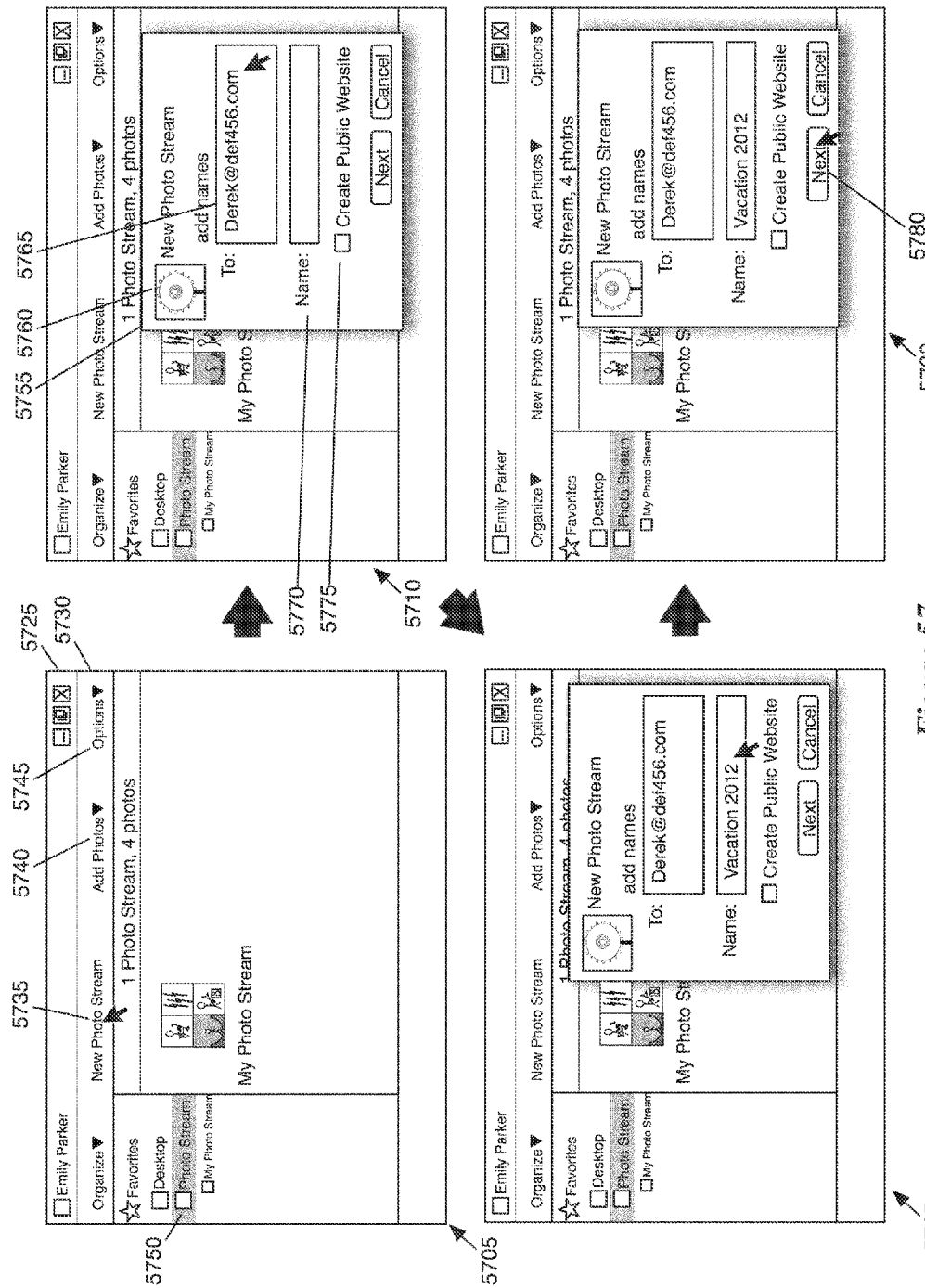
FIG. 57 illustrates an example of specifying a subscriber and a name for the photo stream.

The previous example illustrates installing and configuring image sharing tools on the owner's PC. Once configured, the image sharing tools allow a user to create and modify a photo stream and share comments with other users (e.g., regarding images). An example of creating a photo stream will now be described by reference to FIGS. 57-58. Specifically, FIG. 57 illustrates an example of specifying a subscriber and a name for the photo stream. This is followed by FIG. 58, which illustrates selecting images for the photo stream and inputting comments for several of the images.

Four operational stages 5705-5720 of the OS are illustrated in FIG. 57. As shown, the OS is displaying a browser or explorer window 5725. The image-sharing tool has been integrated into the browser window 5725. Specifically, the browser's menu bar 5730 includes a new photo stream menu item 5735 for creating a new photo stream, add photos menu item 5740 for adding images to an existing photo stream, and an options menu item 5745 for specifying options for the photo stream. In some embodiments, the selection of the add photo menu item 5740 causes the browser 5725 to display a list of available photo streams to add one or more selected images. In some embodiments, the selection of the options menu item 5745 causes the OS to display different options for adding a new subscriber, deleting a subscriber, resending a photo stream invitation, and/or turning on or off web publication for the photo stream. The displayed options may also include an option for unsubscribing from a photo stream. This unsubscribe option may only be selected or displayed when the photo stream (e.g., the photo stream displayed in the browser 5725) is one that was subscribed to by the PC's user.

In addition to the new menu items, the browser's hierarchical or tree view includes a photo stream item 5750 (hereinafter a photo stream folder) with a photo stream icon. The photo stream folder 5750 includes a sub folder for the photo stream that is shared only by the owner's devices.

As shown in the first stage 5705, the owner selects (e.g., through a cursor click operation) the new photo stream menu item 5735. The selection causes the OS to display a photo stream options window 5755, as illustrated in the second stage 5710. This window 5755 includes the photo stream icon 5760 on the top left-hand corner with a heading that states "New Photo Stream". Beneath the heading is a subscriber field 5765 for inputting subscribers for the photo stream. The subscriber field 5765 is followed by a name field 5770 for specifying a name for the photo stream and a selectable item (e.g., a check box 5775) for turning on or off the option to publish the photo stream to a website (e.g., a public website).

In the second stage 5710, the owner inputs an email address of a potential subscriber. The owner can input one or more email addresses of other potential subscribers into this field 5765. As shown in the third stage 5715, the user then inputs a title or name for the photo stream in the name field 5770. In the fourth stage 5720, the user then selects a next button 5780 to continue creating the photo stream.

Figure 58:
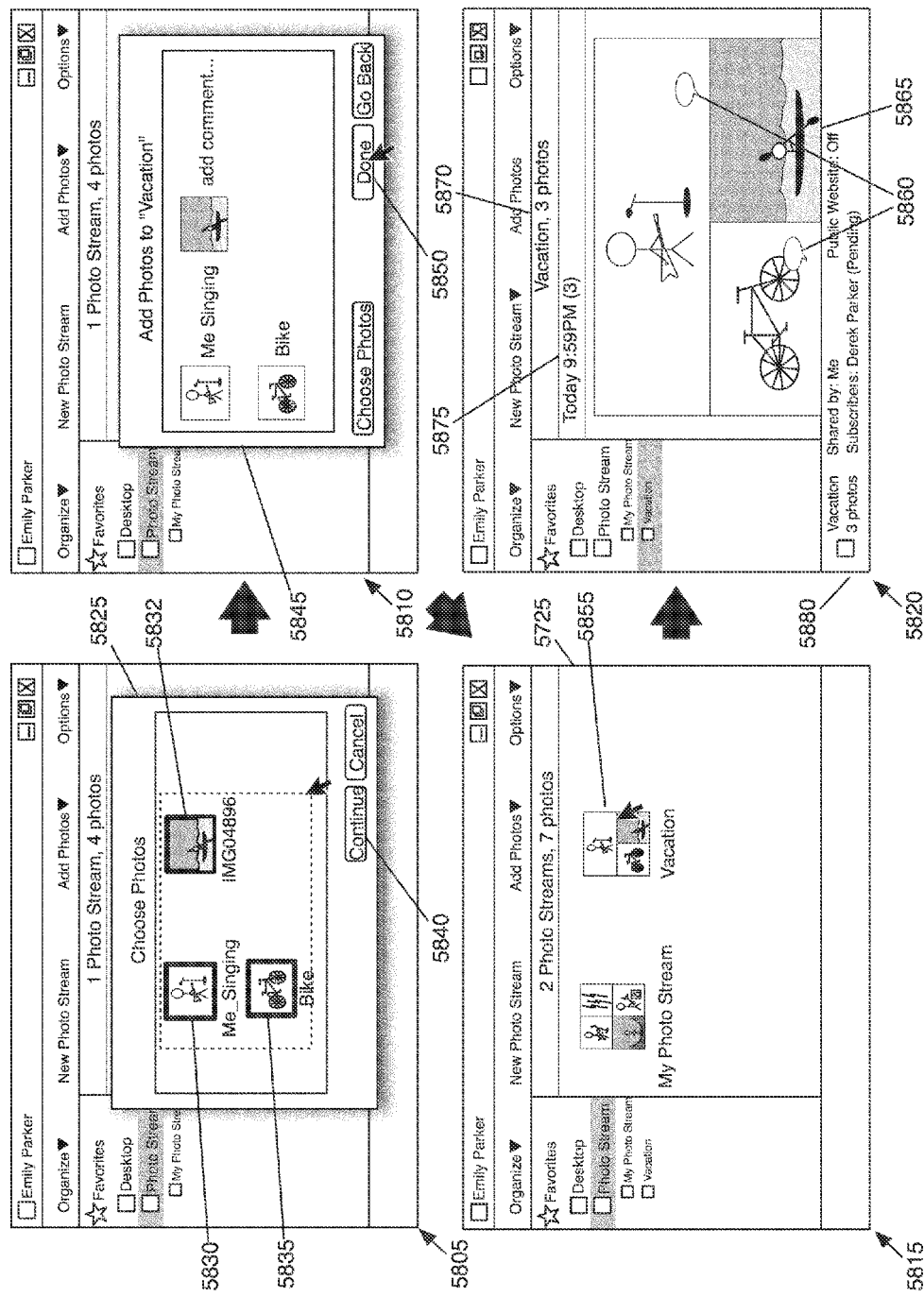
FIG. 58 illustrates selecting images for the photo stream and inputting comments for several of the images.

FIG. 58 illustrates the OS after the selection of the next button 5780. Four operational stages 5805-5820 of the OS are illustrated in this figure. In the first stage 5805, the owner selects several images for the photo stream. Specifically, the images are selected using a choose photos window 5825. The first image 5830 is named "Me_Singing", the second image 5832 is named with a default name (e.g., one specified by a camera), and the third image 5835 is named "Bike". After choosing the images, the user then selects a continue button 5840.

The second stage 5810 illustrates the OS after selecting the continue button 5840. As shown, the selected images are displayed in a comments window 5845. The comments windows 5845 displays each selected image with a field to associate a comment with the selected image. In some embodiments, the comment field is automatically populated based on the name of the image. For example, one or more installed components of the image sharing tools may analyze the filename of the image and determine whether to input the filename as a comment.

The filename may be analyzed using a number of different techniques. In some embodiments, the analysis entails identifying one or more words, names, or people in the filename. The analysis may entail identifying random names that are generated by different image capturing devices (e.g., digital cameras, smart phones, tablets). The analysis may also entail identifying different characters (e.g., underscore) and replacing them with a space. In the example illustrated in the second stage 5810, the first image 5830 and the third image 5835 are associated with their corresponding filenames. In addition, the underscore in the name of the first image 5830 has been replaced with a space for the first image's comment. The owner can modify any one of these comments by inputting a new comment in the corresponding comment field.

As shown in the second stage 5810, the owner selects a done button 5850 to create the new photo stream. The third stage 5815 illustrates the browser 5725 after creating the photo stream. As shown, the new photo stream folder 5855 is displayed on the browser 5725. The new photo stream folder 5855 is displayed with an icon that provides a visual indication of the images in the photo stream. Specifically, the icon includes thumbnail representations of the three images 5830-5835 in the photo stream. The thumbnails are also sized differently. That is, the first thumbnail image is shown larger than the other two thumbnail images. In addition to the photo stream folder 5855, the new photo stream is listed in the browser's hierarchical or tree view 5750.

The fourth stage 5820 illustrates the browser 5725 after the owner has selected the photo stream folder icon 5855. The selection results in the browser 5725 displaying the images in the photo stream. In the example illustrated in the fourth stage 5820, each of the images 5830-5835 associated with a particular comment is shown with a marking 5860 (e.g., a comment bubble). The marking 5860 provides a visual indication to the owner as to the association of the particular comment with the corresponding image. In some embodiments, the color of the marking indicates whether the image is associated with one or more unread comments. For instance, a first color (e.g., white) may indicate that there are no unread comments associated with an image, and a second different color (e.g., blue) may indicate that there are one or more unread comments associated with the image.

Here, the batch view 5865 includes a photo stream heading 5870 that identifies the name of the photo stream and the number of images in the photo stream, a batch heading 5875 that identifies the date and time when the images were added to the photo stream and the number of images in the batch. The batch heading 5875 is followed by the images in the photo stream. In presenting the images, the image sharing tools select a particular layout based on the number of images and/or the orientations of those images. Several examples of selecting different layouts are described above by reference to FIGS. 42-47.

As shown in the fourth stage 5820, the browser window 5725 displays additional information (e.g., metadata) associated with the photos stream. Specifically, the browser's metadata section 5880 lists (1) the name of the photo stream, (2) the owner of the photo stream, the number of images in the photo stream, (3) each subscriber with corresponding subscription status, and (4) a public website status stating that the feature of publishing to the public website is not activated or turned on for this photo stream.

C. Accepting the Invitation

In the previous two examples, the owner creates a new photo stream using the image sharing tools that are integrated into the browser. Once the new photo stream is created, a photo stream invitation is pushed to one or more devices associated with the person invited to the photo stream. One or more of these devices may be the same type of computing device (e.g., a PC) or some other type of device with a different platform (e.g., a smart phone, tablet, digital media receiver, etc.).

Figure 59:
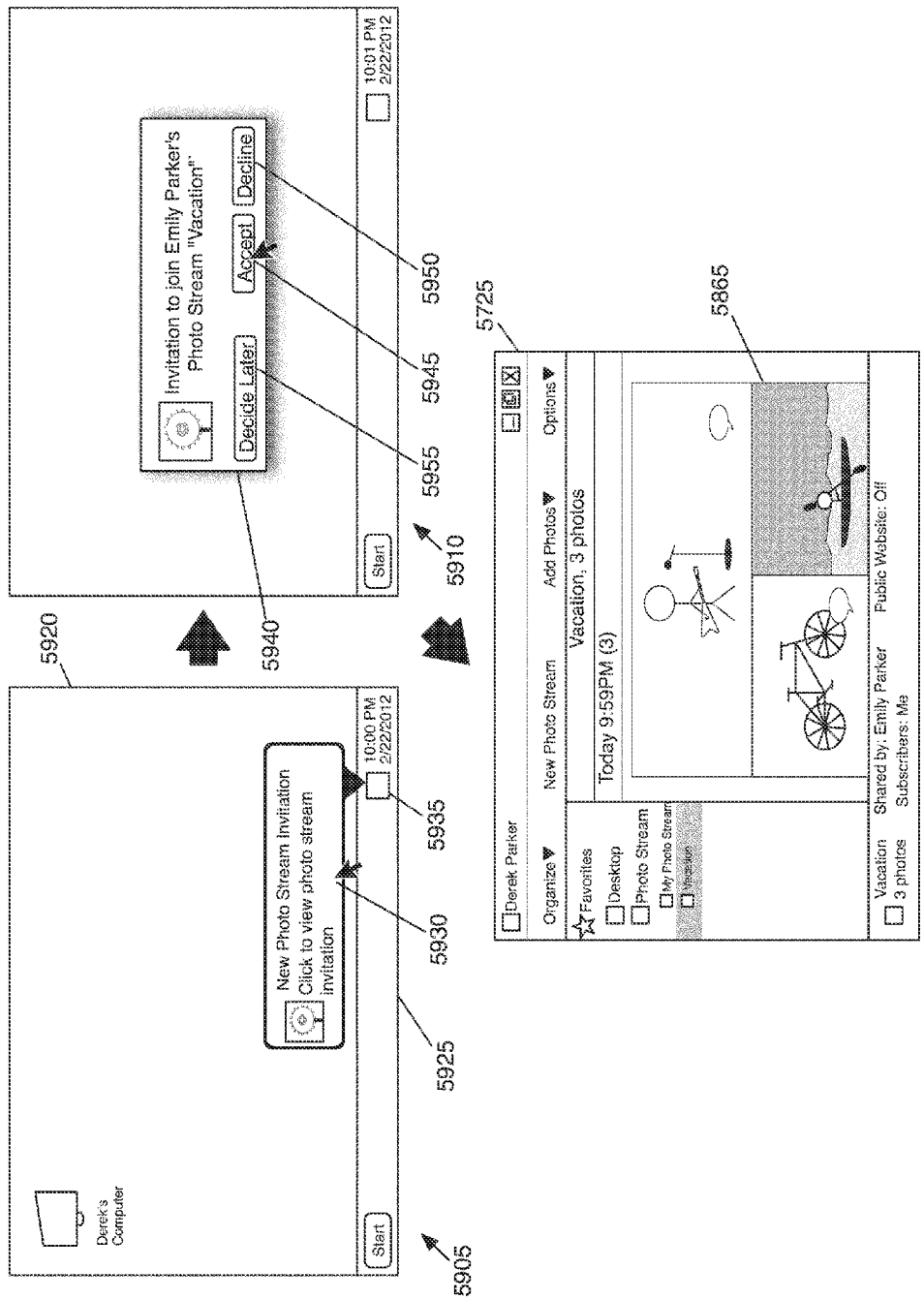
FIG. 59 provides an illustrative example of accepting a photo stream invitation with a subscriber's device.

FIG. 59 provides an illustrative example of accepting a photo stream invitation with a subscriber's device. In this example, the subscriber's device is a PC that is running the same OS as the owner's device. Three operational stages 5905-5915 are shown in this figure. The figure includes the OS's desktop 5920 and taskbar 5925.

The first stage 5905 illustrates an example notification that is received via the taskbar 5925. As shown, the notification appears as a pop-up window 5930 (e.g., bubble). In some embodiments, the pop-up window 5930 appears over a cloud service system tray icon 5935 in the task bar 5925. As shown, the pop-up window 5930 includes a photo stream icon and a notification stating that a new photo stream invitation has been received. The notification also states how to select (e.g., click) the window to view the photo stream invitation.

In the first stage 5905, the recipient selects the pop-up window 5930. The selection causes the OS to display the photo stream invitation window 5940, as illustrated in the second stage 5910. The invitation includes the photo stream icon and the invitation. The invitation states the owner and name of the photo stream. The photo stream invitation window 5940 also includes an accept button 5945 to accept the invitation, a decline button 5950 to decline it, and a decide later button 5955 to keep the invitation pending.

The third stage 5915 illustrates the OS after the recipient has accepted the invitation. The selection results in a window browser 5725 displaying the images in the photo stream. Similar to the owner's device, the images are displayed in the batch view 5865.

D. Modifying a Photo Stream

Figure 60:
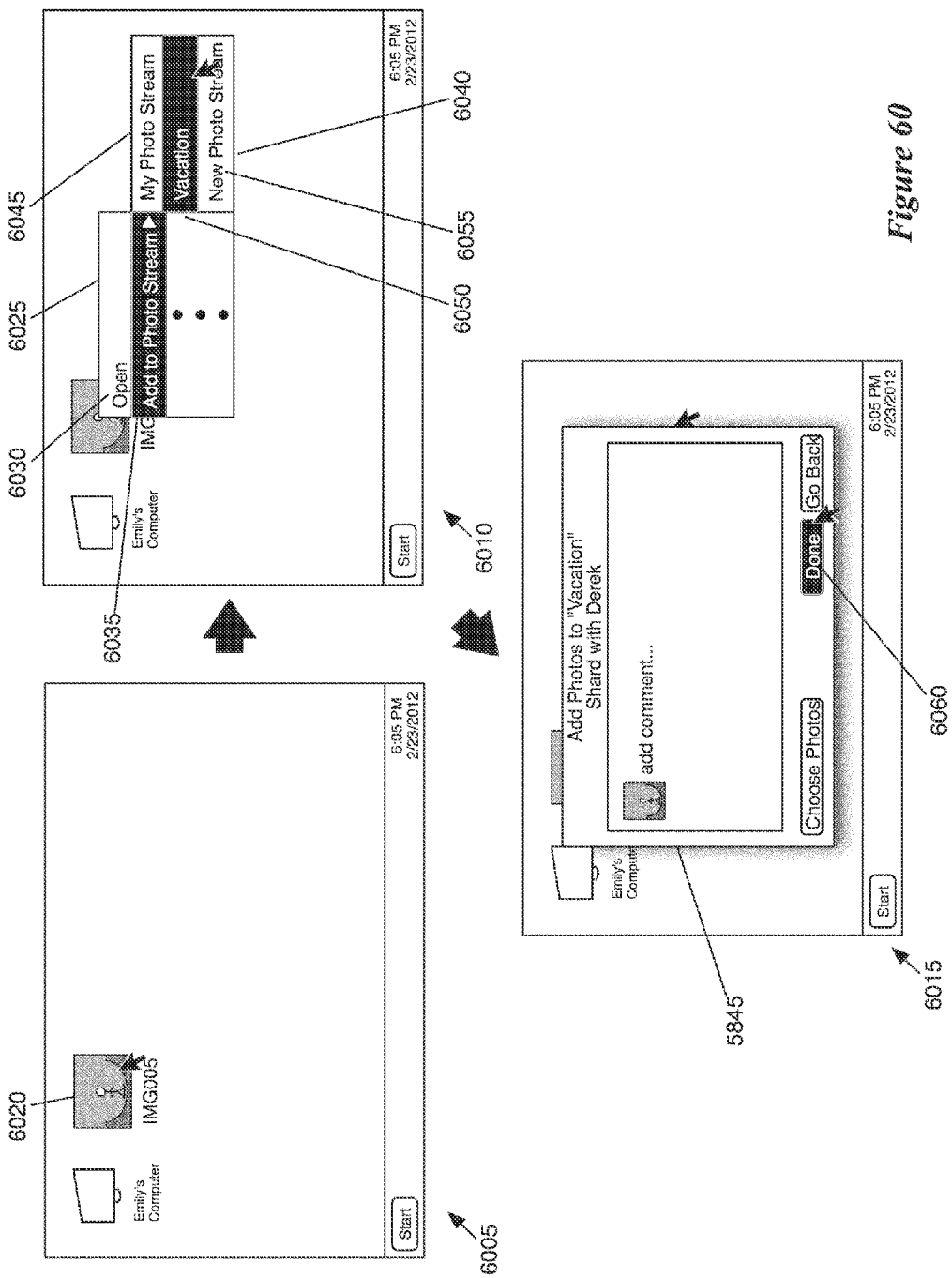
FIG. 60 provides an example of adding an image to a photo stream.

In the previous example, the recipient accepts a photo stream invitation to view images in the photo stream. In some embodiments, the image sharing tools can be used to add or delete images from the photo stream. FIG. 60 provides an example of adding an image to a photo stream. Three operational stages 6005-6015 of the owner's PC are illustrated in this figure.

In the first stage 6005, the OS displays its desktop. The desktop includes an icon 6020 for an image file. The owner selects (e.g., by selecting the right-click button on the cursor controller, or holding a modifier key and selecting the left-click button) the image icon 6020 from the desktop.

As shown in the second stage 6010, the selection causes the OS to display a context menu 6025. The context menu 6025 includes a menu item 6030 to open the image file. The context menu 6025 also includes a menu item to add to photo stream 6035 for adding one or more selected images to a particular photo stream. This context menu 6025 is an extension to the shell (e.g., when the cloud service control panel was installed on the owner's PC). In some embodiments, the menu item to add to photo stream 6035 only appears upon turning on the image sharing feature (e.g., by selecting a check box in the cloud service control panel (not shown)).

In the second stage 6010, the owner has selected the menu item to add to photo stream 6035. The selection results in a list of existing photo streams displayed in a sub-menu 6040. The sub-menu 6040 includes a menu item 6045 to add the selected image to the owner's personal photo stream, a menu item 6050 to add it to a photo stream shared with a subscriber, and a menu item 6055 to add it to a new photo stream. Here, the owner selects the menu item 6050 to add the selected image to the photo stream that is shared with the subscriber.

The third stage 6015 illustrates the OS after selecting the menu item 6050. As shown, the selected image is displayed in the comments window 5845. As mentioned above, the comments windows 5845 displays each selected image with a field to associate a comment for the selected image. In the third stage 6015, the owner selects the done button 6060 to add the selected image to the photo stream.

The previous example illustrated one of several different ways one or more selected images can be added to a photo stream. In conjunction with or instead of the context menu, the image sharing tools of some embodiments allow an owner to add images to a photo stream by dragging and dropping images onto the photo stream folder. The owner can also delete one or more selected images from the photo stream folder. When deleted, the images may be deleted from one or more of the owner's other devices and/or one or more of each subscriber's device. In some embodiments, the owner can delete the photo stream folder to delete the entire photo stream from one or more of the owner's other devices and/or one or more of each subscriber's device.

E. Commenting

Figure 61:
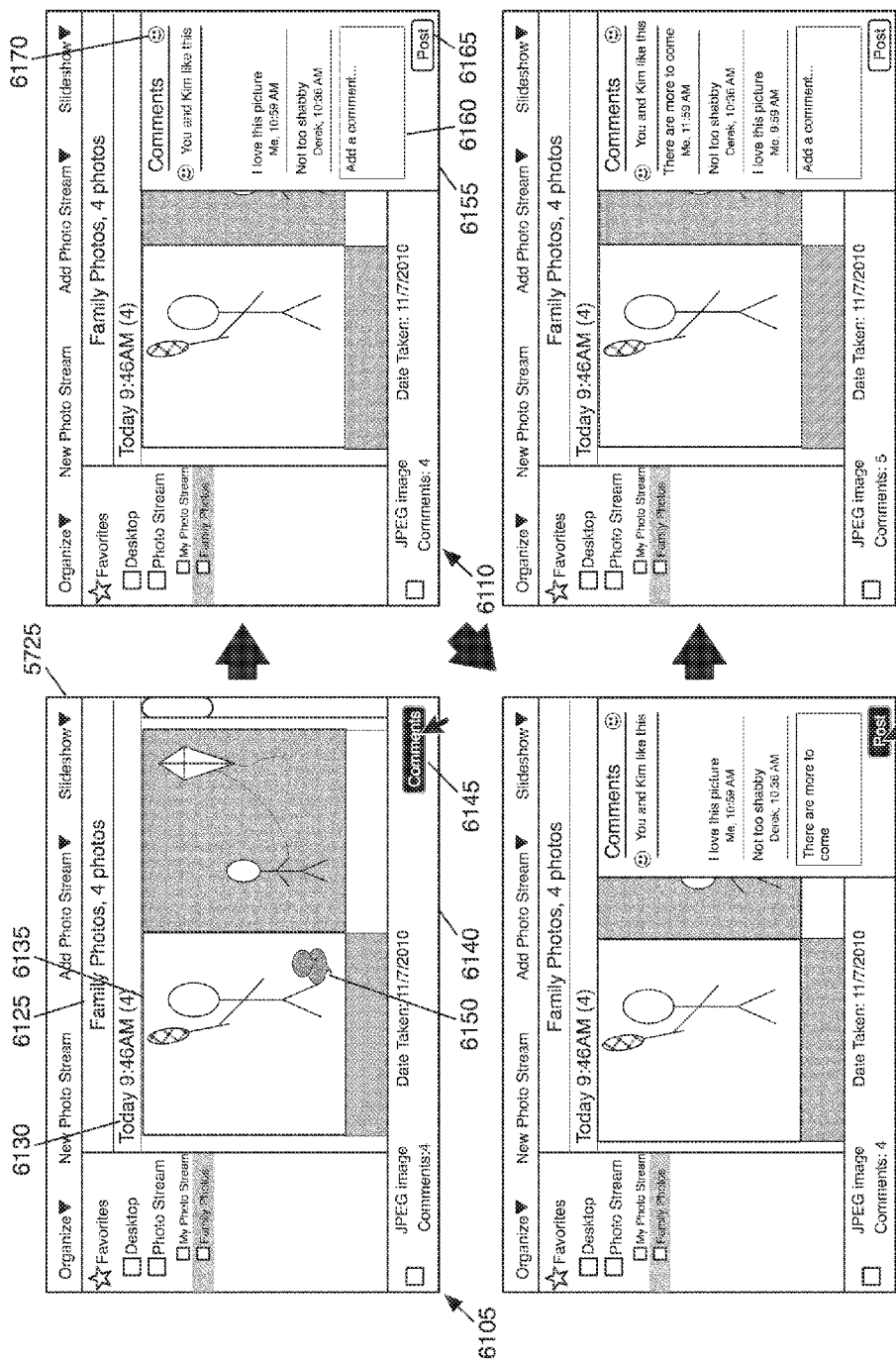
FIG. 61 provides an illustrative example of leaving a comment using a PC.

Several examples of commenting with different devices have been described above. These examples include commenting using a smart phone, tablet, and a digital media receiver. FIG. 61 provides an illustrative example of leaving a comment using a PC. Four operational stages 6105-6120 of the user's PC are illustrated in this figure.

In the first stage 6105, the browser 5725 displays images in a photo stream. The heading 6125 includes the name of the photo stream and the number of images in the photo stream. The sub-heading 6130 includes the date and time that the group of images was added to the photo stream. The first image 6135 has been selected from the browser 5725. The selection results in the display of the image's metadata in the metadata section 6140. Specifically, the metadata section 6140 states (1) the image format (e.g., JPEG, GIF, PNG), (2) the date (e.g., timestamp, file creation date) associated with the image, and (3) the number of comments associated with image. The metadata section also includes a comments button 6145 for opening a comments tool that is described below.

As shown in the first stage 6105, the image 6135 is associated with four comments. A marking 6150 is displayed over the image 6135 on the lower right-hand corner. The marking 6150 (e.g., the double comment bubble) indicates that the user is a part of the conversation. That is, the user has previously left at least one comment regarding the image 6135 and a subscriber has left at least one other comment regarding the same image. The color of the marking 6150 indicates that there are one or more unread comments.

The first stage 6105 illustrates the selection of the comments button 6145. The selection causes the browser 5725 to display the comments tool 6155, as illustrated in the second stage 6110. The comments tool 6155 appears as a side bar of the browser. In this example, the comments tool 6155 is shown on the right side of the browser 5725. The comments tool includes a comment field 6160 for inputting a comment and a post button 6165 to post the comment. The comment field 6160 displays a line of text that invites the user to add a comment. The comments tool 6155 is displayed with a heading "Comments". Adjacent to the heading is a selectable item or selectable icon 6170 (e.g., of a heart, smiley face) that can be selected to indicate that the user approves or likes the images.

As shown in the second stage 6110, the comments are listed under the comments heading. Specifically, there are four comments associated with the image 6135. As shown by the comments' metadata, the user has left one comment at one time and the subscriber has left another comment at another time. The remaining two comments are attributed to the selections of the selectable item 6170. Accordingly, the image sharing tools of some embodiments counts the number of approvals or likes as comments.

The third stage 6115 illustrates the comments tool 6155 after the user has inputted a comment into the comment field 6160. The user then selects the post button 6165 to post the comment. As shown in the fourth stage 6120, the new comment has been added into the comments tool 6155. Specifically, the new comment has been displayed at the top of the comments list but below the approval ratings. The number of comments displayed in the metadata section 6140 has also been incremented by one. In the example described above, a number of different comments are listed in the comments tool 6155. When the number of comments exceeds the display area of the comments tool, the comments tool of some embodiments provides a scroll bar for scrolling through the comments.

Figure 62:
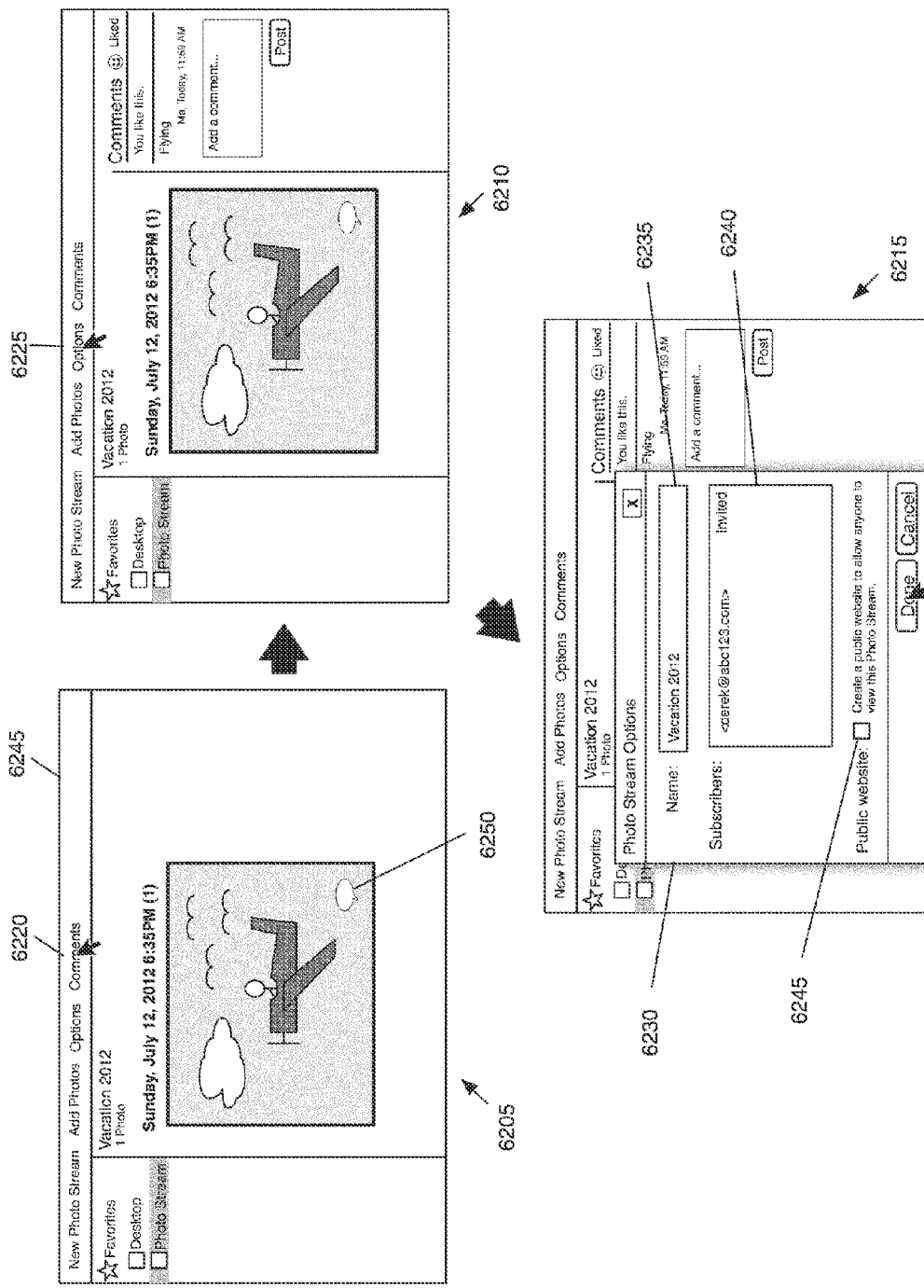
FIG. 62 provides an illustrative example of an alternate embodiment of the integrated image sharing tools.

Several examples of the integrated image sharing tools are described above. FIG. 62 provides an illustrative example of an alternate embodiment of the integrated image sharing tools. Three operational stages 6205-6205 of the user's PC are illustrated in this figure. FIG. 62 is similar to the ones described above. However, the image sharing tools do not include a bottom section that displays information about a shared photo stream or its images. As described above, the bottom section contained a comment button for showing comments. Instead of the comment button, the menu bar 6245 includes a menu item 6220. The menu item can be selected to display any comment associated with a selected image and/or to leave a comment regarding the image. Alternatively, the user can select the comment bubble 6250 to display or leave comments.

In the example illustrated in FIG. 62, the menu bar 6245 includes a menu item 6225 for displaying a photo stream option window 6230. The photo stream options window may also be displayed through a context menu item. The window 6230 is similar to the options sheet described above by reference to FIG. 21. Specially, the window includes a name field 6235 for specifying the name of the shared photo stream, a subscriber field 6240 for adding or removing subscribers, and a control 6245 (e.g., a checkbox) for specifying whether the shared photo stream is published to a public website. In some embodiments, the image sharing tools provide different controls depending on whether the user is an owner or subscriber. For instance, the photo stream options window 6230 may include a control (e.g., button) for unsubscribing from a subscribed photo stream when the browser window displays images from the subscribed photo stream.

IX. Image Organizing and Editing Application

The previous section describes several examples of how the image sharing tools are provided in one computing platform (e.g., Windows platform). Several examples of the image sharing tools on another computing platform will now be described below by reference to FIGS. 63-65. In these examples, the image sharing tools are integrated into an image organizing and editing application that operates on a Mac Operating System (e.g., Mac OS X). The OS may include one or more other applications (e.g., a professional image editing and management application) that include the same or similar image sharing features.

A. Image Sharing Tools in an Image Organizing and Editing Application

Figure 63:
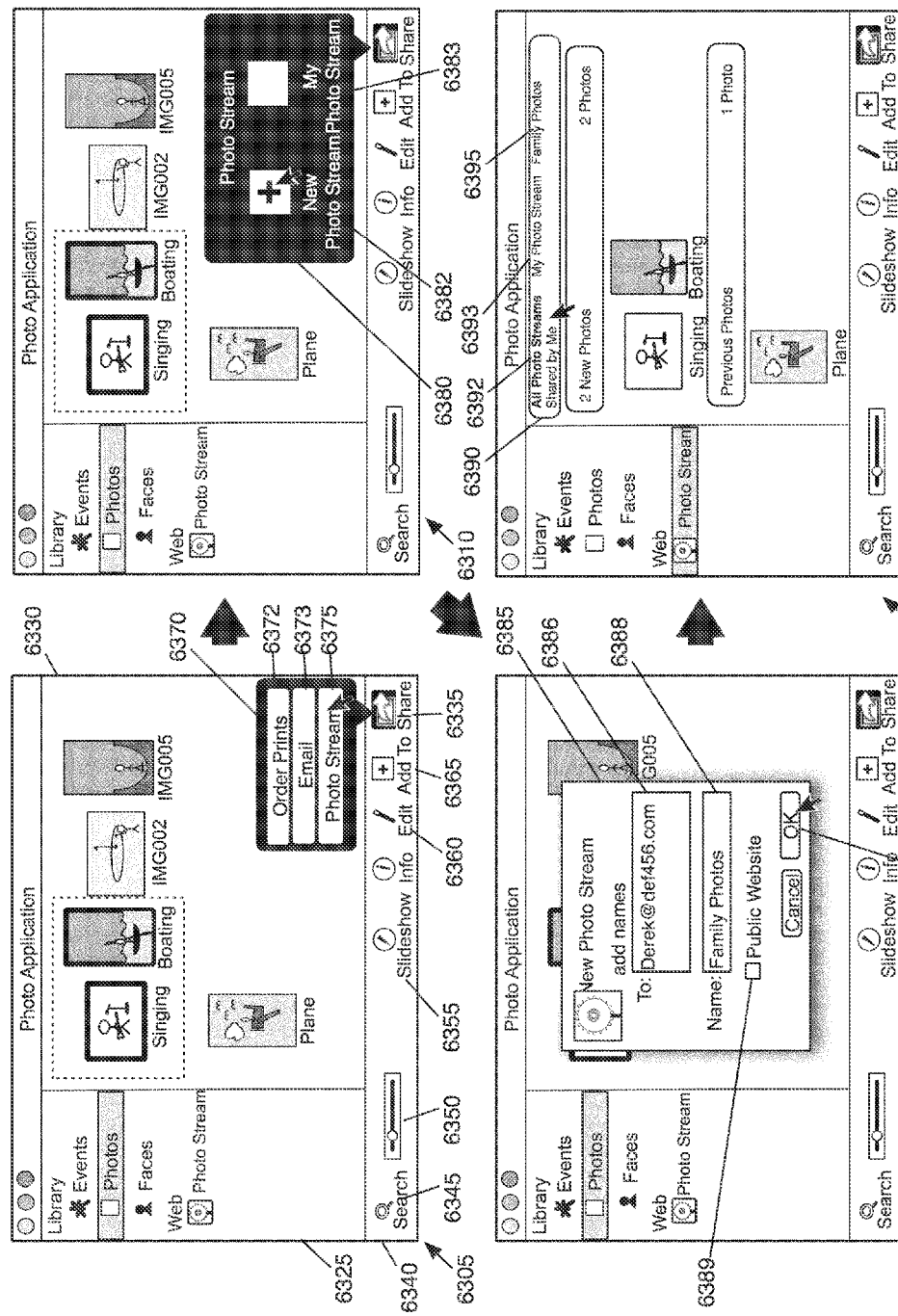
FIG. 63 provides an illustrative example of the image sharing tools that are integrated into an image organizing and editing application.

FIG. 63 provides an illustrative example of the image sharing tools that are integrated into an image organizing and editing application. Specifically, this figure illustrates in four operational stages 6305-6320 how an owner can create a photo stream using the image organizing and editing application.

As shown in the first stage 6305, the name of the application is "Photo Application". The photo application includes (1) a sidebar 6325 that displays different collections of images, (2) an image display area 6330 that displays images in a collection, and (3) a share button 6335 to share one or more images selected from the image display area 6330. The photo application also includes a bottom bar 6340 that displays different tools, such as a search tool 6345 for searching images, a slider 6350 for resizing images in the image display area 6330, a slide show tool 6355 for playing a slideshow of images in a collection, an edit button 6360 for selecting different editing operations (e.g., removing red eye, cropping, enhancing, etc.) to perform on a selected image. In addition, the bottom bar 6340 includes an add to button 6365 for adding selected images to a particular collection (e.g., an album, a photo stream, etc.) and a share button 6335 for sharing the selected images.

The first stage 6305 illustrates selecting a photo stream option using the share button 6335. As shown, the "Photos" collection has been selected from the side bar 6325. Based on the selection, the image display area 6330 displays thumbnail representations of the images in the collection. The owner has selected two images from the image display area 6330. To share these images, the owner has also selected the share button 6335. The selection of the share button results in the display of a pop-up window 6370. The pop-up window 6370 includes a list of share options. Here, the list includes an option 6372 to order prints of the selected images, an option 6373 to email the images, and an option 6375 to create a photo stream using the images.

As shown in the first stage 6305, the owner selects the photo stream option 6375 from the pop-up window 6370. The selection causes the application to display other options in a pop-up window 6380, as illustrated in the second stage 6310. The pop-up window 6380 includes an option 6382 to create a new photo stream using the selected images and an option 6383 to add the selected images to a previous created photo stream. In this example, the previously created photo stream is the owner's personal photo stream. As mentioned above, the personal photo stream represents a group of images that are streamed or pushed to those devices associated with one owner (e.g., the owner). A slider for scrolling through different photo streams may be presented on the pop-up window 6380 (e.g., when all of the different photo streams cannot be listed in its limited space).

The third stage 6315 illustrates the photo application after the selection of the new photo stream option 6382. The selection causes the application to display a photo stream options window 6385. This window includes the photo stream icon on the top left-hand corner with a heading that states "New Photo Stream". Beneath the heading is a subscriber field 6386 for designating subscribers for the photo stream. The subscriber field 6386 is followed by a name field 6388 for specifying a name for the photo stream and a selectable item (e.g., a check box 6389) for turning on or off the option to publish the photo stream to a website (e.g., a public website).

In the third stage 6315, the owner has inputted an email address of a potential subscriber. The owner can input one or more email addresses of other potential subscribers into this field 6386. The owner has also inputted a name for the photo stream in the name field 6388. As shown, the owner then selects the OK button 6387 to create the photo stream. In some embodiments, the application provides a window (not shown) to input a particular comment for one or more of the selected images.

The fourth stage 6320 illustrates the application after the owner has created the photo stream. As shown, the image display area 6330 includes a heading that includes a top bar 6390 that includes an option 6393 to display each image the personal photo stream, an option 6395 to display each image in the newly created photo stream, and an option 6392 to display all images in the different photo streams. Here, the image display area 6330 displays all the images as the option 6392 is selected from the top bar 6390. The image display area 6330 is also organized by new images and old images.

The new images are displayed at the top and the one previous image is displayed below. Each group of images includes a heading that states the group name (e.g., "New Photos", "Previous Photos") and the number of images in the group.

Conceptually, the application provides a form of a batch view that is different from the one that was discussed above (e.g., by reference to FIGS. 50-52). As illustrated in this figure, the previous or new image section can include multiple different batches. One reason for displaying the images in this format is that it makes more efficient use of screen real estate than the above-described batch view. In some embodiments, the application displays images in one view format and provides an option to display the images in another view format.

B. Accepting the Invitation

In the previous example, the owner creates a new photo stream using the image sharing tools that are integrated into the photo application. Once the new photo stream is created, a photo stream invitation is pushed to one or more devices associated with the person who was invited to the photo stream. One or more of these devices may be the same type of computing device or some other type of device with a different platform (e.g., a smart phone, tablet, digital media receiver, etc.)

Figure 64:
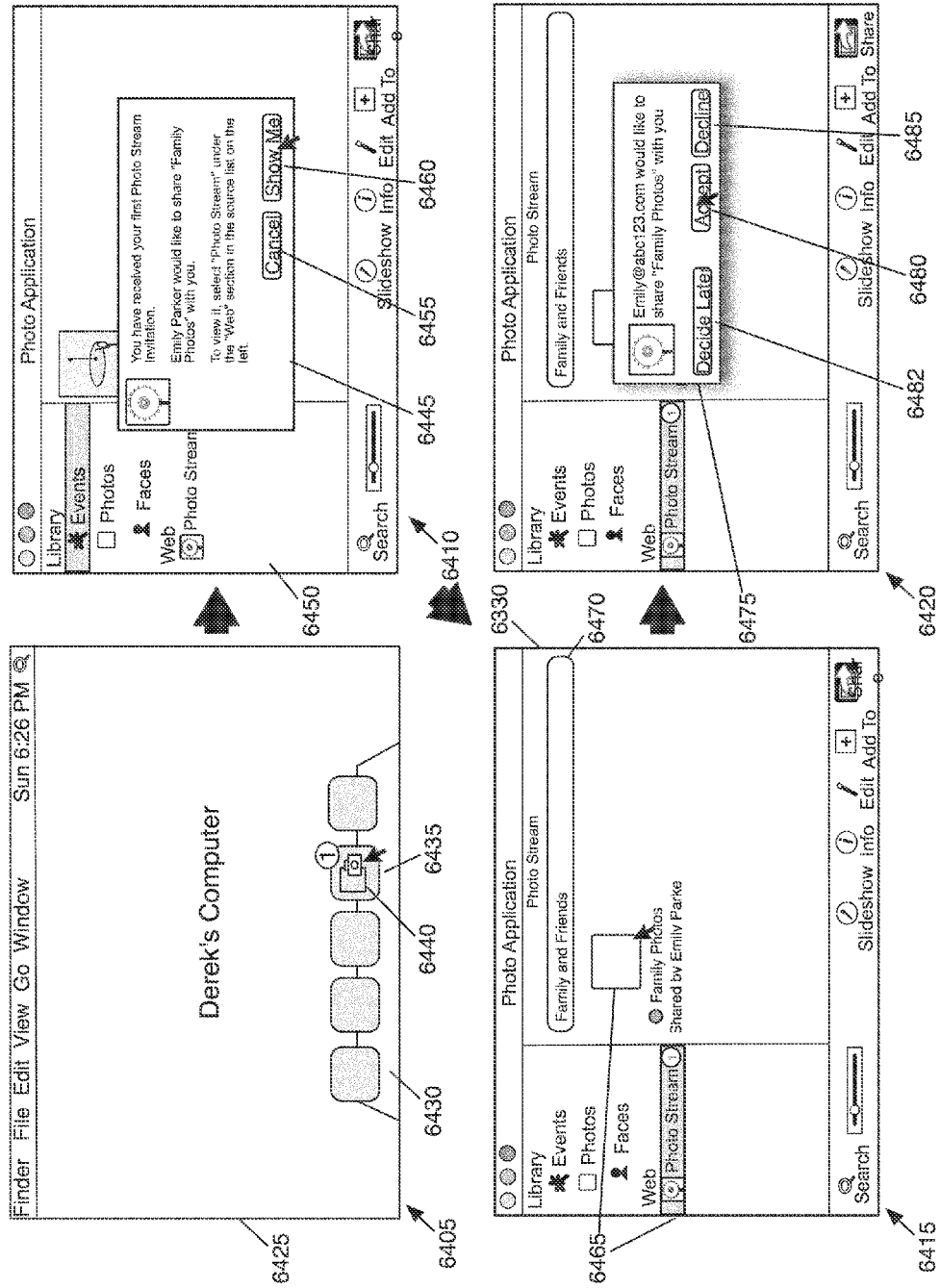
FIG. 64 provides an illustrative example of accepting a photo stream invitation with a subscriber's device.

FIG. 64 provides an illustrative example of accepting a photo stream invitation with a subscriber's device. In this example, the subscriber's device is the same type of device that is running the same OS as the owner's device. Four operational stages 6405-6420 are shown in this figure. The figure includes the OS's desktop 6425 and a dock 6430. The dock 6430 displays icons for opening different applications. As shown, the dock includes an icon 6435 for opening the photo application.

The first stage 6405 illustrates an example notification that is at the OS level. As shown, the notification appears as a marking on the application's icon 6435. One type of notification is a marking or a badge that appears at least partially over the application's icon. This is shown in the first stage 6405 as a badge 6440 that is displayed on the icon of the photo application. The badge 6440 includes a number (e.g., "1"). In the example illustrated in the first stage 6405, it indicates there is one new photo stream invitation. Alternatively, the badge may indicate that there is an update to one existing photo stream.

In the first stage 6405, the user selects the icon of the photo application on the dock 6430. The selection causes the photo application to open a pop up window 6445 that includes a message, as illustrated in the second stage 6410. The message states that the recipient has received a first photo stream invitation, and that the owner would like to share a photo stream with the recipient. The message also provides instructions for viewing the photo stream. Specifically, it states how to select the photo stream under the web section in the source list on the left (i.e., the side bar 6450). In some embodiments, the application displays this window only once upon the recipient receiving a first invitation. That is, the application may not display the window when another invitation is received at the recipient's device.

As shown, the window 6445 includes a show me button 6460 and a cancel button 6455. In some embodiments, the selection of the show me button 6460 causes the application to display a top level a photo stream menu. The cancel button 6455 closes the window. In the second stage 6410, the user selects the show me button 6460.

The third stage 6415 illustrates the application after the selection of the show me button 6460. The selection causes the application to display an icon representing the new photo stream 6465 in the image display area 6330. The photo stream 6465 has also been highlighted in the side bar 6450. The photo stream 6465 in the side bar is also marked with a number that indicates that there is a new invitation for a new photo stream or an update to an existing one. This marking provides the recipient with a visual indication at the application level, as opposed to a visual indication at the OS level.

As shown, the image display area 6330 is overlaid by a heading 6470 that state "Photo Stream". The name of the new photo stream is also marked with a marking. Here, the marking is a colored dot (e.g., a blue dot). Different from the markings described above, the marking here provides the recipient with a visual indication at the album level or photo stream level.

In the third stage 6415, the recipient selects the new photo stream 6465 from the image display area 6330. The selection causes the application to display a photo stream invitation window 6475, as illustrated in the fourth stage 6420. The invitation includes the photo stream icon and the invitation. The invitation originates from a device of the owner that shared the images. The invitation states the name and owner of the photo stream. The photo stream invitation window 6475 also includes an accept button 6480 to accept the invitation, a decline button 6485 to decline it, and a decide later button 6482 to keep the invitation pending. Here, the recipient selects the accept button 6480 to accept the invitation. Once accepted, the images in the photo stream may be downloaded and presented in the image display area 6330.

C. Commenting

Figure 65:
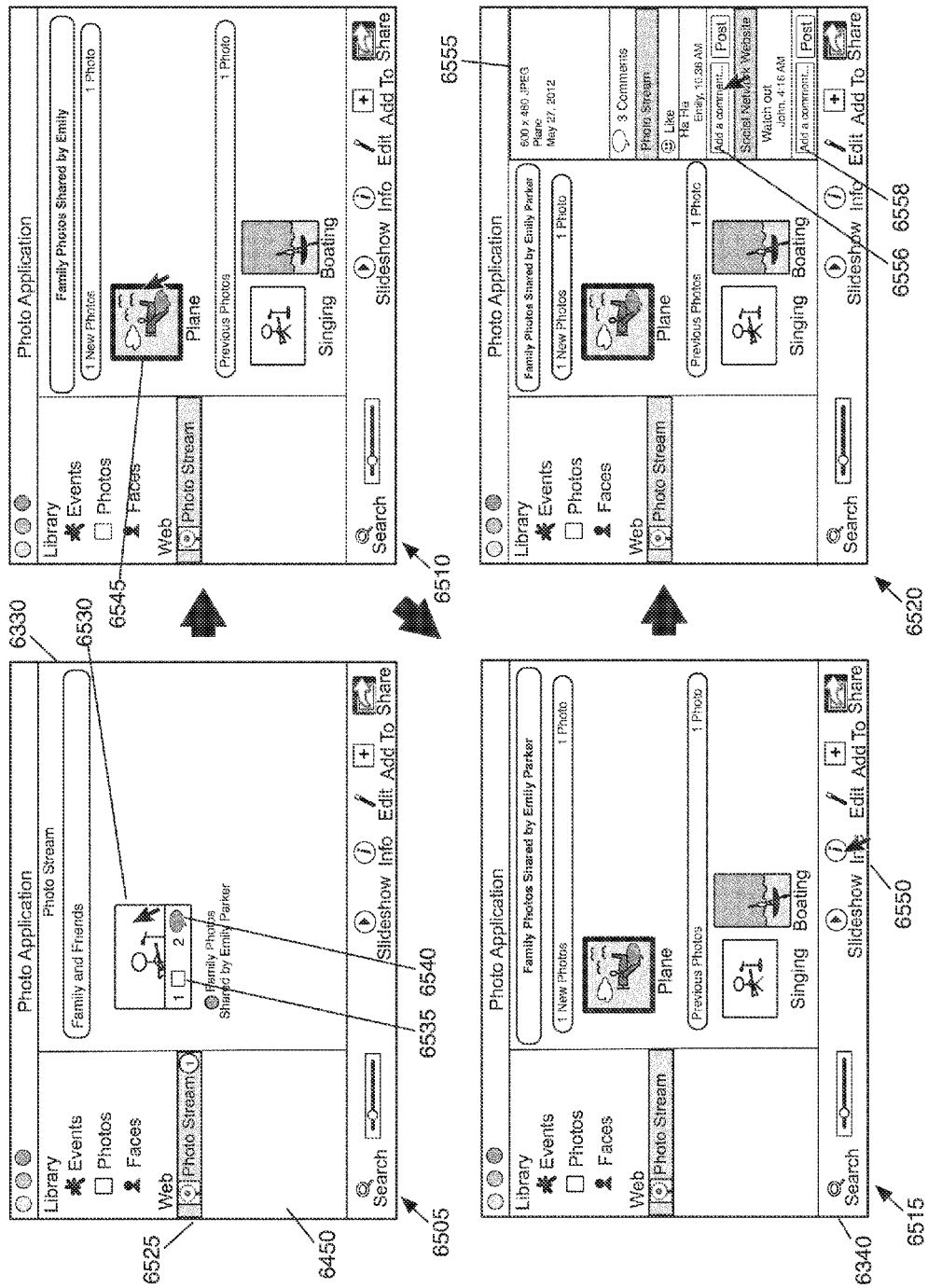
FIG. 65 provides an illustrative example of how the image sharing tools of some embodiments present comments on the photo application.

The previous example illustrated accepting a photo stream invitation on a subscriber's device. FIG. 65 provides an illustrative example of how the image sharing tools of some embodiments present comments on the photo application. Four operational stages 6505-6520 of the subscriber's device are illustrated in this figure.

The first stage 6505 illustrates the image display area 6330 displaying the photo stream. The user has added an image to the photo stream, and two new comments have been left for the image. In some embodiments, the application plays a sound when there is an update to a photo stream. For example, the application may play a ding sound, a bell sound, a ring sound, or some other sound to indicate there is an update to a photo stream (e.g., there is a new comment, new image, etc.) and/or when there is a new photo stream invitation. The application may play different sounds for different events, in some embodiments.

In the example illustrated in the first stage 6505, the application provides several different visual indications of an update to a photo stream. At the application level, the side bar 6450 displays a marking next to the photo stream 6525. Here the number (i.e., "1") indicates that there is an update to one photo stream. At the photo stream list or album list level, a photo stream representation (e.g., a thumbnail representation) may be marked with one or more markings. For example, the photo stream representation 6530 is marked with a number (i.e., "1") next to an image symbol 6535 (e.g., a photo icon) and a different number (i.e., "2") next to a comment symbol 6540 (e.g., a chat bubble). These markings provide a visual indication to the subscriber that there is one new image and two new comments.

In the first stage 6505, the user selects the photo stream representation 6530 from the image display are 6330. As shown in the second stage 6510, the selection causes the application to display thumbnail representations of the images in the photo stream. In some embodiments, the display is dynamically or automatically updated each time a person (e.g., the owner shares) additional images. At this photo stream level, the application provides another visual indication of the updates. For example, the images are batched into different sections (e.g., a new image section and a previous image section). Different from several of the batch view described above, the current batch view display images by displaying new images separately from all other images that were added previously. This can entail grouping previous sets or batches of images into one group (e.g., labeled previous photos). In addition, the thumbnail representation of the image is marked with a marking (e.g., a chat bubble). Many examples of such a marking are described above.

As shown in the second stage 6510, the thumbnail representation 6545 of the new image is associated with new comments. In the third stage 6515, the user selects an info button 6550 from the bottom bar 6340. The selection of the info button 6550 causes the application to display an info pane 6555, as illustrated in the fourth stage 6520.

The fourth stage 6520 illustrates the application displaying the info pane 6555. The info pane 6555 appears on the right hand side of the image display area 6330. The info pane displays information (e.g., metadata) associated with the selected image. In this example, the info pane 6555 lists (1) the image resolution, (2) the name of the image, and (3) a date or timestamp associated with the image. However, the info pane may list other information, such location information (e.g., based on GPS data associated with the image), people information (e.g., based on face detection algorithms), etc.

In addition to image info, the info pane 6555 lists comments associated with the image. In some embodiments, the application provides tools to send and receive comments across multiple different sources. This is illustrated in the fourth stage 6520 as the info pane 6555 lists comment from a subscriber of the photo stream as well as a comment that is received through a social network website. That is, the application is not only integrated with the image sharing tools but is also integrated with the social network website (e.g., through the website's API). This allows the info pane display area to display comments from people associated with the social network website as well as those people associated with the shared stream.

In the example illustrated in the fourth stage 6520, the comment section includes a heading that states the total number of comments that are received from both sources. Each source includes a heading. Specifically, the photo stream comment is listed under a photo stream heading and the social network comment is listed under a social network heading. Each of the two sections includes an add comment field to add a comment (i.e., 6556 or 6558) and a post button for adding comments. The photo stream section also includes an icon or symbol (e.g., a smiley face icon) that can be selected to indicate that the subscriber approves or likes the selected image. The social network website section may have a similar selectable item in some embodiments.

In the example described above, the info pane 6555 lists the image's metadata as well as the comments associated with the image. In some embodiments, the application displays other information relating to the photo stream in the info pane. For example, the photo application of some embodiments displays information regarding a photo stream. For example, when no image is selected in the image display area, the application may present the photo stream's name, a list of subscribers, or an indication of whether the public website version of the photo stream has been turned on or off. In some embodiments, the info pane can be used to modify the photo stream. For example, the info pane can be used to rename the photo stream, add or remove subscribers, resend an invitation or nudge the recipient, or turn on or off the public website version. When the public website is turned on, the info pane may list the URL of the public website.

X. Example System Architecture

Figure 66:
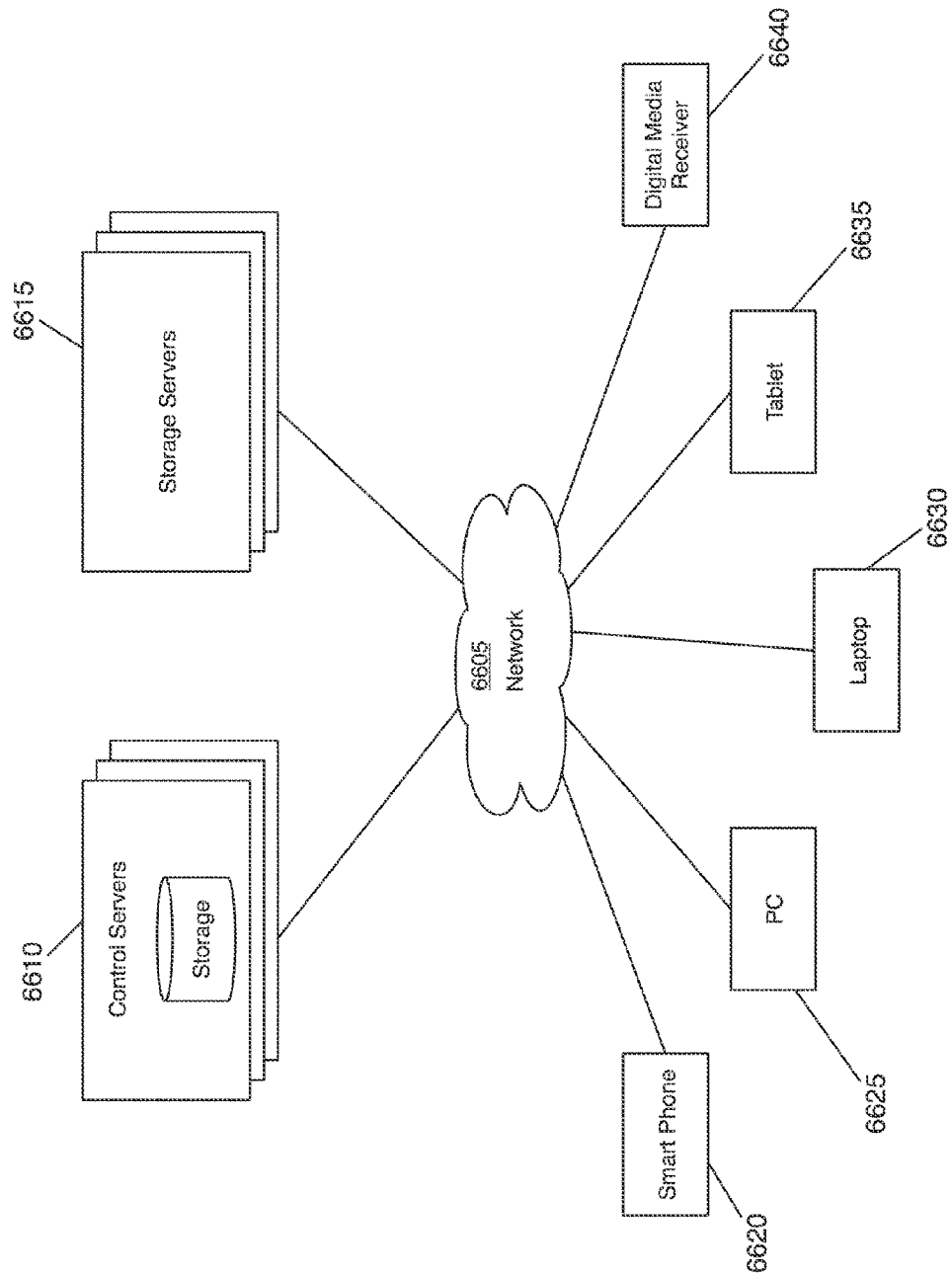
FIG. 66 conceptually illustrates an example system architecture in which the clients communicate with the different servers to share images and comments.

In some embodiments, the image sharing tools are implemented across different user devices and/or different platforms (e.g., from different vendors). To facilitate the image and comment sharing operations, the devices (hereinafter clients) may communicate with several different servers. These servers may include storage servers (e.g., third-party storage servers) and control servers. FIG. 66 conceptually illustrates an example system architecture in which the clients communicate with the different servers to share images and comments.

As shown in FIG. 66, the figure includes different clients 6620-6640, a set of control servers 6610 and a set of storage servers 6615. The clients are different computing devices that communicate with the control and storage servers over network 6605. Any one of these devices can be used to create a photo stream that includes a set of images, and invite one or more individuals to view and/or comment on the set of images. In the example illustrated in FIG. 66, the clients includes a smart phone 6620, a laptop 6630 (e.g., that operates on a MAC OS), a personal computer 6625 (e.g., that operate on a Windows OS), a tablet 6635, and a digital media receiver 6640. However, a client can be one of any number of different types of devices, such as a Personal Data Assistant (PDA), a workstation, etc.

The set of storage servers 6615 stores photo stream images for the different clients. The set of storages may be contracted by the cloud service provider (e.g., that manages the set of control servers 6610) to store content for the different clients. According, the set of storage servers may be a set of third-party servers. To facilitate the storage service, the set of third-party storage servers may be associated with an application program interface (API). The client devices may use this API to store and receive images stored by the third-party storage servers. The set of storage servers may store the images for a temporary period of time, in some embodiments.

The set of control servers 6610 manages control data associated with the different clients. Examples of such control data include user data, photo stream data (e.g., a list of photo stream albums associated with a user, a list of individuals that can access a particular photos stream), etc. The control data may include references to the images that are stored by the set of storage servers 6615. Thus, the set of control servers may maintain information relating to different shared streams, while not storing any of the images associated with those shared streams. However, the set of control servers may store comments associated images in the photo stream. To manage control data, each control server is associated with one or more storages (e.g., data stores). In some embodiments, the control server and the one or more storages is a logical partition in which data relating a particular user resides.

In some embodiments, the control server is configured to receive notifications from a client that one or more files are to be transmitted from the client. In response to such a notification, the control server sends, to the client, storage location data that indicates where the one or more files are to be sent. The storage location data may be data associated with a storage server. The client uses the storage location data to transmit the one or more files to the storage service.

The control server of some embodiments is a push server that pushes notifications (e.g., event triggers) to clients. For instance, when one user creates a shared photo stream that invites another person, the control server may add the other person to a list of authorized users that are able to access the shared stream. The control server may add the person once he or she accepts the invitation, in some embodiments. The control server may also send messages to all of the clients associated with the person. The clients then request for a list of albums from the control server. The content server provides the list with a new photo stream associated with an invitation. When the person accepts the invitation on one client, then all of the clients may retrieve the images in the photo stream from the set of storage servers 6615. As mentioned above, the notifications may be presented differently in different clients. For example, the smart phone client 6620 may display a badge (e.g., over an application icon, play a sound, and/or cause it to vibrate), while the PC client 6625 may display a notification through the OS's system tray.

In some embodiments, the set of control servers communicates with the different clients using one custom protocol. That is, each client uses the same protocol to communicate with a control server. The protocol may identify a particular type of client device (e.g., a digital media receiver, a smart phone). However, the control server may not perform any special operation or logic for that particular type of client. In some embodiments, the protocol is based on an API that includes different API calls or messages for modifying the photo stream's images (e.g., adding images, deleting images), inviting subscribers, accepting invitations, declining invitation, managing comments (e.g., creating a comment, deleting a comment), etc.

Figure 67:
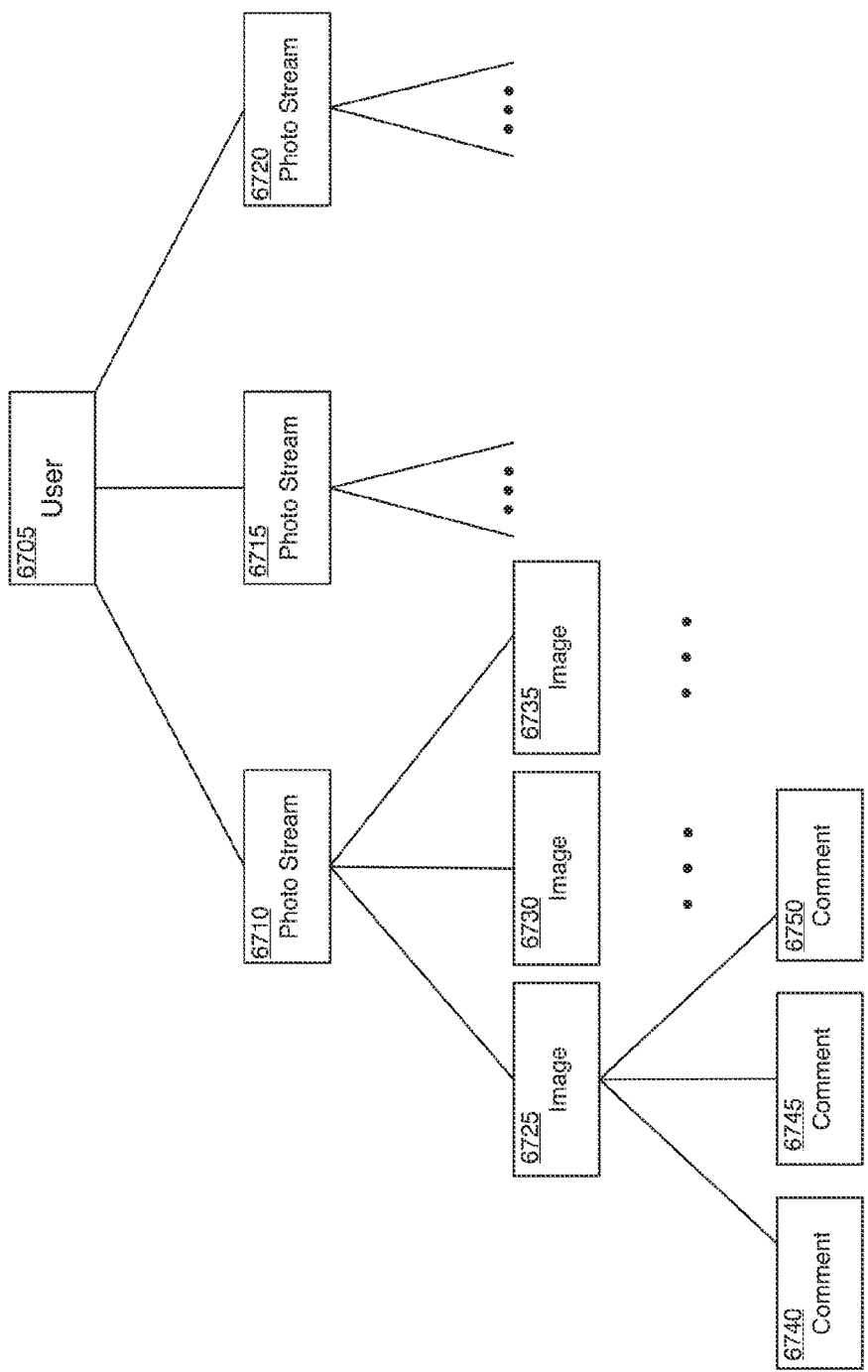
FIG. 67 conceptually illustrates an example of how a user's photo streams are represented at the server side.

FIG. 67 conceptually illustrates an example of how a user's photo streams are represented at the server side (e.g., at a control server). As shown, the figure includes a hierarchical structure that represents the different hierarchical levels of the user's photo stream data. This figure includes user 6705, a set of photo streams 6710-6720, a set of images 6725-6735, and a set of comments 6740-6750. These different boxes represent data structures associated with the user's photo streams.

In the example illustrated in FIG. 67, the user is at the top of the hierarchical structure. The user may be associated with a user identification ("ID") and password. As shown, the user can be associated with any number of photo streams, including a personal photo stream and a shared stream. Here, the user is associated with three photo streams 6710-6720.

In some embodiments, each photo stream is associated with a photo stream ID that uniquely identifies the photo stream and a name that identifies a name for the photo stream. Each photo stream is associated with one or more images. For example, the images 6725-6735 are associated with the photo stream 6710. As mentioned above, the images may be stored at one or more third party storages. Accordingly, the control server may store a reference to each image (a URL) using the photo stream data structure.

In some embodiments, the control server references the image using a first key (e.g., unique key) for identifying the image in the photo stream. The first key may be associated with a second key for accessing the image file that is stored at a storage server (e.g., a third party storage server). The second key may include or is a checksum of that one image file. In some embodiments, the image file is run through a computation algorithm that generates the checksum, which is a hash of the image's content. When a same image is inputted multiple times, the algorithm returns the same file hash (e.g., hash value). Different from the control server, the storage server may reference the image by the file hash, instead of the first key. This allows the storage server to store one image, even though that image is in multiple different photo streams. On the other hand, the control server may reference the same image in different photo streams using different unique keys. Each client may generate keys and/or checksums for its images, in some embodiments.

As shown in FIG. 67, the comments are at the last level and are associated with the image. Many comments can be associated with the one image. For example, the comments 6740-6750 are associated with the image 6725. In some embodiments, the data structure for a comment is associated with a name or user ID of the user that left the comment. The data structure may also include a comment ID for locating or accessing the comment and a timestamp for identifying the time and/or date the comment was left or posted.

XI. Example Server-Side Processes

The previous section described a control server that facilitates the sharing of content (e.g., images, video clips) and comments by managing control data associated with a shared content stream. Examples of such control data include user data (e.g., a list of devices associated with a user) and photo stream data (e.g., a list of photo stream associated with the user, a list of individuals that can access a particular photo stream, file location data, etc.). Several example processes of such a control server will now be described by reference to FIGS. 68-71.

A. Notifying Recipients of a Shared Stream Invitation

Figure 68:
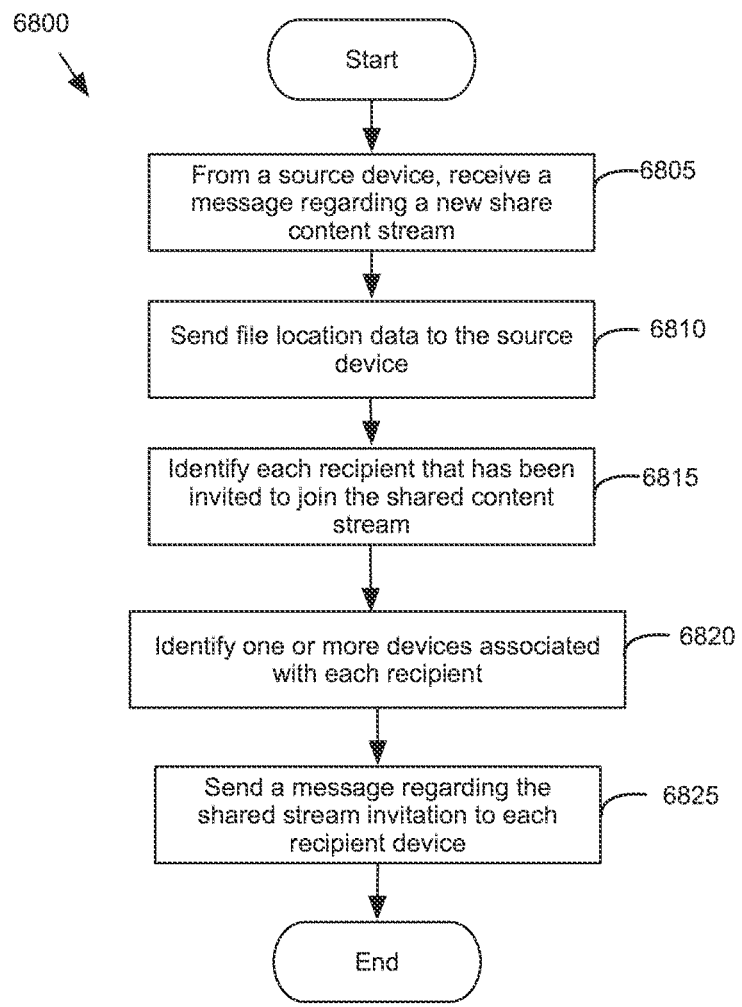
FIG. 68 conceptually illustrates an example process that some embodiments perform to notify recipients of a new-shared stream invitation.

FIG. 68 conceptually illustrates an example process 6800 that some embodiments perform to notify recipients of a new-shared stream invitation. The process 6800, in some embodiments, is performed by the control server. The process 6800 begins when it receives (at 6805) a message regarding a new shared content stream from a source device (e.g., the owner's device). The process 6800 then sends (at 6810) file location data to the source device. In some embodiments, the file location data includes one or more URLs to upload content to a storage server (e.g., a third-party storage server).

At 6815, the process 6800 identities each recipient that has been invited to join the shared stream. For example, the process 6800 might identify a username associated with each recipient. In some embodiment, the username is the same as the recipient's email address. Based on the identification, the process 6800 identifies (at 6820) one or more devices (e.g., destination devices) associated with each recipient. The process 6800 sends (at 6825) a message regarding the shared stream invitation to each recipient device. The process 6800 then ends.

Some embodiments perform variations on the process 6800. The specific operations may not be performed in one continuous series of operations, and different specific operations may be performed in different embodiments. Furthermore, the process 6800 could be implemented using several sub-processes, or as part of a larger macro process. For instance, the process 6800 might identify each device associated with the owner and send a message regarding an update to a shared content stream. The process 6800 might also send the file location data to one or more owner devices. The owner devices may then download the content using the file location data.

B. Adding Subscribers to a Shared Stream

Figure 69:
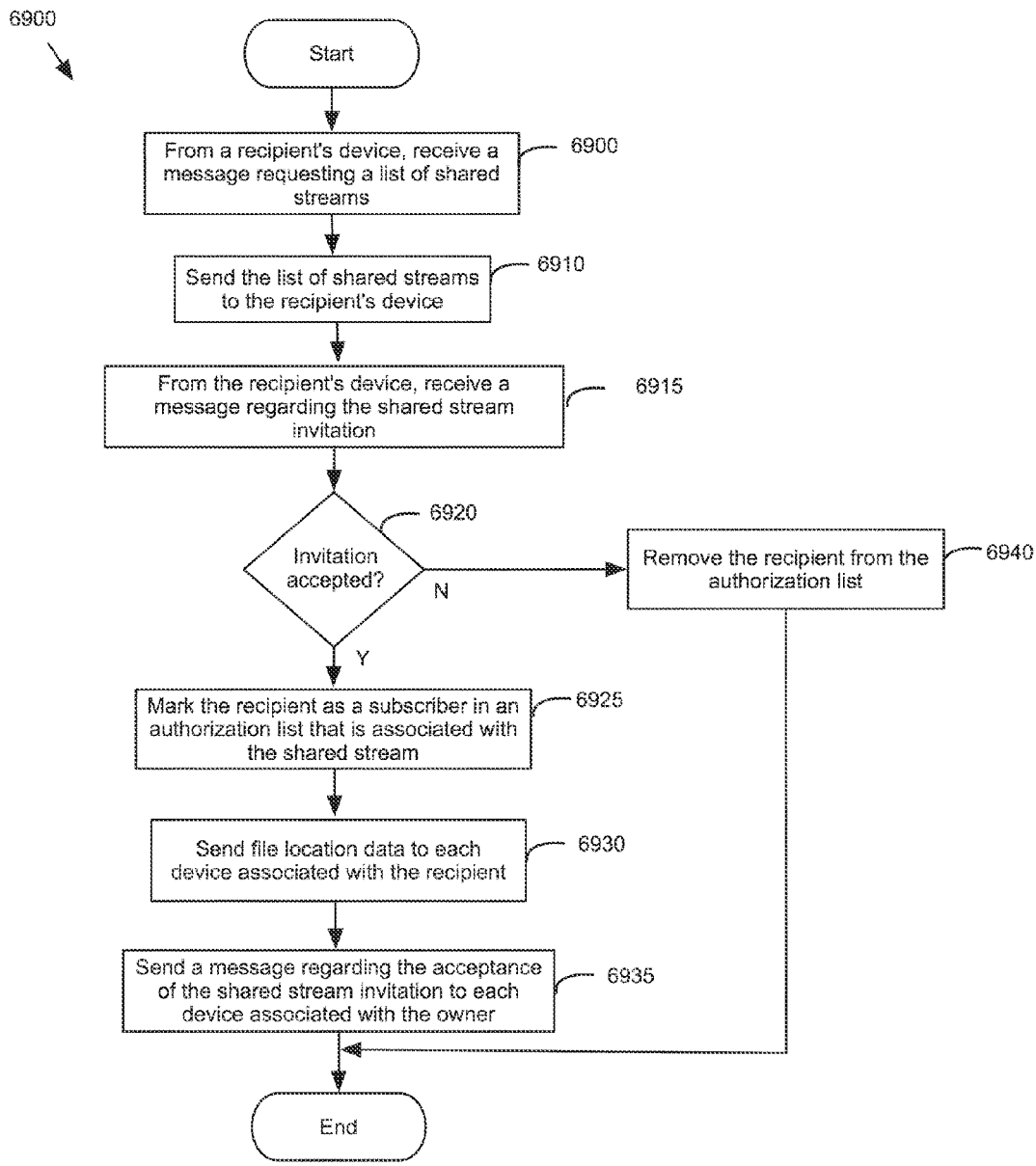
FIG. 69 conceptually illustrates an example process that some embodiments perform when it receives a response from a recipient device.

The previous example described sending a shared stream invitation to each recipient device that is associated with a shared content stream. FIG. 69 conceptually illustrates an example process 6900 that some embodiments perform when it receives a response from a recipient device. The process 6900, in some embodiments, is performed by the control server. The process 6900 begins when it receives (at 6905) receives a message that requests a list of shared streams from a recipient's device. The process 6900 then sends (at 6910) the list of shared streams to the recipient device.

At 6915, the process 6900 receives, from the recipient's device, a message regarding the shared stream invitation. Based on the message, the process 6900 determines (at 6920)

whether the shared stream invitation has been accepted. If so, the process 6900 marks or specifies (at 6925) the recipient as a subscriber in an authorization list that is associated with the shared content stream. In some embodiments, the authorization list lists different individuals that can access the shared content stream. The list may also specify whether a subscriber can add content to a shared stream, remove content, add or remove subscribers, and/or make comments.

After marking the recipient as a subscriber, the process 6900 sends (at 6930) file location data to each device associated with the recipient. Each recipient device may then download the shared content from the storage server using the file location data. The process 6900 then notifies the owner of the acceptance of the shared stream invitation. Specifically, the process 6900 sends (at 6935) a message regarding the acceptance of to each device associated with the owner. One or more of the owner's device may then display a notification (e.g., banner notification, system tray notification) regarding the acceptance of the shared stream invitation.

If the recipient has not accepted the shared stream invitation, the process 6900 removes (at 6940) the recipient from the authorization list. Instead of removing the recipient, the process 6900 might mark the recipient as a person that declined the invitation. In some embodiments, the process 6900 maintain two separate lists, e.g., one that lists different subscribers and another that lists different recipients that have not subscribed to the shared stream.

Some embodiments perform variations on the process 6900. The specific operations may not be performed in one continuous series of operations, and different specific operations may be performed in different embodiments. Furthermore, the process 6900 could be implemented using several sub-processes, or as part of a larger macro process.

C. Commenting

Figure 70:
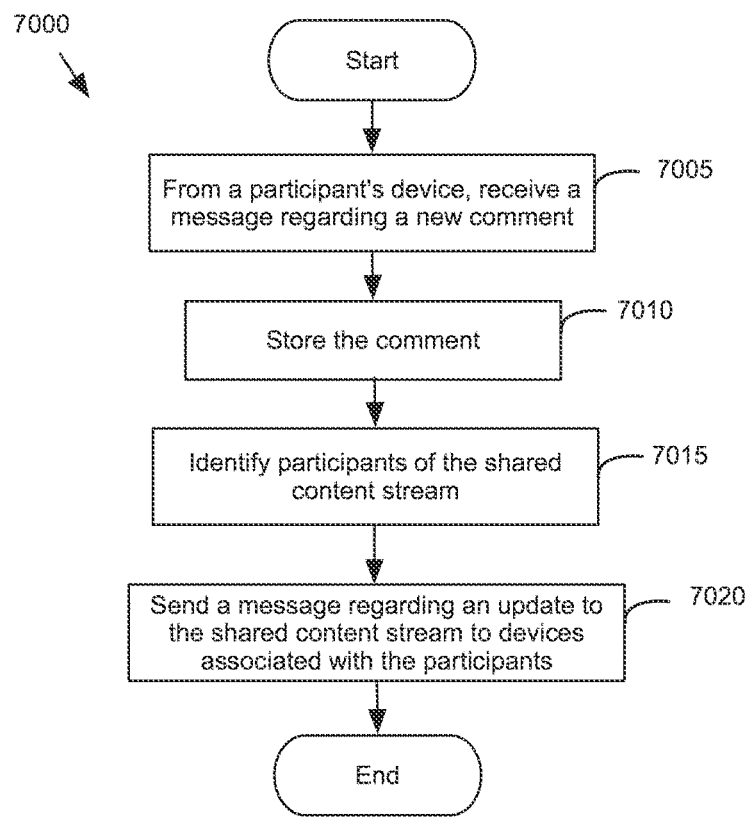
FIG. 70 conceptually illustrates an example process that some embodiments perform to notify participants of a new comment.

The content sharing tools of some embodiments allow different participants to share comments regarding the shared content. FIG. 70 conceptually illustrates an example process 7000 that some embodiments perform to notify participants of a new comment. The process 7000, in some embodiments, is performed by the control server. The process 7000 begins when it receives (at 7005) receives a message with the new comment. The process 7000 then stores (at 7010) the comment.

At 7015, the process 7000 identifies participants of the shared content stream. Based on the identification, the process 7000 sends a message regarding an update to the shared content to the devices that are associated with the participants. The process 7000 then ends.

Figure 71:
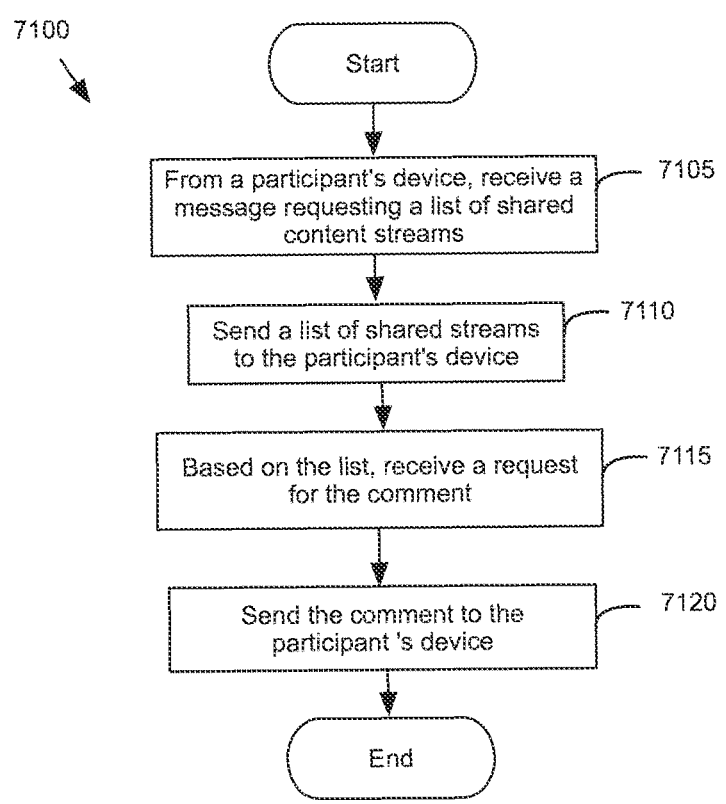
FIG. 71 conceptually illustrates an example process that some embodiments perform to deliver a new comment.

FIG. 71 conceptually illustrates an example process 7100 that some embodiments perform to deliver a new comment. The process 7100, in some embodiments, is performed by the control server. The process 7100 begins when it receives (at 7105) receives a message that requests a list of shared content streams from a recipient device. The process 7100 then sends (at 7110) the list of shared streams to the recipient device.

At 6915, the process 7100 receives, from the participant device, a message request for the new comment. Based on the message, the process 710 sends (at 7120) the comment to the participant's device. Some embodiments perform variations on the processes 7000 and 7100. The specific operations may not be performed in one continuous series of operations, and different specific operations may be performed in different embodiments. Furthermore, each of the processes 7000 and 7100 could be implemented using several sub-processes, or as part of a larger macro process.

XII. Software Architecture

Figure 72:
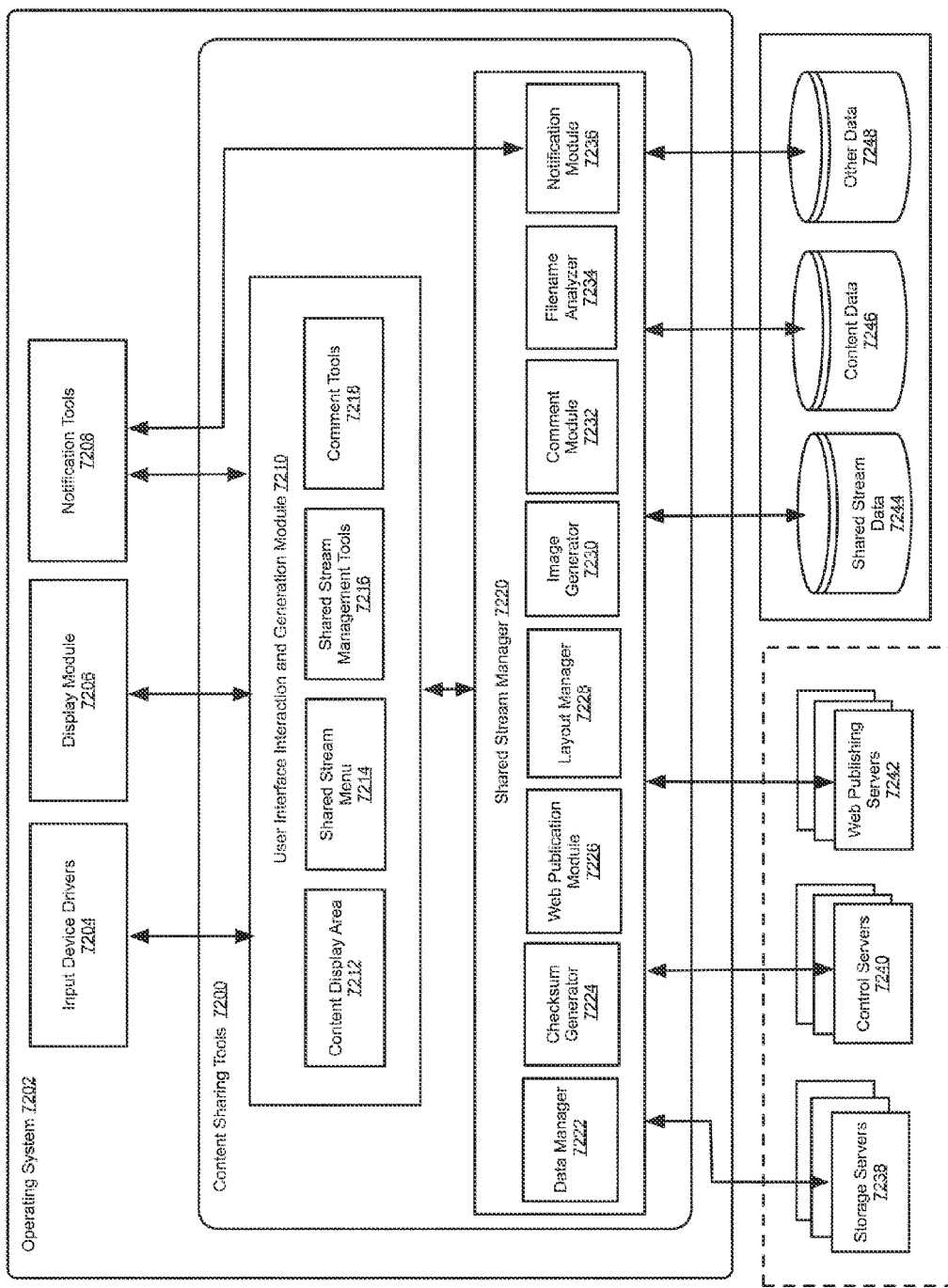
FIG. 72 conceptually illustrates the software architecture of content sharing tools of some embodiments

In some embodiments, the processes described above are implemented as software running on a particular machine, such as a computer or a handheld device, or stored in a machine readable medium. FIG. 72 conceptually illustrates the software architecture of content sharing tools 7200 of some embodiments. In some embodiments, the content sharing tools are provided as a stand-alone application or are integrated into another application, while in other embodiments the content sharing tools are implemented within an operating system. Furthermore, in some embodiments, the content sharing tools are provided as part of a server-based solution. In some such embodiments, the content sharing tools are provided via a thin client. That is, the content sharing tools runs on a server while a user interacts with the content sharing tools via a separate machine remote from the server. In other embodiments, the content sharing tools are provided via a thick client. That is, the content sharing tools are distributed from the server to the client machine and runs on the client machine.

The content sharing tools 7200 includes a user interface (UI) interaction and generation module 7210 and a shared stream manager 7220. As shown, the user interface interaction and generation module 7210 generates a number of different UI elements, including a content display area 7212, a shared stream menu 7214, shared stream management tools 7216, and comment tools 7218. The figure also illustrates stored data associated with the content sharing tools: shared stream data 7244, content data 7244, and other data 7248. In some embodiments, the shared stream data 7244 stores data related to a shared stream (e.g., a list of photo streams, list of individuals associated with a photo stream, references to images, comments, etc.). The content data 7246 may include images and/or video. The content data 7246 of some embodiments includes multiple versions of one image (e.g., at different resolution).

FIG. 72 also illustrates an operating system 7202 that includes input device driver(s) 7204, display module 7206 and notifications tools. In some embodiments, as illustrated, the device drivers 7204 and display module 7206 are part of the operating system 7202 even when the content sharing tools 7200 is part of an application that is separate from the operating system 7270. The input device drivers 7204 may include drivers for translating signals from a keyboard, mouse, touchpad, tablet, touchscreen, etc. A user interacts with one or more of these input devices, each of which send signals to its corresponding device driver. The device driver then translates the signals into user input data that is provided to the UI interaction and generation module 7210.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of touch controls in the graphical user interface to control (e.g., select, move) objects in the graphical user interface. However, in some embodiments, objects in the graphical user interface can also be controlled or manipulated through other controls, such as a cursor control. In some embodiments, the touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 7206 translates the output of a user interface for a display device. That is, the display module 7206 receives signals (e.g., from the UI interaction and generation module 7210) describing what should be displayed and translates these signals into pixel information that is sent to the display device. The display device may be an LCD, plasma screen, CRT monitor, touchscreen, etc.

In some embodiments, the notification tools 7208 presents notifications (e.g., at the operating system level). Examples of such notifications may include one or more of the following: an icon badge, banner notification, system tray notification, lock-screen alert, notification center message, etc. In some embodiments, the notification tools 7208 causes a computing device (e.g., smart phone, tablet) to play a sound or vibrate.

The UI interaction and generation module 7210 of the content sharing tools 7200 interprets the user input data received from the input device drivers 7204 and passes it to various UI components, including the content display area 7212, the shared stream menu 7214, the shared stream management tools 7216, and the comment tools 7218. The UI interaction and generation module 7210 also manages the display of the UI, and outputs this display information to the display module 7206. In some embodiments, the UI interaction and generation module 7210 generates a basic UI and populates the UI with information from the other modules and stored data (e.g., stored data 7244, 7248).

As shown, the UI interaction and generation module 7210, in some embodiments, generates a number of different UI elements. These elements, in some embodiments, include the content display area 7212, the shared stream menu 7214, the shared stream management tools 7216, and the comment tools 7218. In many of the examples described above, the content display area 7212 is referred to as an image display, and the shared stream menu 7214 is referred to a photo stream menu. In some embodiments, the shared stream management tools 7216 include a photo stream options sheet, a comment sheet, a photo stream management sheet (e.g., to add or remove subscriber, to resend a photo stream invitation, to delete a photo stream, etc.). The comment tools of some embodiments include an add comment field, like button, delete comment button, etc. All of these UI elements are described in many different examples above.

As shown in FIG. 72, the shared stream manager includes several components to facilitate the content and comment sharing features. The components include (1) a data manager 7222, (2) a checksum generator 7224, (3) a web publication module 7226, (4) a layout manager 7228, (5) an image generator 7230, (6) a comment module 7232, (7) a filename analyzer, and (8) a notification module. Different components may be provided for different platforms. For instance, the filename analyzer may be provided in one platform (e.g., a PC platform) while not provided for another platform (e.g., a smartphone or tablet platform).

In some embodiments, the data manager 7222 facilitates the uploading and downloading of content data from one or more the storage servers 7238 (e.g., third-party storage servers). The data manager 7222 may receive file location data (e.g., URL address), and upload to or download content from a storage server. This data manager 7222 of some embodiments operates automatically without any user input. For example, the shared stream manager 7220 may receive a message regarding a new batch of images in a shared image, and direct the data manager 7222 to download the batch from the storage server.

The checksum generator 7224 runs an image file through a computation algorithm that generates a checksum of that image file, which is a hash of the image's content. The content sharing tools and the control server may reference an image using a first key (e.g., unique key) for identifying the image in the photo stream. The first key may be associated with a second key for accessing the image file that is stored at an external data source (e.g., a storage server). The second key may include or is a checksum of that one image file. This checksum allows the storage server to store one image, even though that image is in multiple different photo streams.

The web publication module 7230 allows images to be published as a set of webpages to a website. In some embodiments, the website is a public website that can be accessed by any browser with the correct URL address. To publish the images, the web publication module 7230 may communicate with one or more of the web publishing servers 7242.

In some embodiments, the content display area 7212 presents images similar to the ones that are published to a website. To present the images, the shared stream manager 7220 may include the layout manager 7228. This layout manager of some embodiments selects a layout based on the number of images in a batch and the orientation of those images. The images may be presented in a particular order (e.g., starting with the oldest image and ending with the newest image, or vice versa). The batches may be presented in a particular order (e.g., starting with the oldest batch to the newest batch, or vice versa).

In some embodiments, the comment module 7232 allows the sharing of comments regarding content in a shared stream. This module of some embodiments receives a comment and generates a message regarding the comment to send to a control server. The comment module may also receive a message regarding a new comment and perform operations to display the comment (e.g., in the content display area 7212). These operations may include identifying the image associated with the comment, the timestamp of the comment, and the person that left the comment. These operations may also entail counting the number of comments and/or likes associated with that same image.

The filename analyzer 7234 analyzes a filename of a piece of content to automatically input a comment. The filename may be analyzed using a number of different techniques. In some embodiments, the analysis entails identifying one or more words, names, or people in the filename. The analysis may entail identifying random filenames that are generated by different image capturing devices (e.g., digital cameras, smart phones, tablets). The analysis may also entail identifying different characters (e.g., underscore) and replacing them with a space.

The notification module detects notifications from a control server and facilitates their presentation. For example, the notification module may cause different photo streams to be marked with a marking (e.g., colored dot) in the shared stream menu 7214 and/or cause images to be marked with a marking (e.g., a chat bubble, double chat bubble, a flag that identifies the number of new images, etc.) in the content display area 7212. In some embodiments, the notification module interoperates with the notifications tools 7208 to present notifications (e.g., icon badge, banner notification, system tray notification) at the operating system level.

While many of the features of the content sharing tools 7200 have been described as being performed by one module (e.g., the comment module 7232, the web publication module 7226, etc.), one of ordinary skill in the art will recognize that the components (e.g., functions, modules) described herein might be split up into multiple components. Similarly, components that are described as being performed by multiple different modules might be performed by a single module, in some embodiments.

XIII. Electronic Systems

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. In addition, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 73:
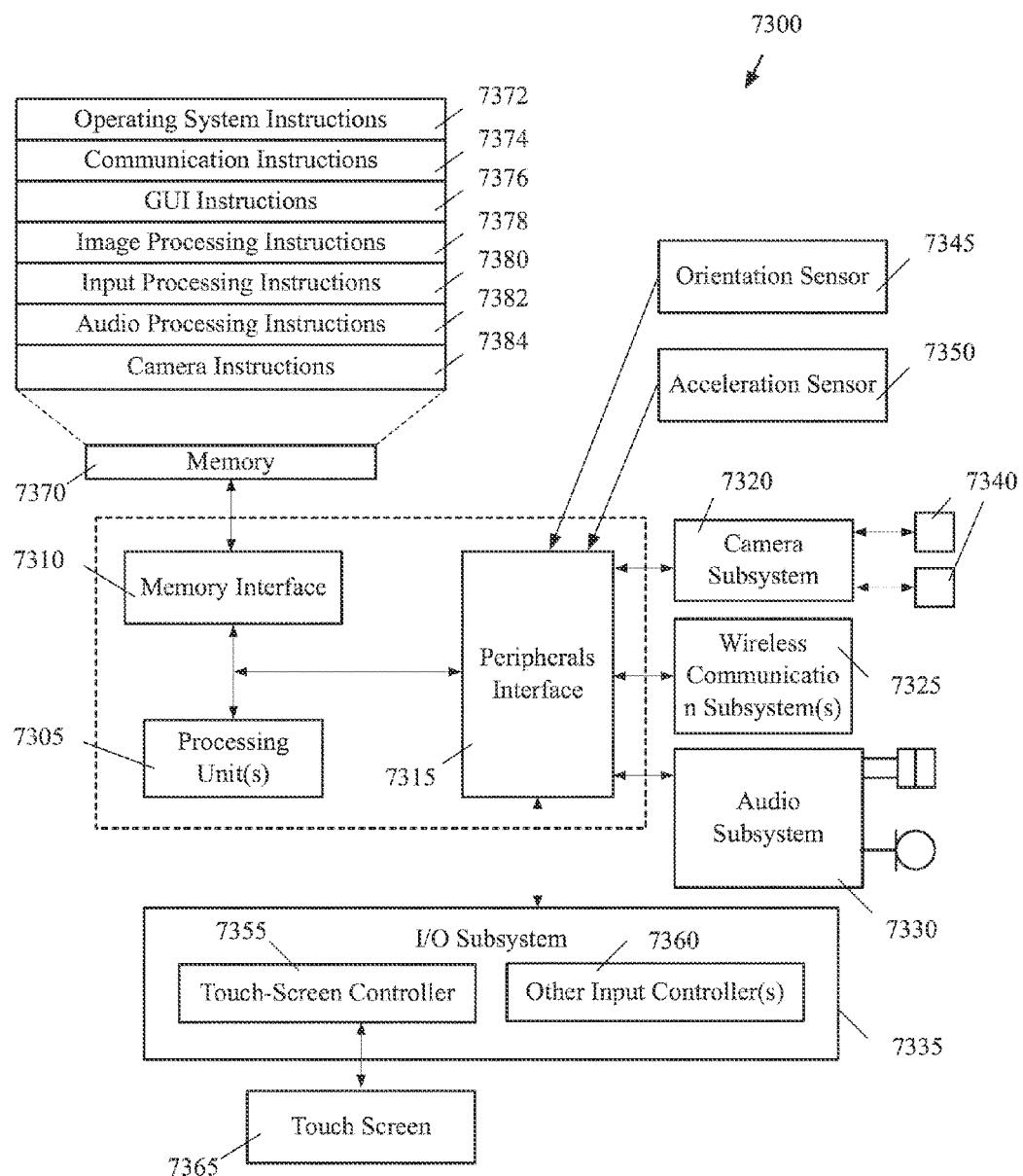
FIG. 73 is an example of an architecture of such a mobile computing device.

The image editing and viewing applications of some embodiments operate on mobile devices. FIG. 73 is an example of an architecture 7300 of such a mobile computing device. Examples of mobile computing devices include smartphones, tablets, laptops, etc. As shown, the mobile computing device 7300 includes one or more processing units 7305, a memory interface 7310 and a peripherals interface 7315.

The peripherals interface 7315 is coupled to various sensors and subsystems, including a camera subsystem 7320, a wireless communication subsystem(s) 7325, an audio subsystem 7330, an I/O subsystem 7335, etc. The peripherals interface 7315 enables communication between the processing units 7305 and various peripherals. For example, an orientation sensor 7345 (e.g., a gyroscope) and an acceleration sensor 7350 (e.g., an accelerometer) is coupled to the peripherals interface 7315 to facilitate orientation and acceleration functions.

The camera subsystem 7320 is coupled to one or more optical sensors 7340 (e.g., a charged coupled device (CCD) optical sensor, a complementary metal-oxide-semiconductor (CMOS) optical sensor, etc.). The camera subsystem 7320 coupled with the optical sensors 7340 facilitates camera functions, such as image and/or video data capturing. The wireless communication subsystem 7325 serves to facilitate communication functions. In some embodiments, the wireless communication subsystem 7325 includes radio frequency receivers and transmitters, and optical receivers and transmitters (not shown in FIG. 73). These receivers and transmitters of some embodiments are implemented to operate over one or more communication networks such as a GSM network, a Wi-Fi network, a Bluetooth network, etc. The audio subsystem 7330 is coupled to a speaker to output audio (e.g., to output different sound effects associated with different image operations). Additionally, the audio subsystem 7330 is coupled to a microphone to facilitate voice-enabled functions, such as voice recognition, digital recording, etc.

The I/O subsystem 7335 involves the transfer between input/output peripheral devices, such as a display, a touch screen, etc., and the data bus of the processing units 7305 through the peripherals interface 7315. The I/O subsystem 7335 includes a touch-screen controller 7355 and other input controllers 7360 to facilitate the transfer between input/output peripheral devices and the data bus of the processing units 7305. As shown, the touch-screen controller 7355 is coupled to a touch screen 7365. The touch-screen controller 7355 detects contact and movement on the touch screen 7365 using any of multiple touch sensitivity technologies. The other input controllers 7360 are coupled to other input/control devices, such as one or more buttons. Some embodiments include a near-touch sensitive screen and a corresponding controller that can detect near-touch interactions instead of or in addition to touch interactions.

The memory interface 7310 is coupled to memory 7370. In some embodiments, the memory 7370 includes volatile memory (e.g., high-speed random access memory), non-volatile memory (e.g., flash memory), a combination of volatile and non-volatile memory, and/or any other type of memory. As illustrated in FIG. 73, the memory 7370 stores an operating system (OS) 7372. The OS 7372 includes instructions for handling basic system services and for performing hardware dependent tasks.

The memory 7370 also includes communication instructions 7374 to facilitate communicating with one or more additional devices; graphical user interface instructions 7376 to facilitate graphic user interface processing; image processing instructions 7378 to facilitate image-related processing and functions; input processing instructions 7380 to facilitate input-related (e.g., touch input) processes and functions; audio processing instructions 7382 to facilitate audio-related processes and functions; and camera instructions 7384 to facilitate camera-related processes and functions. The instructions described above are merely exemplary and the memory 7370 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 73 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 73 may be split into two or more integrated circuits.

B. Computer System

Figure 74:
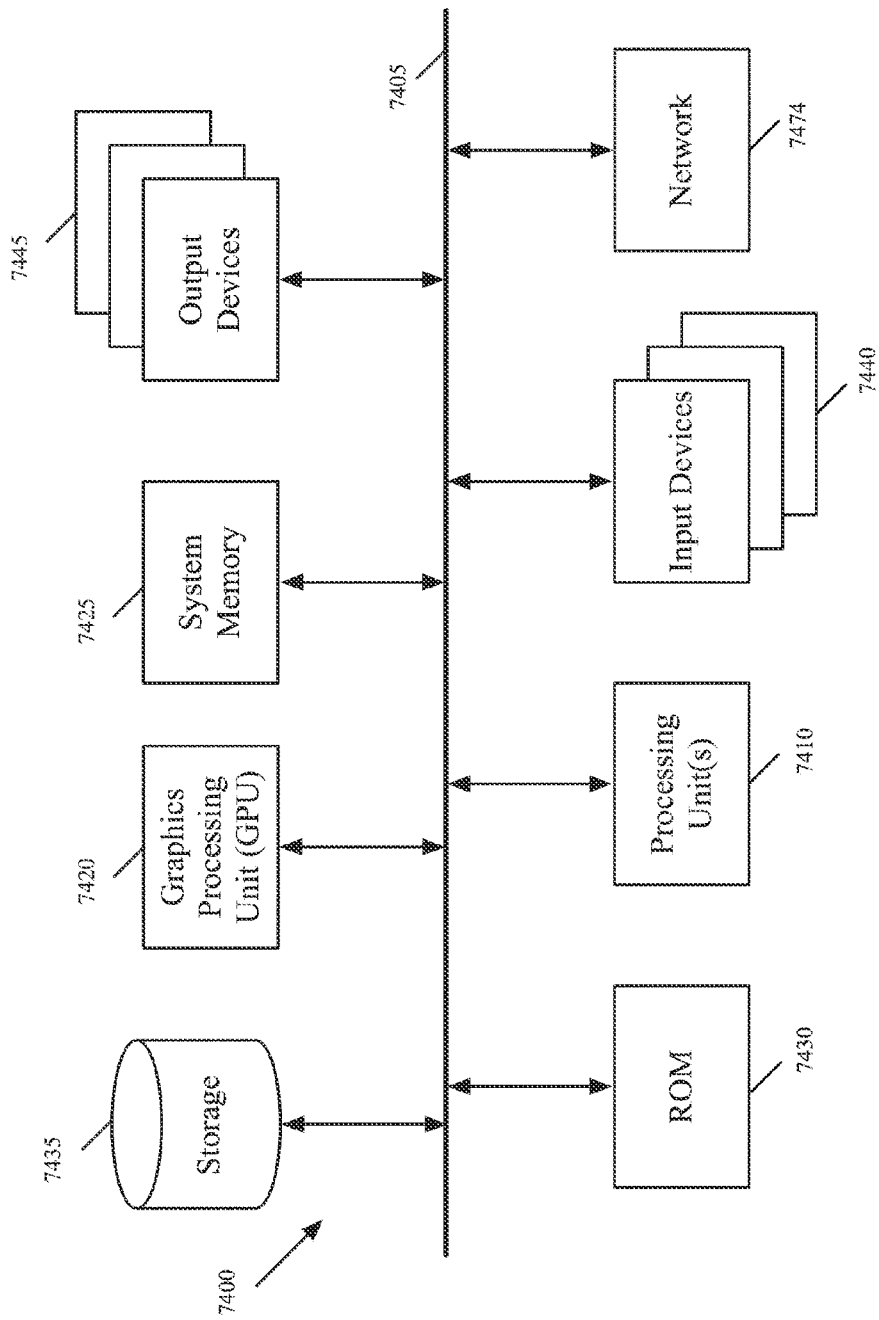
FIG. 74 conceptually illustrates another example of an electronic system with which some embodiments of the invention are implemented.

FIG. 74 conceptually illustrates another example of an electronic system 7400 with which some embodiments of the invention are implemented. The electronic system 7400 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 7400 includes a bus 7405, processing unit(s) 7410, a graphics processing unit (GPU) 7415, a system memory 7420, a network 7425, a read-only memory 7430, a permanent storage device 7435, input devices 7440, and output devices 7445.

The bus 7405 collectively represents all system, peripheral, and chipset buses that communicatively connect the numerous internal devices of the electronic system 7400. For instance, the bus 7405 communicatively connects the processing unit(s) 7410 with the read-only memory 7430, the GPU 7415, the system memory 7420, and the permanent storage device 7435.

From these various memory units, the processing unit(s) 7410 retrieves instructions to execute and data to process in order to execute the processes of the invention. The processing unit(s) may be a single processor or a multi-core processor in different embodiments. Some instructions are passed to and executed by the GPU 7415. The GPU 7415 can offload various computations or complement the image processing provided by the processing unit(s) 7410.

The read-only-memory (ROM) 7430 stores static data and instructions that are needed by the processing unit(s) 7410 and other modules of the electronic system. The permanent storage device 7435, on the other hand, is a read-and-write memory device. This device is a non-volatile memory unit that stores instructions and data even when the electronic system 7400 is off. Some embodiments of the invention use a mass-storage device (such as a magnetic or optical disk and its corresponding disk drive) as the permanent storage device 7435.

Other embodiments use a removable storage device (such as a floppy disk, flash memory device, etc., and its corresponding drive) as the permanent storage device. Like the permanent storage device 7435, the system memory 7420 is a read-and-write memory device. However, unlike storage device 7435, the system memory 7420 is a volatile read-and-write memory, such a random access memory. The system memory 7420 stores some of the instructions and data that the processor needs at runtime. In some embodiments, the invention's processes are stored in the system memory 7420, the permanent storage device 7435, and/or the read-only memory 7430. For example, the various memory units include instructions for processing multimedia clips in accordance with some embodiments. From these various memory units, the processing unit(s) 7410 retrieves instructions to execute and data to process in order to execute the processes of some embodiments.

The bus 7405 also connects to the input and output devices 7440 and 7445. The input devices 7440 enable the user to communicate information and select commands to the electronic system. The input devices 7440 include alphanumeric keyboards and pointing devices (also called "cursor control devices"), cameras (e.g., webcams), microphones or similar devices for receiving voice commands, etc. The output devices 7445 display images generated by the electronic system or otherwise output data. The output devices 7445 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 74, bus 7405 also couples electronic system 7400 to a network 7425 through a network adapter (not shown). In this manner, the computer can be a part of a network of computers (such as a local area network ("LAN"), a wide area network ("WAN"), or an Intranet, or a network of networks, such as the Internet. Any or all components of electronic system 7400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures (including FIGS. 7, 14, 19, 20, 36, 37, 48, and 68-71) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

While the invention has been described with reference to numerous specific details, one of ordinary skill in the art will recognize that the invention can be embodied in other specific forms without departing from the spirit of the invention. For example, one of ordinary skill in the art will understand that many of the UI items of in FIGS. 1-6, 8-13, 15-18, 21-35, 38-41, and 49-65 can also be activated and/or set by a cursor control device (e.g., a mouse or trackball), a stylus, keyboard, a finger gesture (e.g., placing, pointing, tapping one or more fingers) near a near-touch sensitive screen, or any other control system in some embodiments. Thus, one of ordinary skill in the art would understand that the invention is not to be limited by the foregoing illustrative details, but rather is to be defined by the appended claims.

What is claimed is:

1. A non-transitory machine readable medium storing sets of instructions that when executed by at least one processing unit of a device provides a user interface (UI) for sharing a plurality of image streams, each image stream created by a subscriber and shared by one or more other subscribers, the UI comprising:
   a first display area for displaying a plurality of images;
   a set of image sharing tools for (i) receiving a selection of a set of images from the first display area to create an image stream, (ii) sharing the set of images with a group of subscriber devices, and (iii) exchanging comments with the group of subscriber devices regarding the set of images in the created image stream and images in one or more image streams created by other subscriber devices; and
   a second display area for displaying a notification regarding a new comment associated with a shared image, wherein the notification is displayed on a subscriber device that created the image stream comprising the shared image and on a subscriber device that has previously left a comment regarding the shared image, wherein the notification is not displayed on a subscriber device that has not created the image stream comprising the shared image and has not previously left a comment regarding the shared image.

2. The non-transitory machine readable medium of claim 1, wherein the UI further comprises a selectable item that when selected causes the first display area to display images that are shared with the group of subscriber devices and exclude any images that are not shared with the group of subscriber devices.

3. The non-transitory machine readable medium of claim 1, wherein each image that is associated with at least one comment is displayed in the first display area with a marking or number that identifies a number of comments associated with the image.

4. The non-transitory machine readable medium of claim 1, wherein each image that is associated with at least one comment is displayed in the first display area with a marking that indicates whether the image is associated with at least one unread comment or is not associated with any unread comment.

5. The non-transitory machine readable medium of claim 4, wherein the marking is displayed in a first color to indicate that the image is associated with at least one unread comment or is displayed in a second different color to indicate that the image is not associated with any unread comment.

6. The non-transitory machine readable medium of claim 1, wherein each image that is associated with a plurality of comments is displayed in the first display area with a marking that identifies whether the subscriber device has previously left at least one comment regarding the same image.

7. The non-transitory machine readable medium of claim 1, wherein the notification is displayed with at least one of the new comment, a name of the subscriber that posted the new comment, a thumbnail representation of the image associated with the new comment.

8. The non-transitory machine readable medium of claim 1, wherein a selection of the notification causes the image associated with the new comment to be displayed in the first display area with the new comment.

9. The non-transitory machine readable medium of claim 1, wherein the set of image sharing tools comprises a selectable item that when selected associates an image in the set of images with a marking that indicates a liking of the image.

10. A non-transitory machine readable medium storing sets of instructions that when executed by at least one processing unit of a device provides a user interface (UI) for sharing a plurality of image streams, each image stream created by a subscriber and shared by one or more other subscribers, the UI comprising:
    a display area for displaying a plurality of images; and
    a set of image sharing tools for (i) receiving a selection of a set of images from the display area, (ii) sharing the set of images with a group of subscriber devices, (iii) exchanging comments with the group of subscriber devices regarding the set of image, and (iv) displaying a unitary multi-state marker on each image that is associated with a set of comments regarding the image, the multi-state marker displayed on each image comprising:
      a first state to indicate that the subscriber device has previously left at least one comment regarding the image and the image is associated with at least one unread comment, and
      a second state to indicate that the subscriber device has not previously left any comments regarding the image and the image is associated with at least one unread comment.

11. The non-transitory machine readable medium of claim 10, the UI further comprising a selectable item that when selected causes the display area to display images that are shared with the group of subscriber devices and exclude any images that are not shared with the group of subscriber devices.

12. The non-transitory machine readable medium of claim 10, wherein the multi-state marker further comprises a number that identifies a number of comments associated with the image.

13. The non-transitory machine readable medium of claim 10, wherein the multi-state marker is displayed in a first color to indicate that the image is associated with at least one unread comment or is displayed in a second different color to indicate that the image is not associated with any unread comment.

14. The non-transitory machine readable medium of claim 10, wherein the display area is a first display area, wherein the UI further comprises a second display area to display a notification regarding a new comment associated with an image in the set of images.

15. The non-transitory machine readable medium of claim 14, wherein the notification is displayed with at least one of the new comment, a name of the subscriber that posted the new comment, a thumbnail representation of the image associated with the new comment.

16. The non-transitory machine readable medium of claim 14, wherein a selection of the notification in the second display area causes the image associated with the new comment to be displayed in the first display area with the new comment.

17. The non-transitory machine readable medium of claim 14, wherein the notification is displayed on a subscriber device that created the image stream comprising the image associated with the new comment and on a subscriber device that has previously left a comment regarding the image associated with the new comment, wherein the notification is not displayed on a subscriber device that has not created the image stream comprising the shared image and has not previously left a comment regarding the shared image.

18. The non-transitory machine readable medium of claim 10, the multi-state marker displayed on each image further comprising:
a third state to indicate that the subscriber device has previously left at least one comment regarding the image and all comments associated with the image have been read, and
a fourth state to indicate that the subscriber device has not previously left any comments regarding the image and all comments associated with the image have been read.

19. The non-transitory machine readable medium of claim 10, wherein the set of image sharing tools comprises a selectable item that when selected associates an image in the set of images with a marking that indicates a liking of the image.

20. The non-transitory machine readable medium of claim 10, wherein the multi-state marker is displayed with a first shape that indicates the image is associated with at least one comment left by the subscriber device or displayed with a second shape that indicates the image is not associated with any comments left by the subscriber device.

21. The non-transitory machine readable medium of claim 10, wherein the multi-state marker is displayed with a first color that indicates the image is associated with at least one comment left by the subscriber device or displayed with a second color that indicates the image is not associated with any comments left by the subscriber device.

22. The non-transitory machine readable medium of claim 10, wherein the multi-state marker is displayed with a first shape that indicates the image is associated with at least one unread comment or displayed with a second shape that indicates the image is not associated with any unread comment.

* * * * *